March 14, 1950           J. E. OSTLINE           2,500,374
AUTOMATIC CHARGING AND TICKETING IN
AUTOMATIC TELEPHONY
Original Filed Aug. 26, 1940           27 Sheets-Sheet 1
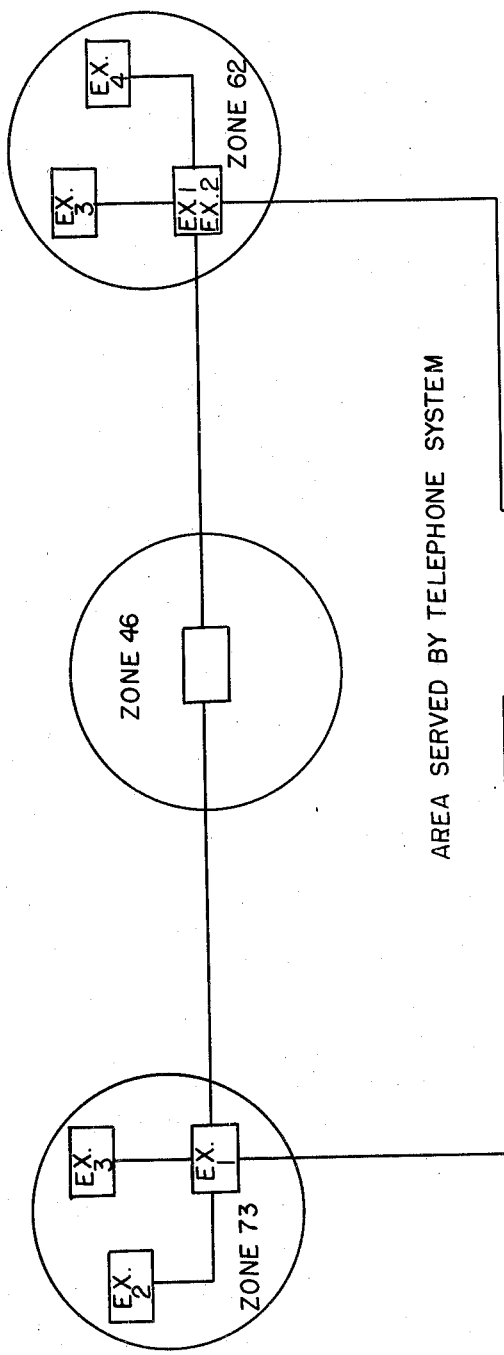
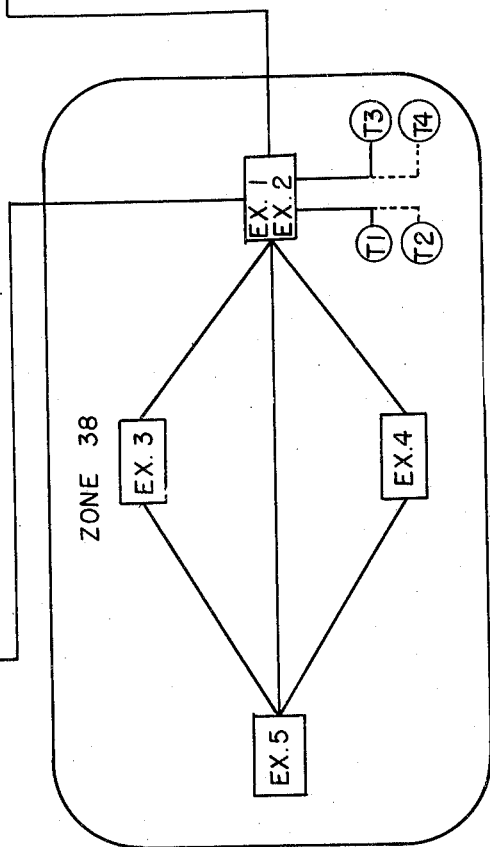
FIG.1
INVENTOR.
JOHN E. OSTLINE
BY Davis, Lindsey, Smith & Shonts
ATTORNEYS

PRINTER CONTROLLER 85

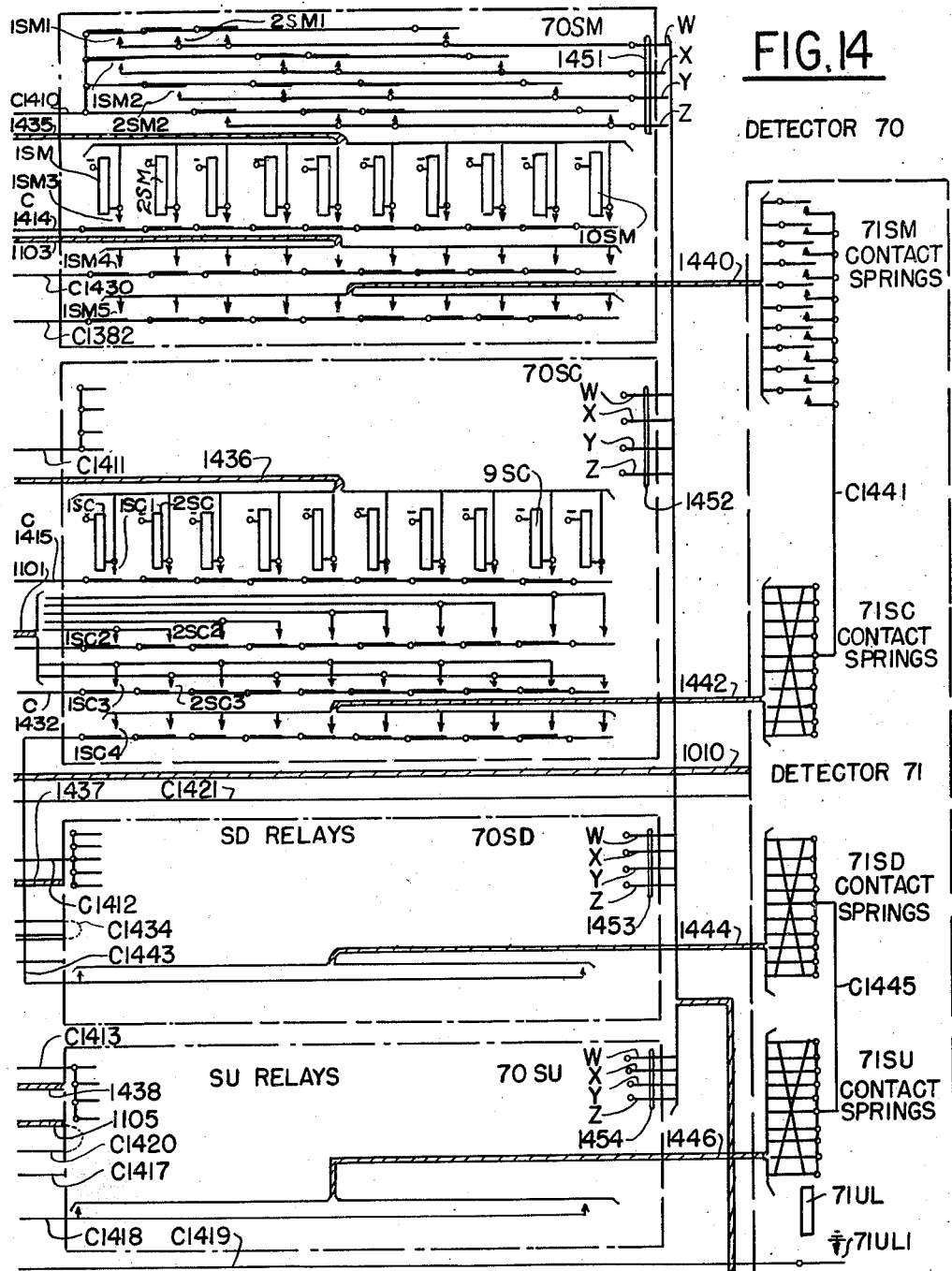
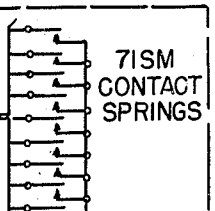
FIG. 14

REGISTER TRANSLATOR 60

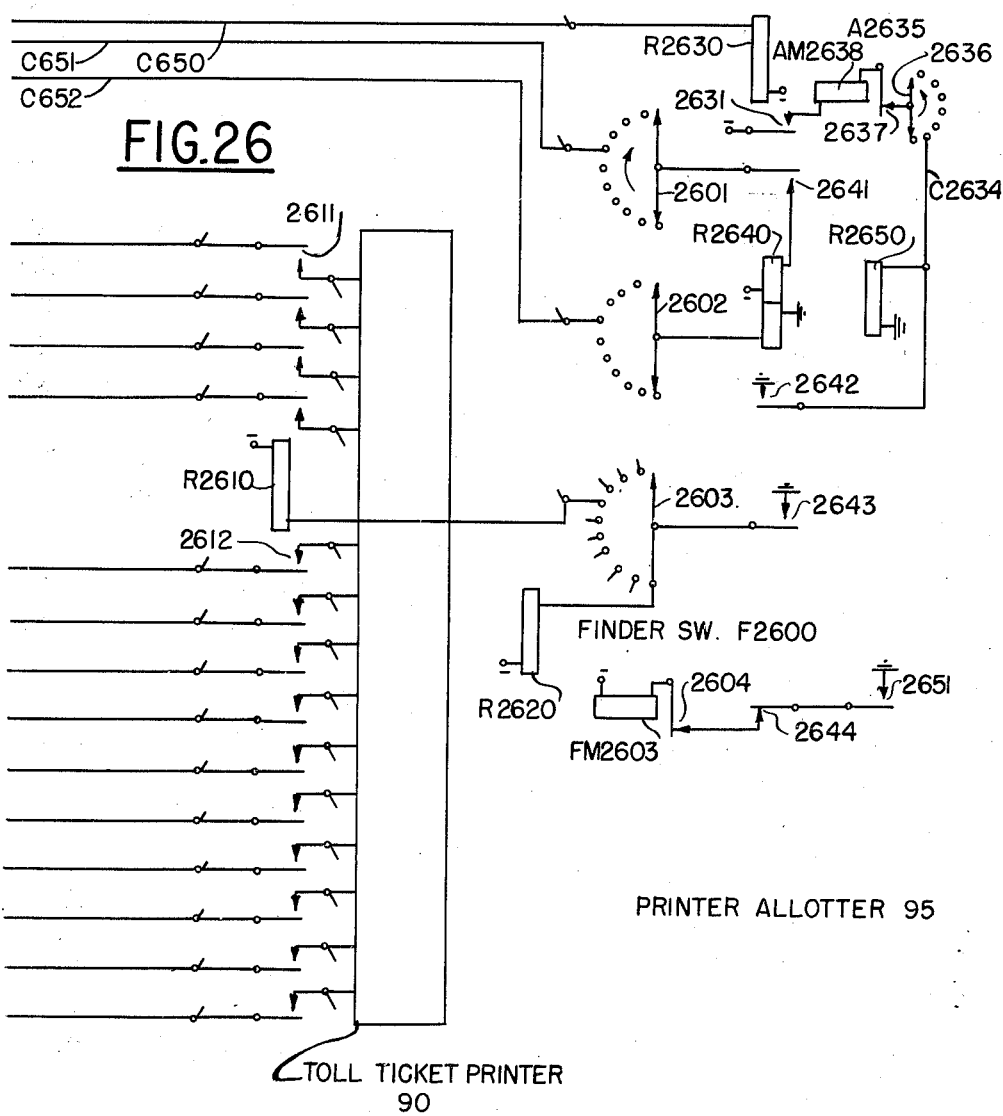

March 14, 1950

J. E. OSTLINE 2,500,374

AUTOMATIC CHARGING AND TICKETING IN
AUTOMATIC TELEPHONY

Original Filed Aug. 26, 1940

27 Sheets-Sheet 27

FIG. 27

Figure 3:
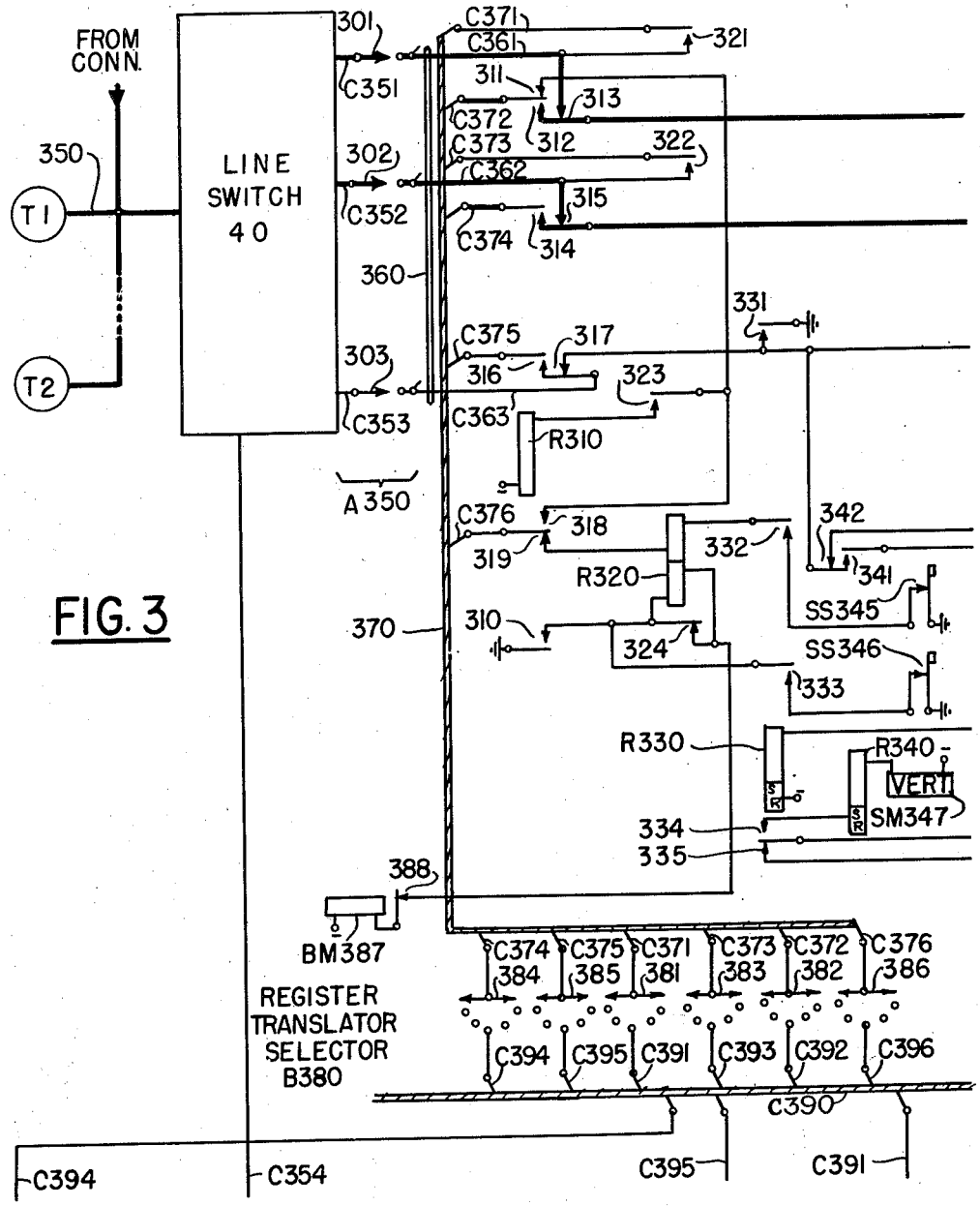
Figure 4:
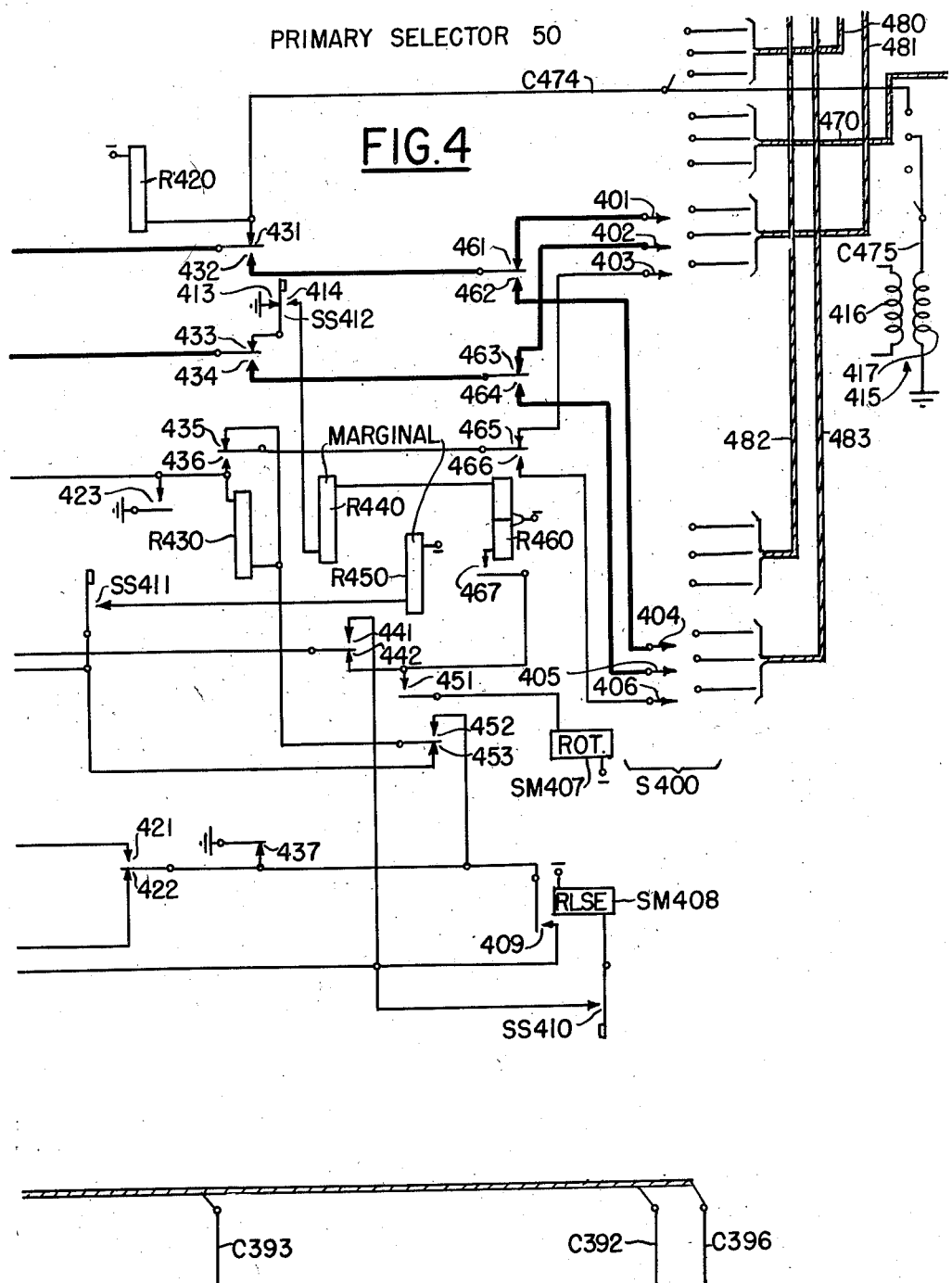
Figure 6:
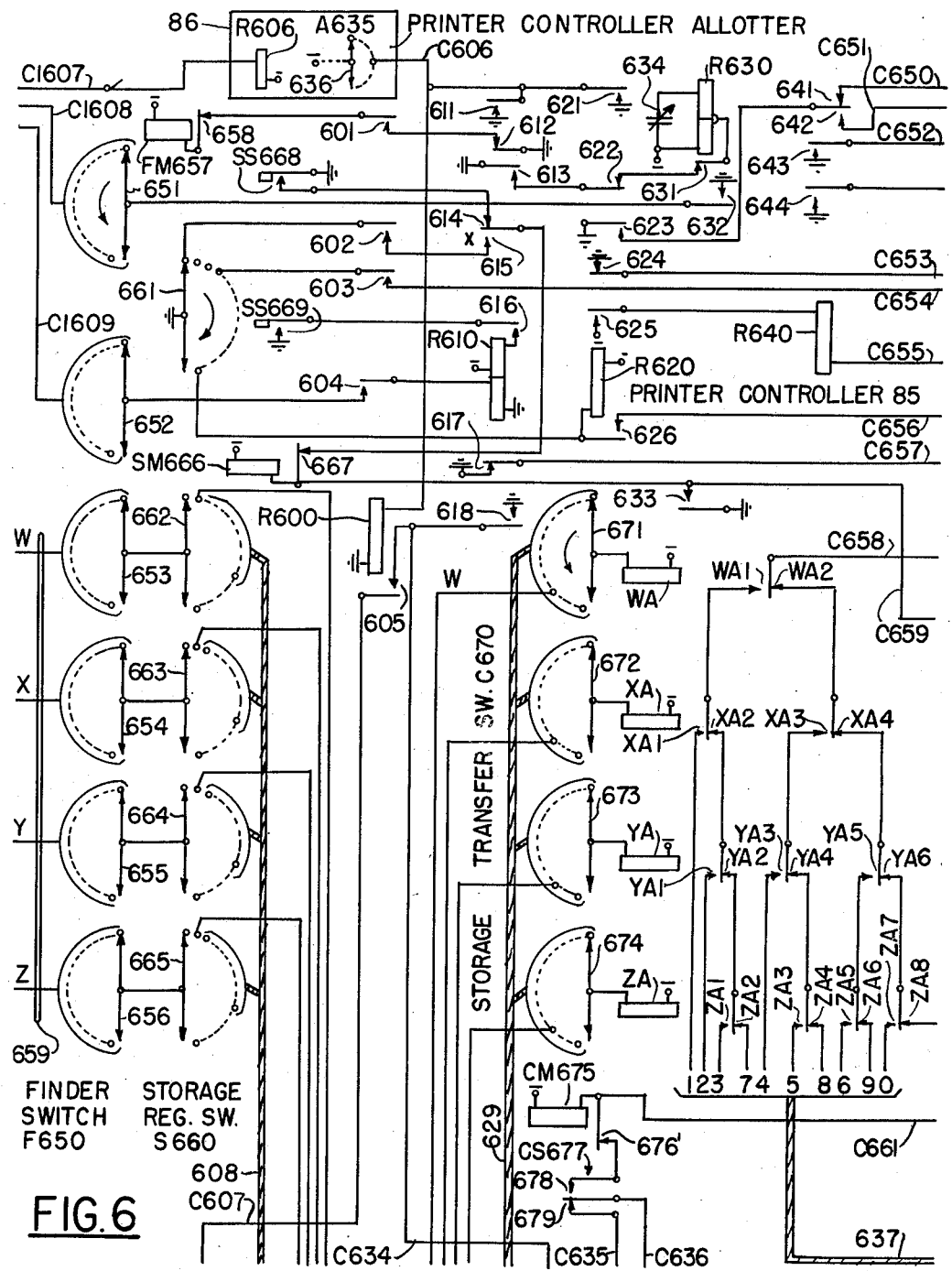
Figure 7:
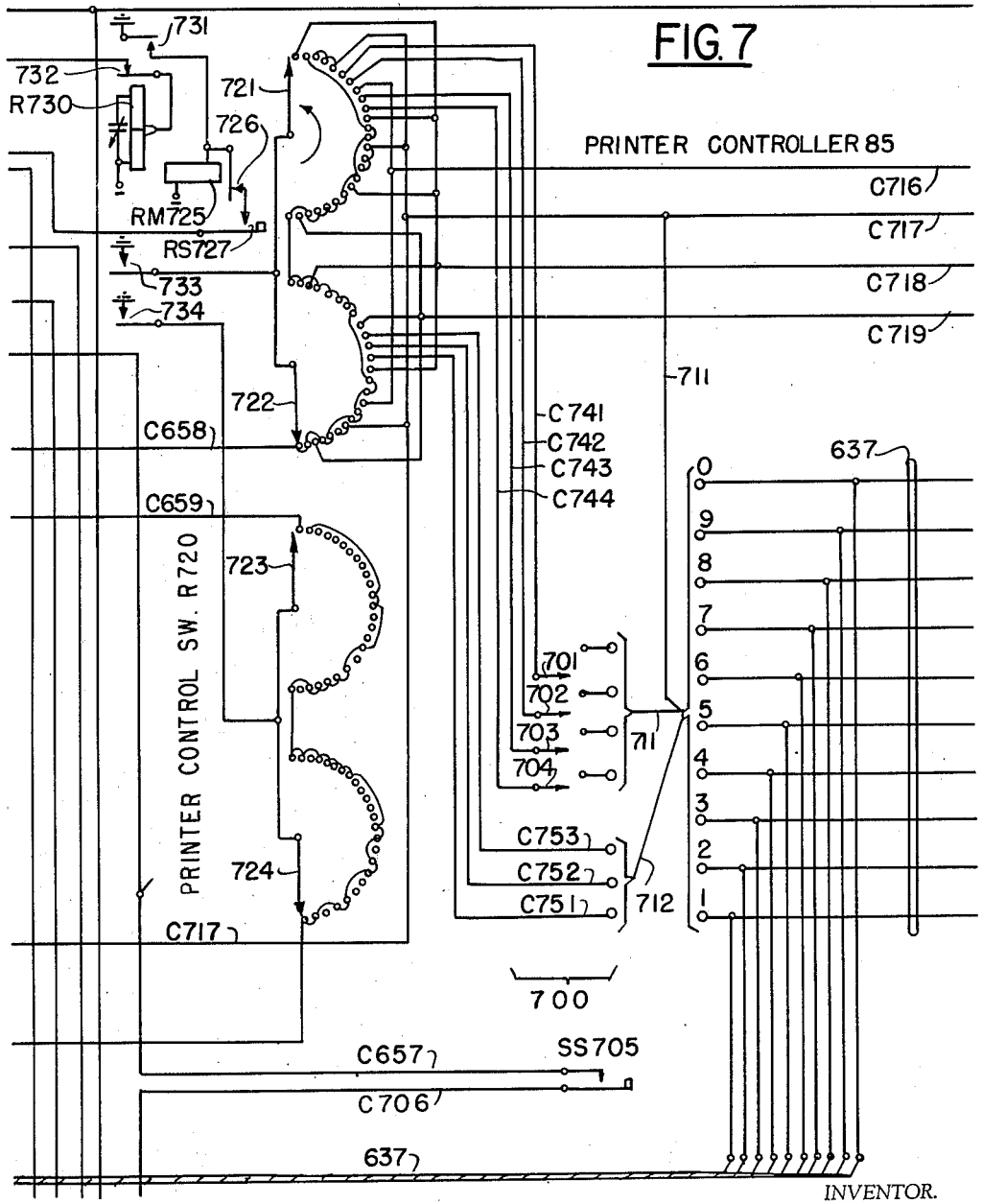
Figure 8:
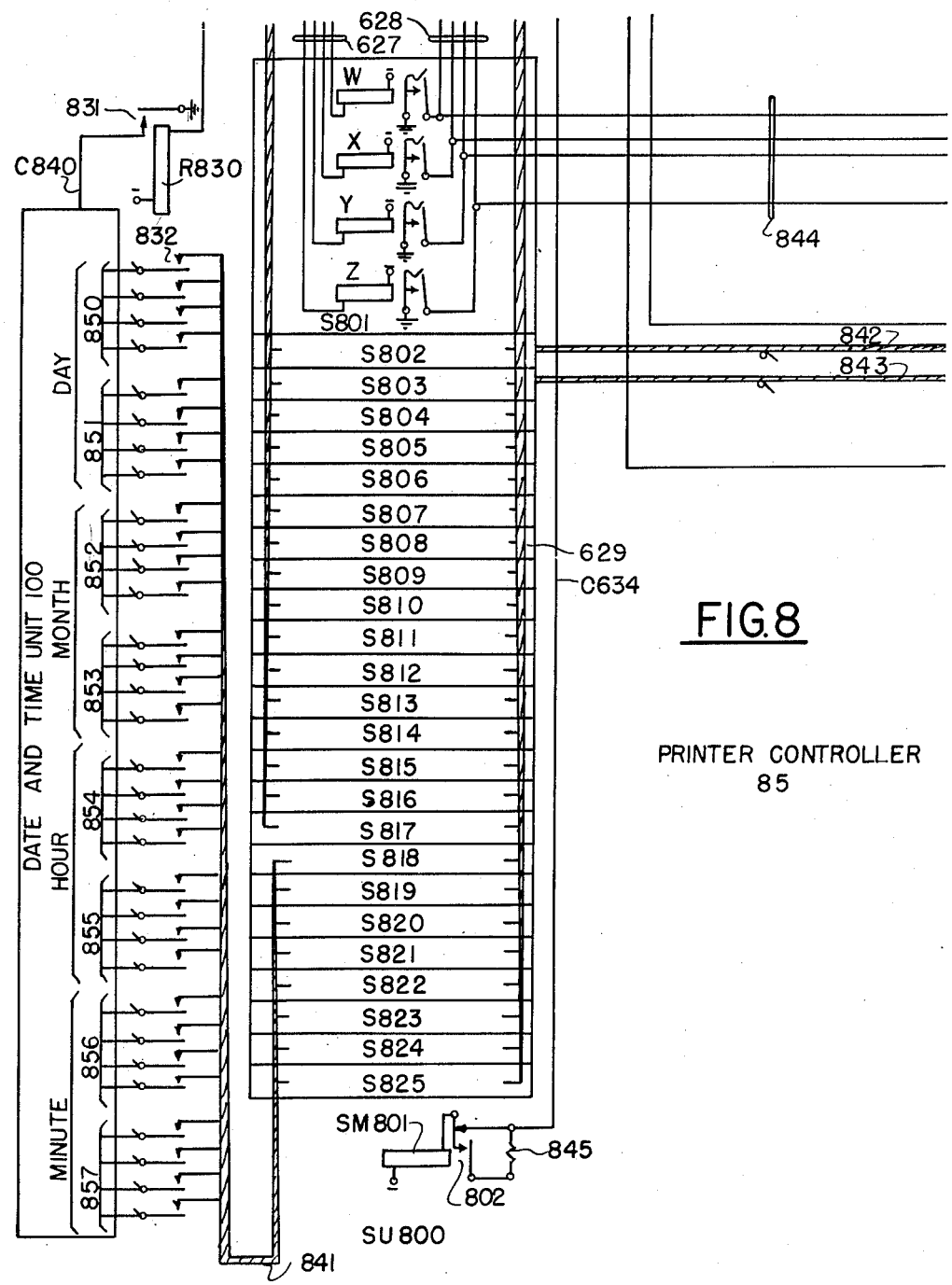
Figure 9:
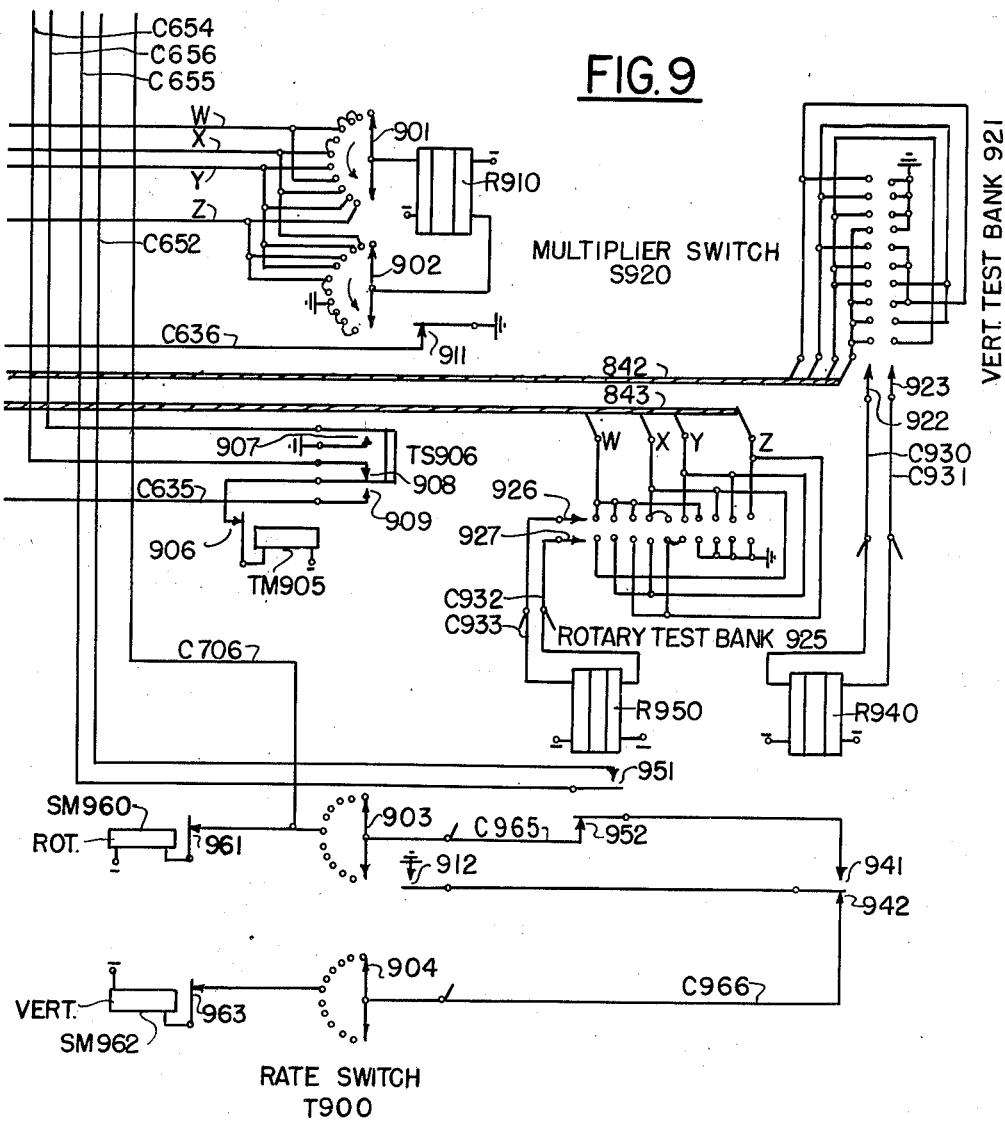
Figure 10:
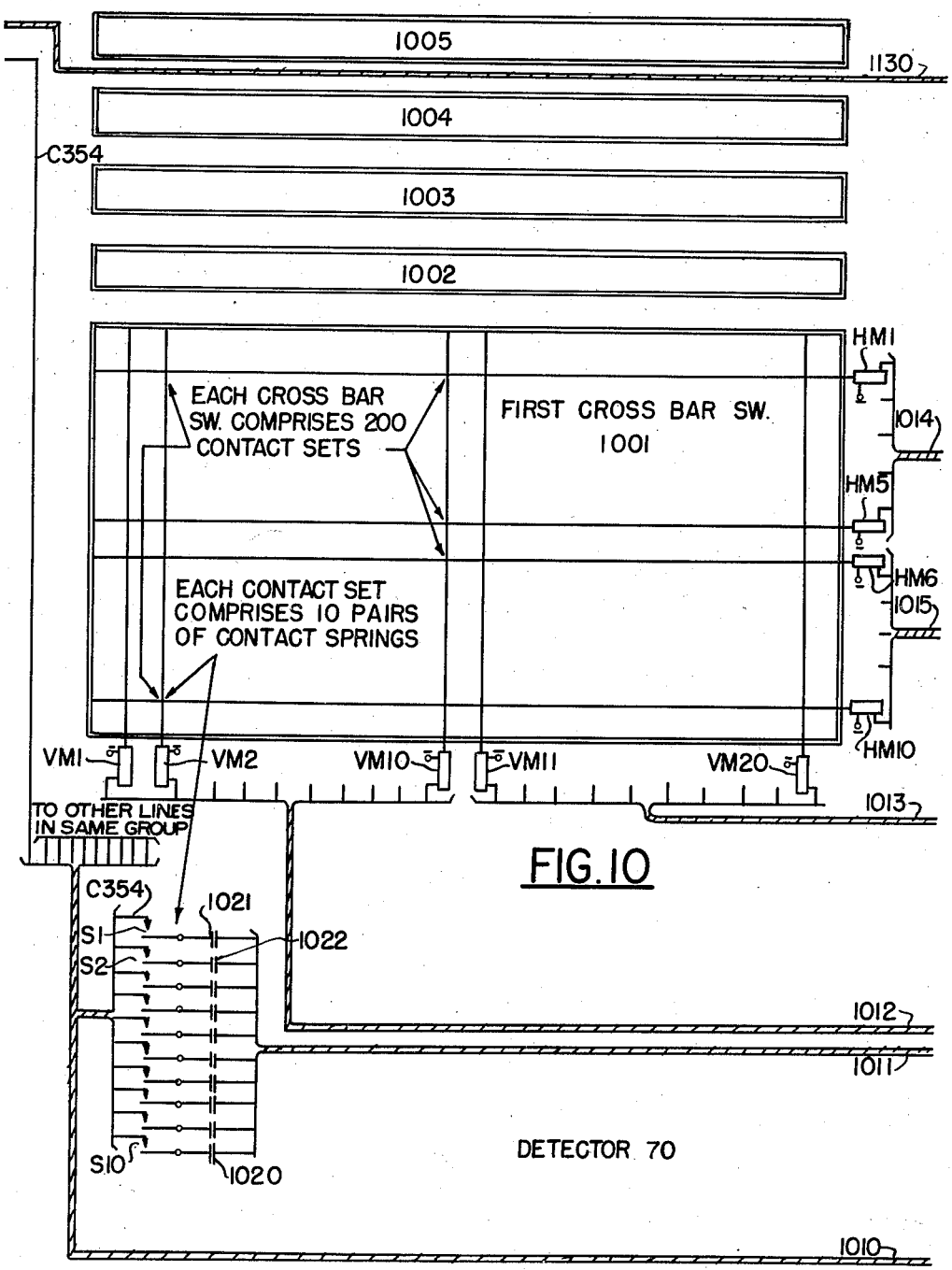
Figure 11:
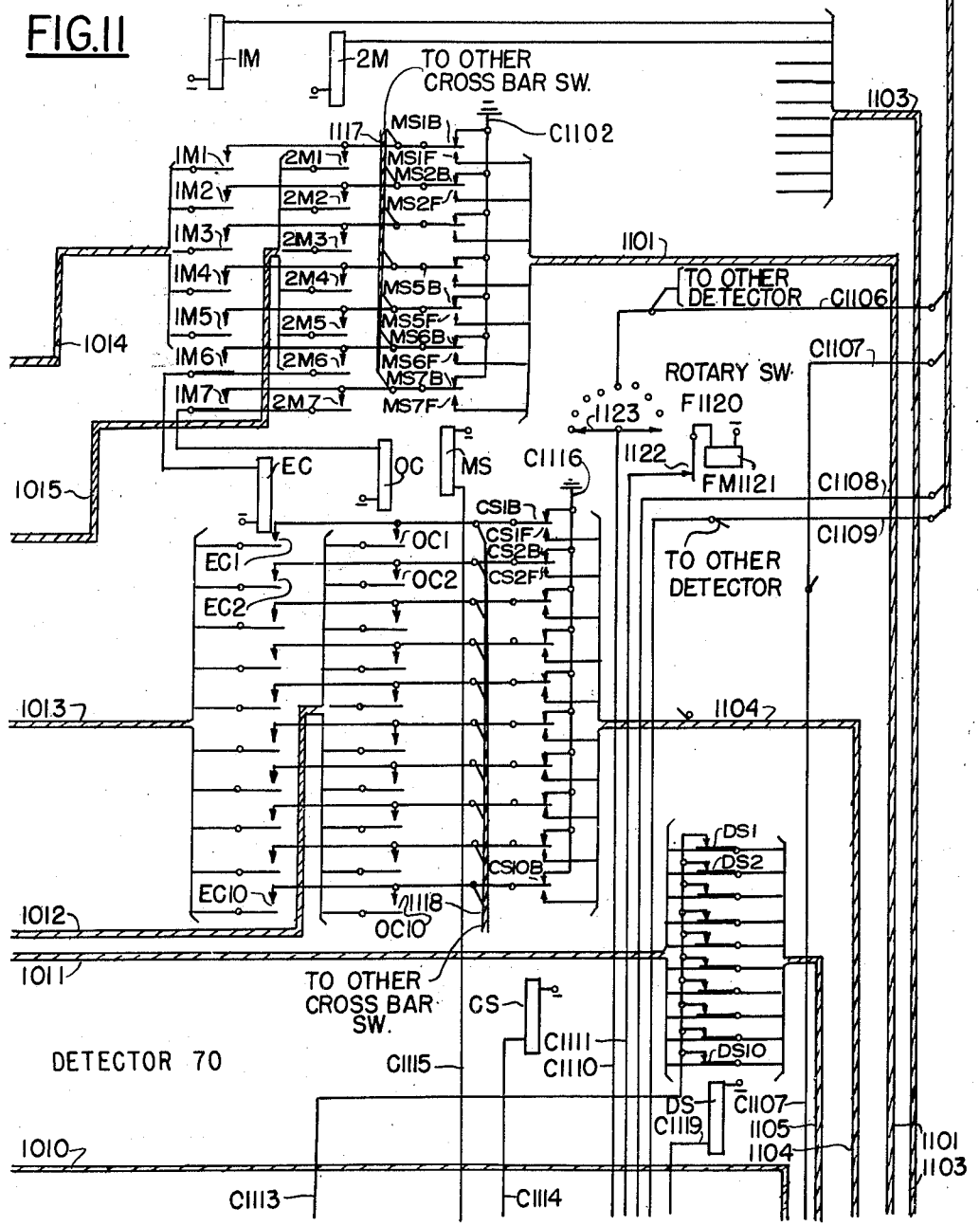
Figure 12:
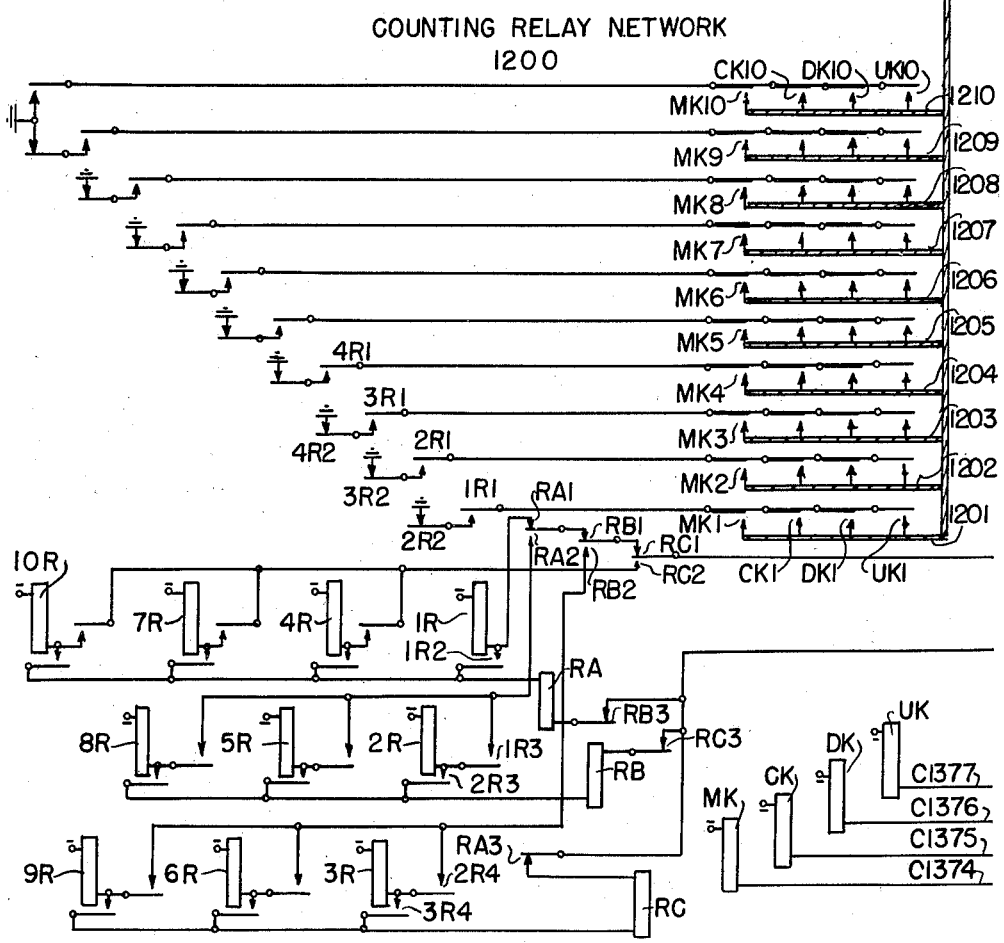
Figure 13:
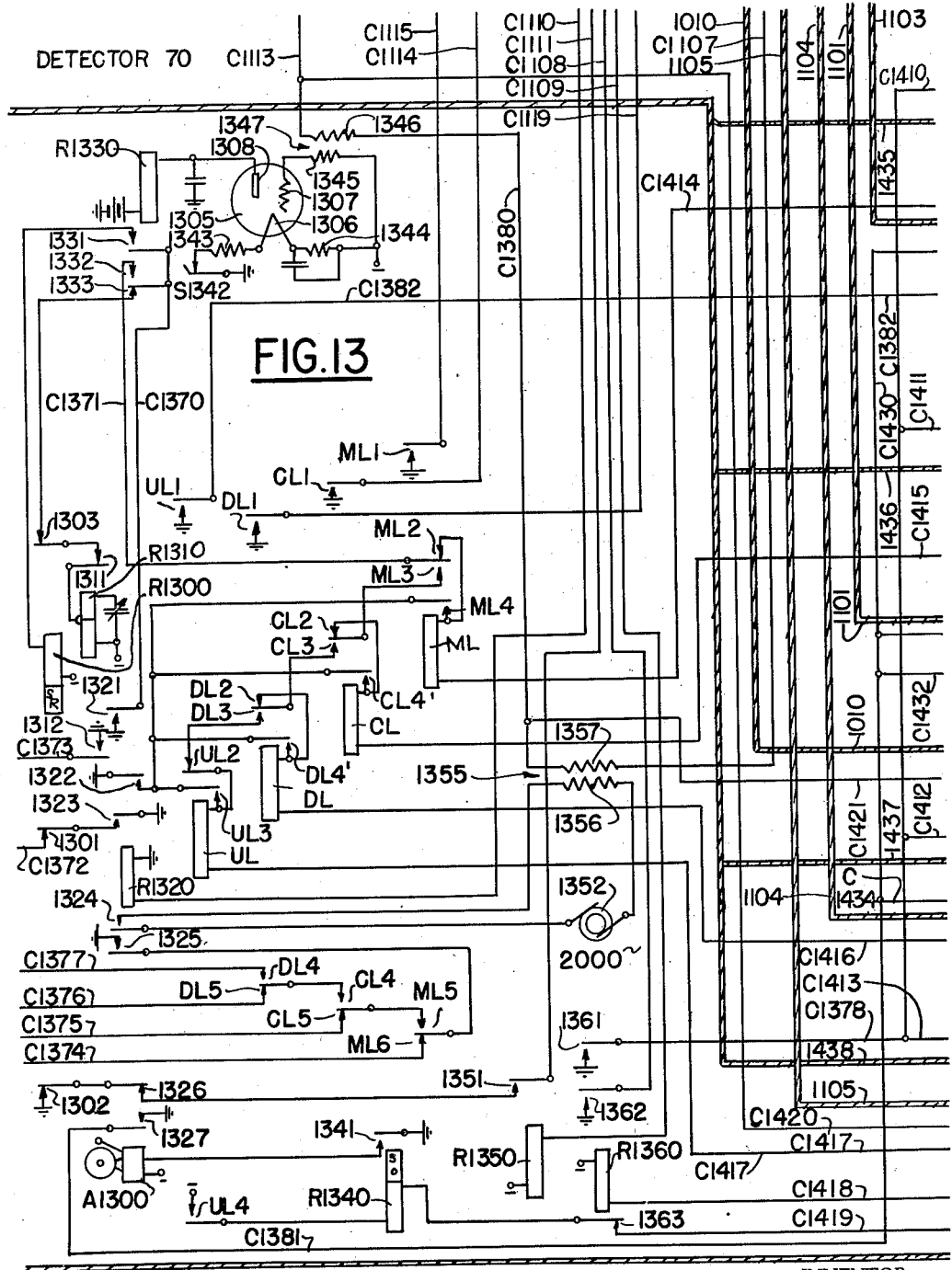
Figure 15:
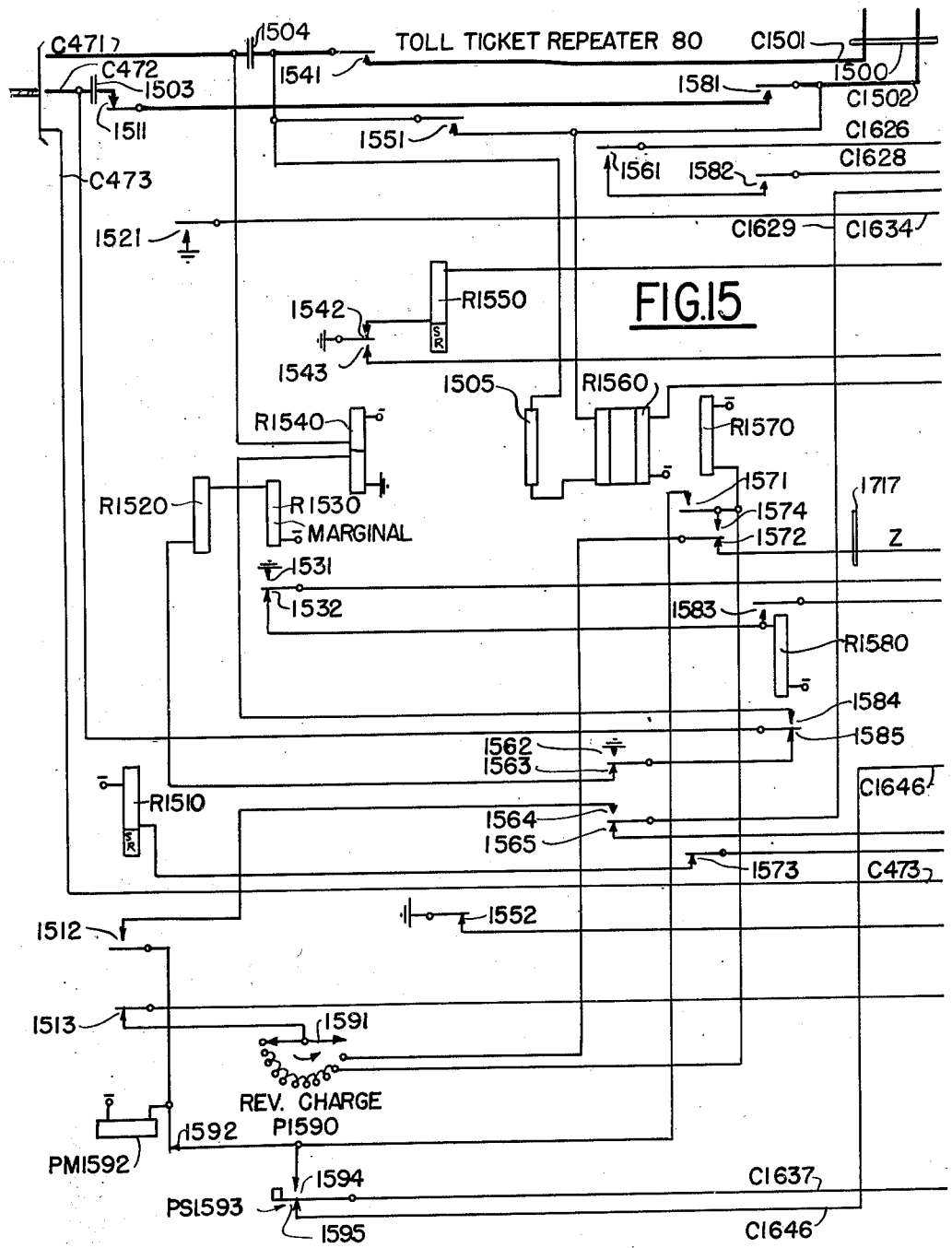
Figure 16:
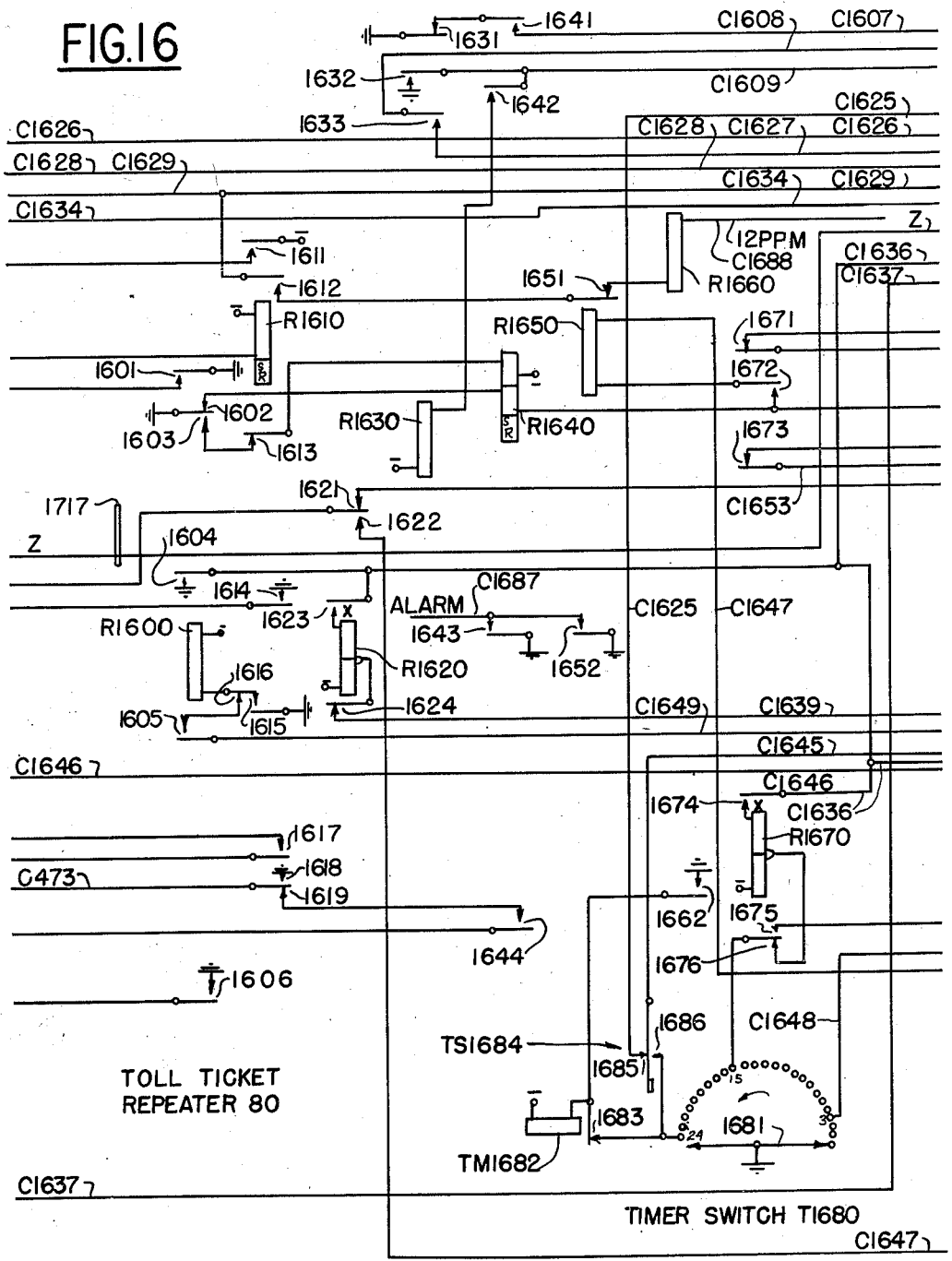
Figure 17:
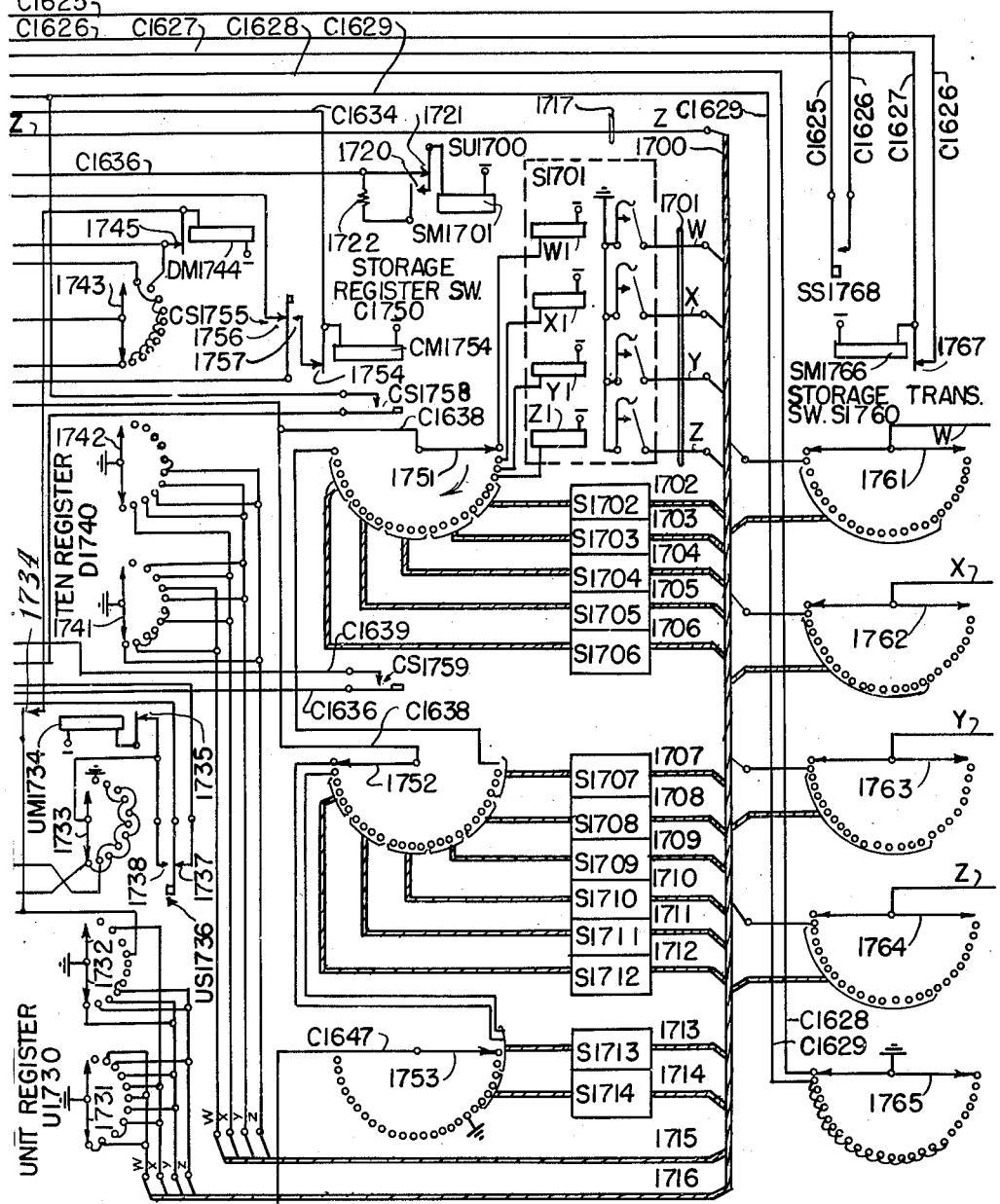
Figure 18:
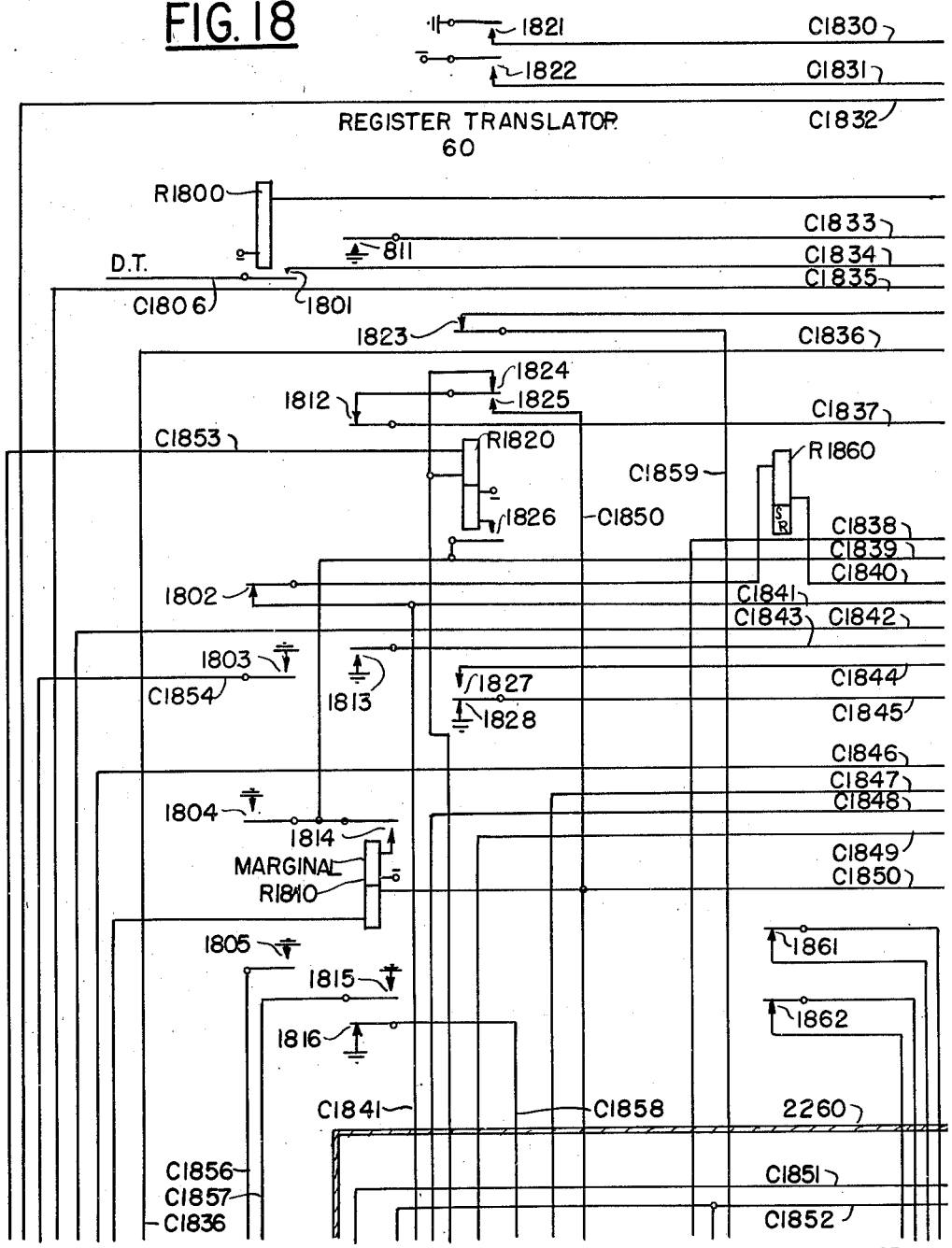
Figure 19:
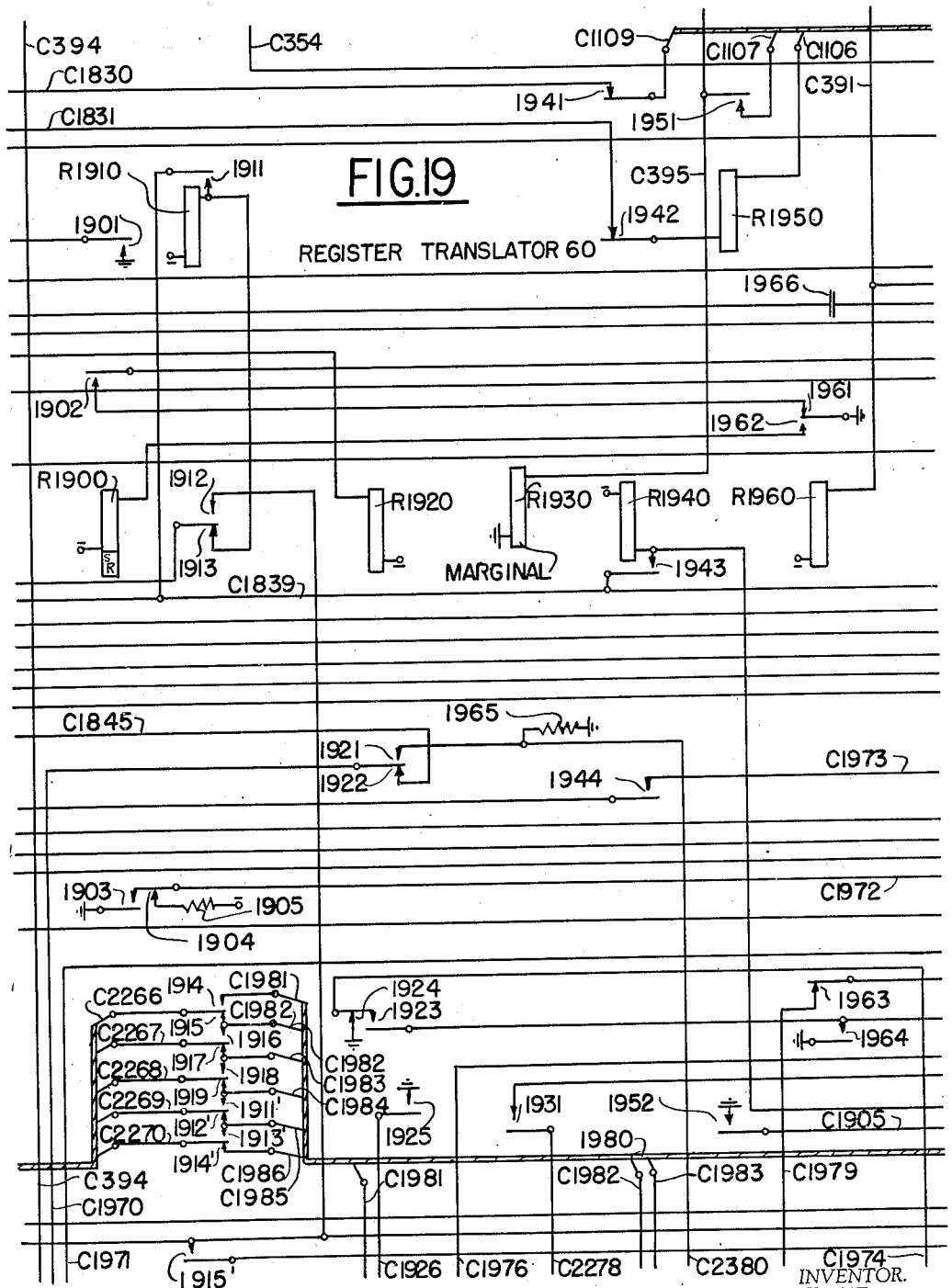
Figure 20:
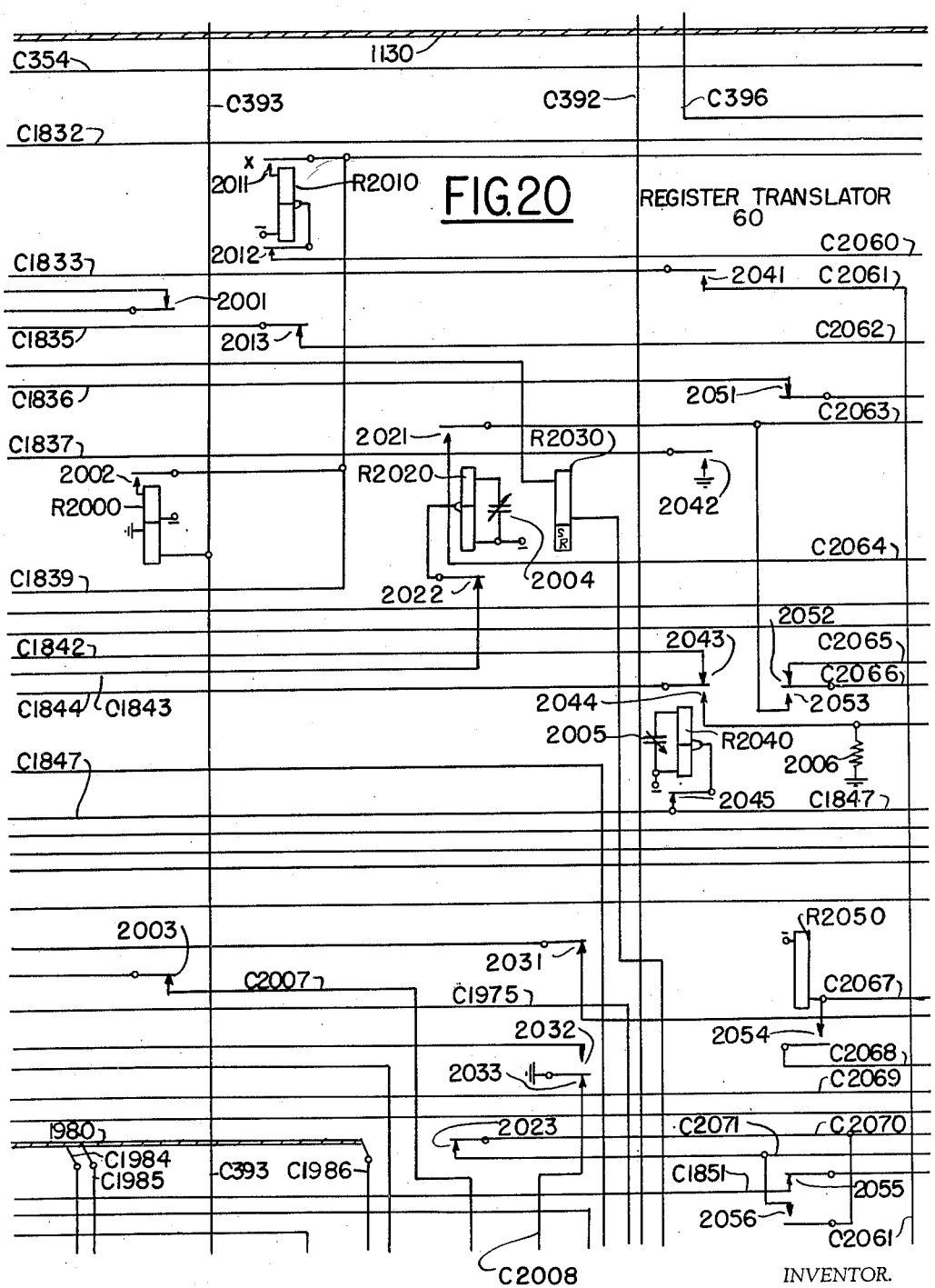
Figure 21:
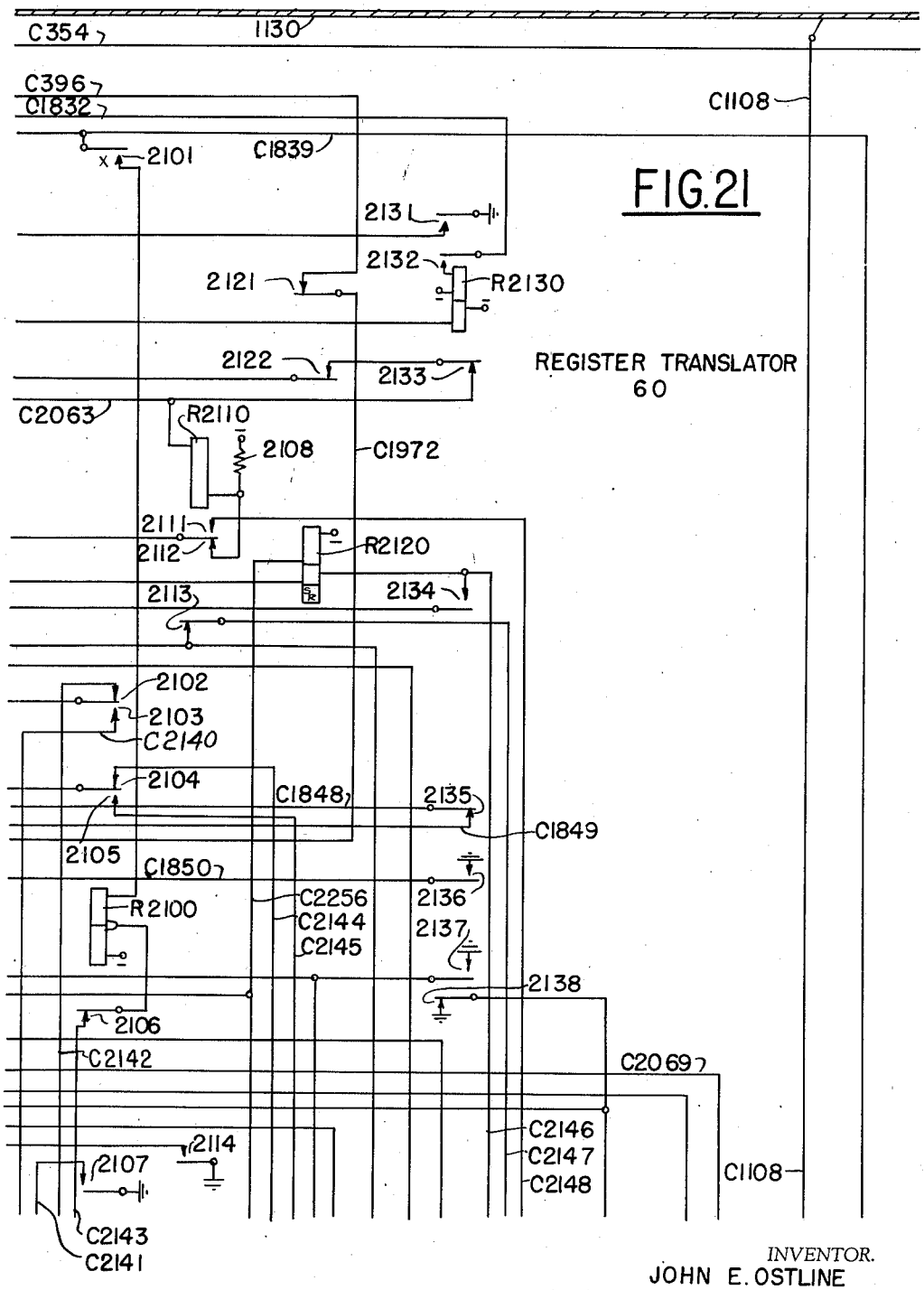
Figure 22:
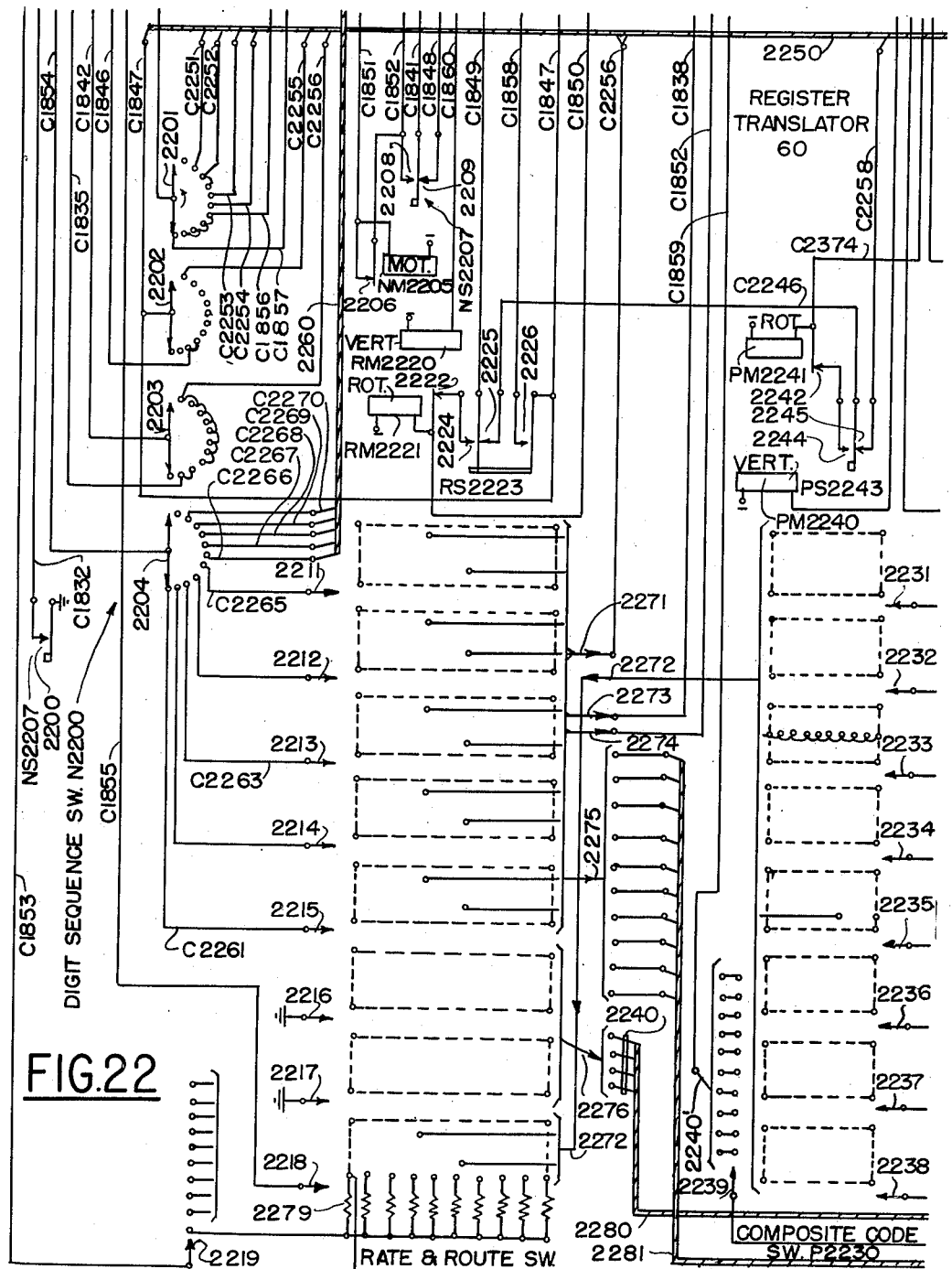
Figure 23:
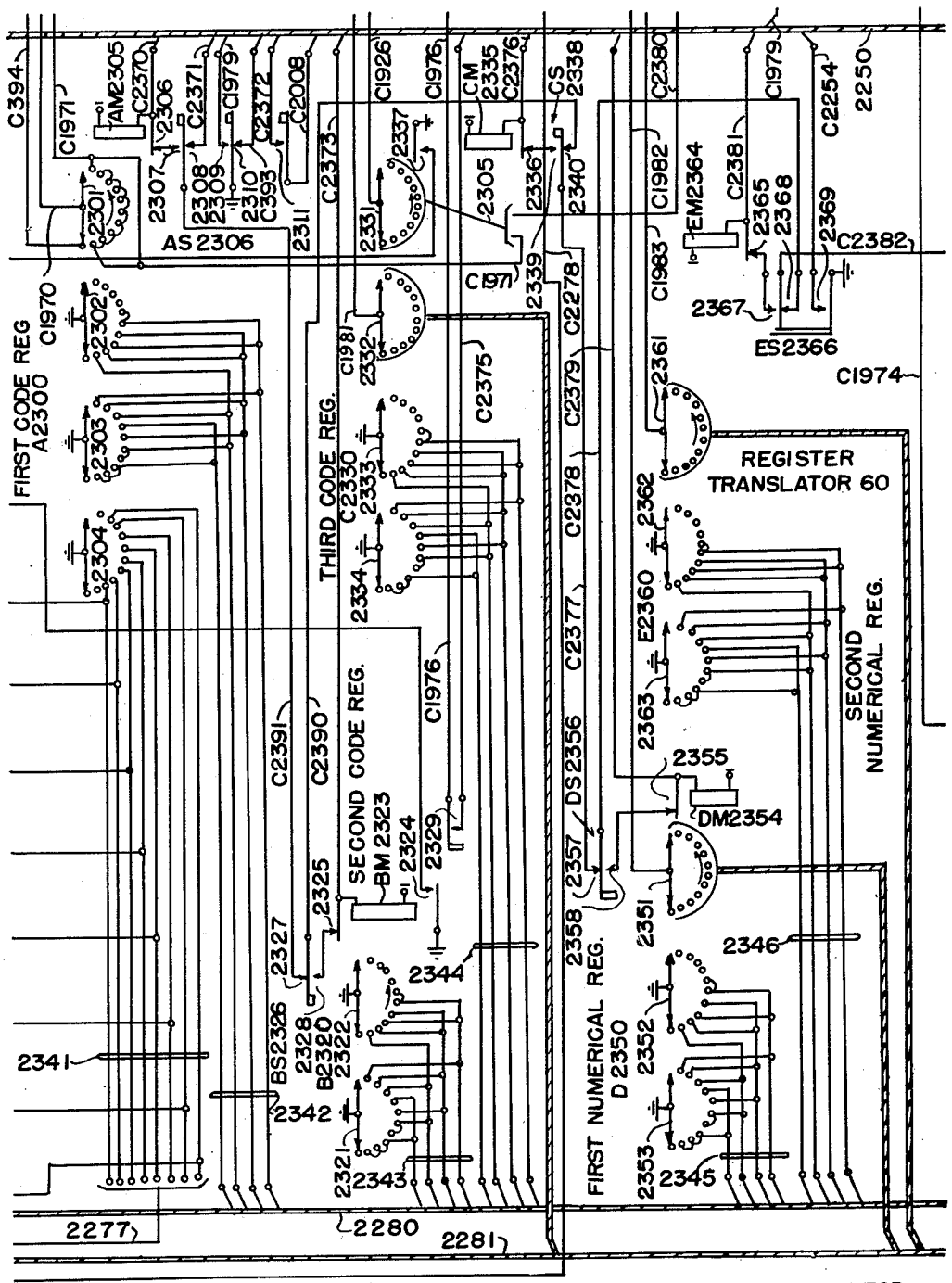
Figure 24:
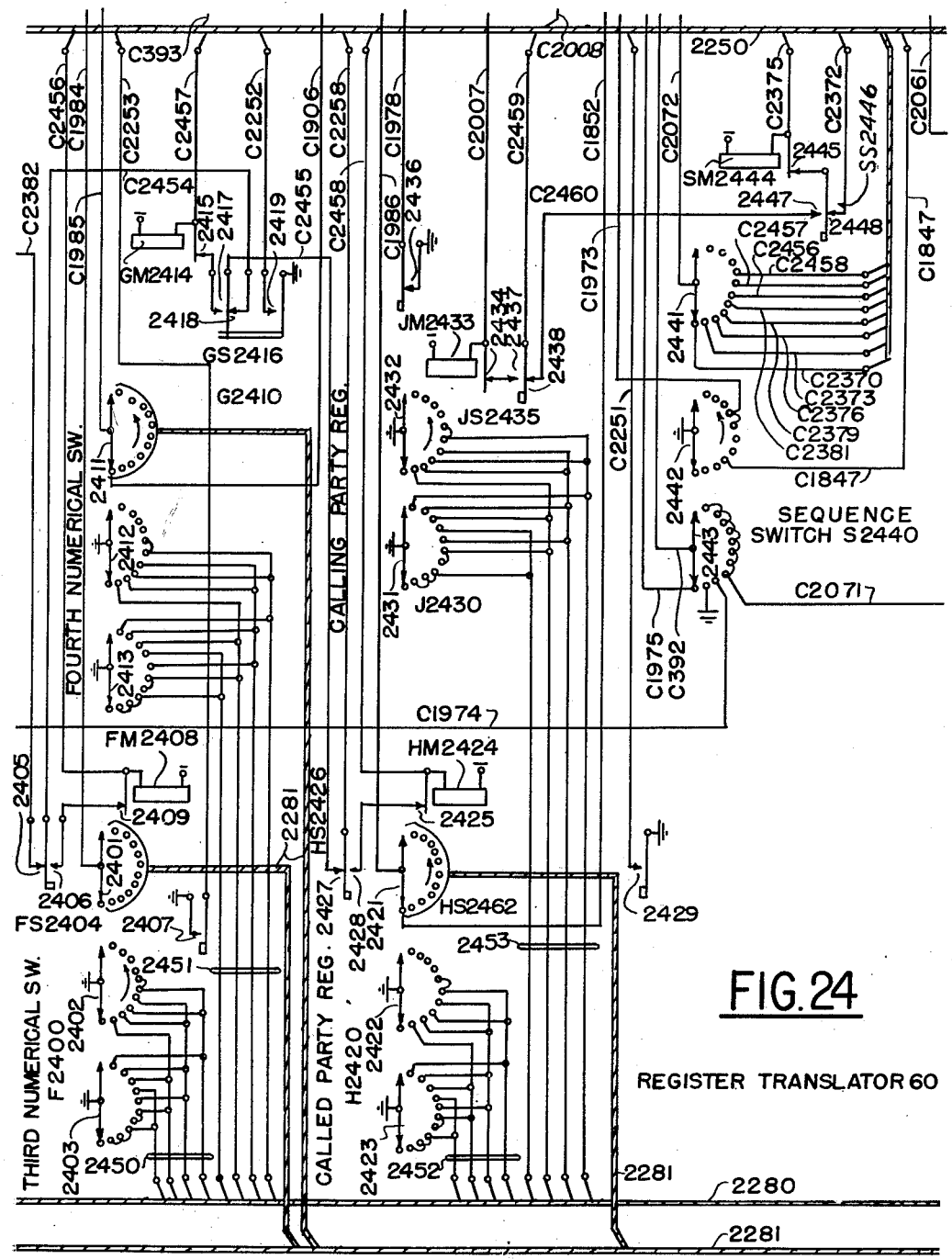
Figure 25:
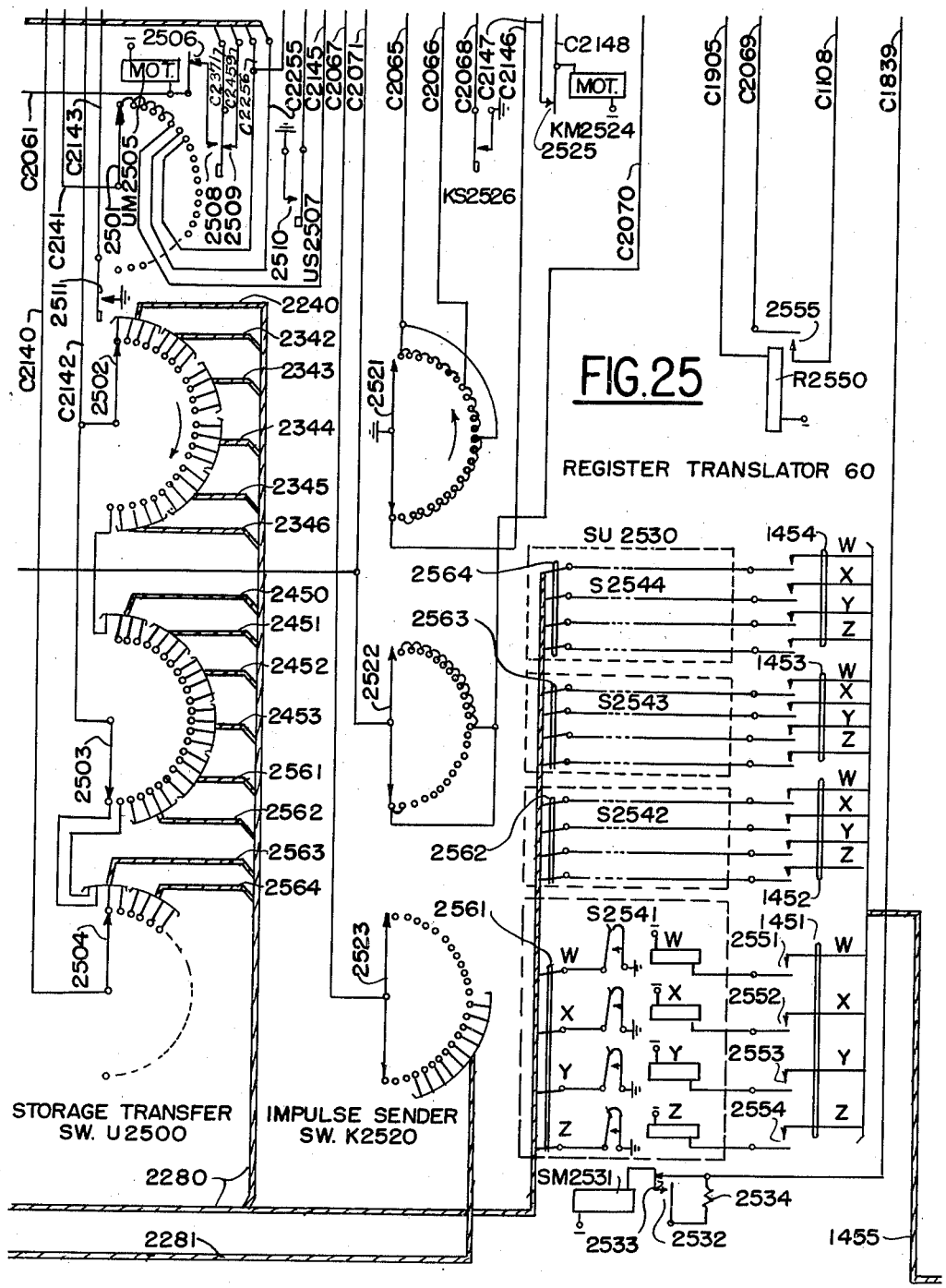

| FIG. 26 | | |
| --- | --- | --- |
| FIG. 7 | FIG. 9 | |
| FIG. 6 | FIG. 8 | FIG. 14 |
| FIG. 17 | FIG. 11 | FIG. 13 |
| FIG. 16 | FIG. 10 | FIG. 12 |
| FIG. 15 | FIG. 21 | FIG. 25 |
| FIG. 4 | FIG. 20 | FIG. 24 |
| FIG. 3 | FIG. 19 | FIG. 23 |
| FIG. 18 | FIG. 22 | |

FIG. 5

FIG. 28

| DATE | TIME | |
| --- | --- | --- |
| MO. DAY | HR. | MIN. |
| 12 - 15 | 11 | 26 |

| CALLING ZONE EX. NO. |
| --- |
| 381 - 2921 |

| CALLED ZONE EX. NO. |
| --- |
| 624 - 1234 |

| RATE | DURATION OF CALL MINS |
| --- | --- |
| 6 | 32 |

| COST OF CALL | SPECIAL SERVICE |
| --- | --- |
| $ ¢ 1.67 | 0 |

| TICKET NO. |
| --- |
| 13579 |

INVENTOR.
JOHN E. OSTLINE

BY Davis, Lindsey, Smith & Shonts

ATTORNEYS

Patented Mar. 14, 1950

2,500,374

UNITED STATES PATENT OFFICE 2,500,374

AUTOMATIC CHARGING AND TICKETING IN AUTOMATIC TELEPHONY

John E. Ostline, Chicago, Ill., assignor to Automatic Electric Laboratories, Inc., a corporation of Delaware Original application August 26, 1940, Serial No. 354,301. Divided and this application June 12, 1942, Serial No. 446,717

15 Claims. (Cl. 179—7.1)

The present invention relates to automatic telephone systems and more particularly to automatic recording apparatus operative to record given particulars of certain calls in the systems. More specifically, the present invention relates to improvements in telephone systems of the character disclosed in the copending application of John E. Ostline, Serial No. 283,347, filed June 8, 1939, now Patent No. 2,297,365, granted Sept. 29, 1942. This application is a division of the copending application of John E. Ostline, Serial No. 354,301, filed August 26, 1940, now Patent No. 2,385,228, granted Sept. 18, 1945.

In a telephone system serving a large metropolitan area and the adjacent suburban areas, it is usually desirable to divide the system into a plurality of zones and to handle calls between the exchanges in different zones and between certain of the exchanges in the same zone as toll calls for which special charges are made, depending upon the distances between the zones or the distances between the exchanges in the same zone and the time durations of the calls. In accordance with conventional practice, the connections for a call of this type are set up with the aid of an operator, which operator records upon a toll ticket certain particulars concerning the call, including the codes of the calling and called zones, the codes of the calling and called exchanges, the directory numbers of the calling and called lines, the rate applicable to the call, the duration of the call and possibly the total charge for or cost of the call.

While a telephone system of the type described is entirely satisfactory in operation, it requires the services of a large number of operators and necessitates some delay in extending a call of the type mentioned while the information concerning the calling and called subscriber substations is being transferred from the calling subscriber to the operator.

Accordingly, it is an object of the present invention to provide in an automatic telephone system of the type noted, improved recording apparatus which is operative automatically to record, without the aid of an operator, given particulars of certain calls in the system for which special charges are made.

Another object of the invention is to provide in an automatic telephone system of the type noted improved apparatus for establishing a charge for each of certain connections and for selectively assessing the established charge for a connection against either the calling line or the called line involved therein.

Another object of the invention is to provide in an automatic telephone system of the type noted, improved apparatus for establishing a charge for each of certain connections and for selectively assessing the established charge for a connection against the particular calling subscriber substation on a calling line of the party type or against the particular called subscriber substation on a called line of the party type.

The invention is illustrated as being embodied in an automatic telephone system comprising a plurality of zones each including one or more exchanges, the zones being so disposed with respect to each other and certain of the exchanges in a given zone being so disposed with respect to each other, that it is desirable to make a special charge for a call extending between two zones or between certain exchanges in a given zone, depending upon the distance between the two zones or between the two exchanges in the given zone and the time duration of the call. Furthermore, each zone comprises a two digit code; while each exchange in a zone including more than one exchange comprises a one digit code; whereby both three digit and two digit codes are employed in the system. Further, each exchange terminates a large number of subscriber lines, of both the private type and the party type, each subscriber line terminating at each exchange being provided with a particular line terminal designation comprising four digits, and each subscriber substation on each subscriber line of the party type being provided with a particular designation comprising one digit; whereby the directory number of each private subscriber line in each exchange comprises four digits; and the directory number of each subscriber substation on each party subscriber line in each exchange comprises five digits.

Each subscriber line is provided with a line switch individual thereto which is operative when a call is initiated on the associated subscriber line to find an idle primary selector accessible thereto, whereupon a register translator selector individual to the primary selector operates to find an idle register translator accessible thereto. The subscriber at the calling subscriber substation then proceeds to dial the directory code identifying the called zone and exchange and then the directory number identifying the called subscriber substation.

In accordance with one feature of the invention, the register translator comprises three code registers, four numerical registers, a calling party register, a called party register, a composite code switch and a rate and route switch. The various code and numerical digits dialed by the subscriber at the calling subscriber substation are successively registered in the code registers, the numerical registers and the called party register. The register translator is so connected and arranged that it is adapted to receive a directory code comprising either two digits or three digits and a directory number comprising either four digits or five digits. When the first two digits of the directory code are registered the register translator determines whether the composite code switch is to be set in accordance with the digits registered in either the first and second code registers or the first and second and third code registers; and when a digit is registered in the third code register the composite code switch is completely operated in accordance with either the two digits registered in the first and second code registers or the three digits registered in the first and second and third code registers, as previously determined. Thus, it will be understood that all of the digits of the directory code are always registered in the code registers; while all of the digits of the directory number are registered in the numerical registers and the called party register only in the event the directory code comprises three digits.

When the composite code switch is fully operated the rate and route switch is operated, thereby to establish a first choice route between the originating exchange and the terminating exchange and a rate applicable thereto.

In accordance with another feature of the invention, the register translator then operates to transmit one or more routing digits established by the rate and route switch and transcribed from the registered code digits, and then to transmit the digit registered in the third code register only in the event that the directory code comprises two digits, and finally to transmit the digits registered in the numerical registers and the called party register.

In accordance with another feature of the invention, in the event the primary selector or the switch train accessible thereto encounters a busy condition upon operating in response to either the first routing digit or the second routing digit, busy tone current returned from the primary selector or from the switch train accessible thereto to the register translator causes the rate and route switch to be reoperated, thereby to establish a second choice route between the originating exchange and the terminating exchange, whereupon the register translator again operates in order to transmit the various routing and registered digits in the manner previously explained.

In accordance with another feature of the invention, the register translator is so connected and arranged that, in the event the first digit registered therein indicates a call to an operator position or in the event the third digit registered therein indicates a local call in the originating exchange, the register translator is released, whereupon the primary selector and the switch train accessible thereto is operated directly from the dialing mechanism at the calling subscriber substation instead of directly from the register translator.

In accordance with another feature of the invention, the register translator is so connected and arranged that, when the code digits registered therein indicate a call to a distant exchange for which a special charge is made, dual detectors, which are provided, are operated, thereby to detect the directory number of the line terminal of the calling subscriber line and to register the detected directory number of the line terminal of the calling subscriber line in the register translator.

In accordance with a further feature of the invention, the register translator is so connected and arranged that, in the event the calling subscriber line is of the party type, the subscriber at the particular calling subscriber substation thereon must dial the prefix digit 11 before proceeding to dial the regular directory code and the regular directory number, only in the event a special charge is to be made for the connection. In case the subscriber at the particular calling subscriber substation on the calling subscriber line of the party type fails to dial the prefix digit 11, in the last-mentioned event, the register translator is operative when the third digit is registered therein to route a connection from the calling subscriber line of the party type to an interceptor operator position, regardless of the actual directory code and directory number registered in the register translator. Also, incident to the dialing of the prefix digit 11 at the particular calling subscriber substation on the calling subscriber line of the party type, the register translator registers in the calling party register a predetermined number of the impulses of the prefix digit 11 corresponding to the position of the particular calling subscriber substation on the calling subscriber line of the party type, thereby to detect the designation thereof.

In accordance with a further feature of the invention, when the register translator operates to set up a connection from an originating exchange to a distant exchange for which a special charge is made, the switch train route comprises a toll ticket repeater adapted to register various items of record information transmitted thereto pertaining to the connection. More particularly, the register translator operates simultaneously to transmit over one of the line conductors of the connection the various routing and numerical digits in order to set up the switch train and to transmit over the other line conductor of the connection various code digits representing various items of record information pertaining to the connection. More particularly, the register translator transmits to the toll ticket repeater, included in the switch train, certain items of record information to be registered therein and including: the designation of the calling subscriber line, the designation of the particular calling subscriber substation on the calling subscriber line in the event the calling subscriber line is of the party type, the designation of the code of the terminating exchange, the designation of the called subscriber line, the designation of the particular called subscriber substation on the called subscriber line in the event the called subscriber line is of the party type, and the rate applicable to the call. When the call is answered at the called subscriber substation, timing apparatus in the toll ticket repeater is operated, thereby to time the duration of the call, and to register an item of record information thereof.

In accordance with a further feature of the invention, the toll ticket repeater comprises an arrangement including a register which is operative under the control of the subscriber at the called subscriber substation to register a particular service required by the connection, namely, that the established charge for the connection is to be assessed against the called subscriber line in the event the called subscriber line is of the private type or against the particular called subscriber substation on the called subscriber line in the event the called subscriber line is of the party type, instead of against the calling subscriber line in the event the calling subscriber line is of the private type, or against the particular calling subscriber substation on the calling subscriber line in the event the calling subscriber line is of the party type. Upon operating, the last-mentioned register in the toll ticket repeater registers an item of record information indicating the reversal of charges, as previously noted.

In accordance with a further feature of the invention, when the established connection is released the toll ticket repeater included therein causes a printer controller having access thereto to sieze the toll ticket repeater, whereupon the various items of record information stored in the toll ticket repeater are transferred to the printer controller. The printer controller then operates, thereby to calculate and to register therein an established charge in monetary values for the connection, to cause additional items of record information pertaining to the time of the termination of the connection to be registered therein and to cause an idle printer to be associated with the printer controller. The printer controller then controls the associated printer, thereby to cause the printer to print on a ticket individual to the connection the various items of record information stored therein.

Further features of the invention pertain to the particular arrangement of the circuit elements of the system, whereby the above-outlined and additional operating features are attained.

Figure 2:
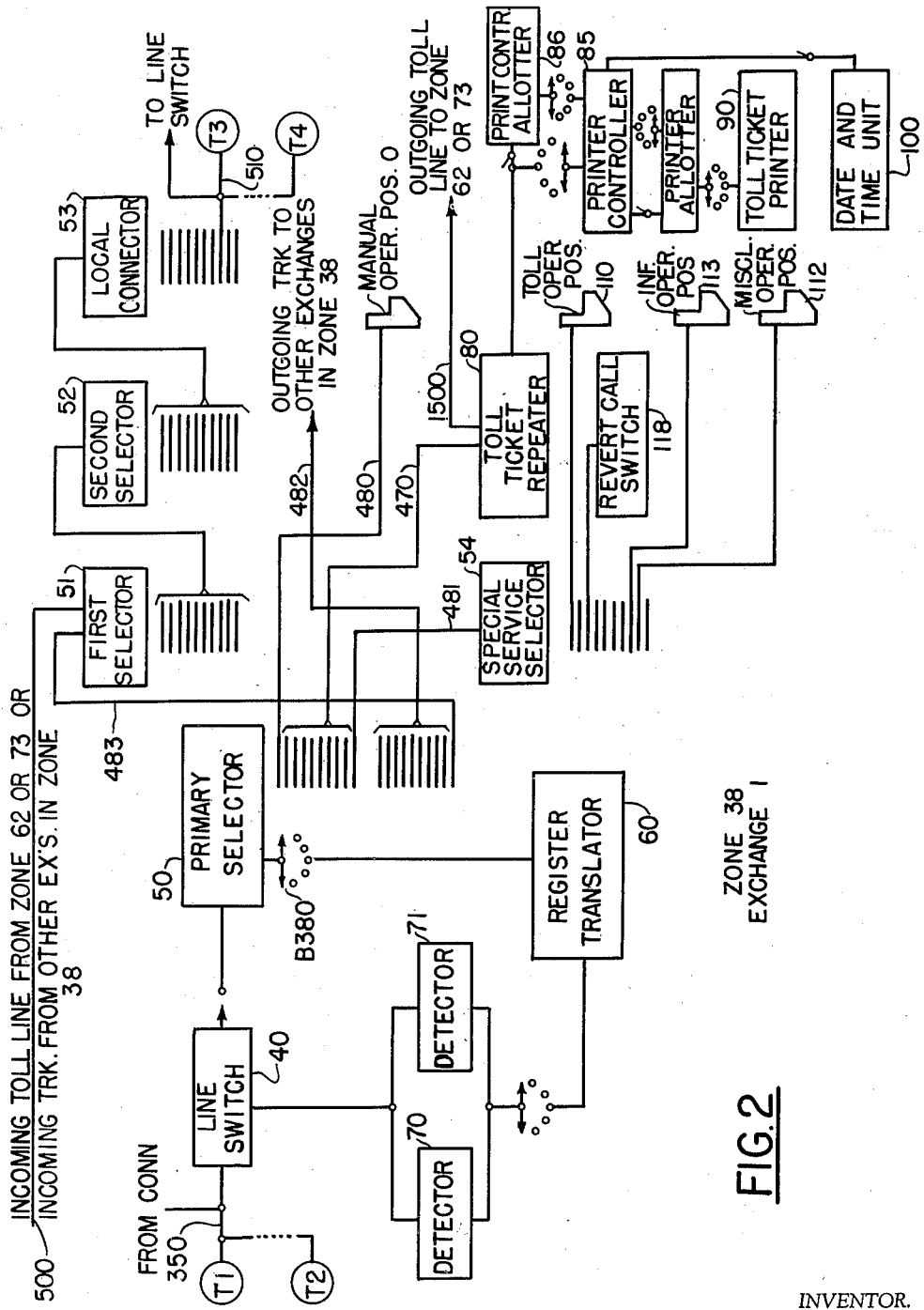
Figure 5:
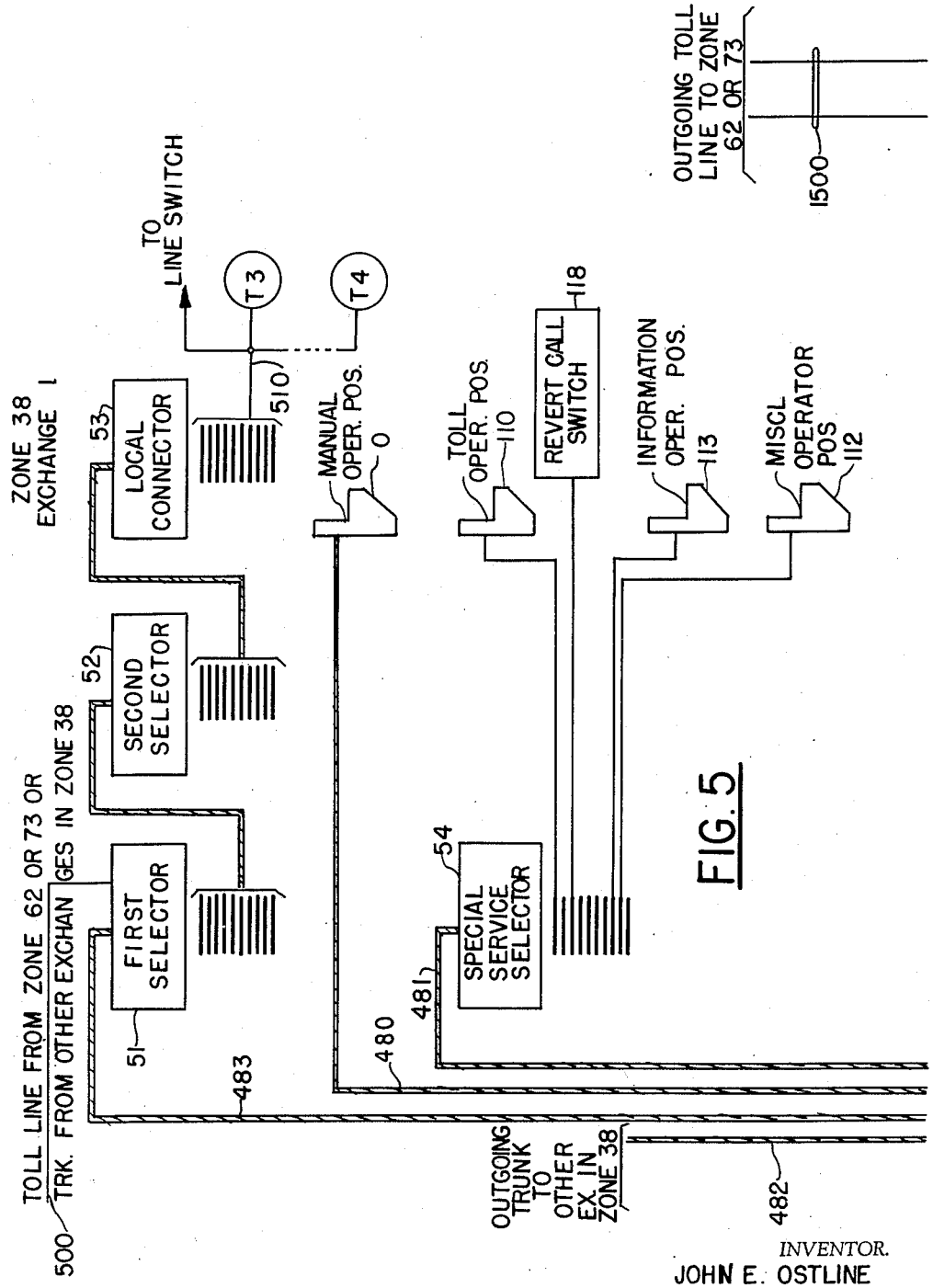

The novel features believed to be characteristic of the invention are set forth with particularity in the appended claims. The invention, both as to its organization and method of operation, together with further objects and advantages thereof, will best be understood by reference to the following specification taken in connection with the accompanying drawings in which Figure 1 is a schematic diagram of the area served by a telephone system embodying the present invention; Fig. 2 illustrates the general arrangement of the apparatus incorporated in exchange 1 zone 38 of the telephone system; Figs. 3 to 26, inclusive, taken together, illustrate the details of the apparatus included in exchange 1 zone 38 of the telephone system, which apparatus has incorporated therein the features of the invention, as briefly outlined above; Fig. 27 illustrates the mode of combining Figs. 3 to 26, inclusive, to form a unified system; and Fig. 28 illustrates a toll ticket printed by a toll ticket printer included in exchange 1 zone 38 of the telephone system. More particularly, Figs. 3 to 5, inclusive, illustrate the details of the switching apparatus and trunking network incorporated in exchange 1 zone 38 of the telephone system; Figs. 6 to 9, inclusive, illustrate the details of one of the printer controllers included in exchange 1 zone 38 of the telephone system; Figs. 10 to 14, inclusive, illustrate the details of the detectors included in exchange 1 zone 38 of the telephone system; Figs. 15 to 17, inclusive, illustrate the details of one of the toll ticket repeaters included in exchange 1 zone 38 of the telephone system; Figs. 18 to 25, inclusive, illustrate the details of one of the register translators included in exchange 1 zone 38 of the telephone system; and Fig. 26 illustrates the printer allotter arrangement included in exchange 1 zone 38 of the telephone system.

*The general arrangement of the telephone system*

Referring now more particularly to Fig. 1 of the drawings, it will be observed that the automatic telephone system serves a large metropolitan area comprising a number of subareas or zones, each of which includes one or more exchanges. More specifically, the area served by the telephone system comprises the zones 73, 46, 62 and 38; the zone 73 includes the exchanges 1, 2 and 3 illustrated; the zone 46 includes the single exchange illustrated; the zone 62 includes the exchanges 1, 2, 3 and 4 illustrated; and the zone 38 includes the exchanges 1, 2, 3, 4 and 5 illustrated. Further, it is noted that in some of the zones two exchanges are housed together. For example, in zone 38, exchanges 1 and 2 are housed together; while, in zone 62, exchanges 1 and 2 are housed together. Each exchange in each zone comprises a 10,000 line unit; although it may not be initially installed to serve its ultimate line capacity. The lines terminating at each exchange in each zone comprise both private subscriber lines and party subscriber lines.

The various exchanges in each zone are interconnected by suitable groups of trunk lines; while at least one exchange in each zone is interconnected with at least certain of the exchanges in other zones by suitable groups of toll lines, as clearly indicated.

In the automatic telephone system, the various local trunk and toll calls are set up by automatic switching apparatus under the control of subscriber substation equipment, including the usual calling dial. In order to facilitate the setting up of various connections, a mixed numbering scheme is utilized in the automatic telephone system, whereby all called subscriber substations in the various exchanges in the various zones of the telephone system are dialed, as listed in the directory. Accordingly, the directory number of each subscriber substation in the telephone system comprises a code portion, including either two or three digits, and a numerical portion, including four digits. More particularly, the directory number of each subscriber substation in zone 46 comprises a code portion, including only the two digits 4 and 6, in view of the fact that there is only one exchange in this zone; whereas, the directory number of each subscriber substation in zones 73, 62 and 38 comprises a code portion, including three digits, in view of the fact that there are a plurality of exchanges in each of these zones. Thus, it will be understood that the directory number of each subscriber substation in zone 38, for example, will comprise a code portion, including the two digits 3 and 8, and an additional digit identifying the particular exchange in zone 38, also including the subscriber substation. Accordingly, the directory number of each subscriber substation in exchange 5 zone 38, for example, will comprise a code portion including the digits 3, 8 and 5. Further, it is pointed out that each party subscriber substation in each exchange in each zone comprises a directory number, including not only the code portion and the numerical portion, previously mentioned, but also a suffix digit indicating the particular position of the party subscriber substation on the associated party subscriber line. In view of the above, it will be understood that the directory numbers of the various subscriber substations in the telephone system comprise different numbers of digits, the number of digits varying among the numbers 6, 7 and 8, depending both upon the particular zone of the subscriber substation and the private or party service rendered the particular subscriber substation.

*The apparatus incorporated in exchange 1 zone 38 of the telephone system*

Preferably, each exchange in the telephone system comprises apparatus substantially identical to that provided in exchange 1 zone 38, which apparatus, as best shown in Fig. 2, includes automatic switching equipment serving a maximum of 10,000 subscriber lines, including the subscriber lines 350 and 510. In order to facilitate the description, the subscriber line 350 will be considered first as a private line serving the subscriber substation T1 and then as a party line serving both the subscriber substations T1 and T2; similarly, the subscriber line 510 will be considered first as a private line serving the subscriber substation T3 and then as a party line serving both the subscriber substations T3 and T4. Further, the switching equipment comprises a number of line switches individually associated with the subscriber lines terminating at exchange 1 zone 38, the line switch 40 being individually associated with the subscriber line 350. Also, the switching equipment comprises a number of groups of primary selectors which are accessible to the various line switches. For example, the switching equipment comprises a group of primary selectors, including the primary selector 50, which is accessible to a number of line switches, including the line switch 40. A register translator selector is individually associated with each primary selector, the register translator selector B380 being individually associated with the primary selector 50.

Further, exchange 1 zone 38 is provided with a group of register translators, including the register translator 60, which is accessible to the various register translator selectors. Also, exchange 1 zone 38 is provided with a local switch train comprising a number of first selectors, including the first selector 51, a number of groups of second selectors, one of the groups including the second selector 52, a number of groups of local connectors, one of the groups including the local connector 53, a number of special service selectors, including the special service selector 54, and a number of reverting call switches, including the reverting call switch 118. A switchboard is also provided in exchange 1 zone 38 which includes a manual operator position 0, a toll operator position 110, an information operator position 113 and a miscellaneous operator position 112.

In addition to the apparatus described above, exchange 1 zone 38 is provided with toll ticketing apparatus comprising, in addition to the number of register translators, including the register translator 60, a number of toll ticket repeaters, including the toll ticket repeater 80, a number of printer controllers, including the printer controller 85, a printer controller allotter 86, a number of toll ticket printers, including the toll ticket printer 90, a printer allotter 95, a date and time unit 100 and two detectors 70 and 71. Also extending to exchange 1 zone 38 are a number of groups of outgoing trunks to the other exchanges in zone 38, such, for example, as the trunk 482, a number of groups of outgoing toll lines to zones 62 and 73, such, for example, as the toll line 1500, and a number of groups of incoming toll lines from zones 62 and 73 and trunks from the other exchanges in zone 38, such, for example, as the toll line or trunk 500.

In exchange 1 zone 38, the various primary selectors have access to the first selectors in the local switch train, to the special service selectors, to the outgoing trunks to the other exchanges in zone 38, to the manual operator position 0 and to the toll ticket repeaters; while the various special service selectors have access to the reverting call switches, to the toll operator position 110, to the information operator position 113 and to the miscellaneous operator position 112. Also, the various first selectors in the local switch train have access to the different groups of second selectors; while the various groups of second selectors have access to a corresponding number of the groups of local connectors. Finally, each local connector has access to an associated group of the subscriber lines. Also, incoming selectors are provided, similar to the various first selectors 51 in the local switch train each of which is individual to the toll lines in the groups of incoming toll lines from zones 62 and 73 and the trunks in the groups of incoming trunks from the other exchanges in zone 38.

Further, it is noted that each toll ticket repeater in exchange 1 zone 38 is individually associated with one of the outgoing toll lines to zone 62 or 73, the toll ticket repeater 80 being individually associated with the outgoing toll line 1500. Also, the two detectors 70 and 71 are connected in multiple, in a manner more fully described hereinafter, and have access to each subscriber line terminating at exchange 1 zone 38 and to each register translator in exchange 1 zone 38. Further, each printer controller in exchange 1 zone 38 is accessible to the printer controller allotter 86 therein and has access to each toll ticket repeater therein; similarly, each toll ticket printer in exchange 1 zone 38 is accessible to the printer allotter 95 therein, while the printer allotter 95 has access to each printer controller therein. Finally, the date and time unit 100 in exchange 1 zone 38 is accessible to each printer controller therein.

Preferably, each of the line switches included in exchange 1 zone 38 is identical to the line switch 40, which line switch comprises, as best shown in Fig. 3, a switching mechanism A350, including three wipers 301, 302 and 303, provided with individually associated contact banks, and suitable control relays, not shown, connected and arranged in a conventional manner.

Preferably, each of the primary selectors included in exchange 1 zone 38 is identical to the primary selector 50 which comprises, as best shown in Figs. 3 and 4, a Strowger mechanism S400, including a wiper carriage movable in both vertical and rotary directions, and an associated contact bank. More particularly, the Strowger mechanism S400 is of the 200-point type and comprises a first wiper set, including the wipers 401, 402 and 403, and a second wiper set, including the wipers 404, 405 and 406. The contacts arranged in the associated contact bank are divided into two groups accessible to the associated wiper sets, each group of contacts including ten vertically spaced-apart rows of contact sets and each row of contact sets being peripherally arranged and including ten individual contact sets. Also, the Strowger mechanism S400 comprises a vertical magnet SM347 for driving the wiper carriage step by step in the vertical direction, a rotary magnet SM407 for driving the wiper carriage step by step in the rotary direction, and a release magnet SM408 for releasing the wiper carriage and for causing it to be returned to its normal position. Furthermore, there are associated with the Strowger mechanism S400 five sets of switch spring SS345, SS346, SS410, SS411 and SS412 which are actuated when the wiper carriage is moved in the vertical direction away from its normal position, in a manner more fully explained hereinafter.

Further, the primary selector 50 comprises a switching relay R310, a test relay R320, a hold relay R330, a transfer relay R340, a line relay R420, a switch-through relay R430, a release relay R440, a rotary step relay R450 and a wiper switching relay R460, and a circuit network connected and arranged in a manner more fully described hereinafter.

Preferably, each of the register translator selectors in exchange I zone 38 is identical to the register translator selector B380 which comprises, as best shown in Fig. 3, a rotary switch including six wipers 381 to 386, inclusive, provided with individually associated contact banks, and a magnet BM387 for driving the wipers noted.

Preferably, each of the register translators included in exchange I zone 38 is identical to the register translator 60 which comprises, as best shown in Figs. 18 to 25, inclusive, a first code register A2300 in the form of a rotary switch including four wipers 2301 to 2304, inclusive, provided with individually associated contact banks, a magnet AM2305 for driving the wipers noted, and a set of switch springs AS2306 which is actuated when the wipers noted are moved away from their home positions; a second code register B2320 in the form of a rotary switch including two wipers 2321 and 2322 provided with individually associated contact banks, a magnet BM2323 for driving the wipers noted, and a set of switch springs BS2326 which is actuated when the wipers noted are moved away from their home positions; and a third code register C2330 in the form of a rotary switch including four wipers 2331 to 2334, inclusive, provided with individually associated contact banks, a magnet CM2335 for driving the wipers noted, and a set of switch springs CS2336 which is actuated when the wipers noted are moved away from their home positions. Also, the register translator 60 comprises a first numerical register D2350 in the form of a rotary switch including three wipers 2351 to 2353, inclusive, provided with individually associated contact banks, a magnet DM2354 for driving the wipers noted, and a set of switch springs DS2356 which is actuated when the wipers noted are moved away from their home positions, a second numerical register E2360 in the form of a rotary switch including three wipers 2361 to 2363, inclusive, provided with individually associated contact banks, a magnet EM2364 for driving the wipers noted, and a set of switch springs ES2366 which is actuated when the wipers noted are moved away from their home positions, a third numerical register F2400 in the form of a rotary switch including three wipers 2401 to 2403, inclusive, provided with individually associated contact banks, a magnet FM2408 for driving the wipers noted, and a set of switch springs FS2404 which is actuated when the wipers noted are moved away from their home positions; and a fourth numerical register G2410 in the form of a rotary switch including three wipers 2411 to 2413, inclusive, provided with individually associated contact banks, a magnet GM2414 for driving the wipers noted, and a set of switch springs GS2416 which is actuated when the wipers noted are moved away from their home positions.

Further, the register translator 60 comprises a called party register H2420 in the form of a rotary switch including three wipers 2421 to 2423, inclusive, provided with individually associated contact banks, a magnet HM2424 for driving the wipers noted, and a set of switch springs HS2426 which is actuated when the wipers noted are moved away from their home positions; a calling party register J2430 in the form of a rotary switch including two wipers 2431 and 2432 provided with individually associated contact banks, a magnet JM2433 for driving the wipers noted, and a set of switch springs JS2435 which is actuated when the wipers noted are moved away from their home positions; a sequence switch S2440 of the rotary type including three wipers 2441 to 2443, inclusive, provided with individually associated contact banks, a magnet SM2444 for driving the wipers noted, and a set of switch springs SS2446 which is actuated when the wipers noted are moved away from their home positions; a storage transfer switch U2500 of the rotary type including four wipers 2501 to 2504, inclusive, provided with individually associated contact banks, a magnet UM2505 for driving the wipers noted, and a set of switch springs US2507 which is actuated when the wipers noted are moved away from their home positions; an impulse sender switch K2520 of the rotary type including three wipers 2521 to 2523, inclusive, provided with individually associated contact banks, a magnet KM2524 for driving the wipers noted, and a set of switch springs KS2526 which is actuated when the wipers noted are moved away from their home positions; and a digit sequence switch N2200 of the rotary type including four wipers 2201 to 2204, inclusive, provided with individually associated contact banks, a magnet NM2205 for driving the wipers noted, and a set of switch springs NS2207 which is actuated when the wipers noted are moved away from their home positions.

Also, the register translator 60 comprises a composite code switch P2230 of the Strowger type, including a wiper carriage movable in both vertical and rotary directions, and an associated contact bank. More particularly, the Strowger mechanism comprises a wiper set including eight wipers 2231 to 2238, inclusive; and the associated contact bank comprises ten vertically spaced-apart rows of contact sets, each row of contact sets being peripherally arranged and including ten individual contact sets. Further, the Strowger mechanism comprises a vertical test wiper 2239 which is moved only in the vertical direction by the wiper carriage, and an associated vertical test contact bank. Also, the Strowger mechanism comprises a vertical magnet PM2240 for driving the wiper carriage step by step in the vertical direction and a rotary magnet PM2241 for driving the wiper carriage step by step in the rotary direction. Furthermore, there is associated with the Strowger mechanism a set of switch springs PS2243 which is actuated when the wiper carriage is moved in the vertical direction away from its normal position.

Further, the register translator 60 comprises a rate and route switch R2210 of the Strowger type, including a wiper carriage movable in both vertical and rotary directions, and an associated contact bank. More particularly, the Strowger mechanism comprises a wiper set including eight wipers 2211 to 2218, inclusive; and the associated contact bank comprises ten vertically spaced-apart rows of contact sets, each row of contact sets being peripherally arranged and including ten individual contact sets. Further, the Strowger mechanism comprises a vertical test wiper 2219 which is moved only in the vertical direction by the wiper carriage, and an associated vertical test contact bank. Also, the Strowger mechanism comprises a vertical magnet RM2220 for driving the wiper carriage step by step in the vertical direction and a rotary magnet RM2221 for driving the wiper carriage step by step in the rotary direction.

Furthermore, there is associated with the Strowger mechanism a set of switch springs RS2223 which is actuated when the wiper carriage is moved in the vertical direction away from its normal position. Also, it is noted that a jumper field is arranged between the contact banks of the composite code switch P2230 and the rate and route switch R2210, for a purpose more fully described hereinafter.

Further, the register translator 60 comprises a code storage unit SU2530, including four code storage devices S2541 to S2544, inclusive, and a master magnet SM2531, each code storage device including four unit or WXYZ magnets.

In the register translator 60, the code registers A2300, B2320 and C2330 are adapted respectively to register the first, second and third code digits of a called directory number; the numerical registers D2350, E2360, F2400 and G2410 are adapted respectively to register the first, second, third and fourth numerical digits of a called directory number; the called party register H2420 is adapted to register the suffix digit of a called party directory number; and the calling party register J2430 is adapted to register the suffix digit of a calling party directory number. Thus, the code registers A2300, 2320 and C2330, taken together, comprise a first register adapted to register a code comprising N digits, wherein $N=3$; while the numerical registers D2350, E2360, F2400 and G2410 and the called party register H2420, taken together, comprise a second register adapted to register a number comprising $M+1$ digits, wherein $M=4$.

The sequence switch S2440 is arranged to select the code registers A2300, B2320 and C2330, and the numerical registers D2350, E2360, F2400 and G2410 and the called party register H2420 in sequence, for purposes of registration; while the digit sequence switch N2200 is arranged to control the sequence of the digits transmitted from the register translator 60, some of these digits being registered in the rate and route switch R2210 and other of these digits being registered in the numerical registers D2350, E2360, F2400 and G2410 and the called party register H2420. The impulse sender switch K2520 is arranged to control the actual number of impulses transmitted in each numerical digit transmitted from the register translator 60; while the storage transfer switch U2500 is arranged to transmit code digits from the register translator 60, these code digits being registered in the rate and route switch R2210, the code registers A2300, B2320 and C2330, the numerical registers D2350, E2360, F2400 and G2410, the called party register H2420, the calling party register J2430 and the code storage unit SU2530. Finally, the composite code switch P2230 is controlled in accordance with the digits stored in the code registers A2300, B2320 and C2330, and governs the operation of the rate and route switch R2210.

Further, the register translator 60 comprises a hold slave relay R1800, a stop relay R1810, a transfer relay R1820, a release slave relay R1860, a hold relay R1900, a slip relay R1910, a local call relay R1920, a party relay R1930, a cutoff relay R1940, a tone test relay R1950, an impulse relay R1960, a line relay R2000, a busy relay R2010, two pulse relays R2020 and R2040, a transfer relay R2030, a digit stop relay R2050, a wiper switching relay R2100, a digit spacer relay R2110, a release relay R2120, a route busy relay R2130, a storage relay R2550, and a control network connected and arranged in a manner fully described hereinafter.

Preferably, the detectors 70 and 71 included in exchange 1 zone 38 are connected and arranged in the manner disclosed in John E. Ostline Patent No. 2,297,365, granted Sept. 29, 1942, and are substantially identical, except that a digit storing element provided in the detector 70 is not provided in the detector 71, as explained more fully hereinafter. The detector 70 comprises, as best shown in Figs. 10 to 14, inclusive, five crossbar switches 1001 to 1005, inclusive, each of these switches being identical and each having access to the control conductors of as many as 2,000 of the subscriber lines terminating in exchange 1 zone 38. Specifically, the crossbar switch 1001 comprises first and second groups of horizontal operating bars and first and second groups of vertical operating bars. The first group of horizontal operating bars includes five individual bars which are respectively operated by the magnets HM1 to HM5, inclusive; the second group of horizontal operating bars includes five individual bars which are respectively operated by the magnets HM6 to HM10, inclusive; the first group of vertical operating bars includes ten individual bars which are respectively operated by the magnets VM1 to VM10, inclusive; and the second group of vertical operating bars includes ten individual bars which are respectively operated by the magnets VM11 to VM20, inclusive. The first crossbar switch 1001 also includes two hundred contact sets which are operated under the joint control of the various horizontal and vertical operating bars, the arrangement being such that only one contact set is operated when the corresponding horizontal bar and the corresponding vertical bar are operated. Further, each contact set comprises ten pairs of contact springs, each contact spring terminating the control conductor of one of the subscriber lines extending to the exchange 1 zone 38. Accordingly, the control conductors of any group of ten subscriber lines in a larger group of two thousand subscriber lines terminating at exchange 1 zone 38 may be selected by operating the appropriate horizontal and vertical bars of the first crossbar switch 1001. Similarly, the control conductors of any group of ten subscriber lines in the group of ten thousand subscriber lines terminating at exchange 1 zone 38 may be selected by operating the appropriate horizontal and vertical bars in an appropriate one of the crossbar switches 1001 to 1005, inclusive.

Furthermore, the detector 70 comprises crossbar switch control networks individually associated with the respective crossbar switches, the crossbar switch control network 1100 being individually associated with the first crossbar switch 1001. The crossbar switch control network 1100 comprises first and second relays 1M and 2M for respectively controlling the first and second groups of horizontal magnets HM1 to HM5, inclusive, and HM6 to HM10, inclusive; an odd hundred relay OC for controlling the first group of vertical magnets VM1 to VM10, inclusive; and an even hundred relay EC for controlling the second group of vertical magnets VM11 to VM20, inclusive. Further, the crossbar switch control network 1100 comprises a relay MS for controlling both of the first and second groups of horizontal magnets HM1 to HM10, inclusive; a relay CS for controlling both of the first and second groups of vertical magnets VM1 to VM20, inclusive; and a relay DS for controlling circuits extending by way of the individual pairs of contact springs included in each contact set in each crossbar switch. At this point it is noted that the cable 1011 comprises ten leads respectively connected to corresponding contact springs of the ten pairs of contact springs in each contact set in each crossbar switch.

Also, the detector 70 comprises a counting relay network 1200 including ten counting relays 1R to 10R, inclusive, three switching relays RA, RB and RC, four code storing devices 70SM, 70SC, 70SD and 70SU, and four selecting relays MK, CK, DK and UK. The code storing devices 70SM, 70SC, 70SD and 70SU are adapted respectively to store codes corresponding to the thousand, hundred, ten and unit digits of the directory number of a calling subscriber line terminating at exchange 1 zone 38 in a manner more fully described hereinafter. Specifically, each of the code storing devices 70SM, 70SC, 70SD and 70SU comprises ten relays respectively corresponding to the ten digits. For example, the code storing device 70SM comprises ten relays 1SM to 10SM, inclusive, respectively corresponding to the thousand digits 1 to 0. Similarly, the code storing device 70SC comprises ten relays 1SC to 10SC, inclusive, respectively corresponding to the hundred digits 1 to 0. Finally, the code storing devices 70SD and 70SU respectively comprise ten SD relays and ten SU relays bearing the previously mentioned relationships to the 10 ten digits and the 10 unit digits. The selecting relays MK, CK, DK and UK are arranged to associate the counting relay network 1200 selectively and sequentially with the code storing devices 70SM, 70SC, 70SD and 70SU. Also, four locking relays ML, CL, DL and UL are respectively associated with the four code storing devices 70SM, 70SC, 70SD and 70SU for a purpose more fully described hereinafter.

It is noted that the code storing device 70SM is connected and arranged to control by way of the cable 1103 the magnets 1M, 2M, 3M, 4M, etc., respectively associated with the first crossbar switch 1001, the second crossbar switch 1002, etc.; the code storing device 70SC is connected and arranged to control by way of the cable 1101 the first and second groups of horizontal magnets in the various crossbar switches; the code storing device 70SD is connected and arranged to control by way of the cable 1104 the first and second groups of vertical magnets in the various crossbar switches; and the code storing device 70SU is connected and arranged to control by way of the cable 1105 the circuits which are adapted to be completed through the individual pairs of contact springs in the various contact sets in the various crossbar switches.

Further, the code storing devices 70SM, 70SC, 70SD and 70SU are adapted to mark by way of the WXYZ leads in the first, second, third and fourth groups of marking leads 1451, 1452, 1453 and 1454, respectively, in the cable 1455, the thousand, the hundred, the ten, and the unit digits of the directory number of the calling subscriber line terminating at exchange 1 zone 38.

More particularly, it is noted that each of the code storing devices marks by way of the four or WXYZ leads in the associated group of marking leads the particular digit by utilizing a code arrangement. For example, the code storing device 70SM marks by way of the WXYZ leads in the first group of marking leads 1451 in the cable 1455 the particular thousand digit of the directory number of a calling subscriber line terminating at exchange 1 zone 38 in accordance with the following code:

| Particular Thousand Digit | Marked Leads in First Group of Leads 1451 |
|---|---|
| 1 | W—X |
| 2 | W—Y |
| 3 | W—Z |
| 4 | X—Y |
| 5 | X—Z |
| 6 | Y—Z |
| 7 | W |
| 8 | X |
| 9 | Y |
| 10 | Z |

Further, the detector 70 comprises a rotary switch F1120 including a wiper 1123 provided with an associated contact bank and a magnet FM1121 for driving the wiper noted; a transformer 1355 associated with a tone lead C1107 common to the five crossbar switches, a 2000 cycle alternating current generator 1352; a vacuum tube detector or rectifier 1305; and an alarm device A1300. Furthermore, the detector 70 comprises a start relay R1350, two test relays R1320 and R1330, an alarm relay R1340, a check relay R1360, an impulse relay R1310, a reset relay R1300, and a control network connected and arranged in a manner more fully described hereinafter.

The detector 71 is connected and arranged in a manner substantially identical to that of the detector 70 except that the four code storing devices 71SM, 71SC, 71SD and 71SU therein are not connected and arranged to mark by way of the WXYZ leads in the four groups of marking leads 1451, 1452, 1453 and 1454 the codes stored therein. Further, the code storing devices included in the respective detectors 70 and 71 are connected and arranged to provide a series chain circuit for controlling the energization of the winding of the check relay R1360, for a purpose more fully described hereinafter.

Preferably, each of the toll ticket repeaters included in exchange 1 zone 38 is identical to the toll ticket repeater 80 which comprises, as best shown in Figs. 15, 16 and 17, a reverse charge switch P1590 of the rotary type including a wiper 1591 provided with an associated contact bank, a magnet PM1592 for driving the wiper noted, and a set of switch springs PS1593 which is actuated when the wiper noted is moved away from its home position; a timer switch T1680 of the rotary type including a wiper 1681 provided with an associated contact bank, a magnet TM1682 for driving the wiper noted, and a set of switch springs TS1684 which is actuated when the wiper noted is moved away from its home position; a storage register switch C1750 of the rotary type including three wipers 1751 to 1753, inclusive, provided with individually associated contact banks, a magnet CM1754, for driving the wipers noted, and three sets of switch springs CS1755, CS1758 and CS1759 which are actuated when the wipers noted are moved away from their home positions; and a storage transfer switch S1760 of the rotary type including five wipers S1761 to S1765, inclusive, provided with individually associated contact banks, a magnet SM1766 for driving the wipers noted, and a set of switch springs SS1768 which is actuated when the wipers noted are moved away from their home positions. Also, the toll ticket repeater 80 comprises a ten register D1740 in the form of a rotary switch including three wipers 1741 to 1743, inclusive, provided with individually associated contact banks, and a magnet DM1744 for driving the wipers noted; and a unit register U1730 in the form of a rotary switch including three wipers 1731 to 1733, inclusive, provided with individually associated contact banks, a magnet UM1734 for driving the wipers noted, and a set of switch springs US1736 which is actuated when the wipers noted are moved away from their home positions.

Further, the toll ticket repeater 80 comprises a code storage unit SU1700, including fourteen code storage devices S1701 to S1714, inclusive, and a master magnet SM1701, each code storage device including four unit or WXYZ magnets.

In the toll ticket repeater 80, the reverse charge switch P1590 is arranged to register a special service digit indicating a special service required by the called subscriber substation involved in a completed connection, such, for example, as the reversal of the assessed charge for the connection; the timer switch T1680 is arranged to time the duration of a completed connection; and the ten register D1740 and the unit register U1730 are respectively arranged to register the ten and unit digits of the time duration of a completed connection. The storage register switch C1750 is arranged to control the registration in the code storage devices in the code storage unit SU1700 of the various items of code information registered in an associated register translator; while the storage transfer switch S1760 is arranged to control the transfer of the various items of code information registered in the code storage devices in the code storage unit SU1700 to an associated printer controller.

Further, the toll ticket repeater 80 comprises a reverse charge relay R1510, a step relay R1520, a code relay R1530, an impulse relay R1540, a shunt relay R1550, an answer relay R1560, a reset relay R1570, a switching relay R1580, a hold slave relay R1600, a hold relay R1610, a wiper switching relay R1620, a test relay R1630, a busy relay R1640, an alarm relay R1650, a time pulse relay R1660, a time absorbing relay R1670, and a circuit network connected and arranged in a manner more fully described hereinafter.

Preferably, each of the printer controllers included in exchange 1 zone 33 is identical to the printer controller 85 which comprises, as best shown in Figs. 6 to 9, inclusive, a finder switch F650 of the rotary type including six wipers 651 to 656, inclusive, having individually associated contact banks, and a magnet FM657 for driving the wipers noted; a storage register switch S660 of the rotary type including five wipers 661 to 665, inclusive, provided with individually associated contact banks, a magnet SM666 for driving the wipers noted, and two sets of switch springs SS668 and SS669 which are actuated when the wipers noted are moved away from their home positions; a storage transfer switch C670 of the rotary type including four wipers 671 to 674, inclusive, having individually associated contact banks, a magnet CM675 for driving the wipers noted, and a set of switch springs CS677 which is actuated when the wipers noted are moved away from their home positions; and a printer control switch R720 of the rotary type including four wipers 721 to 724, inclusive, provided with individually associated contact banks, a magnet RM725 for driving the wipers noted, and a set of switch springs RS727 which is actuated when the wipers noted are moved away from their home positions.

Further, the printer controller 85 comprises a code storage unit SU800, including twenty-five code storage devices S801 to S825, inclusive, and a master magnet SM801, each code storing device including four unit or WXYZ magnets.

In the printer controller 85, the finder switch F650 is arranged to select one of the toll ticket repeaters, at the conclusion of a completed connection, involving the selected toll ticket repeater; the storage register switch S660 is arranged to store in the code storage unit SU800 the various items of record information stored in the selected toll ticket repeater; the storage transfer switch C670 is arranged to transfer the record items stored in the code storage unit SU800 in the printer controller to an associated toll ticket printer; and the printer control switch R720 is arranged to control the operation of the associated toll ticket printer in accordance with both certain fixed controls and the control of the storage transfer switch C670, in a manner more fully explained hereinafter.

Further, the printer controller 85 comprises ten multiplier switches, one of which is illustrated at S920. The multiplier switch S920 comprises a Strowger mechanism 700, including a wiper carriage movable in both vertical and rotary directions, a main wiper set including four wipers 701 to 704, inclusive, carried by the wiper carriage, a vertical control wiper set including two vertical control wipers 922 and 923 movable only in the vertical direction with the wiper carriage, and a rotary control wiper set including two rotary control wipers 926 and 927 movable only in the rotary direction with the wiper carriage. Further, the Strowger mechanism 700 comprises a main contact bank associated with the main wiper set and including ten vertically spaced-apart rows of contact sets, each row of contact sets being peripherally arranged and including ten individual contact sets. Also, the Strowger mechanism 700 comprises a vertical test bank 921 associated with the vertical control wiper set and a rotary test bank 925 associated with the rotary control wiper set. Finally, the Strowger mechanism 700 comprises a vertical magnet SM962 for driving the wiper carriage step by step in the vertical direction and a rotary magnet SM960 for driving the wiper carriage step by step in the rotary direction. Also, there is associated with the wiper carriage of the Strowger mechanism 700 a set of switch springs SS705 which is actuated when the wiper carriage is moved in a vertical direction away from its normal position.

Furthermore, the printer controller 85 comprises a rate switch T900 of the rotary type including four wipers 901 to 904, inclusive, provided with individually associated contact banks, a magnet TM905 for driving the wipers noted, and a set of switch springs TS906 which is actuated when the wipers noted are moved away from their home positions. The rate switch T900 is arranged to select one of the ten multiplier switches in accordance with the established rate factor registered in the first code storage device S801 in the code storage unit SU800 in the printer controller 85, in a manner more fully explained hereinafter.

Further, the printer controller 85 comprises a start relay R600, two test relays R610 and R640, a hold relay R620, two pulse relays R630 and R730, a guard relay R830, a multiplier selecting relay R910, a vertical stop relay R940, a rotary stop relay R950 and four marking relays WA, XA, YA and ZA, and a circuit network connected and arranged in a manner more fully described hereinafter. It is noted that the marking relays WA, XA, YA and ZA are individually associated with the respective wipers 671 to 674, inclusive, of the storage transfer switch C670 and are arranged to control the associated contact pyramid for the purpose of marking the ten marking conductors in the cable 637 adapted to be connected to a toll ticket printer, in a manner more fully explained hereinafter.

Preferably, the printer controller allotter 86 in exchange 1 zone 38, as best shown in Fig. 6, is connected and arranged in a conventional manner and comprises a start relay R606 and a finder switch A635 of the rotary type.

Preferably, the date and time unit 100 included in exchange 1 zone 38, as best shown in Fig. 8, is connected and arranged in a manner identical to that of the unit disclosed in Figs. 36 to 39, inclusive, of John E. Ostline Patent No. 2,373,908, granted April 17, 1945. More specifically, the date and time unit 100 comprises eight groups of marking leads 850 to 857, inclusive, wherein each group of marking leads includes four or WXYZ leads. More particularly, the two groups of marking leads 850 and 851 correspond to the ten and unit digits of the day; the two groups of marking leads 852 and 853 correspond to the ten and unit digits of the month; the two groups of marking leads 854 and 855 correspond to the ten and unit digits of the hour; and the two groups of marking leads 856 and 857 correspond to the ten and unit digits of the minute. At this point, it is noted that the eight groups of marking leads 850 to 857, inclusive, are commonly associated with each of the printer controllers in exchange 1 zone 38, these groups of marking leads being respectively associated with the code storage devices S818 to S825, inclusive, in the code storage unit SU800 incorporated in the printer controller 85.

Preferably, each of the toll ticket printers, included in exchange 1 zone 38, is identical to the toll ticket printer 90 which, as best shown in Fig. 26, is connected and arranged in a manner identical to that of the toll ticket printer disclosed in Figs. 29 and 30 of John E. Ostline Patent No. 2,272,475, granted Feb. 10, 1942. At this point, it is noted that the group of marking leads in the cable 637, comprising ten individual marking leads adapted to be connected to any one of the toll ticket printers in exchange 1 zone 38, is associated with the main contact bank of the Strowger mechanism in each of the multiplier switches by way of a jumper field, for a purpose more fully explained hereinafter.

The printer allotter 95 included in exchange 1 zone 38 comprises, as best shown in Fig. 26, an allotter switch A2635 of the rotary type including a wiper 2636 provided with an associated contact bank and a magnet AM2638 for driving the wiper noted. Also, the printer allotter 95 comprises a master start relay R2630 and a number of printer circuits, one of which is shown as comprising a start relay R2650, a test relay R2640, a number of connect relays, including the connect relays R2610, R2620, etc., and a finder switch F2600 of the rotary type. The finder switch F2600 includes three wipers 2601 to 2603, inclusive, provided with individually associated contact banks and a magnet FM2603 for driving the wipers noted. The connect relays R2610, R2620, etc., are individually associated with the various toll ticket printers, the connect relay R2610 being individually associated with the toll ticket printer 90. It is noted that the allotter switch A2635 has access to each of the printer circuits and is operative to select an idle one of the printer circuits and, consequently, an idle toll ticket printer; whereas, the finder switch F2600 is arranged to find one of the printer controllers having record items stored therein and to operate a corresponding one of the connect relays, thereby to connect the printer controller to the previously selected toll ticket printer.

The toll ticket printer 90 in exchange 1 zone 38 is so connected and arranged that it is adapted to be controlled from any one of the printer controllers to print a toll ticket of the character of that shown in Fig. 28. Referring to Fig. 28, it is noted that the toll ticket printer 90 is operative to print the following information upon the toll ticket:

1. The month and the day of the termination of the call.
2. The hour and the minute of the termination of the call.
3. The zone and exchange code of the directory number of the calling subscriber line.
4. The directory number of the line terminal of the calling subscriber line.
5. The suffix digit of the directory number of the calling subscriber line, in the event the calling subscriber line is a party line.
6. The zone and exchange code of the directory number of the called subscriber line.
7. The directory number of the line terminal of the called subscriber line.
8. The suffix digit of the directory number of the called subscriber line, in the event the called subscriber line is a party line.
9. The rate factor applicable to the call.
10. The duration of the call in minutes.
11. The cost of the call in appropriate monetary values. (In the present example, in dollars and cents.)
12. The special service digit 0, in the event this digit is dialed over the called subscriber line.

Preferably, in exchange 1 zone 38, each first selector, such as the first selector 51, each second selector, such as the second selector 52, each local connector, such as the local connector 53, and each special service selector, such as the special service selector 54, is of the well-known Strowger type; while each reverting call switch, such as the reverting call switch 118, is of any well-known type. Also, in exchange 1 zone 38, the manual operation position 0, the toll operator position 110, the information operator position 113, and the miscellaneous operator position 112 comprise conventional apparatus for answering calls and for extending calls, when such is desirable, in a well-known manner.

Each subscriber substation in exchange I zone 38 is provided with substation apparatus including a telephone instrument, a ringer and a calling device or dialing mechanism. The dialing mechanism at each private subscriber substation is of conventional construction and comprises ten points; while the dialing mechanism at each party subscriber substation is of special construction and comprises eleven points.

The code storage units

Preferably, the code storage units incorporated in the register translators, the toll ticket repeaters and the printer controllers in exchange I zone 38, such as the code storage units SU2530, SU1700 and SU800 respectively incorporated in the register translator 60, the toll ticket repeater 80 and the printer controller 85 are constructed and arranged in the manner disclosed in the copending application of John E. Ostline, Serial No. 334,886, filed May 13, 1940, now Patent No. 2,292,471, granted Aug. 11, 1942.

The dialing mechanism at each party subscriber substation

As previously noted, the dialing mechanism at each party subscriber substation in exchange I zone 38 is of the 11-point type and is constructed and arranged in the general manner of the dialing mechanism disclosed in Edward S. Peterson Patent No. 2,013,171, issued September 3, 1935. More particularly, this dialing mechanism comprises a rotary dial having eleven finger receiving recesses therein, the first ten finger receiving recesses being marked with numerals and letters in accordance with the conventional 10-point dial, and the eleventh finger receiving recess being marked Toll. Further, this dialing mechanism comprises a pair of impulsing springs, a pair of eleventh position springs and a pair of cam control springs.

The dialing mechanism is so constructed and arranged that the pair of impulsing springs is effective to transmit a number of impulses in series and comprising a digit in accordance with the finger receiving recess in the dial utilized; whereby any digit between 1 and 11 may be transmitted. The pair of eleventh position springs are so constructed and arranged that they are operated into engagement only in the event the rotary dial is rotated in accordance with the digit 11, and that they are operated into disengagement, once they have been operated into engagement, only when the rotary dial is returned to its normal position. The pair of cam control springs are so constructed and arranged that they are actuated into engagement an adjustable time interval corresponding to an adjustable number of impulses of the dialing mechanism. Finally, the pair of eleventh position springs and the pair of cam control springs are so related that, when the rotary dial is actuated in accordance with the digit 11, ground potential is connected to the positive conductor of the subscriber line extending to the party subscriber substation an adjustable time interval corresponding to a predetermined adjustable number of impulses of the digit 11, whereby ground potential may be adjustably retained upon the positive line conductor of the line extending to the party subscriber substation corresponding to different numbers of impulses of the digit 11. Finally, the dialing mechanism comprises a mechanical arrangement accessible only to a repairman for adjusting the pair of cam control springs in order to effect the adjustment mentioned. The time interval, during which ground potential is retained upon the positive line conductor of the line extending to a particular party subscriber substation corresponding to a predetermined number of impulses of the digit 11, is adjusted in accordance with the position of the particular party subscriber substation on the subscriber line and, consequently, the suffix digit of the directory number of the particular party subscriber substation, in a manner more fully explained hereinafter.

A better understanding of the connection and arrangement of the apparatus incorporated in the telephone system will be facilitated from a consideration of the detailed operation of the various pieces of apparatus incident to the extension of various calls from exchange I zone 38, as will appear hereinafter.

The selection of an idle primary selector and the selection of an idle register translator in exchange 1 zone 38

In exchange I zone 38, when a call is initiated at a subscriber substation associated with one of the subscriber lines terminating thereat, an idle primary selector switch is automatically associated with the subscriber line. For example, when a call is initiated at the subscriber substation T1 by removing the receiver of the telephone instrument thereat from its associated switchhook, a bridge path is completed thereat between the line conductors C351 and C352 of the subscriber line 350 and operation of the line switch 40 individually associated with the subscriber line 350 is initiated. The line switch 40 then operates to find an idle primary selector in the associated group, including the primary selector 50. More particularly, the switching mechanism A350 of the line switch 40 is operated, thereby to cause the control wiper 303 in the wiper set thereof to test progressively the idle or busy condition of the various primary selectors in this group. Assuming that the primary selector 50 is the first idle primary selector in this group, the switching mechanism A350 operates, thereby to seize the trunk 360 extending thereto, the primary selector 50 being marked as idle by the absence of ground potential upon the control conductor C363 of the trunk 360 extending thereto.

When the primary selector 50 is thus seized a circuit is completed for energizing the winding of the line relay R420, this circuit extending from ground by way of the contacts 413, 433 and 315 to the line conductor C362; and from battery by way of the winding of R420, the contacts 431 and 313 to the line conductor C361, the line conductors C361 and C362 of the trunk 360 being connected together by way of the wipers 301 and 302 of the wiper set of the switching mechanism A350 of the line switch 40, the line conductors C351 and C352 of the subscriber line 350 and the bridge at the calling subscriber substation T1. When thus energized, the line relay R420 operates to complete, at the contacts 421, a circuit for energizing the winding of the hold relay R330, this circuit extending from ground by way of the contacts 437 and 421 and the winding of R330 to battery. When thus energized, the hold relay R330 operates to complete, at the contacts 331, a path for applying ground potential to the control conductor C363 of the trunk 360 extending to the primary selector 50, thereby to mark the primary selector 50 as busy to the other line switches having access thereto, this path extending from ground by way of the contacts 331 and 317 to the control conductor C363 of the trunk 360. Also, the hold relay R330 completes, at the contacts 333, a circuit for energizing the magnet BM387 of the register translator selector B380, this circuit extending from ground by way of the set of switch springs SS346, the contacts 333, 324 and 388 and the magnet BM387 to battery. When thus energized, the magnet BM387 operates buzzer fashion alternately to interrupt and to complete, at the contacts 388, its energizing circuit, thereby to cause the wipers noted of the register translator selector B380 to be driven step by step in the clockwise direction.

The magnet BM387 continues to operate intermittently, thereby to cause the register translator selector B380 to test successively the various register translators in the associated group until an idle register translator is found. Assuming that the register translator 60 is the first idle register translator in the associated group, when the register translator selector B380 seizes the trunk 390 extending thereto a circuit is completed for energizing the upper winding of the test relay R320, this circuit extending from ground by way of the set of switch springs SS345, the contacts 332, the upper winding of R320, the contacts 319, the control conductor C376 of the trunk 370, the wiper 386 of the register translator selector B380, the control conductor C396 of the trunk 390, the contacts 2121, C1972, the contacts 1904 and the resistor 1905 to battery. When thus energized, the test relay R320 operates to interrupt, at the contacts 324, the previously traced circuit for energizing the magnet BM387 of the register translator selector B380, thereby to arrest further operation thereof and to include the lower winding of the test relay R320 in the previously traced circuit for energizing the magnet BM387, thereby to complete an obvious holding circuit for energizing the lower winding of the test relay R320. Also, the test relay R320 completes, at the contacts 321 and 322, an obvious connection between the line conductors C361 and C362 of the trunk 360 and the line conductors C371 and C373 of the trunk 370, the line conductors C361 and C362 of the trunk 360 being connected by way of the switching mechanism A350 of the line switch 40 to the line conductors C351 and C352 of the subscriber line 350 and the line conductors C371 and C373 of the trunk 370 being connected by way of the register translator selector B380 to the line conductors C391 and C393 of the trunk 390. When this connection is completed an obvious circuit is completed for energizing the winding of the impulse relay R1960, thereby to cause the latter relay to operate. At this point, it is noted that the line relay R420 in the primary selector 50 and the impulse relay R1960 in the register translator 60 are energized in multiple by way of the loop circuit, including the subscriber line 350.

Upon operating, the impulse relay R1960 completes, at the contacts 1962, an obvious circuit for energizing the winding of the hold relay R1900, thereby to cause the latter relay to operate, and completes, at the contacts 1964, a path for applying ground potential to the control conductor C392 of the trunk 390, this path extending from ground by way of the contacts 1964, C1975, and the wiper 2443 of the sequence switch S2440 and the engaged home contact in the associated contact bank to the control conductor C392 of the trunk 390. Upon operating, the hold relay R1900 completes, at the contacts 1901, an obvious circuit for energizing the winding of the hold slave relay R1800, thereby to cause the latter relay to operate and complete, at the contacts 1804, an obvious path for applying ground potential to the hold conductor C1839.

When ground potential is applied to the control conductor C392 of the trunk 390 a circuit is completed for energizing the winding of the switching relay R310, this circuit extending from the grounded control conductor C392 of the trunk 390 by way of the wiper 382 of the register translator selector B380, the control conductor C372 of the trunk 370, the contacts 311 and 323 and the winding of R310 to battery. When thus energized, the switching relay R310 operates to complete, at the contacts 310, an obvious multiple holding circuit for energizing the lower winding of the test relay R320 in series with the magnet BM387 of the register translator selector B380 and to complete, at the contacts 318, a holding circuit for energizing the winding thereof, this circuit extending from ground by way of the contacts 1903, C1972, the contacts 2121, the control conductor C396 of the trunk 390, the wiper 386 of the register translator selector B380, the control conductor C376 of the trunk 370, the contacts 318 and 323 and the winding of R310 to battery. Also, the switching relay R310 interrupts, at the contacts 317, the previously traced path for applying ground potential to the control conductor C363 of the trunk 360; and completes, at the contacts 316, an alternative path for applying ground potential by way of the winding of the party relay R1930 to the control conductor C363 of the trunk 360, this path extending from ground by way of the winding of R1930, the control conductor C395 of the trunk 390, the wiper 385 of the register translator selector B380, the control conductor C375 of the trunk 370 and the contacts 316 to the control conductor C363 of the trunk 360.

At this point, it is noted that the party relay R1930 is of the marginal type and is not operated in the event the subscriber line 350 is of the private type. Assuming that the subscriber line 350 is of the private type for the present, the party relay R1930 is not operated. However, a holding ground is supplied by way of the winding of the party relay R1930 and the control conductor C363 of the trunk 360 in order to retain the line switch 40 in its operated position. Further, it is noted that, upon operating, the line switch 40 marks the subscriber line 350 as busy to the connector switches having access thereto.

Further, the switching relay R310 interrupts, at the contacts 313 and 315, the previously traced original circuit for energizing the winding of the line relay R420, completes, at the contacts 312, an alternative circuit for energizing the winding of the line relay R420, and completes, at the contacts 314, an obvious connection between the primary selector 50 and the control conductor C374 of the trunk 370. The alternative circuit for energizing the winding of the line relay R420 extends from the grounded control conductor C392 of the trunk 390 by way of the wiper 382 of the register translator selector B380, the control conductor C372 of the trunk 370, the contacts 312 and 431 and the winding of R420 to battery. The control conductor C374 of the trunk 370 is connected to the control conductor C394 of the trunk 390 for a purpose more fully explained hereinafter, this connection extending from the control conductor C374 of the trunk 370 by way of the wiper 384 of the register translator selector B380 to the control conductor C394 of the trunk 390.

At this time, dial tone current is returned over the subscriber line 350, the path for returning dial tone current over the subscriber line 350 extending from the ungrounded terminal of a grounded dial tone transformer winding, not shown, by way of the dial tone conductor C1806, the contacts 1801, C1834, the condenser 1966, the contacts 2001, the line conductor C391 of the trunk 390, the wiper 381 of the register translator selector B380, the line conductor C371 of the trunk 370, the contacts 321, the line conductor C361 of the trunk 360 and the wiper 301 to the line conductor C351 of the subscriber line 350; and from ground by way of the contacts 2310 of the set of switch springs AS2306, the line conductor C393 of the trunk 390, the wiper 383 of the register translator selector B380, the line conductor C373 of the trunk 370, the contacts 322, the line conductor C362 of the trunk 360 and the wiper 302 to the line conductor C352 of the subscriber line 350, the line conductors C351 and C352 of the subscriber line 350 being connected together at the calling subscriber substation T1 by way of the bridge path, including the receiver of the telephone instrument thereat. The dial tone current traversing the bridge path, including the telephone instrument at the calling subscriber substation T1, causes the receiver of the telephone instrument to produce dial tone in order to indicate to the subscriber thereat that he may dial the directory number of the called subscriber substation.

*Local call in exchange 1 zone 38*

Assuming that the call extending from the calling subscriber substation T1 to the primary selector 50 and the register translator 60 is to be extended to the called subscriber substation T3 in exchange 1 zone 38, the subscriber at the calling substation T1 proceeds to dial the directory number of the called subscriber substation T3. The directory number of the called subscriber substation T3 comprises a code portion including the digits 381, identifying the called zone and exchange, and a numerical portion including four digits, such, for example, as the digits 1234, identifying the line terminal. Also, the directory number of the called subscriber substation T3 may comprise a suffix digit in the event it is a party subscriber substation, such, for example, as the digit 6. Thus, the directory number of the called subscriber substation T3 is 381—1234, in the event the subscriber substation T3 is of the private type, or 381—12346, in the event the subscriber substation T3 is of the party type. In setting up local calls, it is immaterial whether the called subscriber substation T3 is of the private type or the party type, as will be explained more fully hereinafter.

Accordingly, the subscriber at the calling subscriber substation T1 proceeds to dial the first digit 3, thereby to cause a corresponding number of impulses to be transmitted over the subscriber line 350 in a well-known manner. The impulse relay R1960 follows the digits transmitted over the calling subscriber line 351 in view of the fact that the circuit for energizing the winding thereof includes the previously traced loop circuit at the calling subscriber substation T1. Accordingly, the impulse relay R1960 operates and restores intermittently in accordance with the digit 3. Each time the impulse relay R1960 restores it interrupts, at the contacts 1962, the previously mentioned circuit for energizing the winding of the hold relay R1900 and interrupts, at the contacts 1964, the previously mentioned path for applying ground potential to the conductor C1975, thereby to interrupt the previously traced alternative circuit for energizing the winding of the line relay R420. On the other hand, each time the impulse relay R1960 operates it completes, at the contacts 1962, the previously mentioned circuit for energizing the winding of the hold relay R1900 and completes, at the contacts 1964, the previously traced circuit for energizing the winding of the line relay R420. Accordingly, the impulse relay R1960 repeats the impulses of the first digit 3 to the line relay R420, thereby to cause the line relay R420 to follow the first digit 3. The hold relay R1900, being of the slow-to-release type, does not restore during impulsing.

Also, each time the impulse relay R1960 restores it completes, at the contacts 1961, a circuit for energizing in series the winding of the transfer relay R2030 and the magnet AM2305, this circuit extending from ground by way of the contacts 1961, 1902, the upper winding of R2030, C2072, the wiper 2441 of the sequence switch S2440 and the engaged home contact in the associated contact bank, C2370 and the magnet AM2305 to battery. When this circuit is completed the transfer relay R2030 operates and the magnet AM2305 operates, thereby to condition the wipers noted of the first code register A2300 to be driven one step in the counterclockwise direction. Each time the impulse relay R1960 operates it interrupts, at the contacts 1961, the previously traced circuit for energizing in series the winding of the transfer relay R2030 and the magnet AM2305. When this circuit is thus interrupted the magnet AM2305 restores to drive the wipers noted of the first code register A2300 one step in the counterclockwise direction. Accordingly, the impulse relay R1960 repeats the impulses of the first digit 3 to the magnet AM2305; the transfer relay R2030 is of the slow-to-release type and does not restore during impulsing. When the wipers noted of the first code register A2300 are driven one step in the counterclockwise direction the set of switch springs AS2306 is actuated for a purpose more fully explained hereinafter.

Each time the line relay R420 restores it interrupts, at the contacts 421, the previously traced circuit for energizing the winding of the hold relay R330 and completes, at the contacts 422, a circuit for energizing in series the winding of the transfer relay R340 and the vertical magnet SM347, this circuit extending from ground by way of the contacts 437, 422, 334, the winding of R340 and the vertical magnet SM347 to battery. When this circuit is completed the transfer relay R340 operates. Each time the line relay R420 operates it recompletes, at the contacts 421, the previously traced circuit for energizing the winding of the hold relay R330 and interrupts, at the contacts 422, the previously traced circuit for energizing in series the winding of the transfer relay R340 and the vertical magnet SM347. Both the hold relay R330 and the transfer relay R340 are of the slow-to-release type. Accordingly, these relays do not restore during impulsing. Each time the vertical magnet SM347 is energized the wiper carriage of the Strowger mechanism S400 is driven one step in the vertical direction. When the wiper carriage of the Strowger mechanism S400 is driven one step in the vertical direction the sets of switch springs SS345, SS346, SS411, SS410 and SS412 are actuated for a purpose more fully explained hereinafter.

At the conclusion of the first digit 3 the wipers noted of the first code register A2300 engage the third contacts in the associated contact banks and the wiper carriage of the Strowger mechanism S400 occupies its third vertical step. More particularly, at this time, a circuit is completed for energizing in series the winding of the release relay R440 and the upper winding of the wiper switching relay R460, this circuit extending from ground by way of the contacts 1828, C1845, the contacts 1922, C1970, the wiper 2301 of the first code register A2300 and the engaged third contact in the associated contact bank, the control conductor C394 of the trunk 390, the wiper 384 of the register translator selector B380, the control conductor C374 of the trunk 370, the contacts 314 and 433, the contacts 414 of the set of switch springs SS412, the winding of R440 and the upper winding of R460 to battery. When this series circuit is completed, both the release relay R440 and the wiper switching relay R460 operate. It is noted that the release relay R440 is of the marginal type and operates at this time, due to the application of direct ground potential to the control conductor C394 of the trunk 390.

Shortly following the conclusion of the first digit 3 the transfer relay R340 restores, the line relay R420 being operated at this time. Upon restoring, the transfer relay R340 completes, at the contacts 342, a circuit for energizing the release magnet SM408, this circuit extending from ground by way of the contacts 331, 342 and 441, the set of switch springs SS410 and the release magnet SM408 to battery. When thus energized the release magnet SM408 operates to release the wiper carriage of the Strowger mechanism S400 and to cause it to be returned to its normal position, whereby the sets of switch springs SS345, SS346, SS410, SS411 and SS412 are actuated. More particularly, the set of switch springs SS410 is actuated into disengagement, thereby to interrupt the previously traced circuit for energizing the release magnet SM408; while the contacts 414 of the set of switch springs SS412 are actuated into disengagement, thereby to interrupt the previously traced series circuit for energizing the winding of the release relay R440 and the upper winding of the wiper switching relay R460 in order to cause the latter relays to restore. At this time, the wiper carriage of the Strowger mechanism S400 occupies its normal position and the primary selector 50 occupies its normally seized position; thus, the primary selector 50 is of the drop-back type.

Also, shortly following the first digit 3, the transfer relay R2030 restores to complete, at the contacts 2033, a circuit for energizing the magnet SM2444, this circuit extending from ground by way of the contacts 2033, C2008, the contacts 2311 of the set of switch springs AS2306, C2372, the contacts 2448 of the set of switch springs SS2446, the contacts 2445 and the magnet SM2444 to battery. When thus energized the magnet SM2444 operates, thereby to condition the wipers noted of the sequence switch S2440 to be driven one step in the counterclockwise direction and to interrupt, at the contacts 2445, the previously traced circuit for energizing the magnet SM2444. Accordingly, the magnet SM2444 restores, thereby to drive the wipers noted of the sequence switch S2440 one step in the counterclockwise direction, whereupon the set of switch springs SS2446 is actuated. More particularly, the contacts 2448 of the set of switch springs SS2446 are actuated into disengagement, thereby to interrupt a further point in the previously traced circuit for energizing the magnet SM2444.

The subscriber at the calling subscriber substation T1 proceeds to dial the second digit 8 at this time, whereupon the impulse relay R1960 again follows the impulses transmitted over the subscriber line 350. However, at this time, the line relay R420 remains in its operated position due to the completion of a holding circuit therefor, this holding circuit extending from ground by way of the wiper 2443 of the sequence switch S2440 and the engaged first contact in the associated contact bank, the control conductor C392 of the trunk 390, the wiper 382 of the register translator selector B380, the control conductor C372 of the trunk 370, the contact 312 and 431 and the winding of R420 to battery. Accordingly, when the second digit 8 is dialed, only the impulse relay R1960 follows the impulses transmitted over the subscriber line 350. At this time, each time the impulse relay R1960 restores it completes, at the contacts 1961, a circuit for energizing in series the winding of the transfer relay R2030 and the magnet BM2323, this circuit extending from ground by way of the contacts 1961 and 1902, the winding of R2030, C2072, the wiper 2441 of the sequence switch S2440 and the engaged first contact in the associated contact bank, C2373 and the magnet BM2323 to battery. When this series circuit is completed the transfer relay R2030 again operates; and the magnet BM2323 operates, thereby to condition the wipers noted of the second code register B2320 to be driven one step in the counterclockwise direction. When the impulse relay R1960 again restores it interrupts, at the contacts 1961, the previously traced series circuit for energizing the winding of the transfer relay and the magnet BM2323, thereby to cause the magnet BM2323 to restore in order to drive the wipers noted of the second code register B2320 one step in the counterclockwise direction, the transfer relay R2030 remaining in its operated position during impulsing as it is of the slow-to-release type, as previously noted. When the wipers noted of the second code register B2320 are driven one step in the counterclockwise direction the set of switch springs BS2326 is actuated for a purpose more fully explained hereinafter.

Accordingly, at the conclusion of the second digit 8, the wipers noted of the second code register B2320 engage the eighth contacts in the associated contact banks; and shortly thereafter the transfer relay R2030 restores to interrupt, at the contacts 2032, a previously completed circuit for energizing the magnet SM2444; the previously completed circuit for energizing the magnet SM2444 extending from ground by way of the contacts 2032, C1976, the contacts 2329 of the set of switch springs BS2326, C2375 and the magnet SM2444 to battery. When the above-traced circuit was initially completed the magnet SM2444 operated, thereby to condition the wipers noted of the sequence switch S2440 to be driven an additional step in the counterclockwise direction. Accordingly, at this time, when the previously traced circuit for energizing the magnet SM2444 is interrupted at the contacts 2032, due to the restoration of the transfer relay R2030, the magnet SM2444 restores, thereby to drive the wipers noted of the sequence switch S2440 an additional step in the counterclockwise direction and into engagement with the second contacts in the associated contact banks.

At this time, the wipers noted of the first code register A2300 engage the third contacts in the associated contact banks, thereby to complete an obvious path by way of the wiper 2304 and the engaged third contact in the associated contact bank for applying ground potential to the wiper 2232 of the composite code switch P2230. Each time the magnet BM2323 is operated, thereby to condition the wipers noted of the second code register B2320 to be driven one step in the counterclockwise direction, it completes, at the contacts 2324, an obvious circuit for energizing the vertical magnet PM2240, thereby to cause the vertical magnet PM2240 to operate and drive the wiper carriage of the composite code switch P2230 one step in the vertical direction. Hence, at the conclusion of the second digit 8, the wiper carriage of the composite code switch P2230 occupies its eighth vertical position, whereupon a path is completed for applying ground potential to the control conductor C1859, this path extending from the grounded wiper 2304 of the first code register A2300 and the engaged third contact in the associated contact bank by way of the second conductor in the group of marking conductors 2341 and the jumper 2277 to the vertical control wiper 2239 engaging the eighth contact in the associated vertical control contact bank, and therefrom by way of the jumper 2240' to the control conductor C1859. This application of ground potential to the control conductor C1859 completes an obvious circuit for energizing the winding of the local call relay R1920, thereby to cause the latter relay to operate. Upon operating, the local call relay R1920 completes, at the contacts 1921, a path for applying high resistance ground potential to the control conductor C394 of the trunk 390, this path extending from ground by way of the resistor 1965, the contacts 1921, C1970 and the wiper 2301 of the first code register A2300 and the engaged third contact in the associated contact bank to the control conductor C394. This application of resistance ground potential to the control conductor C394 of the trunk 390 is utilized for a purpose more fully explained hereinafter.

The subscriber at the calling subscriber substation T1 then proceeds to dial the third digit 1, thereby to cause the impulse relay R1960 to follow the third digit, in the manner previously explained. Upon restoring, the impulse relay R1960 completes, at the contacts 1961, a circuit for energizing in series the winding of the transfer relay R2030 and the magnet CM2335, this circuit extending from ground by way of the contacts 1961 and 1962, the winding of R2030, C2072, the wiper 2441 of the sequence switch S2440, and the engaged second contact in the associated contact bank, C2376 and the magnet CM2335 to battery. When thus energized the magnet CM2335 operates, thereby to condition the wipers noted of the third code register C2330 to be driven one step in the counterclockwise direction, and completes, at the contacts 2337, an obvious circuit for energizing the rotary magnet PM2241, whereby the rotary magnet PM2241 operates to drive the wiper carriage of the composite code switch P2230 one step in the rotary direction. Upon reoperating, the transfer relay R2030 completes, at the contacts 2032, the previously traced circuit for energizing the magnet SM2444, thereby to condition the wipers noted of the sequence switch S2440 to be driven an additional step in the counterclockwise direction. At the conclusion of the third digit 1 the impulse relay R1960 reoperates, thereby to interrupt, at the contacts 1961, the previously traced circuit for energizing in series the winding of the transfer relay R2030 and the magnet CM2335, thereby to cause the magnet CM2335 to restore and drive the wipers noted of the third code register C2330 one step in the counterclockwise direction. When the wipers noted of the code register C2330 are driven one step away from their home positions, the set of switch springs CS2338 is actuated.

It is noted that the third digit 1 is repeated by the impulse relay R1960 to the line relay R420. More specifically, when the impulse relay R1960 restores it interrupts, at the contacts 1964, an alternative circuit for energizing the line relay R420, this alternative circuit extending, when completed, from ground by way of the contacts 1964, C1975, the contacts 1923, C1974 and the wiper 2443 of the sequence switch S2440 and the engaged second contact in the associated contact bank to the control conductor C392 of the trunk 390; and therefrom by way of the previously traced path, including the winding of R420 to battery. Thus, the line relay R420 following the third digit 1 causes the wiper carriage of the Strowger mechanism S400 to be driven one step in the vertical direction, in the manner previously explained.

Shortly following the conclusion of the third digit 1 the transfer relay R2030 restores, thereby to interrupt, at the contacts 2032, the previously traced circuit for energizing the magnet SM2444, whereupon the magnet SM2444 restores, thereby to drive the wipers noted of the sequence switch S2440 an additional step in the counterclockwise direction and into engagement with the third contacts in the associated contact banks. When the wiper 2443 of the sequence switch S2440 engages the third contact in the associated contact bank an alternative holding circuit is completed for energizing the winding of the line relay R420, this circuit extending from ground by way of the contacts 2138, C2070, the contacts 2023, C2071 and the wiper 2443 of the sequence switch S2440 and the engaged third contact in the associated contact bank to the control conductor C392 of the trunk 390, and therefrom by way of the previously traced path, including the winding of the line relay R420 to battery.

At the conclusion of the third digit 1, the wiper carriage of the Strowger mechanism S400 occupied its first vertical position, as previously noted, thereby to cause the set of switch springs SS412 to be actuated in order to complete the previously traced circuit for energizing in series the winding of the release relay R440 and the upper winding of the wiper switching relay R460 from resistance ground potential appearing upon the control conductor C394 of the trunk 390 by way of the previously traced circuit. As previously noted, the release relay R440 is of the marginal type. Accordingly, the release relay R440 will not operate at this time. However, the wiper switching relay R460 does operate. Upon operating, the wiper switching relay R460 interrupts, at the contacts 461, 463 and 465, previously prepared points in circuits extending to the first wiper set including the wipers 401 to 403, inclusive, and prepares points, at the contacts 462, 464 and 466, in circuits extending to the second wiper set, including the wipers 404, 405 and 406.

At this point, it is noted that when the wiper carriage of the Strowger mechanism S400 is moved one step in the vertical direction the set of switch springs SS411 is actuated into engagement, thereby to complete a circuit for energizing the winding of the rotary step relay R450, this circuit extending from ground by way of the contacts 331 and 341, the set of switch springs SS411 and the winding of R450 to battery. When the rotary step relay R450 is thus energized it operates.

Shortly following the conclusion of the third digit 1, the transfer relay R340 restores, thereby to complete, at the contacts 342, a holding circuit for energizing the lower winding of the wiper switching relay R460, this circuit extending from ground by way of the contacts 331, 342, 442 and 467 and the lower winding of R460 to battery. The transfer relay R340 completes, at the contacts 342, a circuit for energizing the rotary magnet SM407, this circuit extending from ground by way of the contacts 331, 342, 442 and 451 and the rotary magnet SM407 to battery. When thus energized, the rotary magnet SM407 operates, thereby to drive the wiper carriage of the Strowger mechanism S400 one step in the rotary direction. Further, the transfer relay R340 interrupts, at the contacts 341, the previously traced circuit for energizing the winding of the rotary step relay R450, thereby to cause the latter relay to restore.

At this time, the wiper carriage of the Strowger mechanism S400 occupies its first vertical position and its first rotary position, thereby to cause the second wiper set, including the wipers 404 to 406, inclusive, to test the first trunk in the associated group of trunks extending to the local switch train in order to determine the idle or busy condition thereof.

In the event the first trunk in the group of trunks mentioned is busy, ground potential appears upon the control conductor thereof, thereby to complete a path for short-circuiting the winding of the switch-through relay R430 and a circuit for energizing the winding of the rotary step relay R450. The path for short-circuiting the winding of the switch-through relay R430 extends from ground potential appearing upon the control conductor of the trunk seized by the second wiper set of the Strowger mechanism S400 by way of the test wiper 406 thereof, the contacts 466 and 435, the winding of R430 and the contacts 331 to ground. When the winding of the switch-through relay R430 is thus short-circuited this relay does not operate. The circuit for energizing the winding of the rotary step relay R450 extends from the grounded control wiper 406 of the second wiper set of the Strowger mechanism S400 by way of the contacts 466, 435 and 453, the set of switch springs SS411 and the winding of R450 to battery. When thus energized the rotary step relay R450 operates to complete, at the contacts 451, the previously traced circuit for energizing the rotary magnet SM407, thereby to cause the rotary magnet SM407 to operate and drive the wiper carriage of the Strowger mechanism S400 an additional step in the rotary direction. When the wiper carriage of the Strowger mechanism S400 is driven an additional step in the rotary direction the previously traced path for short-circuiting the winding of the switching relay R430 and the previously traced circuit for energizing the winding of the rotary step relay R450 are interrupted, and the second trunk extending to the local switch train is tested in the manner previously explained. Accordingly, the rotary step relay R450 and the rotary magnet SM407 continue to interact, in the manner explained above, until an idle trunk extending to the local switch train is selected by the second wiper set of the Strowger mechanism S400.

Assuming that the trunk 483 is the first idle trunk in the associated group, the first selector 51 being idle at this time, when the second wiper set of the Strowger mechanism S400 seizes the trunk 483 the previously traced path for short-circuiting the winding of the switching relay R430 is not completed due to the absence of ground potential upon the control conductor of the trunk 483. Accordingly, at this time, a series circuit is completed for energizing the winding of the switch-through relay R430 and the winding of the rotary step relay R450, this circuit extending from ground by way of the contacts 331, the winding of R430, the contacts 453, the set of switch springs SS411 and the winding of R450 to battery. When this series circuit is completed the switch-through relay R430 operates; however, the rotary step relay R450 does not operate, the rotary step relay R450 being of the marginal type. When the rotary step relay R450 fails to reoperate in order to complete the previously traced circuit for energizing the rotary magnet SM407, further operation of the Strowger mechanism S400 is arrested. Also, upon operating, the switch-through relay R430 completes, at the contacts 436, a path for applying ground potential to the control conductor of the trunk 483, this path extending from ground by way of the contacts 331, 436 and 466 and the control wiper 406 to the control conductor of the trunk 483. This application of ground potential to the control conductor of the trunk 483 causes the first selector 51 to operate, thereby to cause ground potential in the first selector 51 to be applied to the control conductor of the trunk 483 and to render the first selector 51 operative in response to a digit transmitted thereto. This application of ground potential in the first selector 51 to the control conductor of the trunk 483 completes an obvious multiple holding circuit for energizing the winding of the switch-through relay R430 in series with the winding of the rotary step relay R450.

Returning now to the register translator 60, it is pointed out that the various contacts in the contact bank associated with the wiper 2331 of the third code register C2330 are adapted to be connected to either the control conductor C2380 or the control conductor C1971, the first contact in the contact bank mentioned being connected to the control conductor C1971 and the wipers noted of the third code register C2330 engaging the first contacts in the associated contact banks, at this time, due to the fact that the third digit 1 was dialed. More specifically, it is pointed out that the first contact in the contact bank associated with the wiper 2331 of the third code register C2330 is connected to the control conductor C1971 by way of the jumper 2305 in view of the fact that the present call is a local call and that no special charge is made therefor. Accordingly, at this time, a circuit is completed for energizing the upper winding of the release relay R2120, this circuit extending from ground by way of the contacts 1925, C1926, the wiper 2331 of the third code register C2330 and the engaged first contact in the associated contact bank, the control conductor C1971, the contacts 2031, the transfer relay R2030 having restored at this time, C2256 and the upper winding of R2120 to battery. When thus energized the release relay R2120 operates to interrupt, at the contacts 2121, the previously traced path for applying ground potential to the control conductor C396 of the trunk 390, thereby to interrupt the previously traced holding circuit for energizing the winding of the switching relay R310.

Further, it is pointed out that the operation of the release relay R2120 effects the release of the register translator 60, the actual release of the register translator 60 being explained more fully hereinafter.

Returning now to the primary selector 50, when the previously traced holding circuit for energizing the winding of the switching relay R310 is interrupted the latter relay restores to recomplete, at the contacts 317, an obvious multiple holding circuit for applying ground potential to the control conductor C353 of the subscriber line 350, thereby to retain the line switch 40 in its operated position. Also, the switching relay R310 completes, at the contacts 313 and 315, a connection between the calling subscriber substation T1 and the first selector 51, this connection extending from the line conductor C351 of the subscriber line 350 by way of the wiper 301, the line conductor C361 of the trunk 360, the contacts 313, 432 and 462 and the wiper 404 to one of the line conductors of the trunk 483; and from the line conductor C352 of the subscriber line 350 by way of the wiper 302, the line conductor C362 of the trunk 360, the contacts 315, 434 and 464 and the wiper 405 to the other line conductor of the trunk 483, the line conductors C351 and C352 of the subscriber line 350 being connected together by way of the bridge at the calling subscriber substation T1 and the line conductors mentioned of the trunk 483 being connected together by way of the apparatus in the first selector 51. Accordingly, at this time, an operative connection is extended from the calling subscriber substation T1 to the first selector 51 and the first selector 51 is rendered operative in response to a digit transmitted thereto from the calling subscriber substation T1.

Also upon restoring the switching relay R310 interrupts, at the contacts 318, a further point in the previously traced holding circuit for energizing the winding thereof, and interrupts, at the contacts 316, the previously traced holding circuit for energizing the lower winding of the test relay R320 in series with the magnet BM307 of the register translator selector B300, thereby to cause the test relay R320 to restore. Upon operating, the switch-through relay R430 also interrupts, at the contacts 437, the previously traced circuit for energizing the winding of the hold relay R330, thereby to cause the latter relay to restore shortly thereafter. Upon restoring, the hold relay R330 interrupts, at the contacts 331, the previously traced original circuit for energizing in series the winding of the switch-through relay R430 and the winding of the rotary step relay R450, and the original circuit for retaining the line switch 40 in its operated position. However, the switch-through relay R430 and the line switch 40 remain in their operated positions due to the completion of the previously traced holding circuit therefor extending from ground potential appearing in the first selector 51. Also, upon operating, the switch-through relay R430 interrupts, at the contacts 431, the previously traced circuit for energizing the winding of the line relay R420, thereby to cause the latter relay to restore. Accordingly, at this time, a connection is extended from the calling subscriber substation T1 to the first selector 51.

The subscriber at the calling subscriber substation T1 then proceeds to dial the fourth digit 1, the fifth digit 2, the sixth digit 3 and the seventh digit 4 successively, in the usual manner. Further, the subscriber at the calling subscriber station T1 dials the eighth digit 6 in the event the called subscriber substation T3 is of the party type, as previously explained. The operation of the first selector 51 in response to the fourth digit 1, the operation of the second selector 52 in response to the fifth digit 2 and the operation of the local connector 53 in response to the sixth digit 3, seventh digit 4 and eighth digit 6, in the event this digit is dialed, are entirely conventional, thereby to cause the connection to be forwarded to the subscriber line 510 extending to the called subscriber substation T3. At this point, it is noted that the eighth digit 6 is utilized for the purpose of selecting a suitable ring code in the event the called subscriber substation T3 is of the party type. In any event, at this time, the local connector 53 operates to cause ringing current to be projected over the subscriber line 510 to the called subscriber substation T3, thereby to operate the ringer thereat. When the call is answered at the called subscriber substation T3 an obvious communication connection is completed between the calling subscriber substation T1 and the called subscriber substation T3.

When the local connector 53 seizes the subscriber line 510 extending to the called subscriber substation T3, the apparatus therein operates in order to mark the subscriber line 510 as busy to the connector switches having access thereto.

It should be noted that the incoming toll lines and the incoming trunks, such as 500, terminate in individual incoming first selector switches, similar to first selector 51, and have their bank contacts multiplied together with the bank contacts of the local first selector switches 51, so that incoming calls from subscribers in zones 46, 52, 73 and other exchanges in zone 38 may be completed through the local second selectors 52 and connectors 53 to the local subscribers in zone 38, exchange 1.

The apparatus may be arranged for either calling party or last party release. However, assuming that the apparatus is arranged for calling party release when the subscriber at the calling subscriber substation T1 replaces the receiver of the telephone instrument thereat upon its associated switchhook, the previously traced loop circuit extending between the calling subscriber substation T1 and the local connector 53 is interrupted, thereby to cause the local connector 53 to be released. When the local connector 53 is released the subscriber line 510 extending to the called subscriber substation T3 is marked as idle to the connector switches having access thereto, assuming that the subscriber at the called subscriber substation T3 has, at this time, replaced the receiver of the telephone instrument thereat upon its associated switchhook. Further, the release of the local connector 53 effects the release of the second selector 52 and the first selector 51 and causes ground potential to be removed from the control conductor of the trunk 483, thereby to effect the release of the line switch 40 and to interrupt the previously traced holding circuit for energizing the winding of the switch-through relay R430 in series with the winding of the rotary step relay R450, whereupon the switch-through relay R430 restores. When the line switch 40 is released the subscriber line 350 extending to the calling subscriber substation T1 is marked as idle to the connector switches having access thereto. Upon restoring, the switch-through relay R430 completes, at the contacts 437, a circuit for energizing the release magnet SM408, this circuit extending from ground by way of the contacts 437, 422 and 335, the set of switch springs SS410 and the release magnet SM408 to battery. When thus energized the release magnet SM408 operates, thereby to release the wiper carriage of the Strowger mechanism S400 and to cause it to be returned to its normal position, whereupon the sets of switch springs SS410, SS411, SS412, SS345 and SS346 are actuated. More specifically, the set of switch springs SS410 is actuated into disengagement, thereby to interrupt the previously traced circuit for energizing the release magnet SM408 in order to cause the release magnet SM408 to restore in order to effect the complete release of the primary selector 50. Accordingly, at this time, all of the apparatus utilized in the established connection between the calling subscriber substation T1 and the called subscriber substation T3 is completely released and available for further use.

*Special service calls in exchange 1 zone 38*

Assuming that the call extending from the calling subscriber substation T1 to the primary selector 50 and the register translator 60 is to be extended to a special service operator position, such, for example, as the information operator position 113 in exchange 1 zone 38, the subscriber at the calling subscriber substation T1 proceeds to dial the directory number of the information operator position 113. The directory number of each special service operator position comprises three digits, the first two digits of which are 1 and 1, and the directory number of the information operator position being 113.

Accordingly, the subscriber at the calling subscriber substation T1 proceeds to dial the first digit 1, thereby to cause a corresponding number of impulses to be transmitted over the subscriber line 350, in the manner previously explained. The operations of the primary selector 50 and the register translator 60, in response to the first digit 1, are substantially identical to those previously explained. More particularly, at the conclusion of the first digit 1, the wiper carriage of the Strowger mechanism S400 in the primary selector 50 occupies its first vertical position, and the digit 1 is registered in the first code register A2300 in the register translator 60. Accordingly, the wipers noted of the first code register A2300 engage the first contacts in the associated contact banks. Shortly following the conclusion of the first digit 1, the transfer relay R2030 restores, thereby to complete, at the contacts 2031, a circuit for energizing the upper winding of the release relay R2120, this circuit extending from ground by way of the contacts 1828, C1845, the contacts 1922, C1970, the wiper 2301 of the first code register A2300 and the engaged first contact in the associated contact bank, C1971, the contacts 2031, C2256 and the upper winding of R2120 to battery. When thus energized, the release relay R2120 operates, thereby to effect the release of the register translator 60, in a manner more fully explained hereinafter, as previously noted.

Also, in the primary selector 50, the transfer relay R340 restores shortly following the first digit 1, thereby to complete, at the contacts 342, the previously traced circuit for energizing the rotary magnet SM407, thereby to cause operation of the rotary magnet SM407, whereupon the wiper carriage of the Strowger mechanism S400 is driven one step in the rotary direction. At this point, it is noted that the wiper switching relay R460 is not operated. Accordingly, the first wiper set, including the wipers 401 to 403, inclusive, of the Strowger mechanism S400, tests the first trunk in the associated group. The subsequent operation of the Strowger mechanism S400 in the primary selector to select an idle trunk in the associated group extending to an idle special service selector is identical to that previously explained. Accordingly, the Strowger mechanism S400 continues to operate, in the manner previously explained, until the first wiper set thereof selects an idle trunk extending to an idle special service selector, such, for example, as the trunk 481 extending to the special service selector 54. When the first wiper set, including the wipers 401 to 404, inclusive, of the Strowger mechanism S400 seizes the trunk 481, further operation of the Strowger mechanism S400 is arrested, the switch-through relay R430 operating at this time, in the manner previously explained. Upon operating, the switch-through relay R430 completes, at the contacts 436, a path for applying ground potential to the control wiper 403 of the first wiper set of the Strowger mechanism S400, this path extending from ground by way of the contacts 331, 436 and 465 to the control wiper 403. This application of ground potential to the control wiper 403 of the first wiper set causes ground potential to be applied to the control conductor of the trunk 481 extending to the special service selector 54, whereby apparatus in the special service selector 54 operates, thereby to render the special service selector 54 operative in response to a digit dialed thereinto and to cause ground potential in the special service selector 54 to be applied to the control conductor of the trunk 481, thereby to complete a holding circuit substantially identical to that previously traced for energizing in series the winding of the switch-through relay R430 and the winding of the rotary step relay R450.

Incident to the operation of the primary selector 50 to seize the trunk 481 and to the release of the register translator 60, the switching relay R310, the test relay R320, the hold relay R330 and the line relay R420 restore, in the manner previously explained. Accordingly, at this time, an operative connection substantially identical to that previously traced is completed from the calling subscriber substation T1 by way of the first wiper set, including the wipers 401 to 403, inclusive, of the Strowger mechanism S400, to the special service selector 54. The subscriber at the calling subscriber substation T1 then proceeds to dial the second digit 1 and the third digit 3 into the special service selector 54. It is noted that the special service selector 54 is of the dropback type; whereby the wiper carriage of the Strowger mechanism therein is operated to its first vertical position, in response to the second digit 1, and then dropped back to its normal position. The wiper carriage of the Strowger mechanism in the special service selector 54 is then operated to its third vertical position in response to the third digit 3; and then operates automatically to seize an idle trunk extending to the information operator position 113, thereby to complete a communication connection between the calling subscriber substation T1 and the information operator position 113.

The release of the apparatus involved in the established connection between the calling subscriber substation T1 and the information operator position 113 is effected when the subscriber at the calling subscriber substation T1 replaces the receiver of the telephone instrument thereat upon its associated switchhook, in the manner previously explained.

In view of the above explanation of the extension of a connection from the calling subscriber substation T1 to the information operator position 113, it will be readily appreciated that a connection may be extended, in a substantially identical manner, to the toll operator position 110, to the miscellaneous operator position 112 or to an idle reverting call switch in the group including the reverting call switch 118, the operations of the primary selector 50 and the register translator 60 being identical in each case. In this connection, it is pointed out that the directory number of the toll operator position 110 is 110, while the directory number of the miscellaneous operator position 112 is 112.

Finally, it is noted that the directory number 118 must be dialed in order to establish a connection from the calling subscriber substation T1 to an idle reverting call switch in the group, including the reverting call switch 118. It will be understood that a reverting call switch, such, for example, as the reverting call switch 118, will be seized only when the calling subscriber substation T1 is of the party type and it is desired to extend a connection to the called subscriber substation T2 on the same subscriber line 350. Thus, in order to extend a connection from the calling subscriber substation T1 to the called subscriber substation T2, assuming that both of these subscriber substations are on the same subscriber line 350, the calling subscriber at the calling subscriber substation T1 will dial the digits 118 and then the suffix digit of the directory number of the called subscriber substation T2, such, for example, as the digit 5; the directory number then being 118—5.

The release of the last-mentioned connection will be under the control of the past party to replace the receiver of the telephone instrument thereat upon its associated switchhook in view of the fact that both the subscriber substation T1 and the subscriber substation T2 are on the same subscriber line 350 and will be effected in an obvious manner.

*Call to the manual operator position 0 in exchange 1 zone 38*

Assuming that the call extending from the calling subscriber substation T1 to the primary selector 50 and the register translator 60 is to be extended to the manual operator position 0 in exchange 1 zone 38, the subscriber at the calling subscriber substation T1 proceeds to dial the directory number of the manual operator position 0. The directory number of the manual operator position 0 comprises the single digit 0.

Accordingly, the subscriber at the calling subscriber substation T1 proceeds to dial the single digit 0, thereby to cause a corresponding number of impulses to be transmitted over the subscriber line 350, in the manner previously explained. The operations of the primary selector 50 and the register translator 60, in response to the single digit 0, are substantially identical to those previously explained. More particularly, at the conclusion of the single digit 0, the wiper carriage of the Strowger mechanism S400 in the primary selector 50 occupies its tenth vertical position and the digit 0 is registered in the first code register A2300 in the register translator 60. Accordingly, the wipers noted of the first code register A2300 engage the tenth contacts in the associated contact banks. Shortly following the conclusion of the single digit 0, the transfer relay R2030 restores, thereby to complete, at the contacts 2031, a circuit for energizing the upper winding of the release relay R2120, this circuit extending from ground by way of the contacts 1828, C1845, the contacts 1922, C1970, the wiper 2301 of the first code register A2300 and the engaged tenth contact in the associated contact bank, C1971, the contacts 2031, C2256 and the upper winding of R2120 to battery. When thus energized, the release relay R2120 operates, thereby to effect the release of the register translator 60, in a manner more fully explained hereinafter, as previously noted.

Shortly following the conclusion of the single digit 0, the primary selector 50 operates in the manner previously explained, thereby to cause the first wiper set thereof, including the wipers 401 to 403, inclusive, to test the first trunk in the associated group extending to the manual operator position 0.

The subsequent operation of the Strowger mechanism S400 is the same as that previously explained. At the conclusion of the operation of the Strowger mechanism S400, an idle trunk, such, for example, as the trunk 480 extending to the manual operator position 0 is seized; whereupon the primary selector 50 operates in the previously described manner, thereby to complete a connection between the calling subscriber substation T1 and the manual operator position 0.

The release of the apparatus involved in the established connection between the calling subscriber substation T1 and the manual operator position 0 is effected when the subscriber at the calling subscriber substation T1 replaces the receiver of the telephone instrument thereat upon its associated switchhook, in the manner previously explained.

*Toll call from exchange 1 zone 38 to exchange 5 zone 38*

Assuming that the call extending from the calling subscriber substation T1 to the primary selector 50 and the register translator 60 is to be extended to a called subscriber substation in exchange 5 zone 38, the subscriber at the calling subscriber substation T1 proceeds to dial the directory number of the called subscriber substation. The directory number of the called subscriber substation comprises a code portion, including the digits 385 identifying the called zone and exchange, and a numerical portion, including four digits, such, for example, as the digits 1234 identifying the line terminal. Also, the directory number of the called subscriber substation may comprise a suffix digit in the event it is a party subscriber substation, such, for example, as the digit 6. Thus, the directory number of the called subscriber substation is 385–1234, in the event the called subscriber substation is of the private type, or 385-12346, in the event the called subscriber substation is of the party type.

Accordingly, the subscriber at the calling subscriber substation T1 proceeds to dial the first digit 3, the second digit 8 and the third digit 5, in the manner previously explained.

The impulse relay R1960 follows the first digit 3, the second digit 8 and the third digit 5, thereby to cause the first digit 3 to be registered in the first code register A2300, the second digit 8 to be registered in the second code register B2320 and the third digit 5 to be registered in the third code register C2330, due to the cooperation between the impulse relay R1960, the transfer relay R2030 and the sequence switch S2440, in the manner previously explained. More particularly, the wipers noted of the sequence switch S2440 engage the home contacts in the associated contact banks during the first digit 3, thereby to cause the magnet AM2305 of the first code register A2300 to be operated by the impulse relay R1960 in accordance with the first digit 3; and at the conclusion of the first digit 3 the wipers noted of the sequence switch S2440 are driven to engage the first contacts in the associated contact banks, due to the restoration of the transfer relay R2030, thereby to prepare the magnet BM2323 of the second code register B2320 to be operated in accordance with the second digit 8. The wipers noted of the sequence switch S2440 engage the first contacts in the associated contact banks during the second digit 8, thereby to cause the magnet BM2323 of the second code register B2320 to be operated by the impulse relay R1960 in accordance with the second digit 8; and at the conclusion of the second digit 8 the wipers noted of the sequence switch S2440 are driven to engage the second contacts in the associated contact banks, due to the restoration of the transfer relay R2030, thereby to prepare the magnet CM2335 of the third code register C2330 to be operated in accordance with the third digit 5. The wipers noted of the sequence switch S2440 engage the second contacts in the associated contact banks during the third digit 5, thereby to cause the magnet CM2335 of the third code register C2330 to be operated by the impulse relay R1960, in accordance with the third digit 5; and, at the conclusion of the third digit 5, the wipers noted of the sequence switch S2440 are driven to engage the third contacts in the associated contact banks, due to the restoration of the transfer relay R2030, thereby to prepare the magnet DM2354 of the first numerical register D2350 to be operated in accordance with the fourth digit 1. Thus, it will be understood that the first digit 3, the second digit 8 and the third digit 5 are respectively registered in the first code register A2300, the second code register B2320 and the third code register C2330. When the first code register A2300 is operated, the set of switch springs AS2306 is actuated; when the second code register B2320 is operated, the set of switch springs BS2326 is actuated; and when the third code register C2330 is operated, the set of switch springs CS2338 is actuated.

In view of the above description of the operation of the register translator 60, it will be understood that the wipers noted of the sequence switch S2440 sequentially engage the third, fourth, fifth, sixth and seventh contacts in the associated contact banks during the respective fourth digit 1, fifth digit 2, sixth digit 3, seventh digit 4 and eighth digit 6; thereby to cause sequential operation of the first numerical register D2350, the second numerical register E2360, the third numerical register F2400, the fourth numerical register G2410 and the called party register H2420; whereby the fourth digit 1, the fifth digit 2, the sixth digit 3, the seventh digit 4 and the eighth digit 6 are respectively registered in the first numerical register D2350, the second numerical register E2360, the third numerical register F2400, the fourth numerical register G2410 and the called party register H2420. Also, when the first numerical register D2350 is operated, the set of switch springs DS2356 is actuated; when the second numerical register E2360 is operated, the set of switch springs ES2366 is actuated; when the third numerical register F2400 is operated, the set of switch springs FS2404 is actuated; when the fourth numerical register G2410 is operated, the set of switch springs GS2416 is actuated; and when the called party register H2420 is operated, the set of switch springs HS2426 is actuated.

Further, it is noted that the operation of the first code register A2300 is effective to select one of the wipers carried by the wiper carriage of the Strowger mechanism of the composite code switch P2230; in the present example, the first code register A2300 being effective to select the second wiper 2232 carried by the wiper carriage of the Strowger mechanism of the composite code switch P2230, due to the engagement by the wiper 2304 of the first code register A2300 of the third contact in the associated contact bank, the first digit 3 being registered in the first code register A2300. Further, the wiper carriage of the Strowger mechanism of the composite code switch P2230 is operated in the vertical direction in accordance with the second digit 8 stored in the second code register B2320, in the manner previously explained; whereby the wiper carriage of the Strowger mechanism of the composite code switch P2230 occupies its eighth vertical position. Finally, the wiper carriage of the Strowger mechanism of the composite code switch P2230 is operated in the rotary direction in accordance with the third digit 5 stored in the third code register C2330, in the manner previously explained; whereby the wiper carriage of the Strowger mechanism of the composite code switch P2230 occupies its fifth rotary position. Hence, at this time, the wiper carriage of the Strowger mechanism of the composite code switch P2230 occupies its eighth vertical position and its fifth rotary position in the present example. This operation of the composite code switch P2230 is effective to cause a corresponding operation of the rate and route switch R2210, thereby to select a route for the call outgoing from exchange 1 zone 30 to exchange 5 zone 38, and to select a rate factor applicable to the call, in a manner more fully explained hereinafter.

Considering now the operation of the primary selector 50, it is pointed out that, when the first digit 3 is dialed, the line relay R420 follows the impulses thereof in the manner previously explained, thereby to cause the wiper carriage of the Strowger mechanism S400 to be driven to its third vertical position. Also, at the conclusion of the first digit 3, the wiper carriage of the Strowger mechanism S400 is released and returned to its normal position, in the manner previously explained. When the second digit 8 is dialed, the line relay R420 does not follow the impulses thereof due to the completed holding circuit for energizing the winding of the line relay R420 completed at the wiper 2443 of the sequence switch S2440 and the engaged first contact in the associated contact bank, as previously explained. When the third digit 5 is dialed, the line relay R420 again follows the impulses thereof, in the manner previously explained, thereby to cause the wiper carriage of the Strowger mechanism S400 to be driven to its fifth vertical position. Accordingly, at the conclusion of the third digit 5, the wiper carriage of the Strowger mechanism S400 occupies its fifth vertical position.

Returning now to the register translator 60, at the conclusion of the third digit 5, the wipers noted of the third code register C2330 engage the fifth contacts in the associated contact banks; whereupon a circuit for energizing in series the winding of the release relay R440 and the upper winding of the wiper switching relay R460 is completed, the local call relay R1920 occupying its operated position at this time, and the fifth contact in the contact bank associated with the wiper 2331 of the third code register C2330 being connected by way of the jumper 2305 to the control conductor C2380. This circuit extends from ground by way of the contacts 1925, C1926, the wiper 2331 of the third code register C2330 and the engaged fifth contact in the associated contact bank, the jumper 2305, the control conductor C2380, the contacts 1921, C1970, the wiper 2301 of the first code register A2300 and the engaged third contact in the associated contact bank, the control conductor C394 of the trunk 390, the wiper 384 of the register translator selector B380, the control conductor C374 of the trunk 370, the contacts 314 and 433, the contacts 414 of the set of switch springs SS412, the winding of R440 and the upper winding of R460 to battery. When this series circuit is completed, the release relay R440 operates due to the direct ground connection in the circuit previously traced, the release relay R440 being of the marginal type, as previously noted. Upon operating, the release relay R440 completes, at the contacts 441, the previously traced circuit for energizing the release magnet SM408, thereby to cause the release magnet SM408 to operate and release the wiper carriage of the Strowger mechanism S400; whereupon the wiper carriage of the Strowger mechanism S400 is returned to its normal position.

The register translator 60 then operates, in a manner more fully explained hereinafter, in order to cause a route digit to be transmitted to the primary selector 50, the route digit transmitted to the primary selector 50 being effective to cause the wiper carriage of the Strowger mechanism S400 to seize an idle trunk in the group of trunks extending to exchange 5 zone 38, such, for example, as the trunk 482. It is noted that the trunk 482 comprises a toll ticket repeater in exchange 1 zone 38, similar to the toll ticket repeater 80 in the toll line 1500. The register translator 60 then operates to transmit the four numerical digits stored in the first numerical register D2350, the second numerical register E2360, the third numerical register F2400 and the fourth numerical register G2410. Finally, the register translator 60 operates to transmit the digit stored in the called party register H2420, in the event a digit is stored therein, a digit being stored in the called party register H2420 in the event the called subscribed substation in exchange 5 zone 38 is of the party type; in which case, the digit stored in the called party register H2420 corresponds to the suffix digit of the directory number of the called party subscriber substation in exchange 5 zone 38.

The detailed operation of the register translator 60 to transmit the route digit, the numerical digits and the suffix digit of the directory number of the called subscriber substation, as well as of the operation thereof to collect various items of record information necessary in printing a toll ticket individual to the call, is described more fully hereinafter, as previously noted.

*Toll call from exchange 1 zone 38 to exchange 4 zone 62*

Assuming that the call extending from the calling subscriber substation T1 to the primary selector 50 and the register translator 60 is to be extended to a called subscriber substation in exchange 4 zone 62, the subscriber at the calling subscriber substation T1 proceeds to dial the directory number of the called subscriber substation. The directory number of the called subscriber substation comprises a code portion including the digits 624, identifying the called zone and exchange, a numerical portion including four digits, such, for example, as the digits 1234 identifying the line terminal, and a suffix digit, such, for example, as the digit 1, identifying the position of the called party subscriber substation on the called subscriber line, assuming that the called subscriber substation is of the party type.

Accordingly, the subscriber at the calling subscriber substation T1 proceeds to dial the first digit 6, thereby to cause the first digit 6 to be registered in the first code register A2300, in the manner previously explained. The wiper carriage of the Strowger mechanism S400 in the primary selector 50 is operated to its sixth vertical position in accordance with the first digit 6 and is then released at the conclusion of the first digit 6, in the manner previously explained.

The subscriber at the calling subscriber substation T1 then proceeds to dial the second digit 2, thereby to cause the second digit 2 to be registered in the second code register B2320, in the manner previously explained. The wiper carriage of the Strowger mechanism S400 in the primary selector 50 is not operated in accordance with the second digit 2, as previously explained.

The subscriber at the calling subscriber substation T1 then proceeds to dial the third digit 4, thereby to cause the third digit 4 to be registered in the third code register C2330, in the manner previously explained. The wiper carriage of the Strowger mechanism S400 in the primary selector 50 is not operated in accordance with the third digit 4, due to the completion of a holding circuit for energizing the winding of the line relay R420 at this time. The circuit for energizing the winding of the line relay R420 extends from ground by way of the contacts 1924, C1974, the wiper 2443 of the sequence switch S2440 and the engaged second contact in the associated contact bank, the control conductor C392 of the trunk 390, the wiper 382 of the register translator selector B380, the control conductor C372 of the trunk 370, the contacts 312 and 431 and the winding of R420 to battery.

Accordingly, at this time, the first digit 6 is registered in the first code register A2300; the second digit 2 is registered in the second code register B2320; and the third digit 4 is registered in the third code register C2330; the wiper 2304 of the first code register A2300 engages the sixth contact in the associated contact bank, thereby to select the fifth wiper 2235 carried by the wiper carriage of the Strowger mechanism in the composite code switch P2230; and the wiper carriage of the Strowger mechanism in the composite code switch P2230 occupies its second vertical position and its fourth rotary position. Also, at the conclusion of the third digit 4, the wipers noted of the sequence switch S2440 are moved to engage the third contacts in the associated contact banks, in the manner previously explained. When the wiper 2442 of the sequence switch S2440 engages the third contact in the associated contact bank, a circuit is completed for energizing the windings of the pulse relay R2040, this circuit extending from ground by way of the wiper 2442 of the sequence switch S2440 and the engaged third contact in the associated contact bank, C1847, the contacts 2045 and the windings of R2040 to battery. It is noted that the upper and lower windings of the pulse relay R2040 are energized in multiple, the upper winding including the adjustable condenser 2005, whereby the rate of operation of the pulse relay R2040 may be adjusted, the rate of operation of the pulse relay R2040 being adjusted to approximately twenty pulses per second in the present example. Accordingly, the pulse relay R2040 operates intermittently at this time, for a purpose more fully explained hereinafter.

Also, at this time, ground potential is applied by way of the wiper 2304 of the first code register A2300 and the engaged sixth contact in the associated contact bank to the fifth wiper 2235 carried by the wiper carriage of the Strowger mechanism in the composite code switch P2230; while the fifth wiper 2235 carried by the wiper carriage of the Strowger mechanism mentioned engages the 2 up 4 in contact in the associated contact bank, which contact is connected to a predetermined contact in the contact bank associated with the wiper 2218 carried by the wiper carriage of the Strowger mechanism in the rate and route switch R2210 by way of the jumper 2272. More specifically, for purpose of illustration, the 2 up 4 in contact in the contact bank associated with the fifth wiper 2235 carried by the wiper carriage of the Strowger mechanism in the composite code switch P2230 is connected to the 9 up 4 in contact in the contact bank associated with the wiper 2218 carried by the wiper carriage of the Strowger mechanism in the rate and route switch R2210. The 9 up 4 in contact in the contact bank associated with the wiper 2218 carried by the wiper carriage of the Strowger mechanism in the rate and route switch R2210 corresponds to a routing for the present call via exchange 1 zone 73, the exchange in zone 46 and exchange 1 zone 62 to exchange 4 zone 62, which route comprises four routing digits. The particular four routing digits required do not bear any relationship whatever with respect to the first digit 6, the second digit 2 and the third digit 4 dialed; but are designated in conformity with the trunking plan utilized, which is assumed to be via the route specified above. More specifically, the routing digits required in order to route the call via the route specified comprise the four digits 2462. Hence, the first, second and third digits 624 dialed have been converted into four routing digits 2462, which routing digits correspond to the route specified in conformity with the established trunking plan.

Accordingly, the rate and route switch R2210 is now operated to its ninth vertical position and its fourth rotary position in order to cause the wipers noted, carried by the wiper carriage of the Strowger mechanism therein, to seize the respective 9 up 4 in contacts in the associated contact banks. In order to accomplish this end, the contacts in each level of the contact bank associated with the wiper 2218 carried by the wiper carriage of the Strowger mechanism in the rate and route switch R2210 are connected by way of individual resistors, each having a high resistance, to the numerically corresponding control contact in the vertical control contact bank associated with the vertical control wiper 2219. For example, each contact in the first level of the contact bank associated with the wiper 2218 carried by the wiper carriage of the Strowger mechanism in the rate and route switch R2210 is connected by way of an individual resistor 2279 to the first contact in the vertical control contact bank associated with the vertical control wiper 2219.

As previously explained, when the wipers noted of the sequence switch S2440 engage the third contacts in the associated contact banks, the pulse relay R2040 is set into operation. Each time the pulse relay R2040 operates at this time, a circuit is completed for energizing the vertical magnet RM2220, this circuit extending from ground by way of the contacts 2042, C1837, the contacts 1812 and 1824, C1860 and the vertical magnet RM2220 to battery; and each time the pulse relay R2040 restores it interrupts, at the contacts 2042, the previously traced circuit for energizing the vertical magnet RM2220. Accordingly, the vertical magnet RM2220 operates intermittently, thereby to drive the wiper carriage of the Strowger mechanism in the rate and route switch R2210 step by step in the vertical direction. When the vertical control wiper 2219 carried by the wiper carriage of the Strowger mechanism in the rate and route switch R2210 engages the ninth contact in the associated vertical control contact bank, resistance ground potential is applied thereto by way of the previous connection, including the jumper 2272, from the grounded wiper 2304 of the first code register A2300. This application of ground potential to the control wiper 2219 carried by the wiper carriage of the Strowger mechanism in the rate and route switch R2210 completes a circuit for energizing the upper winding of the transfer relay R1820 in series with the vertical magnet RM2220, this circuit extending from the grounded vertical control wiper 2219 carried by the wiper carriage of the Strowger mechanism in the rate and route switch R2210 by way of C1853, the upper winding of R1820, C1860 and the vertical magnet RM2220 to battery. At this point, it is noted that the above-traced circuit for energizing the upper winding of the transfer relay R1820 is completed when the pulse relay R2040 restores following the ninth impulse, as ground potential is applied by way of the contacts 2042 of the pulse relay R2040 directly to C1860 prior to the restoration of the pulse relay R2040.

When thus energized, the transfer relay R1820 operates to complete, at the contacts 1826, an obvious circuit including the hold conductor C1839 for energizing the lower winding thereof. Further, the transfer relay R1820 interrupts, at the contacts 1824, the previously traced circuit for energizing the vertical magnet RM2220 and completes, at the contacts 1825, a circuit for energizing the rotary magnet RM2221, this circuit extending from ground by way of the contacts 2042, assuming the pulse relay R2040 is operated at this time, C1837, the contacts 1812 and 1825, C1850, and the rotary magnet RM2221 to battery.

Accordingly, the intermittent operation of the pulse relay R2040 causes the rotary magnet RM2221 to be energized intermittently; whereupon the rotary magnet RM2221 operates intermittently; thereby to drive the wiper carriage of the Strowger mechanism in the rate and route switch R2210 step by step in the rotary direction.

When the wiper 2218 carried by the wiper carriage of the Strowger mechanism in the rate and route switch R2210 engages the 9 up 4 in contact in the associated contact bank, direct ground potential is applied thereto by way of the jumper 2272 from the grounded wiper 2304 of the first code register A2300, thereby to complete a circuit for energizing the lower winding of the stop relay R1810 in series with the rotary magnet RM2221, this circuit extending from the grounded wiper 2218 carried by the wiper carriage of the Strowger mechanism in the rate and route switch R2210 by way of C1855, the lower winding of R1810, C1850 and the rotary magnet RM2221 to battery. It is noted that the above-traced circuit for energizing the lower winding of the stop relay R1810 is completed upon the restoration of the pulse relay R2040 following the fourth impulse, as direct ground potential is applied to C1850 prior to the restoration of the pulse relay R2040. Further, it is noted that the stop relay R1810 is of the marginal type and will operate only when direct ground potential is encountered by the wiper 2218 carried by the wiper carriage of the Strowger mechanism in the rate and route switch R2210. When thus energized, the stop relay R1810 operates to complete, at the contacts 1814, an obvious holding circuit, including the hold conductor C1839, for energizing the upper winding thereof; and interrupts, at the contacts 1812, the previously traced circuit for energizing the rotary magnet RM2221. Accordingly, at this time, the wiper carriage of the Strowger mechanism in the rate and route switch R2210 occupies its ninth vertical and fourth rotary position.

Further, it is noted that, when the wiper carriage of the Strowger mechanism in the rate and route switch R2210 is moved away from its normal position, the set of switch springs RS2223 is actuated; thereby to complete, at the contacts 2226 thereof, a continuing circuit for energizing the windings of the pulse relay R2040, this holding circuit extending, when completed, from ground by way of the contacts 1816, C1858, the contacts 2226 of the set of switch springs RS2223, C1847, the contacts 2045 and the windings of R2040 to battery. Accordingly, when the stop relay R1810 operates it also interrupts, at the contacts 1816, the above-traced holding circuit, thereby to arrest further operation of the pulse relay R2040 at this time.

Considering now the jumper arrangement among the contacts in the contact bank of the Strowger mechanism in the rate and route switch R2210, it is noted that the respective 9 up 4 in contacts in the contact banks respectively associated with the wipers 2215, 2214, 2213 and 2212 carried by the wiper carriage of the Strowger mechanism in the rate and route switch R2210 are respectively connected by the jumper 2275 to the second, fourth, sixth and second marking conductors in the marking cable 2281; while the 9 up 4 in contact in the contact bank associated with the wiper 2211 carried by the wiper carriage of the Strowger mechanism in the rate and route switch R2210 is connected by way of the jumper 2274 to the control conductor C1852.

The operations of the rate and route switch R2210 described above, in response to the operation of the composite code switch P2230, take place in an extremely short interval of time at the conclusion of the third digit 4; in the meanwhile the subscriber at the calling subscriber substation T1 proceeds to dial the fourth digit 1, the fifth digit 2, the sixth digit 3, the seventh digit 4 and the eighth digit 1, thereby to cause the respective digits to be stored respectively in the first numerical register D2350, the second numerical register E2360, the third numerical register F2400, the fourth numerical register G2410 and the called party register H2420.

Continuing now with the operation of the register translator 60, upon operating, the stop relay R1810 completes, at the contacts 1813, a circuit for energizing the windings of the pulse relay R2020, this circuit extending from ground by way of the contacts 1813, C1843, the contacts 2022 and the windings of R2020 to battery. It is noted that the upper and lower windings of the pulse relay R2020 are energized in multiple, the upper winding including the adjustable condenser 2004; whereby the rate of operation of the pulse relay R2020 may be adjusted. In the present instance, the pulse relay R2020 is adjusted to approximately ten pulses per second. Also, the stop relay R1810 completes, at the contacts 1815, a circuit for energizing the winding of the digit spacer relay R2110, this circuit extending from ground by way of the contacts 1815, C1857, the wiper 2201 of the digit sequence switch N2200 and the engaged home contact in the associated contact bank, C1836, the contacts 2051, 2122 and 2133, the winding of R2110 and the resistor 2108 to battery. At this point, it is noted that the above-traced circuit for energizing the digit spacer relay R2110 must be initially completed when the pulse relay R2020 occupies its restored position; in view of the fact that a path is completed for short-circuiting the winding of the digit spacer relay R2110 prior to the operation thereof and while the pulse relay R2020 occupies its operated position, this path extending from one terminal of the winding of R2110 by way of the contacts 2021, C2064, and the contacts 2112 to the other terminal of the winding of R2110.

When thus energized, the digit spacer relay R2110 operates to interrupt, at the contacts 2112, a point in the previously traced path for short-circuiting the winding thereof, and to prepare, at the contacts 2111, a circuit traced hereinafter for energizing the magnet KM2524 of the impulse sender switch K2520. The above-mentioned circuit for energizing the magnet KM2524 is completed upon the next operation of the pulse relay R2020 and extends from ground by way of the contacts 1815, C1857, the wiper 2201 of the digit sequence switch N2200 and the engaged home contact in the associated contact bank, C1836, the contacts 2051, 2122 and 2133, C2063, the contacts 2021, C2064, the contacts 2111, C2148 and the magnet KM2524 to battery. When thus energized, the magnet KM2524 operates, thereby to condition the wipers noted of the impulse sender switch K2520 to be driven one step in the counterclockwise direction. When the pulse relay R2020 next restores it interrupts, at the contacts 2021, the previously traced circuit for energizing the magnet KM2524, thereby to cause the magnet KM2524 to restore and drive the wipers noted of the impulse sender switch K2520 one step in the counterclockwise direction. Thus, the pulse relay R2020 causes the wipers noted of the impulse sender switch K2520 to be driven step by step in the counterclockwise direction.

Further, it is noted that, at the conclusion of the third digit 4, an additional circuit for energizing the winding of the line relay R420 in the primary selector 50 is completed at the wiper 2443 of the sequence switch S2440 and the engaged third contact in the associated contact bank, this circuit including a multiple path. The above-mentioned circuit for energizing the winding of the line relay R420 extends from ground by way of the contacts 2138, C2070, and the wiper 2522 of the impulse sender switch K2520 and the engaged home contact in the associated contact bank to C2071; and from ground by way of the contacts 2138, C2070, and the contacts 2023 to C2071; from C2071 by way of the wiper 2443 of the sequence switch S2440 and the engaged third contact in the associated contact bank to the control conductor C392 of the trunk 390; and from the control conductor C392 of the trunk 390 by way of the previously traced path, including the winding of the line relay R420 to battery.

Further, it is noted that, upon operating, the pulse relay R2020 interrupts, at the contacts 2023, one of the multiple branches in the circuit for energizing the line relay R420 in the primary selector 50. However, the circuit for energizing the winding of the line relay R420 is not interrupted at this time due to the completed alternative branch therein, including the wiper 2522 of the impulse sender switch K2520 and the engaged home contact in the associated contact bank. Accordingly, the pulse relay R2020 intermittently interrupts, at the contacts 2021, the previously traced circuit for energizing the magnet KM2524 of the impulse sender switch K2520; and interrupts, at the contacts 2023, the multiple branch in the previously traced circuit for energizing the winding of the line relay R420 in the primary selector 50. Accordingly, the wipers noted of the impulse sender switch K2520 are driven step by step in the counterclockwise direction; and, when the wiper 2522 of the impulse sender switch K2520 is driven two steps in the counterclockwise direction, it disengages the first contact in the associated contact bank, thereby to interrupt the other multiple path in the previously traced circuit for energizing the winding of the line relay R420. Hence, after the wipers noted of the impulse sender switch K2520 engage the second contacts in the associated contact banks, further operation of the pulse relay R2020 is effective intermittently to interrupt, at the contacts 2023, the previously traced circuit for energizing the winding of the line relay R420. Thus, at this time, the pulse relay R2020 causes the magnet KM2524 to operate intermittently, thereby to drive the wipers noted of the impulse sender switch K2520 step by step in the counterclockwise direction; and causes the line relay R420 to operate intermittently, whereupon the wiper carriage of the Strowger mechanism S400 in the primary selector 50 is driven step by step in the vertical direction.

This operation of the pulse relay R2020 continues until the wiper 2523 of the impulse sender switch K2520 engages a marked contact in the associated contact bank, the fourth contact in the contact bank associated with the wiper 2523 of the impulse sender switch K2520 being marked in the present instance as this contact terminates the second marking conductor in the marking cable 2281; whereby a circuit is completed for energizing the winding of the digit stop relay R2050. This circuit extends from ground by way of the contacts 1803, C1854, the wiper 2204 of the digit sequence switch N2200 and the engaged home contact in the associated contact bank, C2261, the wiper 2215 carried by the wiper carriage of the Strowger mechanism in the rate and route switch R2210 and the engaged 9 up 4 in contact in the associated contact bank, the jumper 2275, the second marking conductor in the marking cable 2281, the wiper 2523 of the impulse sender switch K2520 and the engaged fourth contact in the associated contact bank, C2067 and the winding of R2050 to battery. When thus energized, the digit stop relay R2050 operates for a purpose more fully explained hereinafter. At this point, it is noted that, upon operating, the digit spacer relay R2110 completes, at the contacts 2114, a circuit for energizing the magnet NM2205, this circuit extending from ground by way of the contacts 2114 and 2055, C1851 and the magnet NM2205 to battery. When thus energized, the magnet NM2205 operates, thereby to condition the wipers noted of the digit sequence switch N2200 to be driven one step in a counterclockwise direction.

Upon operating, the digit stop relay R2050 completes, at the contacts 2054, a holding circuit for energizing the winding thereof, this circuit extending from ground by way of the set of switch springs KS2526, C2068, the contacts 2054 and the winding of R2050 to battery. Also, the digit stop relay R2050 interrupts, at the contacts 2055, the previously traced circuit for energizing the magnet NM2205, thereby to cause the magnet NM2205 to restore and drive the wipers noted of the digit sequence switch N2200 one step in the counterclockwise direction. Further, the digit stop relay R2050 completes, at the contacts 2056, an obvious path in multiple to the contacts 2023, and, consequently, a holding circuit substantially identical to that previously traced for energizing the winding of the line relay R420 in the primary selector 50. Further operation of the line relay R420 is arrested at this time, thereby positively to arrest further movement of the wiper carriage of the Strowger mechanism S400 in the vertical direction; whereby the wiper carriage of the Strowger mechanism S400 is arrested in the second vertical position corresponding to the first routing digit 2. Also, the digit stop relay R2050 interrupts, at the contacts 2051, the previously traced circuit for energizing the winding of the digit spacer relay R2110, thereby to cause the latter relay to restore. Upon restoring, the digit spacer relay R2110 completes, at the contacts 2113, an alternative circuit for energizing the magnet KM2524, this circuit extending from ground by way of the wiper 2521 of the impulse sender switch K2520, the contacts in the associated contact bank connected to C2065, C2065, the contacts 2113, C2147, the contacts 2525 and the magnet KM2524 to battery. Accordingly, the magnet KM2524 operates intermittently at this time in order to drive the wipers noted of the impulse sender switch K2520 step by step in the counterclockwise direction until the wiper 2521 of the impulse sender switch K2520 disengages the twelfth contact and engages the thirteenth contact in the associated contact bank; thereby to interrupt, at the twelfth contact, the previously traced circuit for energizing the magnet KM2524 and to complete, at the thirteenth contact, an alternative circuit for energizing the winding of the digit spacer relay R2110, this circuit extending from ground by way of the wiper 2521 of the impulse sender switch K2520, the thirteenth contact in the associated contact bank, C2066, the contacts 2053, C2063, the winding of R2110 and the resistor 2108 to battery. When thus energized, the digit spacer relay R2110 again operates, thereby to complete, at the contacts 2111, an alternative circuit for energizing the magnet KM2524, this circuit extending from ground by way of the wiper 2521 of the impulse sender switch K2520 and the engaged thirteenth contact in the associated contact bank, C2066, the contacts 2053, C2063, the contacts 2021, assuming that the pulse relay R2020 is operated at this time, C2064, the contacts 2111, C2148 and the magnet KM2524 to battery. When the magnet KM2524 is energized it operates, thereby to condition the wipers noted of the impulse sender switch K2520 to be driven an additional step in the counterclockwise direction. Accordingly, at this time, the pulse relay R2020 completes intermittently, at the contacts 2021, the above-traced circuit for energizing the magnet KM2524, thereby to cause the magnet KM2524 to operate intermittently; whereupon the wipers noted of the impulse sender switch K2520 are driven additional steps in the counterclockwise direction until the wiper K2521 of the impulse sender switch K2520 disengages the seventeenth contact in the associated contact bank and engages the eighteenth contact therein, thereby to interrupt the previously traced alternative circuit for energizing the winding of the digit spacer relay R2110 and the previously traced alternative circuit for intermittently energizing the magnet KM2524. When the previously traced alternative circuit for energizing the winding of the digit spacer relay R2110 is interrupted, the latter relay restores, thereby to complete, at the contacts 2113, the previously traced circuit, including the contacts 2525, for energizing the magnet KM2524, thereby to cause the magnet KM2524 to be again intermittently energized; whereupon the wipers noted of the impulse sender switch K2520 are again driven step by step in the counterclockwise direction until the wiper 2521 thereof disengages the twenty-fourth contact in the associated contact bank and reengages the home contact therein, thereby to interrupt the above-traced circuit for energizing the magnet KM2524. When the wipers noted of the impulse sender switch K2520 are thus returned to their home positions, the set of switch springs KS2526 is actuated, thereby to interrupt the previously traced holding circuit for energizing the winding of the digit stop relay R2050, whereupon the digit stop relay R2050 restores. When the digit stop relay R2050 restores, the cycle of operation of the impulse sender switch K2520 is completed.

It is pointed out that the wipers noted of the impulse sender switch K2520 are first driven step by step in the counterclockwise direction away from their home positions at a relatively low speed, thereby to insure that the impulses transmitted to the line relay R420 in the primary selector 50 are at a proper impulsing rate. Upon operation of the digit stop relay R2050, the wipers noted of the impulse sender switch K2520 are driven at a relatively high speed into engagement with the thirteenth contacts in the associated contact banks; and thereafter the wipers noted of the impulse sender switch K2520 are driven at relatively low speed until they engage the eighteenth contacts in the associated contact banks, thereby to insure a proper time interval or space between successive digits transmitted to the primary selector 50. Finally, the wipers noted of the impulse sender switch K2520 are driven at the relatively high speed after they engage the eighteenth contacts in the associated contact banks back into their home positions.

Accordingly, at this time, the first routing digit 2 registered in the rate and route switch R2210 has been transmitted by the impulse sender switch K2520 to the primary selector 50; the wipers noted of the impulse sender switch K2520 have been returned to their home positions in readiness to transmit the second routing digit 4; and the wipers noted of the digit sequence switch N2200 engage the first contacts in the associated contact banks, thereby to render the control of the impulse sender switch K2520 in accordance with the second routing digit 4 registered in the rate and route switch R2210. Also, at this time, an alternative circuit for energizing the winding of the digit spacer relay R2110 is completed, this circuit extending from ground by way of the contacts 1805, C1856, the wiper 2201 of the digit sequence switch N2200 and the engaged first contact in the associated contact bank, C1836, the contacts 2051, 2122 and 2133, C2063, the winding of R2110 and the resistor 2108 to battery. Accordingly, the digit spacer relay R2110 reoperates, thereby to cause the second routing digit 4 registered in the rate and route switch R2210 to be transmitted by the impulse sender switch K2520, in the manner previously explained.

In view of the foregoing explanation of the cycle of operation of the impulse sender switch K2520 to transmit the first routing digit 2 to the primary selector 50, it will be readily understood that the second routing digit 4, the third routing digit 6 and the fourth routing digit 2 will be sequentially transmitted to the primary selector 50 in an identical manner; the first routing digit 2, the second routing digit 4, the third routing digit 6 and the fourth routing digit 2 being registered in the contact banks respectively associated with the wipers 2215, 2214, 2213 and 2212 carried by the wiper carriage of the Strowger mechanism in the rate and route switch R2210, in the manner previously explained.

At this point, it is noted that the rate and route switch R2210 is adapted to register as many as five routing digits; the actual number of routing digits required for a given call being determined by the routing plan of the system, four routing digits being utilized in the present example. In the event all five routing digits are not utilized, the present example, the contacts in the associated contact banks engaged by corresponding ones of the wipers 2215 to 2211, inclusive, are connected by the jumper 2274 to the control conductor C1852. Accordingly, in the present case, the 9 up 4 in contact in the contact bank associated with the wiper 2211 carried by the wiper carriage of the Strowger mechanism in the rate and route switch R2210 is connected by way of the jumper 2274 to the control conductor C1852. Hence, at the conclusion of the fourth routing digit 2 when the wiper 2204 of the digit sequence switch N2200 engages the fourth contact in the associated contact bank, an alternative circuit is completed for energizing the magnet NM2205, this circuit extending from ground by way of the contacts 1803, C1854, the wiper 2204 of the digit sequence switch N2200 and the engaged fourth contact in the associated contact bank, C2265, the wiper 2211 carried by the wiper carriage of the Strowger mechanism in the rate and route switch R2210, the engaged 9 up 4 in contact in the associated contact bank, the jumper 2274, the control conductor C1852, the contacts 2206 and the magnet NM2205 to battery. When thus energized, the magnet NM2205 operates, thereby to interrupt, at the contacts 2206, the previously traced alternative circuit for energizing the magnet NM2205. Hence, the magnet NM2205 operates and restores immediately, thereby to drive the wipers noted of the sequence switch N2200 an additional step in the counterclockwise direction and into engagement with the fifth contacts in the associated contact banks.

In the event the subscriber at the calling subscriber substation T1 has completed the dialing of the fourth digit 1 at this time, and has at least started to dial the fifth digit 2, the first numerical register D2350 has registered the fourth digit 1 and the wipers noted of the second numerical register E2360 have been moved away from their home positions. Accordingly, at this time, both the sets of switch springs DS2356 and ES2366 have been actuated. When the set of switch springs ES2366 is actuated there is completed, at the contacts 2369 thereof, an alternative circuit for energizing the winding of the digit spacer relay R2110, this circuit extending from the contact 2369 of the set of switch springs ES2366, C2254, the wiper 2201 of the digit sequence switch N2200 and the engaged fifth contact in the associated contact bank, C1836, the contacts 2051, 2122 and 2133, C2063 and the winding of R2110 and resistor 2108 to battery. Upon operating, the digit spacer relay R2110 recycles the impulse sender switch K2520, thereby to cause the impulse sender switch K2520 to transmit directly the fourth digit 1 stored in the first numerical register D2350. At this point, it is noted that the circuit for energizing the winding of the digit stop relay R2050, after the fourth digit 1 stored in the first numerical register D2350 has been transmitted by the impulse sender switch K2520 to the primary selector 50, extends from ground by way of the contacts 1803, C1854, the wiper 2204 of the digit sequence switch N2200 and the engaged fifth contact in the associated contact bank, the marking conductor C2266 in the marking cable 2260, the contacts 1915, C1982, the wiper 2351 of the first numerical register D2350 and the engaged first contact in the associated contact bank, the first marking conductor in the marking cable 2281, the wiper 2523 of the impulse sender switch K2520 and the engaged third contact in the associated contact bank, C2067 and the winding of R2050 to battery. Accordingly, the impulse sender switch K2520 is operative, at this time, to transmit to the primary selector 50 the fourth digit 1 stored in the first numerical register D2350.

In view of the above description of the operation of the second numerical register E2360 to cause the impulse sender switch K2520 to transmit the fourth digit 1 stored in the first numerical register D2350 to the primary selector 50, it will be understood that the operation of the third numerical register F2400 is effective to cause the impulse sender switch K2520 to transmit the fifth digit 2 stored in the second numerical register E2360 to the primary selector 50. In this case, the alternative circuit for energizing the winding of the digit spacer relay R2110 is substantially identical to that previously traced and includes the contacts 2407 of the set of switch springs FS2404 and the wiper 2201 of the digit sequence switch N2200 and the sixth contact in the associated contact bank; while the alternative circuit for energizing the digit stop relay R2050 is substantially identical to that previously traced and includes the wiper 2204 of the digit sequence switch N2200 and the engaged sixth contact in the associated contact bank, the wiper 2361 of the second numerical register E2360 and the engaged second contact in the associated contact bank and the wiper 2523 of the impulse sender switch K2520 and the engaged fourth contact in the associated contact bank.

Similarly, the operation of the fourth numerical register G2410 is effective to cause the impulse sender switch K2520 to transmit the sixth digit 3 stored in the third numerical register F2400 to the primary selector 50. In this case, the alternative circuit for energizing the winding of the digit spacer relay R2110 is substantially identical to that previously traced and includes the contacts 2419 of the set of switch springs GS2416 and the wiper 2201 of the digit sequence switch N2200 and the engaged seventh contact in the associated contact bank; while the alternative circuit for energizing the digit stop relay R2050 is substantially identical to that previously traced and includes the wiper 2204 of the digit sequence switch N2200 and the engaged seventh contact in the associated contact bank, the wiper 2401 of the third numerical register F2400 and the engaged third contact in the associated contact bank and the wiper 2523 of the impulse sender switch K2520 and the engaged fifth contact in the associated contact bank.

On the other hand, the operation of the fourth numerical register G2410 is effective to cause the impulse sender switch K2520 to transmit the seventh digit 4 stored in the fourth numerical register G2410 to the primary selector 50. In this case, the alternative circuit for energizing the winding of the digit spacer relay R2110 is substantially identical to that previously traced and includes the contacts 2419 of the set of switch springs GS2416 and the wiper 2201 of the digit sequence switch N2200 and the engaged eighth contact in the associated contact bank; while the alternative circuit for energizing the digit stop relay R2050 is substantially identical to that previously traced and includes the wiper 2204 of the digit sequence switch N2200 and the engaged eighth contact in the associated contact bank, the wiper 2411 of the fourth numerical register G2410 and the engaged fourth contact in the associated contact bank and the wiper 2523 of the impulse sender switch K2520 and the engaged sixth contact in the associated contact bank.

Finally, the operation of the called party register H2420 is effective to cause the impulse sender switch K2520 to transmit the eighth digit 1 stored in the called party register H2420 to the primary selector 50. In this case, the alternative circuit for energizing the winding of the digit spacer relay R2110 is substantially identical to that previously traced and includes the contacts 2429 of the set of switch springs HS2426 and the wiper 2201 of the digit sequence switch N2200 and the engaged ninth contact in the associated contact bank; while the alternative circuit for energizing the digit stop relay R2050 is substantially identical to that previously traced and includes the wiper 2204 of the digit sequence switch N2200 and the engaged ninth contact in the associated contact bank, the wiper 2421 of the called party register H2420 and the engaged first contact in the associated contact bank and the wiper 2523 of the impulse sender switch K2520 and the engaged third contact in the associated contact bank.

Prior to considering further operation of the register translator 60 and the operation of the primary selector 50 in response to the various digits transmitted thereto, the operation of the detectors 70 and 71 to detect the line terminal of the calling subscriber line 350 and consequently the numerical portion of the directory number of the calling subscriber substation T1 is described below.

*Operation of the detectors*

In the register translator 60, after the third digit 4 is registered in the third code register C2330, operation of the rate and route switch R2210 is initiated in the manner previously explained. More particularly, when the wiper carriage of the Strowger mechanism in the rate and route switch R2210 is driven nine steps in the vertical direction the transfer relay R1820 operates in order to cause the wiper carriage of the Strowger mechanism in the rate and route switch R2210 to be driven step by step in the rotary direction, in the manner previously explained. Also, upon operating, the transfer relay R1820 completes, at the contacts 1821 a path for applying ground potential to the start conductor C1109 in the cable 1130 extending to the detectors 70 and 71, this path extending from ground by way of the contacts 1821, C1830 and the contacts 1941 to the start conductor C1109. This application of ground potential to the start conductor C1109 completes an obvious circuit for energizing the winding of the start relay R1350 in the detector 70 and a similar circuit for energizing the winding of the corresponding start relay in the detector 71. When energized over the above-mentioned circuit the start relay R1350 operates to complete, at the contacts 1351, a circuit for energizing the magnet FM1121 of the rotary switch F1120. This circuit extends from ground by way of the contacts 1302, 1326 and 1351, C1111, the contacts 1122 and the magnet FM1121 to battery. When energized over the above-traced circuit the magnet FM1121 operates to condition the wiper 1123 of the rotary switch F1120 to be driven one step in the clockwise direction and to interrupt, at the contacts 1122, the previously traced circuit for energizing the magnet FM1121, thereby to cause the magnet FM1121 to restore. Upon restoring, the magnet FM1121 recompletes, at the contacts 1122, the previously traced circuit for energizing the magnet FM1121 and drives the wiper 1123 of the rotary switch F1120 one step in the clockwise direction. Accordingly, the magnet FM1121 operates intermittently, thereby to drive the wiper 1123 of the rotary switch F1120 step by step in the clockwise direction until the wiper 1123 engages the contact in the associated contact bank terminating the test conductor C1106 in the cable 1130; whereupon a circuit is completed for energizing the winding of the test relay R1320 in the detector 70 in series with the winding of the tone test relay R1950 in the register translator 60, this circuit extending from ground by way of the winding of R1320, C1110, the wiper 1123 of the rotary switch F1120 and the engaged contact in the associated contact bank, the test conductor C1106 in the cable 1130, the winding of R1950, the contacts 1942, C1831 and the contacts 1822 to battery. When this series circuit is completed the test relay R1320 and the tone test relay R1950 operate.

Upon operating, the test relay R1320 interrupts, at the contacts 1326, the previously traced circuit for energizing the magnet FM1121, thereby positively to arrest further operation of the rotary switch F1120. Upon operating, the tone test relay R1950 completes, at the contacts 1952, an obvious circuit for energizing the winding of the storage relay R2550, thereby to cause the latter relay to operate. Upon operating, the storage relay R2550 prepares, at the contacts 2551 to 2554, inclusive, obvious circuits for energizing the unit or WXYZ magnets in the first code storage device S2541 in the code storage unit SU2530 by way of the WXYZ leads in the first group of marking leads 1451 in the cable 1455. Also, the storage relay R2550 prepares, at the contacts illustrated, circuits for energizing the WXYZ magnets in the second, third and fourth code storage devices S2542, S2543 and S2544, respectively, in the code storage unit SU2530 by way of the WXYZ leads in the second, third and fourth groups of marking leads 1452, 1453 and 1454, respectively, in the cable 1455.

At this point it is noted that, when ground potential is applied to the hold conductor C1839 incident to the operation of the hold slave relay R1800 when the register translator 60 is seized by the register translator selector B380, a circuit is completed for energizing the master magnet SM2531 of the code storage unit SU2530, this circuit extending from the grounded hold conductor C1839 by way of the contacts 2533 and the master magnet SM2531 to battery. When thus energized the master magnet SM2531 operates to complete, at the contacts 2532, an obvious holding circuit for energizing the master magnet SM2531, including the resistor 2534, by way of the hold conductor C1839. Also, upon operating, the master magnet SM2531 releases the armatures of the various unit or WXYZ magnets in the code storage devices S2541 to S2544, inclusive, in the code storage unit SU2530. Also, upon operating, the tone test relay R1950 prepares, at the contacts 1951, a test circuit between the control conductor C353 of the calling subscriber line 350 and the detector 70. The portion of the test circuit prepared extends from the control conductor C353 of the subscriber line 350 by way of the control wiper 303 in the wiper set of the switching mechanism A350, the control conductor C363 of the trunk 360, the contacts 316, the control conductor C375 of the trunk 370, the wiper 385 of the register translator selector B380, the control conductor C395 of the trunk 390 and the contacts 1951 to the tone conductor C1107 in the cable 1130. Further, this test circuit extends from the tone conductor C1107 by way of the secondary winding 1357 of the transformer 1355 to the conductor C1380; and therefrom by way of the conductor C1421 to the detector 71. Further, it will be understood that a rotary switch in the detector 71 corresponding to the rotary switch F1120 in the detector 70 operates to find the test conductor C1106 in the cable 1130.

Also, upon operating, the test relay R1320 completes, at the contacts 1324, a circuit for energizing the primary winding 1356 of the transformer 1355, this circuit extending from one terminal of the 2,000 cycle generator 1352 by way of the primary winding 1356 of the transformer 1355 and the contacts 1324 to the other terminal of the generator 1352. The generator 1352 causes a 2,000 cycle alternating current to traverse the primary winding 1356 of the transformer 1355 and induce a corresponding alternating potential in the secondary winding 1357 thereof included in the previously traced test circuits extending to the detectors 70 and 71 for a purpose more fully described hereinafter. Also, upon operating, the test relay R1320 completes, at the contacts 1321, a circuit for energizing the upper and lower windings of the impulse relay R1310, this circuit extending from ground by way of the contacts 1321, C1370, the contacts 1333, 1303 and 1311 and the upper and lower windings of R1310 in multiple to battery. When energized over the above-traced circuit the impulse relay R1310 operates to interrupt, at the contacts 1311, the previously traced circuit for energizing the upper and lower windings thereof, thereby to cause the impulse relay R1310 to restore in order to recomplete, at the contacts 1311, the previously traced circuit for energizing the upper and lower windings thereof. Accordingly, the impulse relay R1310 operates intermittently. Also, the rate of operation of the impulse relay R1310 is adjustable by way of the condenser associated with the upper winding thereof, in the manner previously explained. Furthermore, upon operating, the test relay R1320 prepares, at the contacts 1322, points in holding circuits for energizing the windings of the locking relays ML, CL, DL and UL; and prepares, at the contacts 1323, circuits traced hereinafter for energizing the windings of the switching relays RA, RB and RC in series with the various ones of the counting relays 1R to 10R, inclusive, in a manner more fully described hereinafter.

It is noted that the intermittent operation of the impulse relay R1310 controls the counting relay network 1200. More particularly, the first time the impulse relay R1310 operates it completes, at the contacts 1312, a circuit for energizing the winding of the first counting relay 1R, this circuit extending from ground by way of the contacts 1312, C1373, RC1, RB1 and the contacts RA1 and the winding of 1R to battery. When energized over the above-traced circuit, the counting relay 1R operates to prepare, at the contacts 1R2, a holding circuit for energizing the winding thereof in series with the switching relay RA subsequent to the restoration of the impulse relay R1310, and prepares, at the contacts 1R3, a circuit traced hereinafter for energizing the winding of the second counting relay 2R. When the impulse relay R1310 restores, the previously mentioned holding circuit for energizing the winding of the first counting relay 1R in series with the switching relay RA is completed. This circuit extends from ground by way of the contacts 1323 and 1301, C1372, the contacts RB3, the winding of RA, the contacts 1R2, and the winding of 1R to battery. When energized over the above-traced circuit, the first counting relay 1R is retained in its operated position and the switching relay RA is operated. Upon operating, the switching relay RA interrupts, at the contacts RA1, a point in the previously traced original circuit for energizing the winding of the first counting relay 1R, prepares, at the contacts RA2, a further point in the previously mentioned circuit for energizing the winding of the second counting relay 2R, and interrupts, at the contacts RA3, a point in the holding circuit for energizing the winding of the switching relay RC.

When the impulse relay R1310 operates for the second time, it completes, at the contacts 1312, the previously mentioned circuit for energizing the winding of the second counting relay 2R, this circuit extending from ground by way of the contacts 1312, C1373, the contacts RC1, RB1, RA2 and 1R3, and the winding of 2R to battery. When energized over the above-traced circuit, the second counting relay 2R operates to prepare, at the contacts 2R3, a holding circuit for energizing the winding thereof in series with the winding of the switching relay RB subsequent to the restoration of the impulse relay R1310, and prepares, at the contacts 2R4, a point in a circuit for energizing the winding of the third counting relay 3R. Subsequent to the restoration of the impulse relay R1310, the previously mentioned holding circuit for energizing the winding of the second counting relay 2R in series with the winding of the switching relay RB is completed, this circuit extending from ground by way of the contacts 1323 and 1301, C1372, the contacts RC3, the winding of RB, the contacts 2R3 and the winding of 2R to battery. When the above-traced circuit is completed, the second counting relay 2R remains in its operated position and the switching relay RB operates to interrupt, at the contacts RB3, the previously traced holding circuit for energizing the winding of the first counting relay 1R in series with the winding of the switching relay RA, thereby to cause the first counting relay 1R and the switching relay RA to restore. Also, upon operating, the switching relay RB interrupts, at the contacts RB1, a point in the previously traced original circuit for energizing the winding of the second counting relay 2R, and prepares, at the contact RB2, a point in a circuit for energizing the winding of the third counting relay 3R. Upon restoring, the switching relay RA prepares, at the contacts RA3, a point in a holding circuit for energizing the winding of the third counting relay 3R in series with the switching relay RC.

In view of the above description of the operation of the counting relay network 1200, it will be understood that the counting relays 1R to 10R, inclusive, and the switching relays RA, RB and RC are operated in the following order:

| Number of Operations and Restorations of the Impulse Relay R1310 | Operated Relays in the Counting Relay Network 1200 |
|---|---|
| 1 | 1R and RA |
| 2 | 2R and RB |
| 3 | 3R and RC |
| 4 | 4R and RA |
| 5 | 5R and RB |
| 6 | 6R and RC |
| 7 | 7R and RA |
| 8 | 8R and RB |
| 9 | 9R and RC |
| 10 | 10R and RA |

Upon operating, the first counting relay 1R completes, at the contacts 1R1, an obvious path for applying ground potential to one of the conductors in the cable 1201; upon operating, the second counting relay 2R completes, at the contacts 2R1, an obvious path for applying ground potential to one of the conductors in the cable 1202, and interrupts, at the contacts 2R2, the previously mentioned path for applying ground potential to one of the conductors in the cable 1201; the third counting relay 3R completes, at the contacts 3R1, an obvious path for applying ground potential to one of the conductors in the cable 1203, and interrupts, at the contacts 3R2, the previously mentioned path for applying ground potential to one of the conductors in the cable 1202; etc. Accordingly, it will be understood that the ground potential is sequently applied to corresponding ones of the conductors in the cables 1201 to 1210, inclusive, incident to the operation of the counting relay network 1200.

The detector 70 operates at this time to determine the particular 1,000 group of lines in the 10,000 group of lines terminating at exchange 1 zone 38 which includes the calling subscriber line 350. More particularly, upon operating, the test relay R1320 completes, at the contacts 1325, a circuit for energizing the winding of the selecting relay MK, this circuit extending from ground by way of the contacts 1325, ML6, C1374 and the winding of MK to battery. When energized over the above-traced circuit, the selecting relay MK operates to prepare, at the contacts MK1 to MK10, inclusive, the previously mentioned path for applying ground potential to the first conductor in each of the cables 1201 to 1210, inclusive. Accordingly, at this time, ground potential is sequentially applied to the first conductors in the cables 1201 to 1210, inclusive, incident to the operation of the counting relay network 1200, whereby the relays 1SM to 10SM, inclusive, in the first code storing device 70SM are sequentially operated. Upon operating, the first relay 1SM in the code storing device 70SM completes, at the contacts 1SM4, a circuit for energizing the first relay 1M in the crossbar switch control network 1100, this circuit extending from ground by way of the contacts 1327, C1381, the contacts 1SM4, the first conductor in the cable 1103, and the winding of 1M to battery, whereupon the relay 1M operates. Also, upon operating, the first relay 1SM prepares, at the contacts 1SM3, a holding circuit for energizing the winding thereof in series with the locking relay ML, which holding circuit is completed in the event the calling subscriber line 350 is included in the first 1,000 group of lines terminating at exchange 1 zone 38. On the other hand, in the event the calling subscriber line 350 is not included in the first group of 1,000 lines terminating at exchange 1 zone 38, the present example, the first relay 1SM in the code storing device 70SM subsequently restores and the second relay 2SM in the code storing device 70SM operates. More specifically, the relays 1SM to 10SM, inclusive, in the code storing device 70SM operate sequentially until the relay in the code storing device 70SM is operated, which relay corresponds to the particular group of 1,000 lines terminating at exchange 1 zone 38 including the calling subscriber line 350.

Upon operating, the first relay 1M in the crossbar switch control network 1100 completes, at the contacts 1M1 to 1M5, inclusive, obvious circuits for energizing the first to the fifth horizontal magnets HM1 to HM5, inclusive, of the first crossbar switch 1001, these circuits extending from the grounded conductor C1102 by way of the back contacts of the relay MS and the contacts 1M1 to 1M5, inclusive, of the relay 1M, the conductors in the cable 1014 and the horizontal magnets HM1 to HM5, inclusive, to battery. Also, upon operating, the relay 1M completes, at the contacts 1M6 and 1M7, circuits for respectively energizing the even and odd relays EC and OC, respectively, these circuits extending from the grounded conductor C1102 by way of the back contacts of the relay MS, the contacts 1M6 and 1M7 of the relay 1M and the windings of the relays EC and OC to battery. When energized over the above-traced circuit, the odd relay OC operates to complete, at the contacts OC1 to OC10, inclusive, obvious circuits for energizing the vertical magnets VM1 to VM10, inclusive, these circuits extending from the grounded conductor C1116 by way of the back contacts of the relay CS, the contacts OC1 to OC10, inclusive, of the odd relay OC, the conductors in the cable 1012 and the vertical magnets VM1 to VM10, inclusive, to battery. When energized over the above-traced circuit, the even relay EC operates to complete, at the contacts EC1 to EC10, inclusive, obvious circuits for energizing the vertical magnets VM11 to VM20, inclusive, these circuits extending from the grounded conductor C1116 by way of the back contacts of the relay CS, the contacts EC1 to EC10, inclusive, of the even relay EC, the conductors in the cable 1013 and the vertical magnets VM11 to VM20, inclusive, to battery.

When the horizontal magnets HM1 to HM5, inclusive, and the vertical magnets VM1 to VM20, inclusive, are energized, these magnets operate, thereby to cause the corresponding horizontal and vertical bars in the first crossbar switch 1001 to be operated, whereupon the associated 100 contact sets in the first crossbar switch are actuated, ten pairs of contact springs in each contact set being actuated into engagement. This operation of the horizontal magnets HM1 to HM5, inclusive, and the vertical magnets VM1 to VM20, inclusive, prepares a further point in the previously mentioned test circuit. However, in the present example, the calling subscriber line 350 is included in the second 1,000 group of lines terminating at exchange 1 zone 38. Thus, this test circuit is not completed at this time. When the first relay 1SM in the code storing device 70SM restores and the second relay 2SM therein operates, the first relay 1M and the second relay 2M in the crossbar switch control network 1100 respectively restore and operate. When the first relay 1M restores, the previously traced circuits for the horizontal magnets HM1 to HM5, inclusive, and the windings of the odd and even relays OC and EC, respectively, are interrupted at the contacts 1M1 to 1M7, inclusive, thereby to cause the horizontal magnets HM1 to HM5, inclusive, and the odd and even relays OC and EC, respectively, to restore. When the second relay 2M operates, there are completed, at the contracts 2M1 to 2M5, inclusive, obvious circuits for energizing, by way of the conductors in the cable 1015, the horizontal magnets HM6 to HM10, inclusive, of the first crossbar switch 1001. Also, upon operating, the second relay 2M completes, at the contacts 2M6 and 2M7, alternative circuits for energizing the odd and even relays OC and EC, respectively, whereupon the last-mentioned relays reoperate and recomplete, at the contacts OC1 to OC10, inclusive, and at the contacts EC1 to EC10, inclusive, respectively, the previously traced circuits for energizing the vertical magnets VM1 to VM10, inclusive, and the vertical magnets VM11 to VM20, inclusive. Accordingly, at this time, the horizontal magnets HM6 to HM10, inclusive, and the vertical magnets VM1 to VM20, inclusive, of the first crossbar switch 1001 operate, thereby to operate the associated horizontal and vertical bars in the first crossbar switch 1001, whereupon the second group of 100 contact sets are operated, each contact set including ten pairs of operated contact springs.

In view of the fact that the calling subscriber line 350 is included in the second group of 1,000 lines terminating at exchange 1 zone 38, the previously mentioned test circuit is completed at this time. This test circuit extends from the control conductor C353 of the calling subscriber line 350 by way of the conductor C354, the set of switch springs illustrated, associated with the tenth horizontal bar and the second vertical bar in the first crossbar switch 1001, one of the conductors in the cable 1011, one of the sets of contacts DS1 to DS10, inclusive, of the relay DS and the conductor C1113 to the primary winding 1346 of the transformer 1347. Further, this test circuit extends over the previously traced prepared path by way of the register translator 60, the register translator selector B380 and the primary selector 50 to the control conductor C353 of the subscriber line 350.

In view of the fact that this test circuit is completed, 2,000 cycle current traverses the primary winding 1346 of the transformer 1347 and induces a similar alternating current potential in the secondary winding 1345 of the transformer 1347. At this point, it is noted that the vacuum tube detector 1305 comprises a filamentary cathode 1306 included in a circuit extending from ground by way of the switch S1342, the resistor 1343, the filamentary cathode 1306 and the resistor 1344 to battery. Also, negative battery biasing potential is applied to the grid 1307 of the vacuum tube 1305 by way of the secondary winding 1345 of the transformer 1347. At this time, when 2,000 cycle voltage is induced in the secondary winding 1345 of the transformer 1347 and applied to the grid 1307, the detector 1305 operates, in a well-known manner, to cause direct current to traverse the winding of the test relay R1330 over a circuit extending from the positive terminal of the anode current source by way of the winding of the test relay R1330, the anode 1308, the cathode 1306 and the resistor 1344 to the negative terminal of the anode current source. When the winding of the test relay R1330 is energized by way of the above-traced circuit, this relay operates to interrupt, at the contacts 1333, the previously traced circuit for energizing the winding of the impulse relay R1310 and to prepare, at the contacts 1332, a circuit for energizing the winding of the locking relay ML in series with the winding of the second relay 2SM in the code storing device 70SM subsequent to the restoration of the second counting relay 2R in the counting relay network 1200. Also, upon operating, the test relay R1330 completes, at the contacts 1331, a circuit for energizing the reset relay R1300, this circuit extending from ground by way of the contacts 1321, C1370, the contacts 1331 and the winding of R1300 to battery. When energized over the above-traced circuit, the reset relay R1300 operates to interrupt, at the contacts 1301, the previously traced holding circuit for energizing the winding of the switching relay RB in series with the winding of the second counting relay 2R in the counting relay network 1200, thereby to cause the switching relay RB and the second counting relay 2R to restore. Upon restoring, the second counting relay 2R interrupts, at the contacts 2R1, the previously traced original circuit for energizing the winding of the second relay 2SM in the code storing device 70SM, whereupon the previously mentioned circuit for energizing the winding of the locking relay ML in series with the second relay 2SM in the code storing device 70SM is completed. The last-mentioned circuit extends from ground by way of the contacts 1321, C1370, the contacts 1332, C1371, the contacts ML2, the winding of ML, C1414, the contacts 2SM3 and the winding of 2SM to battery. When energized over the above-traced circuit, the locking relay ML operates to interrupt, at the contacts ML2, a point in the previously traced circuit for energizing the winding thereof in series with the winding of the second relay 2SM in the code storing device 70SM, and to complete, at the contacts ML4, an obvious holding circuit for energizing the winding thereof in series with the winding of the second relay 2SM.

Also, upon operating, the locking relay ML prepares, at the contacts ML3, a point in a circuit traced hereinafter for energizing the winding of the locking relay CL and completes, at the contacts ML1, an obvious circuit for energizing the winding of the relay MS, thereby to cause operation of the relay MS. Also, upon operating, the locking relay ML interrupts, at the contacts ML6, the previously traced circuit for energizing the winding of the selecting relay MK in order to cause the selecting relay MK to restore, and completes, at the contacts ML5, a circuit for energizing the winding of the selecting relay CK. The last-mentioned circuit extends from ground by way of the contacts 1325, ML5 and CL5, C1375 and the winding of CK to battery. When energized over the above-traced circuit, the selecting relay CK operates to prepare the previously mentioned path for applying ground potential to the second conductors in the cables 1201 to 1210, inclusive, incident to the reoperation of the counting relay network 1200.

Upon operating, the relay MS interrupts, at the back contacts MS1B to MS5B, inclusive, the previously traced circuits for energizing the horizontal magnets HM6 to HM10, inclusive, and interrupts, at the back contacts MS6B and MS7B, the previously traced circuits for energizing the windings of the even and odd relays EC and OC, respectively, thereby to cause the horizontal magnets HM6 to HM10, inclusive, and the even and odd relays EC and OC to restore. When the odd and even relays OC and EC restore, the previously traced circuits for energizing the vertical magnets VM1 to VM20, inclusive, are interrupted, at the contacts OC1 to OC10, inclusive, and at the contacts EC1 to EC10, inclusive.

Accordingly, at this time, the horizontal magnets HM6 to HM10, inclusive, and the vertical magnets VM1 to VM20, inclusive, restore to interrupt, at the set of contact springs illustrated, the previously traced test circuit, whereupon the vacuum tube detector 1305 cuts off and interrupts the previously traced circuit for energizing the winding of the test relay R1330. The test relay R1330 then restores to recomplete, at the contacts 1333, the previously traced circuit for causing intermittent operation of the impulse relay R1310, and interrupts, at the contacts 1331, the previously traced circuit for energizing the winding of the reset relay R1300. Shortly thereafter, the reset relay R1300, being of the slow-to-release type, restores to recomplete, at the contacts 1301, the previously traced circuit for energizing the counting relays in the counting relay network 1200. At this time, further operation of the counting relay network 1200 is initiated and the second relay 2SM in the code storing device 70SM corresponding to the particular 1,000 group of lines terminating at exchange 1 zone 38 and including the calling subscriber line 350 is operated and locked in its operated position in series with the locking relay ML. Also the relays 2M and MS remain operated.

The detector 70 then operates to determine the particular 100 group of lines in the previously determined 1,000 group of lines terminating at exchange 1 zone 38 which includes the calling subscriber line 350. More particularly, the operation of the counting relay network 1200 causes the relays 1SC to 10SC, inclusive, in the code storing device 70SC to be operated sequentially, due to the fact that the selecting relay CK occupies its operated position at this time. When the first relay 1SC in the code storing device 70SC is operated, it completes, at the contacts 1SC2, a circuit for energizing the horizontal magnet HM6 in the first crossbar switch 1001. This circuit extends from ground by way of the contacts 1327, C1331, the contacts 1SC2, the first conductor in the cable 1101, the front contact MS1F of the relay MS, the contacts 2M1, the first conductor in the cable 1015 and the winding of HM6 to battery. Also, upon operating, the first relay 1SC in the code storing device 70SC completes, at the contacts 1SC3, a circuit for energizing the winding of the odd relay OC, this circuit extending from ground by way of the contacts 1327, C1331, C1432, the contacts 1SC3, the odd conductor in the cable 1101, the contacts MS7F and 2M7 and the winding of the odd relay OC to battery. When energized over the above-traced circuit, the odd relay OC operates to complete, at the contacts OC1 to OC10, inclusive, the previously traced circuits for energizing the vertical magnets VM1 to VM10, inclusive. Accordingly, at this time, the horizontal magnet HM6 and the vertical magnets VM1 to VM10, inclusive, occupy their operated positions, thereby to cause the 10 contact sets associated therewith to be operated. In the present example, the calling subscriber line 350 is included in the ninth 100 group. Accordingly, the test relay R1330 is not operated as the previously traced test circuit is not completed at this time.

Subsequently, the first relay 1SC restores and the second relay 2SC operates in the code storing device 70SC. Upon operating, the second relay 2SC completes, at the contacts 2SC2, an obvious alternative circuit for energizing the horizontal magnet HM6 and completes, at the contacts 2SC3, a circuit for energizing the winding of the even relay EC, this circuit extending from ground by way of the contacts 1327, C1331, C1432, the contacts 2SC3, the even conductor in the cable 1101, the contacts MS6F and 2M6 and the winding of EC to battery. When energized over the above-traced circuit, the even relay EC operates to complete, at the contacts EC1 to EC10, inclusive, the previously traced circuits for energizing the magnets VM11 to VM20, inclusive. At this time, the horizontal magnet HM6 and the vertical magnets VM11 to VM20, inclusive, occupy their operated positions, thereby to operate the ten contact sets associated therewith. As previously noted, the calling subscriber line 350 is terminated in the ninth 100 group at exchange 1 zone 38. Hence, the test relay R1330 is not operated at this time.

In view of the foregoing description, it will be understood that, when the third and fourth SC relays are operated, the horizontal magnet HM7 will be operated; when the fifth and sixth SC relays are operated, the horizontal magnet HM8 will be operated; when the seven and eighth SC relays are operated, the horizontal magnet HM9 will be operated; and when the ninth and tenth SC relays are operated, the horizontal magnet HM10 will be operated. Furthermore, when the third, fifth, seventh and ninth SC relays are operated, the OC relay will be operated; and when the fourth, sixth, eighth and tenth SC relays are operated, the even relay EC will be operated. Accordingly, in the present example, when the relay 9SC is operated, the horizontal magnet HM10 and the vertical magnets VM1 to VM10, inclusive, will be operated; and the previously traced test circuit will be completed, whereupon the test relay R1330 will operate. Upon operating, the test relay R1330 resets the counting relay network 1200, as previously explained, and completes a holding circuit for energizing the winding of the locking relay CL in series with the winding of the relay 9SC in the code storing device 70SC. The last-mentioned circuit extends from ground, at the contacts 1321, by way of C1370, the contacts 1332, C1371, the contacts ML3 and CL2, the winding of CL, C1415 and the contacts and winding of 9SC to battery. The operated relay 9SC retains the horizontal magnet HM10 and the odd relay OC in their operated positions at this time. Upon operating, the locking relay CL completes, at the contacts CL4', an obvious holding circuit for energizing the winding thereof in series with the operated relay 9SC in the code storing device 70SC. Further, the locking relay CL interrupts, at the contacts CL5, the previously traced circuit for energizing the winding of the selecting relay CK, thereby to cause the relay CK to restore, and completes, at the contacts CL4, a circuit for energizing the winding of the selecting relay DK. This circuit extends from ground by way of the contacts 1325, ML5, CL4 and DL5, C1376 and the winding of DK to battery. When energized over the above-traced circuit, the selecting relay DK operates to condition the counting relay network 1200 to apply ground potential sequentially to the third conductors in the cables 1201 to 1211, inclusive. Also, upon operating, the locking relay CL completes, at the contacts CL1, an obvious circuit for energizing the winding of the relay CS, thereby to cause the last-mentioned relay to operate and interrupt, at the contacts CS1B to CS10B, inclusive, the previously traced circuits for energizing the windings of the vertical magnets VM1 to VM10, inclusive, whereupon the vertical magnets VM1 to VM10, inclusive, restore to interrupt the previously traced test circuit, whereby the test relay R1330 restores to initiate further operation of the counting relay network 1200.

The detector 70 then operates to determine the particular 10 group of lines in the previously determined 100 group of lines terminating at exchange 1 zone 38 which includes the calling subscriber line 350. More particularly, the SD relays in the code storing device 70SD operate sequentially, thereby sequentially to complete circuits for energizing the vertical magnets VM1 to VM10, inclusive, of the first crossbar switch 1001. Specifically, when the first SD relay operates, a circuit is completed for energizing the vertical magnet VM1, this circuit extending from ground by way of the contacts 1327, C1331, C1434, the contacts controlled by the first SD relay, the first conductor in the cable 1104, the contacts CS1F and OC1, the first conductor in the cable 1012 and the winding of VM1 to battery. Upon operating, the vertical magnet VM1 operates the particular contact set individually associated with the horizontal and vertical operating bars respectively associated with the horizontal magnet HM10 and the vertical magnet VM1. As previously noted, the calling subscriber line 350 is included in the second 10 line group. Accordingly, the previously traced test circuit is not completed at this time. When the second SD relay in the code storing device 70SD operates, a circuit similar to that previously traced is completed for energizing the vertical magnet VM2. When the horizontal magnet HM10 and the vertical magnet VM2 are operated, the set of contact springs illustrated is operated, whereupon the previously traced test circuit is completed, and the test relay R1330 operates in order to reset the counting relay network 1200, as previously explained. At this time, a holding circuit is completed for energizing the winding of the locking relay DL in series with the second SD relay in the code storing device 70SD, this circuit extending from ground by way of the contacts 1322 and DL4', the winding of DL, C1416, the contacts controlled by the second SD relay and the winding of the second SD relay to battery. The operated second SD relay in the code storing device 70SD retains the vertical magnet VM2 in its operated position at this time.

Upon operating, the locking relay DL interrupts, at the contacts DL5, the previously traced circuit for energizing the winding of the selecting relay DK and completes, at the contacts DL4, a circuit for energizing the winding of the selecting relay UK. The last-mentioned circuit extends from ground by way of the contacts 1325, ML5, CL4 and DL4, C1377 and the winding of UK to battery. When energized over the above-traced circuit, the selecting relay UK operates to prepare, at the contacts UK1 to UK10, inclusive, paths for causing the counting relay network 1200 to apply ground potential sequentially to the fourth conductors in the cables 1201 to 1210, inclusive. Also, upon operating, the locking relay DL prepares, at the contacts DL3, a circuit traced hereinafter for energizing the winding of the locking relay UL in series with an operated one of the SU relays in the code storing device 70SU, and completes, at the contacts DL1, an obvious circuit for energizing the winding of the relay DS, thereby to cause the relay DS to operate. Upon operating, the relay DS interrupts, at the contacts DS1 to DS10, inclusive, the connection between the ten conductors in the cable 1011 and the conductor C1113, thereby to interrupt the previously traced test circuit. When the previously traced test circuit is interrupted, the test relay R1330 restores in order to initiate further operation of the counting relay network 1200.

The detector 70 then operates to determine the particular line in the previously determined 10 group of lines terminating at exchange 1 zone 38 which is the calling subscriber line 350. More particularly, the SU relays in the code storing device 70SU begin to operate sequentially, thereby to test the individual pairs of contact springs illustrated to determine the particular pair of contact springs terminating the conductor C354 extending to the control conductor C353 of the calling subscriber line 350 and included in the previously traced test circuit. More specifically, when the first SU relay in the code storing device 70SU operates, the previously traced test circuit is completed, this test circuit extending by way of the previously traced path to the conductor C1113, and therefrom by way of the conductor C1420, the contacts associated with the first SU relay in the code storing device 70SU, the first conductor in the cable 1105, the first conductor in the cable 1011, the condenser 1021, and the first pair of switch springs S1 in the contact set illustrated to the conductor C354, and therefrom by way of the previously traced path to the control conductor C353 of the calling subscriber line 350. When this test circuit is completed, the test relay R1330 operates, as previously explained, thereby to reset the counting relay network 1200, whereupon a holding circuit is completed for energizing the winding of the first SU relay in the code storing device 70SU in series with the locking relay UL. The last-mentioned circuit extends from ground by way of the contacts 1322, UL3, the winding of UL, C1417, the contacts controlled by the first SU relay and the winding of the first SU relay to battery.

At this time, the detector 70 has operated to determine the numerical portion of the directory number of the calling subscriber line 350 terminating at exchange 1 zone 38, the numerical portion of the directory number of the calling subscriber line 350 being 2921, as previously noted. This numerical portion of the directory number of the calling subscriber line 350 terminating at exchange 1 zone 38 is determined by the operated positions of the second SM relay in the 1,000 code storing device 70SM, the ninth SC relay in the 100 code storing device 70SC, the second SD relay in the 10 code storing device 70SD, and the first SU relay in the unit code storing device 70SU. In a similar manner, the detector 71 operates to determine the numerical portion of the directory number of the calling subscriber line 350 terminating at exchange 1 zone 38, and corresponding relays in the code storing devices 71SM, 71SC, 71SD and 71SU in the detector 71 should be operated at this time.

In the event both of the detectors 70 and 71 operate and determine that the calling subscriber line 350 terminating at exchange 1 zone 38 has the same numerical portion of the directory number—in other words, both of the detectors 70 and 71 check with each other concerning the directory number of the calling subscriber line 350—a chain circuit is completed for operating the check relay R1360 upon operation of the locking relay UL. This chain circuit extends from ground by way of the contact UL1, C1382, the contacts controlled by the second SM relay in the code storing device 70SM, the second conductor in the cable 1440, the contacts controlled by the second SM relay in the code storing device 71SM, the conductor C1441, the contacts controlled by the ninth SC relay in the code storing device 71SC, the ninth conductor in the cable 1442, the contacts controlled by the ninth SC relay in the code storing device 70SC, the conductor C1443, the contacts controlled by the second SD relay in the code storing device 70SD, the second conductor in the cable 1444, the contacts controlled by the second SD relay in the code storing device 71SD, the conductor C1445, contacts controlled by the first SU relay in the code storing device 71SU, the first conductor in the cable 1446, contacts controlled by the first SU relay in the code storing device 70SU, C1418 and the winding of the check relay R1360 to battery. When the above-traced chain circuit is completed, the check relay R1360 operates to interrupt, at the contacts 1363, a point in a circuit traced hereinafter for energizing the winding of the alarm relay R1340.

In the event that the detectors 70 and 71 fail to check with each other concerning the directory number of the calling subscriber line 350 terminating at exchange 1 zone 38, the above-traced chain circuit for energizing the winding of the check relay R1360 is not completed and the check relay R1360 does not operate. Furthermore, in the last-mentioned event, upon operation of the locking relay UL in the detector 70 and the locking relay 71UL in the detector 71, the previously mentioned circuit for energizing the winding of the alarm relay R1340 is completed. The last-mentioned circuit extends from ground in the detector 71, by way of the contacts 71UL1 of the locking relay 71UL in the detector 71, C1419, the contacts 1363, the winding of R1340 and the contacts UL4 of the locking relay UL in the detector 70 to battery. In the event the above-traced circuit is completed, the alarm relay R1340 operates shortly thereafter, this relay being of the slow-to-operate type, to complete, at the contacts 1341, an obvious circuit for energizing the winding of the alarm device A1300, thereby to cause operation of the alarm device A1300 in order to indicate to the attendant at exchange 1 zone 38 that the detectors 70 and 71 have failed to check with each other concerning the directory number of a calling subscriber line terminating at exchange 1 zone 38.

Furthermore, it is noted that the operated second relay 2SM in the code storing device 70SM completes, at the contacts 2SM1 and 2SM2, obvious paths for applying ground potential to the W and Y leads in the first group of marking leads 1451 included in the cable 1455 extending into the register translator 60, thereby to mark with code the 1,000 digit of the numerical portion of the directory number of the calling subscriber line 350 terminating at exchange 1 zone 38, this code corresponding to the digit 2, as previously explained. This marking circuit extends from ground by way of the contacts 1361, C1378 to the conductor C1410, from the conductor C1410 by way of the contacts 2SM1 to the W lead in the first group of marking leads 1451, and from the conductor C1410 by way of the contacts 2SM2 to the Y lead in the first group of marking leads 1451. In a similar manner, the operated ninth SC relay in the code storing device 70SC marks the WXYZ leads in the second group of marking leads 1452 with ground potential; the second SD relay in the code storing device 70SD marks the WXYZ leads in the third group of marking leads 1453 with ground potential; and the first SU relay in the code storing device 70SU marks the WXYZ leads in the fourth group of marking leads 1454 with ground potential. It is noted that the WXYZ leads in the first, second, third and fourth or 1,000, 100, 10 and unit groups of marking leads 1451, 1452, 1453 and 1454, respectively, are marked with ground potential only in the event that the check relay R1360 operates, which check relay operates only in the event the detectors 70 and 71 check with each other concerning the directory number of the calling subscriber line 350 terminating at exchange 1 zone 38.

Finally, upon operating, the check relay R1360 completes, at the contacts 1362, an obvious path for applying ground potential to the cutoff conductor C1108 in the cable 1130, thereby to complete a circuit for energizing the winding of the cutoff relay R1940 in the register translator 60, this circuit extending from the grounded cutoff conductor C1108 in the cable 1130 by way of the contacts 2555, C2069, and the winding of R1940 to battery. When thus energized, the cutoff relay R1940 operates to complete, at the contacts 1943, an obvious holding circuit for energizing the winding thereof by way of the hold conductor C1839 and interrupts, at the contacts 1941, the previously traced path for applying ground potential to the start conductor C1109 in the cable 1130. When ground potential is removed from the start conductor C1109 in the cable 1130 the previously traced circuit for energizing the winding of the start relay R1350 in the detector 70 is interrupted, thereby to cause the start relay R1350 to restore. Further, the cutoff relay R1940 interrupts, at the contacts 1942, the previously traced circuit for energizing in series the tone test relay R1950 in the register translator 60 and the test relay R1320 in the detector 70, thereby to cause the latter relays to restore. When the start relay R1350 and the test relay R1320 in the detector 70 restore, further operation thereof is arrested and the detector 70 is released. In a similar manner, the restoration of the start and test relays in the detector 71 causes the latter detector to be released.

Upon restoring, the tone test relay R1950 interrupts, at the contacts 1951, a further point in the previously traced test circuit between the control conductor C353 of the calling subscriber line 350 and the detectors 70 and 71, and interrupts, at the contacts 1952, the previously mentioned circuit for energizing the winding of the storage relay R2550, thereby to cause the latter relay to restore. Prior to the restoration of the storage relay R2550, ground potential was applied in the detector 70 to the WXYZ leads in the first, second, third and fourth groups of marking leads 1451 to 1454, inclusive, in the manner previously explained, thereby to cause operation of the corresponding ones of the WXYZ magnets in the first, second, third and fourth code storage devices S2541 to S2544, inclusive, respectively, in the code storage unit SU2530. More particularly, the W and Y magnets in the code storage device S2541, corresponding to the code digit 2 are momentarily operated. Similarly, in the code storage device S2542, the Y magnet, corresponding to the code digit 9, is momentarily operated; in the code storage device S2543, the W and Y magnets, corresponding to the code digit 2, are momentarily operated; and, in the code storage device S2544, the W and X magnets, corresponding to the code digit 1, are momentarily operated. When the various WXYZ magnets in the code storage devices S2541 to S2544, inclusive, are operated the individually associated armatures are operated and locked in their operated positions, thereby to cause ground potential to be applied to the corresponding WXYZ leads in the associated group of marking leads. More particularly, the various WXYZ leads in the groups of marking leads 2561 to 2564, inclusive, are respectively marked in the respective code storage devices S2541 to S2544, inclusive. More specifically, the WXYZ leads in the group of marking leads 2561 to 2564, inclusive, are respectively marked in accordance with the code digits 2, 9, 2 and 1, the digits 2921 corresponding to the numerical portion of the directory number of the calling subscriber line 350. Thus, the four digits of the numerical portion of the directory number of the calling subscriber line 350 are stored in the code storage devices S2541 to S2544, inclusive, in the code storage unit SU2530 in the register translator 60.

Initial operation of the toll ticket repeater

Incident to the setting up of the present call, the register translator 60 first transmits the four routing digits 2462 to the primary selector 50, in the manner previously explained. More particularly, the four routing digits 2462 are transmitted over the line conductor C392 of the trunk 390, the wiper 382 of the register translator selector B380 and the line conductor C372 of the trunk 370; whereupon the line relay R420 in the primary selector 50 follows the first routing digit 2 in order to cause the wiper carriage of the Strowger mechanism S400 to be driven two steps in the vertical direction, in the manner previously explained. At the conclusion of the first routing digit 2 the wiper carriage of the Strowger mechanism S400 is driven automatically step by step in the rotary direction in order to select an idle trunk in the associated group extending to an idle toll ticket repeater. Assuming that the trunk 470 extending to the toll ticket repeater 80 is the first idle trunk in the group of trunks mentioned, the Strowger mechanism S400 operates in order to seize the trunk 470, in the manner previously explained, the trunk 470 being marked as idle by the absence of ground potential upon the control conductor C473 thereof. When the Strowger mechanism S400 seizes the trunk 470 the switch-through relay R430 in the primary selector 50 operates, in the manner previously explained, thereby to interrupt, at the contacts 431, the previously traced circuit for energizing the winding of the line relay R420 and to complete, at the contacts 432 and 434, the previously traced connections between the control conductors C372 and C374 of the trunk 370 and the line wipers 401 and 402 of the first wiper set carried by the wiper carriage of the Strowger mechanism S400.

When the primary selector 50 thus operates to seize the trunk 470 a circuit is completed for energizing the upper winding of the impulse relay R1540 in the toll ticket repeater 80, this circuit extending from the grounded control conductor C392 of the trunk 390 by way of the wiper 382 of the register translator selector B380, the control conductor C372 of the trunk 370, the contacts 312, 432 and 461, the line wiper 401 of the first wiper set carried by the wiper carriage of the Strowger mechanism S400, the line conductor C471 of the trunk 470, and the upper winding of R1540 to battery. When this circuit is completed the impulse relay R1540 operates.

In view of the above description, it will be understood that the first routing digit 2 is transmitted from the register translator 60 over the control conductor C392 of the trunk 390 and the control conductor C372 of the trunk 370 to the line relay R420 in the primary selector 50; whereas, the second, third and fourth routing digits 4, 6 and 2, respectively, are transmitted from the register translator 60 over the control conductor C392 of the trunk 390 and the line conductor C471 of the trunk 470 to the impulse relay R1540 in the toll ticket repeater 80. Thus, the line relay R420 in the primary selector 50 follows the first routing digit 2 in order to cause a corresponding operation of the primary selector 50; while the impulse relay R1540 in the toll ticket repeater 80 follows the second, third and fourth routing digits 4, 6 and 2, respectively, in order to cause these routing digits to be repeated over the toll line 1500 extending to exchange 1 zone 73.

More particularly, upon operating, the impulse relay R1540 completes, at the contacts 1543, an obvious circuit for energizing the winding of the hold relay R1610, thereby to cause the latter relay to operate. Upon operating, the hold relay R1610 completes, at the contacts 1618, an obvious path for applying ground potential to the control conductor C473 of the trunk 470, thereby to mark the trunk 470 as busy and to retain the primary selector 50 and the line switch 40 in their operated positions, in the manner previously explained. Also, the hold relay R1610 completes, at the contacts 1615, an obvious circuit for energizing the winding of the hold slave relay R1600, thereby to cause the latter relay to operate. Upon operating, the hold slave relay R1600 completes, at the contacts 1604, an obvious path for applying ground potential to the hold conductor C1636 and completes, at the contacts 1601, an obvious circuit for energizing the right-hand winding of the answer relay R1560. However, the answer relay R1560 does not operate at this time, this relay being of the type which operates only when the right-hand and left-hand windings thereof are energized.

When ground potential is applied to the hold conductor C1636 an obvious circuit is completed for energizing the master magnet SM1701 of the code storage unit SU1700 in the toll ticket repeater 80, thereby to cause the master magnet SM1701 to operate. Upon operating, the master magnet SM1701 completes, at the contacts 1720, an obvious holding circuit, including the resistor 1722 and the hold conductor C1636, for energizing the master magnet SM1701. Also, the master magnet SM1701 releases the armatures of the unit or WXYZ magnets in the various code storage devices S1701 to S1714, inclusive, in the code storage unit SU1700. At this time, the toll ticket repeater 80 is in readiness to receive the second routing digit 4; and when the second routing digit 4 is transmitted thereto from the register translator 60 by way of the primary selector 50 and the trunk 470, the impulse relay R1540 follows the impulses thereof. More particularly, the impulse relay R1540 operates intermittently. Each time the impulse relay R1540 restores it interrupts, at the contacts 1543, the previously mentioned circuit for energizing the winding of the hold relay R1610 and completes, at the contacts 1542, an obvious circuit for energizing the winding of the shunt relay R1550, thereby to cause the shunt relay R1550 to operate. The hold relay R1610 and the shunt relay R1550, being of the slow-to-release type, do not restore during impulsing. Upon operating, the shunt relay R1550 completes, at the contacts 1551, an obvious path for short-circuiting the left-hand winding of the answer relay R1560 in series with the impedance 1505 and a direct loop circuit between the line conductors C1501 and C1502 of the toll line 1500 extending to exchange 1 zone 73. Also, the intermittent operation of the impulse relay R1540 is effective to cause the previously mentioned direct loop between the line conductors C1501 and C1502 of the tool line 1500 to be completed intermittently, this loop extending, when completed, from the line conductor C1501 of the toll line 1500 by way of the contacts 1541 and 1551 to the line conductor C1502 of the toll line 1500. Accordingly, the impulse relay R1540 repeats the second routing digit 4 over the toll line 1500. In a similar manner, the impulse relay R1540 repeats the third routing digit 6 and the fourth routing digit 2 over the toll line 1500. Subsequently, the register translator 60 operates to transmit the fourth, fifth, sixth and seventh digits dialed at the calling subscriber substation T1, the digits 1, 2, 3 and 4, and then the eighth digit dialed at the calling subscriber substation T1, the digit 1, over the trunk 470 to the toll ticket repeater 80. The fourth, fifth, sixth and seventh digits 1, 2, 3 and 4 correspond respectively to the numerical portion of the directory number of the called subscriber substation in exchange 4 zone 62; while the eighth digit 1 corresponds to the suffix digit of the directory number of the called subscriber substation in exchange 4 zone 62, the last-mentioned subscriber substation being of the party type, as previously noted. These digits transmitted to the toll ticket repeater 80 are repeated over the toll line 1500, in the manner previously explained.

The second routing digit 4 transmitted over the toll line 1500 is utilized in automatic switching apparatus in exchange 1 zone 73 to select an idle toll line extending between exchange 1 zone 73 and the exchange in zone 46; the third routing digit 6 transmitted over the toll line 1500 is utilized in automatic switching apparatus in the exchange in zone 46 to select an idle toll line extending between the exchange in zone 46 and exchange 1 zone 62; while the fourth routing digit 2 transmitted over the toll line 1500 is utilized in automatic switching apparatus in exchange 1 zone 62 to select an idle trunk extending between exchange 1 zone 62 and exchange 4 zone 62. The fourth, fifth, sixth and seventh digits 1, 2, 3 and 4, respectively, corresponding to the numerical portion of the directory number of the called subscriber substation in exchange 4 zone 62, are utilized in automatic switching apparatus in exchange 4 zone 62 to select the line terminal of the subscriber line extending to the called subscriber substation therein; while the eighth digit 1, corresponding to the suffix digit of the directory number of the called subscriber substation in exchange 4 zone 62 is utilized in automatic switching apparatus in exchange 4 zone 62 to select the ringing code corresponding to the called party subscriber substation in exchange 4 zone 62.

The switching apparatus in exchange 4 zone 62 then operates in accordance with conventional practice in order to cause the selected ringing code to be projected over the subscriber line extending to the called party subscriber substation, thereby to operate the ringer thereat.

Returning now to the operation of the register translator 60, when the sixth digit 3 has been dialed at the calling subscriber substation T1 the wiper 2442 of the sequence switch S2440 engages the sixth contact in the associated contact bank, thereby to prepare a point in an alternative circuit traced hereinafter for energizing the upper and lower windings of the pulse relay R2040; when the second routing digit 4 has been transmitted from the register translator 60 the wiper 2202 of the digit sequence switch N2200 engages the second contact in the associated contact bank, thereby to prepare another point in the previously mentioned alternative circuit for energizing the upper and lower windings of the pulse relay R2040; and when the cutoff relay R1940 operates, incident to the complete operation of the detectors 70 and 71, it completes, at the contacts 1944, a further point in the previously mentioned circuit for energizing the upper and lower windings of the pulse relay R2040. At this time, after the sixth digit 3 has been dialed at the calling subscriber substation T1, after the second routing digit 4 has been transmitted from the register translator 60, and after the numerical portion of the directory number of the calling subscriber substation T1 has been registered in the code storage devices S2541 to S2544, inclusive, in the code storage unit SU2530, the previously mentioned alternative circuit for energizing the upper and lower windings of the pulse relay R2040 is completed, this circuit extending from the grounded wiper 2442 of the sequence switch S2440 and the engaged sixth contact in the associated contact bank, C1973, the contacts 1944, C1846, the wiper 2202 of the digit sequence switch N2200 and the engaged second contact in the associated contact bank, C1847, the contacts 2045 and the upper and lower windings of R2040 to battery. Accordingly, the pulse relay R2040 again operates intermittently, in the manner previously explained.

Upon operating, the pulse relay R2040 completes, at the contacts 2041, a circuit for energizing the magnet UM2505 of the storage transfer switch U2500, this circuit extending from ground by way of the contacts 1811, C1833, the contacts 2041, C2001, and the magnet UM2505 to battery. When thus energized, the magnet UM2505 operates, thereby to condition the wipers noted of the storage transfer switch U2500 to be driven one step in the clockwise direction. Upon restoring, the pulse relay R2040 interrupts, at the contacts 2041, the previously mentioned circuit for energizing the magnet UM2505, thereby to cause the magnet UM2505 to restore and drive the wipers noted of the storage transfer switch U2500 one step in the clockwise direction; whereupon the set of switch springs US2507 is actuated. When the set of switch springs US2507 is actuated there is completed, at the contacts 2510 thereof, a continuing circuit for energizing the upper and lower windings of the pulse relay R2040, this circuit extending from ground by way of the contacts 2510 of the set of switch springs US2507, C2144, the contacts 2104, C1847, the contacts 2045 and the upper and lower windings of R2040 to battery.

Also, upon operating, the pulse relay R2040 completes, at the contacts 2044, a path for applying ground potential, either direct ground potential by way of the wipers 2502, 2503 or 2504 of the storage transfer switch U2500, or resistance ground potential by way of the resistor 2006 to the control conductor C394 of the trunk 390 and, consequently, to the line conductor C472 of the trunk 470. The path for applying resistance ground potential to the line conductor C472 of the trunk 470 extends from ground by way of the resistor 2006, the contacts 2044, C1844, the contacts 1827, C1845, the contacts 1922, C1970, the wiper 2301 of the first code register A2300 and the engaged sixth contact in the associated contact bank, the control conductor C394 of the trunk 390, the wiper 384 of the register translator selector B380, the control conductor C374 of the trunk 370, the contacts 314, 434 and 465 and the line wiper 402 of the first wiper set of the Strowger mechanism S400 to the line conductor C472 of the trunk 470; while the path for applying direct ground potential to the line conductor C472 of the trunk 470 extends from the ungrounded terminal of the resistor 2006 to the line conductor C472 of the trunk 470 by way of the previously traced path and from the ungrounded terminal of the resistor 2006 by way of the contacts 2102 and C2142 to the wipers 2502 and 2503 of the storage transfer switch U2500 or from the ungrounded terminal of the resistor 2006 by way of the contacts 2103 and C2140 to the wiper 2504 of the storage transfer switch U2500.

Accordingly, each time the pulse relay R2040 operates, resistance ground potential is applied to the line conductor C472 of the trunk 470 when the selected wiper 2502, 2503 or 2504 of the storage transfer switch U2500 engages a contact in the associated contact bank having no ground potential connected thereto; on the other hand, each time the pulse relay R2040 operates, direct ground potential is applied to the line conductor C472 of the trunk 470 when the selected wiper 2502, 2503 or 2504 of the storage transfer switch U2500 engages a contact in the associated contact bank having direct ground potential connected thereto.

At this point it is noted that the groups of WXYZ marking leads 2240, 2342, 2343, 2344, 2345 and 2346 are terminated in a clockwise direction in the contact bank associated with the wiper 2502 of the storage transfer switch U2500; the group of WXYZ marking leads 2450 is terminated in both the lower portion of the contact bank associated with the wiper 2502 of the storage transfer switch U2500 and the upper portion of the contact bank associated with the wiper 2503 of the storage transfer switch U2500; the groups of WXYZ marking leads 2451, 2452, 2453, 2561 and 2562 are terminated in a clockwise direction in the contact bank associated with the wiper 2503 of the storage transfer switch U2500; the group of WXYZ marking leads 2563 is terminated in both the lower portion of the contact bank associated with the wiper 2503 of the storage transfer switch U2500 and the upper portion of the contact bank associated with the wiper 2504 of the storage transfer switch U2500; and the group of WXYZ marking leads 2564 is terminated in a clockwise direction in the contact bank associated with the wiper 2504 of the storage transfer switch U2500. The various WXYZ leads in the group of marking leads 2240 terminate by way of the jumper 2276 in the contact banks associated with the wipers 2216 and 2217 carried by the Strowger mechanism of the rate and route switch R2210. In a similar manner, the groups of WXYZ marking leads 2342, 2343 and 2344 respectively terminate in the contact banks of the first code register A2300, the second code register B2320 and the third code register C2330; the groups of WXYZ marking leads 2345, 2346, 2450 and 2451 respectively terminate in the contact banks of the first numerical register D2350, the second numerical register E2360, the third numerical register F2400 and the fourth numerical register G2410; the groups of WXYZ marking leads 2452 and 2453 respectively terminate in the contact banks of the called party register H2420 and the calling party register J2430; while the groups of WXYZ marking leads 2561, 2562, 2563 and 2564 respectively terminate in the code storage devices S2541, S2542, S2543 and S2544 in the code storage unit SU2530.

At this time, the wiper carriage of the Strowger mechanism in the rate and route switch R2210 occupies its 9 up 4 in position, thereby to cause a corresponding rate factor applicable to the call from exchange 1 zone 38 to exchange 4 zone 62 to be selected. Assuming that the selected rate factor is 6, the wipers 2216 and 2217 carried by the wiper carriage of the Strowger mechanism in the rate and route switch R2210 mark the associated WXYZ leads in the group of marking leads 2240 in accordance with the digit 6, the Y and Z leads in the group of marking leads 2240 being marked. Also, the first code digit 6, the second code digit 2 and the third code digit 4 are respectively registered in the first code register A2300, the second code register B2320 and the third code register C2330, thereby to cause the WXYZ leads in the groups of marking leads 2342, 2343 and 2344 to be marked respectively in accordance with the digits 6, 2 and 4; similarly, the first numerical digit 1, the second numerical digit 2, the third numerical digit 3 and the fourth numerical digit 4 are respectively registered in the first numerical register D2350, the second numerical register E2360, the third numerical register F2400 and the fourth numerical register G2410, thereby to cause the WXYZ leads in the groups of marking leads 2345, 2346, 2450 and 2451, to be marked respectively in accordance with the digits 1, 2, 3 and 4. Also, the suffix digit 1 is registered in the called party register H2420, thereby to cause the WXYZ leads in the group of marking leads 2452 to be marked in accordance with the digit 1; while there is no digit registered in the calling party register J2430, thereby to cause no marking of the WXYZ leads in the group of marking leads 2453. Finally, the digits 2, 9, 2 and 1 are respectively registered in the code storage devices S2541 to S2544, inclusive, thereby to cause the WXYZ leads in the groups of marking leads 2561, 2562, 2563 and 2564 to be marked respectively in accordance with the digits 2, 9, 2 and 1.

In the storage transfer switch U2500, the wiper 2502 first successively engages the contacts in the associated contact bank; then the wiper 2503 successively engages the contacts in the associated contact bank; and finally the wiper 2504 successively engages the contacts in the associated contact bank. When the wipers noted of the storage transfer switch U2500 are driven one step in the clockwise direction, the set of switch springs US2507 are actuated, as previously noted; whereupon there is completed, at the contacts 2511 thereof, an obvious circuit for energizing the lower winding of the wiper switching relay R2100. When the lower winding of the wiper switching relay R2100 is thus energized this relay operates partially, thereby to complete, at the contacts 2101, an obvious path for short-circuiting the upper winding thereof. After the wipers noted of the storage transfer switch U2500 have been driven one complete revolution back into their home positions, the set of switch springs US2507 is again actuated, thereby to interrupt, at the contacts 2511 thereof, the previously mentioned path for short-circuiting the upper winding of the wiper switching relay R2100; whereupon the wiper switching relay R2100 operates fully in order to transfer, at the contacts 2102 and 2103, the previously traced direct ground path from the wipers 2502 and 2503 of the storage transfer switch U2500 to the wiper 2504 of the storage transfer switch U2500, for a purpose more fully explained hereinafter.

At this time, a circuit is completed for energizing in series the winding of the step relay R1520 and the winding of the code relay R1530 in the toll ticket repeater 80, this circuit extending from the grounded line conductor C472 of the trunk 470 by way of the contacts 1585 and 1563, the winding of R1520 and the winding of R1530 to battery. It is noted that the code relay 1530 is of the marginal type. Accordingly, the step relay R1520 operates each time either direct ground or resistance ground potential is applied to the line conductor C472 of the trunk 470; while the code relay R1530 operates only each time direct ground potential is applied to the line conductor C472 of the trunk 470.

The groups of WXYZ marking leads respectively extending to the code storage devices S1701 to S1706, respectively, are terminated, in a clockwise direction, in the contact bank associated with the wiper 1751 of the storage register switch C1750; the group of WXYZ marking leads extending to the code storage device S1707 is terminated in both the left-hand side of the contact bank associated with the wiper 1751 of the storage register switch C1750 and the right-hand side of the contact bank associated with the wiper 1752 of the storage register switch C1750; the groups of WXYZ marking leads respectively extending to the code storage devices S1708 to S1712, respectively, are terminated, in a clockwise direction, in the contact bank associated with the wiper 1752 of the storage register switch C1750; the group of WXYZ marking leads extending to the code storage device S1713 is terminated in both the left-hand side of the contact bank associated with the wiper 1752 of the storage register switch C1750 and the right-hand side of the contact bank associated with the wiper 1753 of the storage register switch C1750; and the group of WXYZ marking leads extending to the code storage device S1714 is terminated, in a clockwise direction, in the contact bank associated with the wiper 1753 of the storage register switch C1750. During the operation of the storage register switch C1750 the wiper 1751 first sequentially engages the contacts in the associated contact bank; then the wiper 1752 sequentially engages the contacts in the associated contact bank; and, finally, the wiper 1753 sequentially engages the contacts in the associated contact bank.

When the wipers noted of the storage register switch C1750 are driven one step in the clockwise direction, the set of switch springs CS1759 is actuated, thereby to complete an obvious circuit for energizing the lower winding of the wiper switching relay R1620. When the lower winding of the wiper switching relay R1620 is thus energized it operates partially, thereby to complete, at the contacts 1623, an obvious path for short-circuiting the upper winding thereof. Subsequently, when the wipers noted of the storage register switch C1750 are driven one complete revolution back into their home positions, the set of switch springs CS1759 is actuated, thereby to interrupt the previously mentioned path for short-circuiting the upper winding of the wiper switching relay R1620; whereupon an obvious holding circuit for energizing in series the upper and lower windings of the wiper switching relay R1620 is completed. When the upper and lower windings of the wiper switching relay R1620 are thus energized this relay operates fully in order to transfer, at the contacts 1621 and 1622, a connection traced hereinafter from the wipers 1751 and 1752 of the storage register switch C1750 to the wiper 1753 of the storage register switch C1750, for a purpose more fully explained hereinafter.

Each time the step relay R1520 operates and restores it completes and then interrupts, at the contacts 1521, an obvious circuit for energizing the magnet CM1754, thereby to cause the wipers noted of the storage register switch C1750 to be driven one step in the clockwise direction; each time the code relay R1530 operates it completes, at the contacts 1531, a path for applying ground potential to the wipers 1751 and 1752 of the storage register switch C1750 or the wiper 1753 of the storage register switch C1750, depending upon the restored or fully operated position of the wiper switching relay R1620, in an obvious manner.

In view of the above description of the operation of the storage transfer switch U2500 in the register translator 60 and the storage register switch C1750 in the toll ticket repeater 80, it will be understood that each time the pulse relay R2040 operates it completes, at the contacts 2041, the previously traced circuit for energizing the magnet UM2505 and completes, at the contacts 2044, the previously traced path for applying either resistance or direct ground potential to the line conductor C472 of the trunk 470, thereby to cause operation of the step relay R1520; whereupon the step relay R1520 operates to complete, at the contacts 1521, the previously traced circuit for energizing the magnet CM1754. Hence, the magnets UM2505 and CM1754 are energized and deenergized in synchronism, thereby to cause the storage transfer switch U2500 in the register translator 60 and the storage register switch C1750 in the toll ticket repeater 80 to be operated in synchronism. Accordingly, it will be understood that the wipers noted of the storage transfer switch U2500 successively engage the WXYZ leads in the various groups of marking leads previously noted; while the wipers noted of the storage register switch C1750 successively engage the various WXYZ leads in the groups of marking leads extending to the code storage devices noted. Accordingly, the code markings corresponding to different digits appearing upon the WXYZ leads in the various groups of marking leads associated with the storage transfer switch U2500 are transferred to corresponding ones of the code storage devices associated with the storage register switch C1750.

By way of example, it is pointed out that the Y and Z leads in the group of marking leads 2240 are marked corresponding to the rate factor digit 6. Thus, when the wiper 2502 engages the home and first contacts in the associated contact bank, no ground potential on the W and X leads in the group of marking leads 2240 is encountered; on the other hand, when the wiper 2502 engages the second and third contacts in the associated contact bank, direct ground potential on the Y and Z leads in the group of marking leads 2240 is encountered. Accordingly, the register translator 60 transmits two resistance ground pulses and then two direct ground pulses over the line conductor C472 of the trunk 470 at this time. The two resistance ground impulses and the two direct ground impulses cause four complete operations of the step relay R1520, thereby to cause the wipers noted of the storage register switch C1750 to be driven four steps in the clockwise direction, in the manner previously explained; however, only the last two of the four impulses, the direct ground impulses, cause operation of the code relay R1530. Thus, the code relay R1530 is operated at this time when the wiper 1751 of the storage register switch C1750 engages the second and third contacts in the associated contact banks, thereby to complete circuits for energizing the Y and Z magnets in the code storage device S1701. The circuit for energizing the Y magnet in the code storage device S1701 extends from ground by way of the contacts 1531 and 1621, C1638, the wiper 1751 and engaged second contact in the associated contact bank, and the Y magnet to battery. The Y and Z magnets in the code storage device S1701 operate, thereby to mark with ground potential the Y and Z leads in the associated group of marking leads 1701 in accordance with the rate factor digit 6, in the manner previously explained.

At the conclusion of the cycle of operation of the storage transfer switch U2500 in the register translator 60 and the storage register switch C1750 in the toll ticket repeater 80, the various items of record information stored in the various registers in the register translator 60 have been transferred to the various code storage devices in the code storage unit SU1700 in the toll ticket repeater 80, and represent the following information, as indicated below:

all of the record information stored in the register translator 60 has been transferred to the various code storage devices in the code storage unit SU1700, in the manner previously explained. When the wiper 2501 of the storage transfer switch U2500 disengages the fifth contact and engages the sixth contact in the associated contact bank, the previously traced alternative circuit for energizing the upper and lower windings of the pulse relay R2040 is interrupted, thereby to arrest further operation of the pulse relay R2040 at this time.

After the eighth digit 1 dialed at the calling subscriber substation T1 and registered in the called party register H2420 in the register translator 60 has been transmitted therefrom to the toll ticket repeater 80, the wipers noted of the

| Register in Register Translator 60 Transferred From— | Code Storage Device in Toll Ticket Repeater 80 Transferred To— | Nature of Record Information |
|---|---|---|
| Rate and route switch R2210 | S1701 | The rate factor applicable to the toll call between the calling subscriber substation in exchange 1 zone 38 and the called subscriber substation in exchange 4 zone 62, the digit 6. |
| First code register A2300 | S1702 | The respective first, second and third digits of the code portion of the directory number of the called subscriber substation identifying the zone and exchange thereof, the digits 6, 2 and 4. |
| Second code register B2320 | S1703 | |
| Third code register C2330 | S1704 | |
| First numerical register D2350 | S1705 | The respective first, second, third and fourth digits of the numerical portion of the directory number of the called subscriber substation identifying the subscriber line terminal thereof, the digits 1, 2, 3 and 4. |
| Second numerical register E2360 | S1706 | |
| Third numerical register F2400 | S1707 | |
| Fourth numerical register G2410 | S1708 | |
| Called party register H2420 | S1709 | The suffix digit of the directory number of the called subscriber substation identifying the position of the called party subscriber substation on the associated subscriber line, the digit 1. |
| Calling party register J2430 | S1710 | The suffix digit of the directory number of the calling subscriber substation identifying the position of the calling party subscriber substation on the associated subscriber line, no digit being registered. |
| Code storage device S2541 | S1711 | The respective first, second, third and fourth digits of the numerical portion of the directory number of the calling subscriber substation identifying the subscriber line terminal thereof, the digits 2, 9, 2 and 1. |
| Cold storage device S2542 | S1712 | |
| Code storage device S2543 | S1713 | |
| Code storage device S2544 | S1714 | |

It is noted that the resistance ground and direct ground impulses transmitted by the pulse relay R2040 over the line conductor C472 of the trunk 470 are transmitted simultaneously with the transmission of impulses by the pulse relay R2020 over the line conductor C471 of the trunk 470. The impulses transmitted over the line conductor C472 of the trunk 470 constitute code digits corresponding to record information digits; while the impulses transmitted over the line conductor C471 of the trunk 470 constitute numerical digits corresponding to switch control digits. However, in view of the fact that the pulse relay R2040 operates considerably faster than the pulse relay R2020, the code digits are completely transmitted from the register translator 60 prior to the complete transmission of the numerical digits from the register translator 60.

It is pointed out that, after the wipers noted of the storage transfer switch U2500 in the register translator 60 have been driven one revolution in the clockwise direction, the wiper switching relay R2100 operates, as previously explained. Also, upon operating, the wiper switching relay R2100 completes, at the contacts 2107, an alternative circuit for energizing the upper and lower windings of the pulse relay R2040, this circuit extending from ground by way of the contacts 2107, C2141, the wiper 2501 of the storage transfer switch U2500 and engaged contact in the associated contact bank, C2145, the contacts 2105 and 2045 and the upper and lower windings of R2040 to battery. After the wipers noted of the storage transfer switch U2500 have been driven one complete revolution in the clockwise direction and six additional steps away from their home positions, digit sequence switch N2200 are driven an additional step in the counterclockwise direction; whereupon the wiper 2202 of the digit sequence switch N2200 engages the tenth contact in the associated contact bank, thereby to complete a further circuit for energizing the upper and lower windings of the pulse relay R2040. This circuit for energizing the upper and lower windings of the pulse relay R2040 extends from ground by way of the contacts 2107, C2141, the wiper 2501 and engaged sixth contact in the associated contact bank, C2255, the wiper 2202 of the digit sequence switch N2200 and engaged tenth contact in the associated contact bank, C1847, the contacts 2045 and the upper and lower windings of R2040 to battery. When this circuit is completed the pulse relay R2040 operates and restores, thereby to complete and interrupt, at the contacts 2044, the previously traced path for applying resistance ground potential to the line conductor C472 of the trunk 470, and to complete and interrupt, at the contacts 2041, the previously traced circuit for energizing the magnet UM2505, thereby to cause the wipers noted of the storage transfer switch U2500 to be driven an additional step in the clockwise direction; whereupon the wiper 2501 of the storage transfer switch U2500 engages the seventh contact in the associated contact bank, for a purpose more fully explained hereinafter.

When this additional resistance ground impulse is transmitted over the line conductor C472 of the trunk 470 the step relay R1520 again operates and restores, thereby to cause the wipers noted of the storage register switch C1750 to be driven an additional step in the clockwise direction; whereupon the wiper 1753 of the storage register switch C1750 engages the seventh contact in the associated contact bank. When the wiper 1753 of the storage register switch C1750 engages the seventh contact in the associated contact bank a circuit is completed for energizing the winding of the switching relay R1580, this circuit extending from the wiper 1753 of the storage register switch C1750 and engaged grounded seventh contact in the associated contact bank, C1647, the contacts 1622 and 1532 and the winding of R1580 to battery. When thus energized, the switching relay R1580 operates to complete, at the contacts 1583, an obvious holding circuit for energizing the winding thereof. Also, the switching relay R1580 completes, at the contacts 1581, an obvious operative connection between the line conductors C471 and C472 of the trunk 470 and the line conductors C1501 and C1502 of the toll line 1500; and completes, at the contacts 1584, an obvious direct bridge connection between the upper and lower windings of the impulse relay R1540 and the line conductors C471 and C472 of the trunk 470.

When the wiper 2501 of the storage transfer switch U2500 engages the seventh contact in the associated contact bank, an alternative circuit for energizing the upper winding of the release relay R2120 is completed, this circuit extending from ground by way of the contacts 2107, C2141, the wiper 2501 of the storage transfer switch U2500 and the engaged seventh contact in the associated contact bank, C2256, and the upper winding of R2120 to battery. When thus energized, the release relay R2120 operates to interrupt, at the contacts 2121, the previously traced circuit for energizing the winding of the switching relay R310 in the primary selector 50, thereby to cause the switching relay R310 to restore. Upon restoring, the switching relay R310 interrupts, at the contacts 310, the previously traced holding circuit for energizing the winding of the test relay R320 in series with the magnet BM387 of the register translator selector B380, thereby to cause the test relay R320 to restore. Upon restoring, the switching relay R310 completes, at the contacts 313 and 315, an operative connection substantially identical to that previously traced between the line conductors C351 and C352 of the subscriber line 350 extending to the calling subscriber substation T1 and the line conductors C471 and C472 of the trunk 470, thereby to complete a loop circuit between the calling subscriber substation T1 and the impulse relay R1540 in the toll ticket repeater 80, the upper and lower windings of the impulse relay R1540 being connected respectively to the line conductors C471 and C472 of the trunk 470, as previously noted. Accordingly, at this time, an operative connection is completed between the calling subscriber substation T1 and the toll line 1500; and therefrom by way of the automatic switching apparatus in exchange 1 zone 73, the exchange in zone 46, exchange 1 zone 62 and exchange 4 zone 62 to the subscriber line extending to the called subscriber substation.

Release of the register translator

Incident to the operation of the release relay R2120 in the register translator 60, the switching relay R310 and the test relay R320 in the primary selector 50 restore, as previously explained. Upon restoring, the test relay R320 interrupts, at the contacts 321 and 322, the previously traced series circuit for energizing the lower winding of the line relay R2000 and the winding of the impulse relay R1960. The impulse relay R1960 then restores; however, the line relay R2000 remains in its operated position due to the completed holding circuit for energizing the upper winding thereof at this time. Upon restoring, the impulse relay R1960 interrupts, at the contacts 1962, the previously mentioned circuit for energizing the winding of the hold relay R1900, thereby to cause the latter relay to restore shortly thereafter, the hold relay R1900 being of the slow-to-release type. Upon restoring, the hold relay R1900 interrupts, at the contacts 1901, the previously mentioned circuit for energizing the winding of the hold slave relay R1800, thereby to cause the latter relay to restore. Upon restoring, the hold slave relay R1800 interrupts, at the contacts 1804, the previously mentioned path for applying ground potential to the hold conductor C1839. When ground potential is removed from the hold conductor C1839, there are interrupted the holding circuit for energizing the upper winding of the stop relay R1810, the holding circuit for energizing the lower winding of the transfer relay R1820, the holding circuits for energizing the windings of the line relay R2000 and the cutoff relay R1840, the holding circuit for energizing in series the upper and lower windings of the wiper switching relay R2100, and the holding circuit for energizing the master magnet SM2531; whereupon the relays mentioned and the master magnet SM2531 restore. When the master magnet SM2531 restores, the operated and locked armatures of the various unit or WXYZ magnets in the code storage devices S2541 to S2544, inclusive, in the code storage unit SU2530 are returned to their normal positions.

Also, when the hold slave relay R1800 restores there is completed, at the contacts 1802, a chain circuit for effecting the release of the rate and route switch R2210, the composite code switch P2230, the digit sequence switch N2200, the storage transfer switch U2500, the sequence switch S2440, and the various registers in the register translator 60. More particularly, at this time, a circuit is completed for energizing in series the lower winding of the release relay R2120, the winding of the release slave relay R1860 and the magnet NM2205, this circuit extending from the grounded wiper 2521 of the impulse sender switch K2520 and the engaged home contact in the associated contact bank, C2146, the lower winding of R2120, C1840, the winding of R1860, the contacts 1802, C1841, the contacts 2208 of the set of switch springs NS2207, the contacts 2206 and the magnet NM2205 to battery. When this series circuit is completed the release relay R2120 is retained in its operated position, the release slave relay R1860 operates and the magnet NM2205 is operated intermittently. The operated release relay R2120 retains interrupted, at the contacts 2121, the previously traced path for applying battery potential by way of the resistor 1905 to the control conductor C396 of the trunk 390, thereby to mark the trunk 390 as busy to the register translator selector B380; whereupon the register translator 60 is marked as busy until it is completely released. Upon operating, the release slave relay R1860 interrupts, at the contacts 1861 and 1862, the previously traced original circuits for energizing respectively the rotary magnet PM2241 and the vertical magnet PM2240 of the composite code switch P2230, thereby to prevent energization of the magnets mentioned incident to the release of the third code register C2330 and the second code register B2320.

The intermittent operation of the magnet NM2205 is effective to drive the wipers noted of the digit sequence switch N2200 step by step in the counterclockwise direction back into their home positions, whereupon the set of switch springs NS2207 is actuated. More particularly, the set of switch springs NS2207 is actuated, thereby to interrupt, at the contacts 2208 thereof, the previously traced circuit for energizing the magnet NM2205 and to complete, at the contacts 2209 thereof, a circuit for energizing the rotary magnet RM2221 of the rate and route switch R2210. This circuit extends from the grounded conductor C1841 by way of the contacts 2209 of the set of switch springs NS2207, C1848, the contacts 2135, C1849, the contacts 2224 of the set of switch springs RS2223, the contacts 2222 and the rotary magnet RM2221 to battery. When this series circuit is completed the rotary magnet RM2221 operates intermittently, thereby to drive the wiper carriage of the Strowger mechanism in the rate and route switch R2210 step by step in the rotary direction until the wiper carriage is driven eleven steps away from its normal position; whereupon the wiper carriage of the Strowger mechanism in the rate and route switch R2210 is returned to its normal rotary and vertical positions.

When the rate and route switch R2210 is thus released the set of switch springs RS2223 is actuated, thereby to interrupt, at the contacts 2224 thereof, the previously traced circuit for energizing the rotary magnet RM2221, and to complete, at the contacts 2225 thereof, a circuit for energizing the rotary magnet PM2241 of the composite code switch P2230. This circuit extends from the grounded conductor C1849 by way of the contacts 2225 of the set of switch springs RS2223, C2246, the contacts 2244 of the set of switch springs PS2243, the contacts 2242 and the rotary magnet PM2241 to battery. When the rotary magnet PM2241 is thus energized it operates intermittently, thereby to drive the wiper carriage of the Strowger mechanism in the composite code switch P2230 step by step in the rotary direction until the wiper carriage is driven eleven steps in the rotary direction away from its normal position; whereupon the wiper carriage of the composite code switch P2230 is returned to its normal vertical and rotary positions.

When the composite code switch P2230 is thus released the set of switch springs PS2243 is actuated, thereby to interrupt, at the contacts 2244 thereof, the previously traced circuit for energizing the rotary magnet PM2241 and to complete, at the contacts 2245 thereof, a circuit for energizing the magnet HM2424. This circuit extends from the grounded conductor C2246 by way of the contacts 2245 of the set of switch springs PS2243, C2256, the contacts 2426 of the set of switch springs HS2426, the contacts 2425 and the magnet HM2424 to battery. When this series circuit is completed the magnet HM2424 operates intermittently, thereby to drive the wipers noted of the called party register H2420 step by step in the counterclockwise direction back into their home positions.

When the called party register H2420 is thus released the set of switch springs HS2426 is actuated, thereby to interrupt, at the contacts 2426 thereof, the previously traced circuit for energizing the magnet HM2424 and to complete, at the contacts 2427 thereof, a circuit for energizing the magnet GM2414. This circuit extends from the grounded conductor C2256 by way of the contacts 2427 of the set of switch springs HS2426, C2455, the contacts 2417 of the set of switch springs GS2416, the contacts 2415 and the magnet GM2414 to battery. When this series circuit is completed the magnet GM2414 operates intermittently, thereby to drive the wipers noted of the fourth numerical register G2410 step by step in the counterclockwise direction back into their home positions.

When the fourth numerical register G2410 is thus released the set of switch springs GS2416 is actuated, thereby to interrupt, at the contacts 2417 thereof, the previously traced circuit for energizing the magnet GM2414 and to complete, at the contacts 2418 thereof, a circuit for energizing the magnet FM2408. This circuit extends from the grounded conductor C2455 by way of the contacts 2418 of the set of switch springs GS2416, C2454, the contacts 2406 of the set of switch springs FS2404, the contacts 2409 and the magnet FM2408 to battery. When this series circuit is completed the magnet FM2408 operates intermittently, thereby to drive the wipers noted of the third numerical register F2400 step by step in the counterclockwise direction back into their home positions.

When the third numerical register F2400 is thus released, the set of switch springs FS2404 is actuated, thereby to interrupt, at the contacts 2406 thereof, the previously traced circuit for energizing the magnet FM2408 and to complete, at the contacts 2405 thereof, a circuit for energizing the magnet EM2364. This series circuit extends from the grounded conductor C2454 by way of the contacts 2405 of the set of switch springs FS2404, C2382, the contacts 2367 of the set of switch springs ES2366, the contacts 2365 and the magnet FM2364 to battery. When this series circuit is completed the magnet EM2364 operates intermittently, thereby to drive the wipers noted of the second numerical register E2360 step by step in the counterclockwise direction back into their home positions.

When the second numerical register E2360 is thus released the set of switch springs ES2366 is actuated, thereby to interrupt, at the contacts 2367 thereof, the previously traced circuit for energizing the magnet EM2364 and to complete, at the contacts 2368 thereof, a circuit for energizing the magnet DM2354. This series circuit extends from the grounded conductor C2382 by way of the contacts 2368 of the set of switch springs ES2366, C2378, the contacts 2358 of the set of switch springs DS2356, the contacts 2355 and the magnet DM2354 to battery. When this series circuit is completed the magnet DM2354 operates intermittently, thereby to drive the wipers noted of the first numerical register D2350 step by step in the counterclockwise direction back into their home positions.

When the first numerical register D2350 is thus released the set of switch springs DS2356 is actuated, thereby to interrupt, at the contacts 2358 thereof, the previously traced circuit for energizing the magnet DM2354 and to complete, at the contacts 2357 thereof, a circuit for energizing the magnet CM2335. This series circuit extends from the grounded conductor C2378 by way of the contacts 2357 of the set of switch springs DS2356, C2377, the contacts 2339 of the set of switch springs CS2338, the contacts 2336 and the magnet CM2335 to battery. When this series circuit is completed the magnet CM2335 operates intermittently, thereby to drive the wipers noted of the third code register C2330 step by step in the counterclockwise direction back into their home positions.

When the third code register C2330 is thus released the set of switch springs CS2338 is actuated, thereby to interrupt, at the contacts 2339 thereof, the previously traced circuit for energizing the magnet CM2335 and to complete, at the contacts 2340 thereof, a circuit for energizing the magnet BM2323. This series circuit extends from the grounded conductor C2377 by way of the contacts 2340 of the set of switch springs CS2338, C2390, the contacts 2326 of the set of switch springs BS2326, the contacts 2325 and the magnet BM2323 to battery. When this series circuit is completed the magnet BM2323 operates intermittently, thereby to drive the wipers noted of the second code register B2320 step by step in the counterclockwise direction back into their home positions.

When the second code register B2320 is thus released the set of switch springs BS2326 is actuated, thereby to interrupt, at the contacts 2328 thereof, the previously traced circuit for energizing the magnet BM2323 and to complete, at the contacts 2327 thereof, a circuit for energizing the magnet AM2305. This series circuit extends from the grounded conductor C2390 by way of the contacts 2327 of the set of switch springs BS2326, C2391, the contacts 2307 of the set of switch springs AS2306, the contacts 2306 and the magnet AM2305 to battery. When this series circuit is completed the magnet AM2305 operates intermittently, thereby to drive the wipers noted of the first code register A2300 step by step in the counterclockwise direction back into their home positions.

When the first code register A2300 is thus released the set of switch springs AS2306 is actuated, thereby to interrupt, at the contacts 2307 thereof, the previously traced circuit for energizing the magnet AM2305 and to complete, at the contacts 2308 thereof, a circuit for energizing the magnet UM2505. This series circuit extends from the grounded conductor C2391 by way of the contacts 2308 of the set of switch springs AS2306, C2371, the contacts 2508 of the set of switch springs US2507, the contacts 2506 and the magnet UM2505 to battery. When this series circuit is completed the magnet UM2505 operates intermittently, thereby to drive the wipers noted of the storage transfer switch U2500 step by step in the clockwise direction back into their home positions.

When the storage transfer switch U2500 is thus released the set of switch springs US2507 is actuated, thereby to interrupt, at the contacts 2508 thereof, the previously traced circuit for energizing the magnet UM2505, and to complete, at the contacts 2509 thereof, a circuit for energizing the magnet JM2433, in the event the calling party register J2430 is operated. In the present instance, the calling party register J2430 is not operated. Accordingly, at the contacts 2509 of the set of switch springs US2507, there is completed a circuit for energizing the magnet SM2444, this circuit extending from the grounded conductor C2371 by way of the contacts 2509 of the set of switch springs US2507, C2459, the contacts 2438 of the set of switch springs JS2435, C2460, the contacts 2447 of the set of switch springs SS2446, the contacts 2445 and the magnet SM2444 to battery. When this series circuit is completed the magnet SM2444 operates intermittently, thereby to drive the wipers noted of the sequence switch S2440 step by step in the counterclockwise direction back into their home positions.

When the sequence switch S2440 is thus released the set of switch springs SS2446 is actuated, thereby to interrupt, at the contacts 2447 thereof, the previously traced circuit for energizing the magnet SM2444. When this series circuit is interrupted, the winding of the release slave relay R1860 and the lower winding of the release relay R2120 are deenergized, thereby to cause the latter relays to restore shortly thereafter, these relays being of the slow-to-release type, in order to prevent release thereof incident to transfer of the previously traced series circuit from one register to the other, in the manner previously explained. Upon restoring, the release slave relay R1860 reprepares, at the contacts 1861 and 1862, the previously traced original circuits for energizing the rotary magnet PM2241 and the vertical magnet PM2240 of the composite code switch P2230. Upon restoring, the release relay R2120 recompletes, at the contacts 2121, the previously traced path for applying battery potential by way of the resistor 1905 to the control conductor C396 of the trunk 390, thereby to mark the trunk 390 and, consequently, the register translator 60 as idle to the register translator selectors having access thereto. At this time, the register translator 60 is completely released and available for further use.

*Additional operation of the toll ticket repeater*

Again considering the operation of the toll ticket repeater 80, a connection has been established between the calling subscriber substation T1 and the subscriber line extending to the called subscriber substation; and a loop circuit is completed between the calling subscriber substation T1 and the impulse relay R1540 in the toll ticket repeater 80, as previously noted. Shortly following this operation of the toll ticket repeater 80, the shunt relay R1550 restores, thereby to interrupt, at the contacts 1551, the previously mentioned path for short-circuiting in series the impedance 1505 and the left-hand winding of the answer relay R1560, and to recomplete a bridge connection between the impedance 1505 and the left-hand winding of the answer relay R1560 and the line conductors C1501 and C1502 of the toll line 1500, this bridge connection extending from the line conductor C1501 of the toll line 1500 by way of the contacts 1541, the impedance 1505 and the left-hand winding of R1560 to the line conductor C1502 of the toll line 1500.

In the event the called subscriber substation is busy at this time, busy tone current is returned from the automatic switching apparatus in exchange 4 zone 62 over the previously traced connection to the toll line 1500; and therefrom by way of the primary selector 50, the line switch 40 and the subscriber line 350 to the calling subscriber substation T1, thereby to indicate that the called subscriber substation is busy, in accordance with conventional practice. On the other hand, in the event the called subscriber substation is idle at this time, ringing current is projected over the subscriber line extending thereto and ring-back tone current is returned over the previously traced connection to the calling subscriber substation T1, thereby to operate the ringer at the called subscriber substation and to give the subscriber at the calling subscriber substation T1 supervision. It is noted that the ringing current projected over the subscriber line extending to the called subscriber substation in exchange 4 zone 62 is coded in view of the fact that the called subscriber substation is of the party type, as previously noted.

When the subscriber at the called subscriber substation in exchange 4 zone 62 answers the call extending thereto, an operative communication connection is completed between the calling subscriber substation T1 in exchange 1 zone 36 and the called subscriber substation in exchange 4 zone 62. Also, at this time, ground and battery potentials are respectively applied to the line conductors C1502 and C1501 of the toll line 1500 in the automatic switching apparatus in exchange 4 zone 62, thereby to complete an obvious circuit for energizing the left-hand winding of the answer relay R1560. When the left-hand winding of the answer relay R1560 is thus energized, the right-hand winding thereof having been previously energized, this relay operates to complete, at the contacts 1561, a circuit for energizing the magnet SM1766. This circuit extends from the grounded wiper 1765 of the storage transfer switch S1760 and the engaged home contact in the associated contact bank, by way of C1629, the contacts 1582 and 1561, C1626, the contacts 1767 and the magnet SM1766 to battery. When thus energized, the magnet SM1766 operates and then restores, thereby to drive the wipers noted of the storage transfer switch S1760 one step in the counterclockwise direction; whereupon the wiper 1765 thereof disengages the home contact and engages the first contact in the associated contact bank, thereby to interrupt the previously traced circuit for energizing the magnet SM1766 and to prepare a circuit for energizing the time pulse relay R1660. The circuit for energizing the time pulse relay R1660 extends from the grounded wiper 1765 of the storage transfer switch S1760 and the engaged first contact in the associated contact bank, by way of C1629, the contacts 1612 and 1651, and the winding of R1660 to the time pulse conductor C1688. It is noted that a timing mechanism, not shown, is associated with the time pulse conductor C1688 which is operated to cause battery pulses to be applied to the time pulse conductor C1688 at a rate of twelve impulses per minute. Accordingly, the time pulse relay R1660 is operated intermittently at this time at a rate of twelve operations and restorations per minute.

Each time the time pulse relay R1660 operates and restores it completes and interrupts, at the contacts 1662, an obvious circuit for energizing the magnet TM1682, thereby to cause the magnet TM1682 to operate and restore in order to drive the wiper 1681 of the timer switch T1680 one step in the counterclockwise direction. Hence, the timer switch T1680 is operated twelve steps each minute. After the wiper 1681 of the timer switch T1680 has been moved three steps away from its home position into engagement with the third contact in the associated contact bank, corresponding to an elapse of approximately fifteen seconds, a circuit is completed for energizing the magnet UM1734. This circuit extends from the grounded wiper 1681 of the timer switch T1680 and the engaged third contact in the associated contact bank, by way of C1648, the wiper 1733 of the unit register U1730 and engaged home contact in the associated contact bank, the contacts 1735 and the magnet UM1734 to battery. When energized over the above-traced circuit, the magnet UM1734 operates and then restores, thereby to drive the wipers noted of the unit register U1730 one step in the counterclockwise direction; whereupon the wiper 1733 thereof disengages the home contact and engages the first contact in the associated contact bank, whereupon the previously traced circuit for energizing the magnet UM1734 is interrupted. Also, when the wipers noted of the unit register U1730 are moved away from their home positions, the set of switch springs US1736 is actuated. At this time, the wipers 1731 and 1732 of the unit register U1730 engage the first contacts in the associated contact banks, thereby to apply ground potential to the W and Z leads in the group of marking leads 1716. At this point, it is noted that the marked W and Z leads in the group of marking leads 1716 correspond in code to the digit 3 in view of the fact that the minimum charge time is three minutes.

The timer switch T1680 continues to operate as previously explained and, at the conclusion of the first minute, the wiper 1681 thereof engages the fifteenth contact in the associated contact bank, thereby to complete an obvious circuit for energizing the lower winding of the time absorbing relay R1670. When energized over the above-traced circuit the time absorbing relay R1670 operates partially, thereby to complete, at the contacts 1674, an obvious path for short-circuiting the upper winding thereof by way of the hold conductor C1636. When the wiper 1681 of the timer switch T1680 disengages the fifteenth contact in the associated contact bank, the previously mentioned path for short-circuiting the upper winding of the time absorbing relay R1670 is interrupted; whereupon an obvious holding circuit for energizing in series the upper and lower windings of the time absorbing relay R1670 is completed. When this holding circuit for energizing in series the upper and lower windings of the time absorbing relay R1670 is completed, the time absorbing relay R1670 operates fully, thereby to prepare, at the contacts 1675, an alternative circuit traced hereinafter for energizing the magnet UN1734.

The timer switch T1680 continues to operate until the wiper 1681 thereof engages the twenty-fourth contact in the associated contact bank. An alternative circuit for energizing the magnet TM1682 is completed, this circuit extending from the grounded wiper 1681 of the timer switch T1680 and the engaged twenty-fourth contact in the associated contact bank, by way of the contact 1683 and the magnet TM1682 to battery. When thus energized, the magnet TM1682 operates and restores, thereby to drive the wiper 1681 of the timer switch T1680 an additional step in the counterclockwise direction back into its home position; whereupon the previously traced alternative circuit for energizing the magnet TM1682 is interrupted.

At the conclusion of the second minute, the wiper 1681 of the timer switch T1680 engages the third contact in the associated contact bank, thereby to prepare the previously traced circuit for energizing the magnet UM1734, this circuit being uncompleted at this time as the wiper 1733 of the unit register U1730 now engages the first contact in the associated contact bank. At the conclusion of the third minute, the wiper 1681 of the timer switch T1680 reengages the fifteenth contact in the associated contact bank; whereupon an alternative circuit is completed for energizing the magnet UM1734, this circuit extending from the grounded wiper 1681 of the timer switch T1680 and the engaged fifteenth contact in the associated contact bank, by way of the contacts 1675, the wiper 1633 of the unit register U1730 and the engaged first contact in the associated contact bank, the contacts 1735 and the magnet UM1734 to battery. The magnet UM1734 then operates and restores, thereby to drive the wipers noted of the unit register U1730 an additional step in the counterclockwise direction. Accordingly, at the beginning of the fourth minute, the wipers noted of the unit register U1730 engage the second contacts in the associated contact bank.

The timer switch T1680 continues to operate, and, when the wiper 1681 reengages the third contact in the associated contact bank, the previously traced circuit for energizing the magnet UM1734 is completed; whereupon the magnet UM1734 operates and restores, thereby to drive the wipers noted of the unit register U1730 an additional step in the counterclockwise direction into engagement with the third contacts in the associated contact bank.

Thenceforth, each time the wiper 1681 of the timer switch T1680 engages the third and fifteenth contacts in the associated contact bank, the magnet UM1734 operates and restores, thereby to drive the wipers noted of the unit register U1730 an additional step in the counterclockwise direction. After an elapse of eight minutes, the wiper 1732 of the unit register U1730 engages the seventh contact in the associated contact bank, thereby to prepare a circuit traced hereinafter for energizing the magnet DM1744. After an elapse of nine minutes, the magnet UM1734 operates to complete, at the contacts 1734, the previously mentioned circuit for energizing the magnet DM1744, this circuit extending from the grounded wiper 1732 of the unit register U1730 and the engaged seventh contact in the associated contact bank, C1647, the contacts 1734 and the magnet DM1744 to battery. When thus energized, the magnet DM1744 operates, thereby to condition the wipers noted of the ten register D1740 to be driven one step in the counterclockwise direction. The magnet UM1734 then restores, thereby to drive the wipers noted of the unit register U1730 an additional step in the counterclockwise direction into engagement with the eighth contacts in the associated contact banks and to interrupt the previously traced circuit for energizing the magnet DM1744. The magnet DM1744 then restores, thereby to drive the wipers noted of the ten register D1740 one step in the counterclockwise direction into engagement with the first contacts in the associated contact banks. Accordingly, after an elapse of nine minutes, the wipers 1741 and 1742 of the ten register D1740 engage the first contacts in the associated contact banks, thereby to mark the W and X leads in the associated group of marking leads 1715 in accordance with the code digit 1; while the wiper 1731 of the unit register U1730 engages the eighth contact in the associated contact bank, thereby to mark the Z lead in the associated group of marking leads 1716 in accordance with the code digit 0.

In view of the foregoing description, it will be understood that the unit register U1730 operates step by step each minute to register the unit minutes of the duration of the established connection between the calling subscriber substation T1 in exchange 1 zone 38 and the called subscriber substation in exchange 4 zone 62; while the ten register D1740 operates step by step each ten minutes to register the ten minutes of the duration of the esablished connection mentioned. Thus, it will be understood that at any minute there are marked in code upon the WXYZ leads in the groups of marking leads 1716 and 1715, respectively, the unit and ten minutes of the duration of the established connection between the calling subscriber substation T1 in exchange 1 zone 38 and the called subscriber substation in exchange 4 zone 62.

It is noted that the ten register D1740 and the unit register U1730 have an ultimate capacity of registering ninety-eight minutes; whereupon the wiper 1732 of the unit register U1730 engages the seventh contact in the associated contact bank and the wiper 1743 of the ten register D1740 engages the ninth contact in the associated contact bank, thereby to complete a circuit for energizing the winding of the alarm relay R1650. The last-mentioned circuit extends from the grounded wiper 1732 of the unit register U1730 and the engaged seventh contact in the associated contact bank by way of C1647, the winding of R1650, the contacts 1672, the wiper 1743 of the ten register D1740 and engaged ninth contact in the associated contact bank, the contacts 1745 and the magnet DM1744 to battery. When this series circuit is completed the alarm relay R1650 operates to interrupt, at the contacts 1651, the previously traced circuit for energizing the winding of the time pulse relay R1660, thereby to prevent further operation of the time pulse relay R1660. Also, the alarm relay R1650 completes, at the contacts 1652, an obvious path for applying ground potential to the alarm conductor C1687, thereby to cause, after a predetermined time interval, an alarm device in exchange 1 zone 38 to be operated in order to indicate to the exchange attendant that an established connection, including the toll ticket repeater 80, has been maintained for a time interval greater than ninety-eight minutes.

Reversal of charges on a toll call

As previously noted, the charge for a toll call is normally assessed against the calling subscriber substation; however, facility is provided for assessing the charge for the toll call against the called subscriber substation, thereby effecting a reversal of charges for the toll connection. Assuming that the charges for the toll call extending between the calling subscriber substation T1 in exchange 1 zone 38 and the called subscriber substation in exchange 4 zone 62 are to be reversed and assessed against the called subscriber substation in exchange 4 zone 62, this may be accomplished under the control of the subscriber at the called subscriber substation in exchange 4 zone 62. More particularly, after the connection has been established between the calling subscriber substation T1 in exchange 1 zone 38 and the called subscriber substation in exchange 4 zone 62, the subscriber at the calling subscriber substation requests the subscriber at the called subscriber substation to accept the assessment of the charges for the toll call. In the event the subscriber at the called subscriber substation in exchange 4 zone 62 agrees to accept the assessment of the charges for the toll call, he signifies his acceptance by dialing the digit 0 without either the subscriber at the calling subscriber substation T1 in exchange 1 zone 38 or the subscriber at the called subscriber substation in exchange 4 zone 62 replacing the receiver of the telephone instrument thereat upon its associated switchhook.

At this time, when the subscriber at the called subscriber substation in exchange 4 zone 62 dials the digit 0, ten impulses are transmitted over the toll line 1500 to the toll ticket repeater 80 in order to effect intermittent energization and deenergization of the left-hand winding of the answer relay R1560. In other words, the answer relay R1560 follows the impulses of the digit 0 dialed at the called subscriber substation in exchange 4 zone 62.

Upon restoring, the answer relay R1560 completes, at the contacts 1565, a circuit for energizing the winding of the reverse charge relay R1510, this circuit extending from the grounded wiper 1765 of the storage transfer switch S1760 and the engaged first contact in the associated contact bank by way of C1629, the contacts 1565, 1617 and 1573 and the winding of R1510 to battery. When thus energized, the reverse charge relay R1510 operates to prepare, at the contacts 1512, a circuit traced hereinafter for energizing the magnet PM1592. Upon operating, the answer relay R1560 interrupts, at the contacts 1565, the previously traced circuit for energizing the winding of the reverse charge relay R1510; however, the latter relay being of the slow-to-release type does not restore during impulsing. Also, upon operating, the answer relay R1560 completes, at the contacts 1564, the previously mentioned circuit for energizing the magnet PM1592, this circuit extending from the grounded wiper 1565 of the storage transfer switch S1760 and engaged first contact in the associated contact bank by way of C1629, the contacts 1564 and 1512 and the magnet PM1592 to battery. Thus, the intermittent operation of the answer relay R1560 causes intermittent operation of the magnet PM1592; whereupon the wiper 1591 of the reverse charge switch P1590 is driven step by step in the counterclockwise direction ten steps away from its home position. At the conclusion of the digit 0, the answer relay R1560 reoperates, thereby to interrupt, at the contacts 1565, the previously traced circuit for energizing the winding of the reverse charge relay R1510 in order to cause the latter relay to restore shortly thereafter. Further, it is noted that, while the digit 0 is being received by the toll ticket repeater 80, the reverse charge relay R1510 occupies its operated position, thereby to retain interrupted, at the contacts 1511, the previously traced connection between the calling subscriber substation T1 in exchange 1 zone 38 and the called subscriber substation in exchange 4 zone 62 in order to prevent the digit 0 dialed at the called subscriber substation in exchange 4 zone 62 from being transmitted over the subscriber line 350 extending to the calling subscriber substation T1 in exchange 1 zone 38, and the consequent operation of the receiver of the telephone instrument thereat.

Upon restoring, the reverse charge relay R1510 recompletes, at the contacts 1511, the previously traced connection between the calling subscriber substation T1 in exchange 1 zone 38 and the called subscriber substation in exchange 4 zone 62, and completes, at the contacts 1513, an obvious path for applying ground potential to the Z marking lead 1717 for a purpose more fully explained hereinafter.

At this point, it is noted that, in the event the subscriber at the called subscriber substation in exchange 4 zone 62 dials any digit other than 0 at this time, the reverse charge switch P1590 will be operated in accordance therewith; however, the wiper 1591 of the reverse charge switch P1590 will engage some contact in the associated contact bank other than the tenth contact. In this event, when the reverse charge relay R1510 restores it completes, at the contacts 1513, a circuit for energizing the winding of the reset relay R1570, this circuit extending from ground by way of the contacts 1606 and 1513, the wiper 1591 of the reverse charge switch P1590 and the engaged contact in the associated contact bank and the winding of R1570 to battery. When thus energized, the reset relay R1570 operates to interrupt, at the contacts 1572, the connection between the tenth contact in the contact bank associated with the wiper 1591 of the reverse charge switch P1590 and the Z marking conductor 1717, and to complete, at the contacts 1571, an alternative circuit for energizing the magnet PM1592, this circuit extending from ground by way of the contacts 1606 and 1513, the wiper 1591 of the reverse charge switch P1590 and the engaged contact in the associated contact bank, the contacts 1571 and 1592 and the magnet PM1592 to battery. When thus energized, the magnet PM1592 operates intermittently, thereby to drive the wiper 1591 of the reverse charge switch P1590 step by step in the counterclockwise direction back into its home position; whereupon the previously traced circuit for energizing the winding of the reset relay R1570 and the previously traced circuit for energizing the magnet PM1592 are interrupted in order to cause the reset relay R1570 to restore, and further operation of the reverse charge switch P1590 to be arrested. It will be understood that, in this event, the wiper 1591 of the reverse charge switch P1590 is returned to its home position and the charge for the toll call will be assessed against the calling subscriber substation and not against the called subscriber substation.

*Initial operation of the printer controller*

In the present example, assuming that the established connection between the calling subscriber substation T1 in exchange 1 zone 38 and the called subscriber substation in exchange 4 zone 62 is maintained for thirty-two minutes and that, after the elapse of thirty-two minutes the subscriber at the calling subscriber substation T1 in exchange 1 zone 38 replaces the receiver of the telephone instrument thereat upon its associated switchhook, when this is done the previously traced circuit for energizing in series the upper and lower windings of the impulse relay R1540 in the toll ticket repeater 80 is interrupted, thereby to cause the impulse relay R1540 to restore. Upon restoring, the impulse relay R1540 interrupts, at the contacts 1541, the previously traced bridge connection between the left-hand winding of the answer relay R1560 and the line conductors C1501 and C1502 of the toll line 1500, thereby to cause the answer relay R1560 to restore and the automatic switching apparatus in exchange 4 zone 62 to be released. When the automatic switching apparatus in exchange 4 zone 62 is released, the subscriber line extending to the called subscriber substation in exchange 4 zone 62 is marked as idle to the connector switches having access thereto, assuming that the subscriber at the called subscriber substation has replaced the receiver of the telephone instrument thereat upon its associated switchhook at this time.

Also, the impulse relay R1540 interrupts, at the contacts 1543, the previously mentioned circuit for energizing the winding of the hold relay R1610, thereby to cause the latter relay to restore shortly thereafter, the hold relay R1610 being of the slow-to-release type. Upon restoring, the hold relay R1610 interrupts, at the contacts 1614, the previously traced holding circuit for energizing the winding of the switching relay R1580, thereby to cause the latter relay to restore, and interrupts, at the contacts 1612, the previously traced circuit for energizing the winding of the time pulse relay R1660, thereby to cause the latter relay to restore. Also, the hold relay R1610 completes, at the contacts 1616, an alternative circuit for energizing the winding of the hold slave relay R1600, thereby to retain the latter relay in its operated position at this time. The alternative circuit for energizing the winding of the hold slave relay R1600 extends from the grounded wiper 1765 of the storage transfer switch S1760 and the engaged first contact in the associated contact bank by way of C1629, the set of switch springs CS1758, C1649, the contacts 1605 and 1616 and the winding of R1600 to battery. Further, the hold relay R1610 completes, at the contacts 1613, an obvious circuit for energizing the upper winding of the busy relay R1640, thereby to cause the latter relay to operate. Further, the hold relay R1610 interrupts, at the contacts 1618, the previously mentioned path for applying ground potential to the control conductor C473 of the trunk 470, thereby to interrupt the previously traced circuit for energizing the winding of the switching relay R430 in series with the rotary step relay R450 in the primary selector 50, thereby to cause the switching relay R430 to restore and interrupt, at the contacts 436, the previously traced path for applying ground potential to the control conductor C363 of the trunk 360. When the switching relay R430 restores the primary selector 50 is released; and when ground potential is removed from the control conductor C363 of the trunk 360 the line switch 40 is released, in the manner previously explained. At this time, the subscriber line 350 extending to the calling subscriber substation T1 is marked as idle to the connector switches having access thereto.

Upon operating, the busy relay R1640 in the toll ticket repeater 80 completes, at the contacts 1644, an alternative path for applying ground potential to the control conductor C473 of the trunk 470, thereby to mark the trunk 470 and, consequently, the toll ticket repeater 80 as busy to the primary selectors having access thereto. The last-mentioned path extends from ground by way of the contacts 1552, 1644 and 1619 to the control conductor C473 of the trunk 470. Also, the busy relay R1640 completes, at the contacts 1643, an obvious path for applying ground potential to the alarm conductor C1687, thereby to cause an alarm to be operated after a predetermined time interval, in the event the busy relay R1640 remains in its operated position the predetermined time interval indicating improper release of the toll ticket repeater 80 to the exchange attendant. Further, the busy relay R1640 completes, at the contacts 1641, an obvious path for applying ground potential to the start conductor C1607 and completes, at the contacts 1642, an obvious path for applying battery potential by way of the winding of the test relay R1630 to the test conductor C1609. The application of ground potential to the start conductor C1607 completes an obvious circuit for energizing the winding of the start relay R606 of the printer controller allotter 86, thereby to cause operation thereof. When the start relay R606 in the printer controller allotter 86 is thus operated, operation of the finder switch A635 in the printer controller allotter 86 is initiated, whereupon the finder switch A635 operates to find an idle printer controller. More particularly, the wiper 636 of the finder switch A635 is driven step by step in the clockwise direction until it engages a contact in the associated contact bank terminating a start conductor extending to one of the printer controllers having resistance ground potential connected thereto by way of the winding of the start relay in the printer controller. Assuming that the printer controller 85 is the first idle printer controller in the group, when the wiper 636 of the finder switch A635 engages the contact in the associated contact bank terminating the start conductor C606 having ground potential applied thereto by way of the winding of the start relay R600, further operation of the finder switch A635 is arrested and an obvious circuit is completed for energizing the winding of the start relay R600, thereby to cause the latter relay to operate.

Upon operating, the start relay R600 completes, at the contacts 601, an obvious circuit for energizing the magnet FM657, thereby to cause the magnet FM657 to operate intermittently in order to drive the wipers noted of the finder switch F650 step by step in the counterclockwise direction. The wipers noted of the finder switch F650 are driven step by step in the counterclockwise direction until the wiper 652 thereof engages the contact in the associated contact bank terminating the test conductor C1609, whereupon a circuit is completed for energizing the winding of the test relay R1630 in the toll ticket repeater 80 in series with the lower winding of the test relay R610 in the printer controller 85, this circuit extending from ground by way of the lower winding of R610, the contacts 604, the wiper 652 of the finder switch F650 and engaged contact in the associated contact bank, the test conductor C1609, the contacts 1642 and the winding of R1630 to battery. When this series circuit is completed the test relay R1630 and the test relay R610 operate. Upon operating, the test relay R1630 interrupts, at the contacts 1631, the previously mentioned path for applying ground potential to the start conductor C1607, thereby to interrupt the previously mentioned circuit for energizing the winding of the start relay R606 in the printer controller allotter 86 in order to cause the latter relay to restore and release the printer controller allotter 86. Also, the test relay R1630 completes, at the contacts 1632, an obvious holding circuit for energizing the winding thereof and prepares, at the contacts 1633, a circuit traced hereinafter for energizing the magnet SM1766 in order to cause the wipers noted of the storage transfer switch S1760 to be driven step by step in the counterclockwise direction, in a manner more fully explained hereinafter.

Upon operating, the test relay R610 completes, at the contacts 618, an obvious circuit for energizing the master magnet SM801 of the code storage unit SU800, thereby to cause the master magnet SM801 to operate. Upon operating, the master magnet SM801 completes, at the contacts 802, an obvious holding circuit for energizing the master magnet SM801 and to condition the armatures of the WXYZ or unit magnets in the various code storage devices S801 to S825, inclusive, to be operated in the manner previously explained. Also, the test relay R610 completes, at the contacts 618, an obvious circuit for energizing the winding of the guard relay R830, thereby to cause the latter relay to operate. Upon operating, the guard relay R830 completes, at the contacts 831, an obvious path for applying ground potential to the guard conductor C840 extending to the date and time unit 100. This application of ground potential to the guard conductor C840 prevents the date and time unit 100 from operating to change the markings upon the groups of marking leads 850 to 857, inclusive, during the short interval of time the guard relay R830 occupies its operated position. Also, the guard relay R830 completes, at the contacts 832, etc., obvious connections between the WXYZ leads in the groups of marking leads 850 to 857, inclusive, and the code storage devices 818 to 825, inclusive, respectively, in the code storage unit SU800. At this time, it is noted that the date and time unit 100 marks, by way of the group of marking leads 850, the ten digit of the day of the month, and marks, by way of the group of marking leads 851, the unit digit of the day of the month; further, the date and time unit marks, by way of the group of marking leads 852, the ten digit of the month of the year, and marks, by way of the group of marking leads 853, the unit digit of the month of the year; further, the date and time unit 100 marks, by way of the group of marking leads 854, the ten digit of the hour of the day, and marks, by way of the group of marking leads 855, the unit digit of the hour of the day; and, finally, the date and time unit 100 marks, by way of the group of marking leads 856, the ten digit of the minute of the hour, and marks, by way of the group of marking leads 857, the unit digit of the minute of the hour. Accordingly, at this time, there is stored in code in the code storage devices S818 and S819 the information concerning the day of the month; there is stored in code in the code storage devices S820 and S821 the information concerning the month of the year; there is stored in code in the code storage devices S822 and S823 the information concerning the hour of the day; and, finally, there is stored in code in the code storage devices S824 and S825 the information concerning the minute of the hour.

Also, upon operating, the test relay R610 completes, at the contacts 611, an obvious path for short-circuiting the winding of the start relay R600, thereby to render the start relay R600 slightly slow to release. Also, the test relay R610 completes, at the contacts 611, an obvious path for applying direct ground potential to the start conductor C606, thereby to mark the printer controller 85 as busy to the finder switch A635 in the printer controller allotter 86. Further, the test relay R610 completes, at the contacts 615, a circuit for energizing the magnet SM666, this circuit extending from the grounded wiper 661 of the storage register switch S660 and the engaged home contact in the associated contact bank by way of the contacts 602, 615 and 667 and the magnet SM666 to battery. When thus energized, the magnet SM666 operates and then restores, thereby to drive the wipers noted of the storage register switch S660 one step in the clockwise direction; whereupon the wiper 661 of the storage register switch S660 disengages the home contact in the associated contact bank in order to interrupt the previously traced circuit for energizing the magnet SM666. When the wipers noted of the storage register switch S660 are driven away from their home positions, the sets of switch springs SS668 and SS669 are actuated, the set of switch springs SS669 being operated into engagement in order to complete an obvious holding circuit for energizing the upper winding of the test relay R610.

Further, the test relay R610 completes, at the contacts 613, an obvious circuit for energizing in multiple the upper and lower windings of the pulse relay R630, thereby to cause the pulse relay R630 to operate intermittently. It is noted that the upper winding of the pulse relay R630 includes an adjustable condenser 634 rendering the rate of operation of the pulse relay R630 adjustable. The pulse relay R630 operates exceedingly fast of the order of twenty operations and restorations per second. Each time the pulse relay R630 operates and restores it completes and interrupts, at the contacts 632, the previously mentioned circuit for energizing the magnet SM1766, and completes and interrupts, at the contacts 633, an obvious circuit for energizing the magnet SM666; thereby to cause the magnets SM1766 and SM666 to operate and restore; whereby the wipers noted of the storage transfer switch S1760 in the toll ticket repeater 80 are driven step by step in the counterclockwise direction, and the wipers noted of the storage register switch S660 in the printer controller 85 are driven step by step in the clockwise direction. Accordingly, the wipers noted of the storage transfer switch S1760 in the toll ticket repeater 80 and the wipers noted of the storage register switch S660 in the printer controller 85 are driven synchronously. The previously mentioned circuit for energizing the magnet SM1766 extends from ground by way of the contacts 632, the wiper 651 of the finder switch F650 and engaged contact in the associated contact bank, the pulse conductor C1608, the contacts 1633, C1627 and the magnet SM1766 to battery.

The synchronous operation of the storage transfer switch S1760 in the toll ticket repeater 80 and the storage register switch S660 in the printer controller 85 is effective to transfer the items of record information stored in the code storage devices S1701 to S1714, inclusive, in the code storage unit SU1700, and the items of record information stored on the WXYZ leads in the groups of marking leads 1715 and 1716 and the item of record information stored on the Z marking lead 1717, all in the toll ticket repeater 80, to the code storage devices S801 to S817, inclusive, in the storage unit SU800 in the printer controller 85. By way of example, it is noted that the rate factor digit 6 is stored in the code storage device S1701 in the code storage unit SU1700 in the toll ticket repeater 80, thereby to cause ground potential to be applied to the Y and Z leads in the group of marking leads 1701. The rate factor digit 6 stored in the code storage device S1701 in the code storage unit SU1700 is transferred to the code storage device S801 in the code storage unit SU800. Accordingly, when the wipers 662, 663, 664 and 665 engage the first contacts in the associated contact banks, while the wipers 1761, 1762, 1763 and 1764 of the storage transfer switch S1760 engage the first contacts in the associated contact banks, obvious circuits are completed by way of the Y and Z leads in the group of marking leads 1701 extending to the code storage device S1701 in the code storage unit SU1700 for energizing the Y and Z magnets in the code storage device S801 in the code storage unit SU800. Thus, it will be readily appreciated that the rate factor digit 6 is transferred from the code storage device S1701 in the code storage unit SU1700 in the toll ticket repeater 80 to the code storage device S801 in the code storage unit SU800 in the printer controller 85.

At the conclusion of the cycle of operation of the storage transfer switch S1760 in the toll ticket repeater 80 and the storage register switch S660 in the printer controller 85, the various items of record information stored in the various registers in the toll ticket repeater 80 have been transferred to the various code storage devices in the code storage unit SU800 in the printer controller 85, and represent the following information, as indicated below:

contact banks, thereby to cause the last item of record information registered in the toll ticket repeater 80 to be transferred to the code storage unit SU800 in the printer controller 85, the toll ticket repeater 80 is released. More particularly, when the wiper 1765 of the storage transfer switch S1760 disengages the sixteenth contact in the associated contact bank, the previously traced holding circuit for energizing the winding of the hold slave relay R1600 is interrupted, thereby to cause the latter relay to restore. Upon restoring, the hold slave relay R1600 interrupts, at the contacts 1604, the previously mentioned path for applying ground potential to the hold conductor C1636, thereby to interrupt

| Register in Toll Ticket Repeater 80 Transferred From— | Code Storage Device in Printer Controller 85 Transferred to— | Nature of Record Information |
|---|---|---|
| S1701 | S801 | The rate factor applicable to the toll call between the calling subscriber substation in exchange 1 zone 38 and the called subscriber substation in exchange 4 zone 62, the digit 6. |
| WXYZ marking group 1715 | S802 | The ten minute digit of the duration of the toll call between the calling subscriber substation in exchange 1 zone 38 and the called subscriber substation in exchange 4 zone 62, the digit 3. |
| WXYZ marking group 1716 | S803 | The unit minute digit of the duration of the toll call between the calling subscriber substation in exchange 1 zone 38 and the called subscriber substation in exchange 4 zone 62, the digit 2. |
| S1702 | S804 | The respective first, second, and third digits of the code portion of the directory number of the called subscriber substation identifying the zone and exchange thereof, the digits 0, 2, and 4. |
| S1703 | S805 | |
| S1704 | S806 | |
| S1705 | S807 | The respective first, second, third, and fourth digits of the numerical portion of the directory number of the called subscriber substation identifying the subscriber line terminal thereof, the digits 1, 2, 3, and 4. |
| S1706 | S808 | |
| S1707 | S809 | |
| S1708 | S810 | |
| S1709 | S811 | The suffix digit of the directory number of the called subscriber substation identifying the position of the called party subscriber substation on the associated party subscriber line, the digit 1. |
| S1710 | S812 | The suffix digit of the directory number of the calling subscriber substation identifying the position of the calling party subscriber substation on the associated party subscriber line, no digit being registered. |
| S1711 | S813 | The respective first, second, third, and fourth digits of the numerical portion of the directory number of the calling subscriber substation identifying the subscriber line terminal thereof, the digits 2, 9, 2, and 1. |
| S1712 | S814 | |
| S1713 | S815 | |
| S1714 | S816 | |
| Z marking lead 1717 | S817 | The special service digit indicating that the charge for the toll call between the calling subscriber substation in exchange 1 zone 38 and the called subscriber substation in exchange 4 zone 62 are to be assessed against the called subscriber substation in exchange 4 zone 62, the digit 0. |

Also, at this time, there has been transferred from the date and time unit 100 by way of the WXYZ marking leads 850 to 857, inclusive, to the code storage devices S818 to S825, inclusive, in the code storage unit SU800 in the printer controller 85, certain items of record information pertaining to the time of termination of the toll call between the calling subscriber substation in exchange 1 zone 38 and the called subscriber substation in exchange 4 zone 62, as indicated below:

the previously mentioned holding circuit for energizing the upper winding of the time absorbing relay R1670, the previously mentioned holding circuit for energizing the upper winding of the wiper switching relay R1620 and the previously mentioned holding circuit for energizing the master magnet SM1701 of the code storage unit SU1700, thereby to cause the relays mentioned and the master magnet SM1701 to restore. Upon restoring, the master magnet SM1701 causes

| WXYZ Marking Group in Date and Time Unit Transferred From— | Code Storage Device in Printer Controller 85 Transferred To— | Nature of Record Information |
|---|---|---|
| 850 | S818 | The ten digit of the day of the month, the digit 1. |
| 851 | S819 | The unit digit of the day of the month, the digit 5. |
| 852 | S820 | The ten digit of the month of the year, the digit 1. |
| 853 | S821 | The unit digit of the month of the year, the digit 2. |
| 854 | S822 | The ten digit of the hour of the day, the digit 1. |
| 855 | S823 | The unit digit of the hour of the day, the digit 1. |
| 856 | S824 | The ten digit of the minute of the hour, the digit 2. |
| 857 | S825 | The unit digit of the minute of the hour, the digit 6. |

Release of the toll ticket repeater

When the wipers noted of the storage transfer switch S1760 in the toll ticket repeater 80 engage the seventeenth contacts in the associated the armatures of the WXYZ or unit magnets in the various code storage devices S1701 to S1714, inclusive, in the code storage unit SU1700 to be released and returned to their normal positions.

Also, upon restoring, the hold slave relay R1600 interrupts, at the contacts 1603, the previously traced circuit for energizing the winding of the busy relay R1640 and completes, at the contacts 1602, a circuit for energizing the lower winding of the busy relay R1640 in series with the magnet DM1744, thereby to retain the busy relay R1640 in its operated position in order to retain the toll ticket repeater 80 marked as busy to the primary selectors having access thereto until it is completely released. The circuit for energizing the lower winding of the busy relay R1640 in series with the magnet DM1744 extends from ground by way of the contacts 1602, the lower winding of R1640, the wiper 1743 of the ten register D1740 and the engaged contact in the associated contact bank, the contact 1745 and the magnet DM1744 to battery. When the magnet DM1744 is thus energized it operates intermittently, thereby to drive the wipers noted of the ten register D1740 step by step in the counterclockwise direction back into their home positions; whereupon a series circuit for energizing the lower winding of the busy relay R1640 in series with the magnet CM1754 is completed. The last-mentioned circuit extends from the grounded wiper 1743 of the ten register D1740 and the engaged home contact in the associated contact bank by way of the contacts 1673, C1653, the contacts 1757 of the set of switch springs CS1755, the contacts 1754 and the magnet CM1754 to battery. When the magnet CM1754 is thus energized it operates intermittently, thereby to drive the wipers noted of the storage register switch C1750 step by step in the clockwise direction back into their home positions.

When the storage register switch C1750 is thus released the set of switch springs CS1755 is actuated, thereby to interrupt, at the contacts 1757 thereof, the previously traced circuit for energizing the magnet CM1754, and to complete, at the contacts 1756 thereof, a circuit for energizing the magnet PM1592. This series circuit extends from the grounded conductor C1653 by way of the contacts 1756 of the set of switch springs CS1755, C1637, the contacts 1594 of the set of switch springs PS1593, the contacts 1592 and the magnet PM1592 to battery. When the magnet PM1592 is thus energized it operates intermittently, thereby to drive the wiper 1591 of the reverse charge switch P1590 step by step in the counterclockwise direction back into its home position.

When the reverse charge switch P1590 is thus released the set of switch springs PS1593 is actuated, thereby to interrupt, at the contacts 1594 thereof, the previously traced circuit for energizing the magnet PM1592 and to complete, at the contacts 1595 thereof, a circuit for energizing the magnet UM1734. This series circuit extends from the grounded conductor C1637 by way of the contacts 1595 of the set of switch springs PS1593, C1646, the contacts 1739 of the set of switch springs US1736, the contacts 1735 and the magnet UM1734 to battery. When the magnet UM1734 is thus energized it operates intermittently, thereby to drive the wipers noted of the unit register U1730 step by step in the counterclockwise direction back into their home positions.

When the unit register U1730 is thus released the set of switch springs US1736 is actuated, thereby to interrupt, at the contacts 1739 thereof, the previously traced circuit for energizing the magnet UM1734 and to complete, at the contacts 1737 thereof, a circuit for energizing the magnet TM1682. This series circuit extends from the grounded conductor C1646 by way of the contacts 1737 of the set of switch springs US1736, C1645, the contacts 1686 of the set of switch springs TS1684, the contacts 1683 and the magnet TM1682 to battery. When the magnet TM1682 is thus energized it operates intermittently, thereby to drive the wiper 1681 of the timer switch T1680 step by step in the counterclockwise direction back into its home position.

When the timer switch T1680 is thus released the set of switch springs TS1684 is actuated, thereby to interrupt, at the contacts 1686 thereof, the previously traced circuit for energizing the magnet TM1682 and to complete, at the contacts 1685 thereof, a circuit for energizing the magnet SM1766. This series circuit extends from the grounded conductor C1645 by way of the contacts 1685 of the set of switch springs TS1684, C1625, the set of switch springs SS1768, C1626, the contacts 1767 and the magnet SM1766 to battery. When the magnet SM1766 is thus energized it operates intermittently, thereby to drive the wipers noted of the storage transfer switch S1760 step by step in the counterclockwise direction back into their home positions.

When the storage transfer switch S1760 is thus released the set of switch springs SS1768 is actuated, thereby to interrupt the previously traced series circuit for energizing the lower winding of the busy relay R1640 and the magnet SM1766; whereupon the busy relay R1640 restores shortly thereafter, the latter relay being of the slow-to-release type, as previously noted. Upon restoring, the busy relay R1640 interrupts, at the contacts 1644, the previously traced path for applying ground potential to the control conductor C473 of the trunk 470, thereby to mark the trunk 470 and, consequently, the toll ticket repeater 80 as idle to the primary selectors having access thereto. Further, the busy relay R1640 interrupts, at the contacts 1643, the previously mentioned path for applying ground potential to the alarm conductor C1687, thereby to arrest the timing operation of the alarm device in order to prevent operation thereof, as previously explained. At this time, the toll ticket repeater 80 is completely released and available for further use.

*Further operation of the printer controller*

As previously explained, the storage register switch S660 first transfers the rate factor digit 6 to the code storage device S801, then the ten minute digit 3 to the code storage device S802, and then the unit minute digit 2 to the code storage device S803. At this time, the wipers noted of the storage register switch S660 engage the third contacts in the associated contact banks; whereupon a circuit is completed for energizing the magnet TM905, this circuit extending from the grounded wiper 661 of the storage register switch S660 and the engaged third contact in the associated contact bank by way of the contacts 603, C654, the contacts 908 of the set of switch springs TS906, the contacts 906 and the magnet TM905 to battery. When the magnet TM905 is thus energized it operates and restores, thereby to drive the wipers noted of the rate switch T900 one step in the counterclockwise direction, whereupon the set of switch springs TS906 is actuated. When the set of switch springs TS906 is thus actuated the previously traced circuit for energizing the magnet TM905 is interrupted at the contacts 908 thereof, and an alternative circuit for energizing the magnet TM905 is completed at the contacts 909 thereof. The last-mentioned circuit extends from ground by way of the contacts 911, C636, the contacts 679 of the set of switch springs CS677, C635, the contacts 909 of the set of switch springs TS906, the contacts 906 and the magnet TM905 to battery. When the magnet TM905 is thus energized it operates intermittently, thereby to drive the wipers noted of the rate switch T900 step by step in the counterclockwise direction until both the left-hand and right-hand windings of the multiplier selecting relay R910 are energized. More particularly, the wipers noted of the rate switch T900 are driven six steps in the counterclockwise direction at this time; whereupon the wipers 901 and 902 respectively engage the sixth contacts in the associated contact banks respectively terminating the Y and Z marking leads in the group of marking leads 844 marked with ground potential by the operated Y and Z magnets in the code storage device S801 in the code storage unit SU800, thereby to complete obvious circuits for energizing the left-hand and right-hand windings of the multiplier selecting relay R910. When both the left-hand and right-hand windings of the multiplier selecting relay R910 are thus energized, the latter relay operates, the multiplier selecting relay R910 being of the type which operates only when both the left-hand and right-hand windings thereof are energized. Upon operating, the multiplier selecting relay R910 interrupts, at the contacts 911, the previously traced alternative circuit for energizing the magnet TM905, thereby to arrest further operation of the rate switch T900 and to cause the rate switch T900 to select the multiplier switch S920 corresponding to the previously established rate factor digit 6.

Shortly following the operation of the rate switch R900 explained above, the start relay R600 restores, thereby to interrupt, at the contacts 605, the previously mentioned circuit for energizing the winding of the guard relay R830; whereupon the latter relay restores to interrupt, at the contacts 831, the previously mentioned path for applying ground potential to the guard conductor C840. Also, the guard relay R830 interrupts, at the contacts 832, etc., the previously mentioned connections between the groups of WXYZ marking leads 850 to 857, inclusive, extending to the date and time unit 100 and the code storage devices S818 to S825, inclusive, in the code storage unit SU800. When ground potential is removed from the guard conductor C840, further operation of the date and time unit 100 is resumed; whereupon the markings on the various WXYZ marking groups 850 to 857, inclusive, are changed in accordance with the passing of time. In view of the above explanation, it will be understood that the date and time unit 100 is connected to the code storage unit SU800 for only a fraction of a second due to the high rate of operation of the storage register switch S660.

When the rate switch T900 selects the multiplier switch S920 corresponding to the previously established rate factor digit 6, operation of the multiplier switch S920 is initiated. More particularly, upon operating, the multiplier selecting relay R910 completes, at the contacts 912, a circuit for energizing the vertical magnet SM962, this circuit extending from ground by way of the contacts 912 and 942, C966, the wiper 904 of the rate switch T900 and engaged sixth contact in the associated contact banks, the contacts 963 and the vertical magnet SM962 to battery. When thus energized, the vertical magnet SM962 operates intermittently, thereby to drive the wiper carriage of the Strowger mechanism 700 in the multiplier switch S920 step by step in the vertical direction until the vertical test wipers 922 and 923 carried by the wiper carriage of the Strowger mechanism 700 engage contacts in the associated vertical test bank 921 having ground potential thereon; whereupon obvious circuits are completed for energizing both the left-hand and right-hand windings of the vertical stop relay R940. The circuits for energizing the left-hand and right-hand windings of the vertical stop relay R940 are completed after the wiper carriage of the Strowger mechanism 700 in the multiplier switch S920 has been moved three steps in the vertical direction corresponding to the marked W and Z leads in the group of marking leads 842 extending to the code storage device S802 in the code storage unit SU800; the W and Z leads in the group of marking leads 842 having ground potential thereon corresponding to the ten digit 3 of the previously established time factor. When both the left-hand and right-hand windings of the vertical stop relays R940 are energized, this relay operates to interrupt, at the contacts 942, the previously traced circuit for energizing the vertical magnet SM962 and to complete, at the contacts 941, a circuit for energizing the rotary magnet SM960. The last-mentioned circuit extends from ground by way of the contacts 912, 941 and 952, C965, the wiper 903 of the rate switch T900 and engaged sixth contact in the associated contact bank, the contacts 961 and the rotary magnet SM960 to battery.

When thus energized, the rotary magnet SM960 operates intermittently, thereby to drive the wiper carriage of the Strowger mechanism 700 in the mulipler switch S920 step by step in the rotary direction until the rotary test wipers 926 and 927 carried by the wiper carriage of the Strowger mechanism 700 engage contacts in the associated rotary test bank 925 having ground potential thereon, whereupon obvious circuits are completed for energizing both the left-hand and right-hand windings of the rotary stop relay R950. The circuits for energizing the left-hand and right-hand windings of the rotary stop relay R950 are completed after the wiper carriage of the Strowger mechanism 700 in the multiplier switch S920 has been moved two steps in the rotary direction corresponding to the marked W and Y leads in the group of marking leads 843 extending to the code storage device S803 in the code storage unit SU800, the W and Y leads in the group of marking leads 843 having ground potential thereon corresponding to the unit digit 2 of the previously established time factor. When both the left-hand and right-hand windings of the rotary stop relay R950 are energized, this relay operates to interrupt, at the contacts 952, the previously traced circuit for energizing the rotary magnet SM960 and to prepare, at the contacts 951, a circuit traced hereinafter for energizing the winding of the test relay R640. At this time, the wiper carriage of the Strowger mechanism 700 in the multiplier switch S920 occupies its 3 up 2 in positions respectively corresponding to the ten digit 3 and the unit digit 2 of the established time factor 32.

After all of the items of record information stored in the toll ticket repeater 80 have been transferred to the code storage unit SU800 in the printer controller 85 and when the wiper 661 of the storage register switch S660 engages the twenty-fourth contact in the associated contact bank, an obvious circuit is completed for energizing the winding of the hold relay R620, thereby to cause the latter relay to operate. Upon operating, the hold relay R620 completes, at the contacts 626, a holding circuit for energizing the winding thereof, this circuit extending from ground by way of the contacts 907 of the set of switch springs TS906, C656, the contacts 626 and the winding of R620 to battery. Also, the hold relay R620 interrupts, at the contacts 622, the previously traced circuit for energizing the upper and lower windings of the pulse relay R630, thereby to cause the latter relay to restore in order to arrest further operation of the storage register switch S660. Further, the hold relay R620 completes, at the contacts 625, a path for applying battery potential by way of the winding of the test relay R640 to the test conductor C652, this path extending from battery by way of the contacts 625, the winding of R640, C655 and the contacts 951 to the test conductor C652. Also, the hold relay R620 completes, at the contacts 623, an obvious path for applying ground potential to the start conductor C650, thereby to complete an obvious circuit for energizing the winding of the master start relay H2630 in the printer allotter 95.

When thus energized, the master start relay R2630 operates to prepare, at the contacts 2631, an obvious circuit for energizing the magnet AM2638, this circuit being completed in the event the wiper 2636 of the allotter switch A2635 engages a contact in the associated contact bank having direct ground potential thereon. Thus, the magnet AM2638 operates intermittently, thereby to drive the wiper 2636 of the allotter switch A2635 step by step in the counterclockwise direction until it engages a contact in the associated contact bank having resistance ground potential thereon corresponding to the start relay of an idle finder switch. Assuming that the finder switch F2600 is the first idle finder switch in the associated group, further operation of the allotter switch A2635 is arrested when the wiper 2636 thereof engages the first contact in the associated contact bank terminating the conductor C2634 extending to the start relay R2650. More particularly, when the wiper 2636 of the allotter switch A2635 engages the first contact in the associated contact bank, a series circuit is completed for energizing the winding of the start relay R2650 in series with the magnet AM2638, this circuit extending from ground by way of the winding of R2650, C2634, the wiper 2636 of the allotter switch A2635 and engaged first contact in the associated contact bank, the contacts 2637, the magnet AM2638 and the contacts 2631 to battery. When this series circuit is completed the winding of the start relay R2650 is energized, thereby to cause the latter relay to operate; however, the magnet AM2638 is not sufficiently energized to operate, due to the high series resistance of the winding of the start relay R2650.

Upon operating, the start relay R2650 completes, at the contacts 2651, an obvious circuit for energizing the magnet FM2603, thereby to cause the magnet FM2603 to operate intermittently in order to drive the wipers noted of the finder switch F2600 step by step in the clockwise direction. More particularly, the wipers noted of the finder switch F2600 are driven step by step in the clockwise direction until the wiper 2602 engages the sixth contact in the associated contact bank; whereupon a circuit is completed for energizing in series the lower winding of the test relay R2640 and the winding of the test relay R640, the test conductor C652 extending to the printer controller 85 being terminated on the sixth contact associated with the wiper 2602 of the finder switch F2600. The above-mentioned circuit extends from ground by way of the lower winding of R2640, the wiper 2602 of the finder switch F2600 and engaged sixth contact in the associated contact bank C652, the contacts 951, C655, the winding of R640 and the contact 625 to battery. When thus energized, the test relay R640 and the test relay R2640 operate. Upon operating, the test relay R2640 completes, at the contacts 2641, a holding circuit for energizing the upper winding thereof, this circuit extending from ground by way of the contacts 623 and 642, C651, the wiper 2601 of the finder switch F2600 and engaged sixth contact in the associated contact bank, the contacts 2641 and the upper winding of R2640 to battery. Also, the test relay R2640 completes, at the contacts 2642, an obvious path for applying ground potential to the conductor C2634, thereby to mark the finder switch F2600 as busy to the allotter switch A2635. Further, the test relay R2640 interrupts, at the contacts 2644, the previously mentioned circuit for energizing the magnet FM2603, thereby positively to arrest further operation of the finder switch F2600, and completes, at the contacts 2643, an obvious circuit for energizing the winding of the connect relay R2610, thereby to cause the latter relay to operate. Upon operating, the connect relay R2610 completes, at the contacts 2611, etc., obvious connections between the marking leads C716 to C719, inclusive, and the toll ticket printer 90; and completes, at the contacts 2612, etc., obvious connections between the marking leads in the group of marking leads 637 and the toll ticket printer 90. The toll ticket printer 90 is idle at this time as it corresponds to the finder switch F2600 being utilized. Thus, it will be understood that the operation of the allotter switch A2635 to select the idle finder switch F2600 is tantamount to the selection of the idle toll ticket printer 90.

Upon operating, the test relay R640 interrupts, at the contacts 641, the previously mentioned path for applying ground potential to the start conductor C650, thereby to interrupt the previously mentioned circuit for energizing the winding of the master start relay R2630 in the printer allotter 95, whereupon the latter relay restores. Also, the start relay R640 completes, at the contacts 644, an obvious circuit for energizing the upper and lower windings of the pulse relay R730, thereby to cause the latter relay to operate intermittently. Each time the pulse relay R730 operates it completes, at the contacts 731, an obvious circuit for energizing the magnet RM725, completes, at the contacts 733, an obvious path for applying ground potential to the wipers 721 and 722 of the printer control switch R720, and completes, at the contacts 734, an obvious path for applying ground potential to the wipers 723 and 724 of the printer control switch R720; and each time the pulse relay R730 restores it interrupts, at the contacts 731, the previously mentioned circuit for energizing the magnet RM725, and interrupts, at the contacts 733 and 734, the previously mentioned paths for applying ground potential to the wipers 721 to 724, inclusive, of the printer control switch R720. Each time the magnet RM725 is energized and subsequently deenergized it operates and restores, thereby to drive the wipers noted of the printer control switch R720 one step in the counterclockwise direction. Each time the pulse relay R730 operates and restores, while the wiper 723 or the wiper 724 of the printer control switch R720 engages a contact in the associated contact bank terminating the multiple conductor C661, an obvious circuit is completed and interrupted for energizing the magnet CM675, thereby to cause the magnet CM675 to operate and restore in order to drive the wipers noted of the storage transfer switch C670 one step in the counterclockwise direction. From the foregoing, it will be understood that each time the pulse relay R730 operates and restores the wipers noted of the printer control switch R720 are driven one step in the counterclockwise direction; while the wipers noted of the storage transfer switch C670 are driven one step in the counterclockwise direction, upon each of only certain of the operations and restorations of the pulse relay R730.

Upon the first operation of the pulse relay R730, the previously traced circuits for energizing the magnets RM725 and CM675 are completed, thereby to cause the magnet RM725 to operate and condition the wipers noted of the printer control switch R720 to be driven one step in the counterclockwise direction and to cause the magnet CM675 to operate and condition the wipers noted of the storage transfer switch C670 to be driven one step in the counterclockwise direction. Also, the pulse relay R730 completes a path for applying ground potential to the first marking conductor in the group of marking leads 637. This path extends from the grounded wiper 722 of the printer control switch R720 and the engaged home contact in the associated contact bank by way of the marking conductor C658 and the contacts WA1 and XA1 to the first lead in the group of marking leads 637, the relays WA and XA being operated at this time in a manner more fully described hereinafter. This application of ground potential to the first lead in the group of marking leads 637 causes the toll ticket printer 90 to print the digit 1 in the space on the toll ticket entitled Date Mo. as shown in Fig. 28.

Before explaining the mode of operation of the WA, XA, YA and ZA relays associated with the wipers 671, 672, 673 and 674, respectively, of the storage transfer switch C670, the general operation of the printer control switch R720 will be explained. Continuing now with the operation of the printer control switch R720, it is noted that the wiper 722 first engages the home contact and then the first contact in the associated contact bank terminating the marking conductor C658, thereby to cause the toll ticket printer 90 to print the numerals 12 in the space entitled Date Mo. on the toll ticket. The wiper 722 then engages the second contact in the associated contact bank terminating the dash lead C719, thereby to cause ground potential to be applied thereto, whereupon the toll ticket printer 90 prints a dash (—) in the space entitled Date Mo. Day on the toll ticket. The wiper 722 then successively engages the third and fourth contacts in the associated contact bank terminating the marking conductor C658, thereby to cause the toll ticket printer 90 to print the numerals 15 in the space entitled Date Day on the toll ticket.

The wiper 722 then successively engages the fifth and sixth contacts in the associated contact bank terminating the space lead C717, thereby to cause the toll ticket printer 90 to space the toll ticket twice. The wiper 722 then successively engages the seventh and eighth contacts in the associated contact bank terminating the marking conductor C658, thereby to cause the toll ticket printer 90 to print the numerals 11 in the space on the toll ticket entitled Time Hr. The wiper 722 then engages the ninth contact in the associated contact bank terminating the period lead C716, thereby to cause the toll ticket printer 90 to print a period (.) in the space entitled Time Hr. Min. on the toll ticket. Subsequently, the wiper 722 successively engages the tenth and eleventh contacts in the associated contact bank terminating the marking conductor C658, thereby to cause the toll ticket printer 90 to print the numerals 26 in the space entitled Time Min. on the toll ticket.

The wiper 722 then engages the twelfth contact in the associated contact bank terminating the shift lead C718, thereby to cause the toll ticket printer 90 to shift the toll ticket to the space entitled Calling zone Ex. No. on the toll ticket. The wiper 722 then successively engages the thirteenth, fourteenth and fifteenth contacts in the associated contact bank respectively terminating the marking leads C751, C752 and C753, which are permanently connected by way of the jumper 712 to certain of the leads in the group of marking leads 637 extending to the toll ticket printer 90. More particularly, the marking leads C751, C752 and C753 are respectively connected by way of the jumper 712 to the third, eighth and first leads in the group of marking leads 637, thereby to cause the toll ticket printer 90 to print the numerals 381 in the space entitled Calling zone Ex. on the toll ticket. The wiper 722 then engages the sixteenth contact in the associated contact bank terminating the dash lead C719, thereby to cause the toll ticket printer 90 to print a dash (—) in the space entitled Calling zone Ex. No. on the toll ticket. Subsequently, the wiper 722 successively engages the seventeenth, eighteenth, nineteenth and twentieth contacts in the associated contact bank terminating the marking conductor C658, thereby to cause the toll ticket printer 90 to print the numerals 2921 in the space entitled Calling No. on the toll ticket. The wiper 722 then engages the twenty-first contact in the associated contact bank terminating the marking conductor C658, thereby to cause the toll ticket printer 90 to space the toll ticket once, the marking conductor C658 being connected to the space lead C717 by way of the contacts WA2, XA4, YA6 and ZA8 of the marking relays WA, XA, YA and ZA, respectively at this time in a manner more fully explained hereinafter.

The wiper 722 then engages the twenty-second contact in the associated contact bank terminating the shift lead C718, thereby to cause the toll ticket printer 90 to shift the toll ticket to the space enitled Called zone Ex. No. on the toll ticket. The wiper 722 then successively engages the twenty-third and twenty-fourth contacts in the associated contact bank terminating the marking conductor C658 and the wiper 721 engages the twenty-fifth contact in the associated contact bank terminating the marking conductor C658, thereby to cause the toll ticket printer 90 to print the numerals 624 in the space entitled Called zone Ex. on the toll ticket. The wiper 721 then engages the twenty-sixth contact in the associated contact bank terminating the dash lead C719, thereby to cause the toll ticket printer 90 to print a dash (—) in the space entitled Called zone Ex. No. on the toll ticket. Subsequently, the wiper 721 successively engages the twenty-seventh, twenty-eighth, twenty-ninth, thirtieth and thirty-first contacts in the associated contact bank terminating the marking conductor C658, thereby to cause the toll ticket printer 90 to print the numerals 12341 in the space entitled Called No. on the toll ticket.

The wiper 721 then engages the thirty-second contact in the associated contact bank terminating the shift lead C718, thereby to cause the toll ticket printer 90 to shift the toll ticket to the space entitled Rate on the toll ticket. The wiper 721 then engages the thirty-third contact in the associated contact bank terminating the marking conductor C658 thereby to cause the toll ticket printer 90 to print the numeral 6 in the space entitled Rate on the toll ticket. Subsequently, the wiper 721 successively engages the thirty-fourth, thirty-fifth and thirty-sixth contacts in the associated contact bank terminating the space lead C717, thereby to cause the toll ticket printer 90 to space the toll ticket three times. The wiper 721 then successively engages the thirty-seventh and thirty-eighth contacts in the associated contact bank terminating the marking conductor C658, thereby to cause the toll ticket printer 90 to print the numerals 32 in the space entitled Duration of call Mins. on the toll ticket.

The wiper 721 then engages the thirty-ninth contact in the associated contact bank terminating the shift lead C718, thereby to cause the toll ticket printer 90 to shift the toll ticket to the space entitled Cost of call $.¢ on the toll ticket. The wiper 721 then successively engages the fortieth and forty-first contacts in the associated contact bank respectively terminating the marking leads C744 and C743 respectively extending to the wipers 704 and 703 carried by the wiper carriage of the Strowger mechanism 700 in the multiplier switch S920, thereby to cause the toll ticket printer 90 to space the toll ticket one space and then to print the numeral 1 in the space entitled Cost of call $.¢ on the toll ticket. Subsequently, the wiper 721 engages the forty-second contact in the associated contact bank terminating the period lead C716, thereby to cause the toll ticket printer 90 to print a period (.) in the space entitled Cost of call $.¢ on the toll ticket. Subsequently, the wiper 721 successively engages the forty-third and forty-fourth contacts in the associated contact bank respectively terminating the marking leads C742 and C741 respectively extending to the wipers 702 and 701 carried by the wiper carriage of the Strowger mechanism 700 in the multiplier switch S920, thereby to cause the toll ticket printer 90 to print the numerals 67 in the space entitled Cost of call $.¢ on the toll ticket. The wiper 721 then successively engages the forty-fifth, forty-sixth and forty-seventh contacts in the associated contact bank terminating the space lead C717, thereby to cause the toll ticket printer 90 to space the toll ticket three times. The wiper 721 then engages the forty-eighth contact in the associated contact bank terminating the marking conductor C658, thereby to cause the toll ticket printer 90 to print the numeral 0 in the spaced entitled Special service on the toll ticket.

Finally, the wiper 721 engages the forty-ninth contact in the associated contact bank terminating the shift lead C718, thereby to cause the toll ticket printer 90 to shift the toll ticket out of the machine.

Considering now the operation of the marking relays WA, XA, YA and ZA, when the wipers 671 to 674, inclusive, of the storage transfer switch C670 engage the home contacts in the associated contact banks, the code storage device S820 in the code storage unit SU800 is operatively connected to the windings of the marking relays WA, XA, YA and ZA. In view of the fact that a code corresponding to the ten digit of the month of the year, the digit 1, is stored in the code storage device S820 in the code storage unit SU800, the W and X magnets therein are operated, thereby to complete paths for applying ground potential to the W and X leads in the associated group of marking leads in the marking cable 629; whereupon obvious circuits for energizing the windings of the marking relays WA and XA are completed. When thus energized, the WA and XA relays operate to complete, at the contacts WA1 and XA1, a path for applying ground potential to the first lead in the group of marking leads 637, this path extending from the grounded wiper 722 of the printer control switch R720 and the engaged home contact in the associated contact bank, the marking conductor C658 and the contacts WA1 and XA1 to the first lead in the group of marking leads 637 extending to the toll ticket printer 90.

From the foregoing, it will be understood that, as the wipers noted of the storage transfer switch C670 are rotated step by step in the counterclockwise direction, they engage contacts in the associated contact banks terminating the WXYZ leads of the various groups of marking leads in the marking cable 629 extending to the various code storage devices S801 to S825, inclusive, in the code storage unit SU800, thereby to cause the marking relays WA, XA, YA and ZA to operate in accordance with the code stored in the particular code storage device. The various combinations of operations of the marking relays WA, XA, YA and ZA complete marking paths between the marking conductor C658 and the marking leads in the group of marking leads 637 extending to the toll ticket printer 90, in an obvious manner.

Further, it is noted that, when there is no code digit stored in a given code storage device in the code storage unit SU800 selected by the wipers noted of the storage transfer switch C670, no ground potential appears upon the associated WXYZ marking leads, thereby to cause each of the marking relays WA, XA, YA and ZA to remain in its restored position. At this time, the previously mentioned path for connecting the marking conductor C658 to the space lead C717 is completed, this path extending from the marking conductor C658 by way of the contacts WA2, XA4, YA6 and ZA8 to the space lead C717.

In order to cause the toll ticket printer 90 to operate and print the information previously described upon the toll ticket, as shown in Fig. 31, it is necessary for the different code storage devices S801 to S825, inclusive, in the code storage unit SU800 to be connected to the various contacts in the contact banks associated with the wipers 671 to 674, inclusive, of the storage transfer switch C670, in a predetermined order.

The code storage devices S801 to S825, inclusive, in the code storage unit SU800 are connected to the various contacts in the associated contact banks of the storage transfer switch C670, in accordance with the following schedule:

| Code Storage Device | Position of Terminating Contacts in the Contact Banks of the Storage Transfer Switch C670 |
| --- | --- |
| S820 | Home |
| S821 | 1 |
| S818 | 2 |
| S819 | 3 |
| S822 | 4 |
| S823 | 5 |
| S824 | 6 |
| S825 | 7 |
| S813 | 8 |
| S814 | 9 |
| S815 | 10 |
| S816 | 11 |
| S812 | 12 |
| S804 | 13 |
| S805 | 14 |
| S806 | 15 |
| S807 | 16 |
| S808 | 17 |
| S809 | 18 |
| S810 | 19 |
| S811 | 20 |
| S801 | 21 |
| S802 | 22 |
| S803 | 23 |
| S817 | 24 |

After the toll ticket printer 90 has operated to print the toll ticket, as shown in Fig. 28, the wipers noted of the printer control switch R720 are driven an additional step back into their home positions; whereupon the wiper 723 thereof disengages the forty-ninth contact in the associated contact bank, thereby to interrupt a previously completed circuit for energizing the magnet SM666, whereupon the previously operated magnet SM666, restores. The circuit mentioned for energizing the magnet SM666 extends from the grounded wiper 723 of the printer control switch R720 by way of C659 and the magnet SM666 to battery. When the magnet SM666 thus operates and restores the wipers noted of the storage register switch S660 are driven back into their home positions. When the storage register switch S660 is thus released the set of switch springs SS669 is actuated, thereby to interrupt the previously mentioned holding circuit for energizing the upper winding of the test relay R610 in order to cause the latter relay to restore. Upon restoring, the test relay R610 interrupts, at the contacts 618, the previously mentioned circuit for energizing the master magnet SM801, thereby to cause the master magnet SM801 to restore and release the armatures associated with the WXYZ or unit magnets in the various code storage devices S801 to S825, inclusive, in the code storage unit SU800 in order to clear the various code storage devices in the code storage unit SU800 of the code digits stored therein. Also, the test relay R610 completes, at the contacts 617, a circuit for energizing the rotary magnet SM960, this circuit extending from ground by way of the contacts 617, C657, the set of switch springs SS705, C706, the contacts 961 and the rotary magnet SM960 to battery. When thus energized, the rotary magnet SM960 operates intermittently, thereby to drive the wiper carriage of the Strowger mechanism 700 in the multiplier switch S960 step by step in the rotary direction. When the wiper carriage of the Strowger mechanism is driven eleven steps away from its normal position in the rotary direction, it is released and returned to its normal vertical and rotary positions, whereupon the set of switch springs SS705 is actuated, thereby to interrupt the previously traced circuit for energizing the rotary magnet SM960.

When the code storage devices S801, S802 and S803 in the code storage unit SU800 are released, the previously traced circuits for energizing the left-hand and right-hand windings of the multiplier selecting relay R910, the vertical stop relay R940 and the rotary stop relay R950 are interrupted, thereby to cause the latter relays to restore. Upon restoring the multiplier selecting relay R910 completes, at the contacts 911, a circuit for energizing the magnet CM675, this circuit extending from ground by way of the contacts 911, C636, the contacts 678 of the set of switch springs CS677, the contacts 676 and the magnet CM675 to battery. When thus energized the magnet CM675 operates intermittently, thereby to drive the wipers noted of the storage transfer switch C670 step by step in the clockwise direction back into their home positions.

When the storage transfer switch C670 is thus released the set of switch springs CS677 is actuated, thereby to interrupt, at the contacts 678 thereof, the previously traced circuit for energizing the magnet CM675 and to complete, at the contacts 679 thereof, a circuit for energizing the magnet TM905. The last-mentioned circuit extends from the grounded conductor C636 by way of the contacts 679 of the set of switch springs CS677, C635, the contacts 909 of the set of switch springs TS906, the contacts 906 and the magnet TM905 to battery. When thus energized, the magnet TM905 operates intermittently, thereby to drive the wipers noted of the rate switch T900 step by step in the counterclockwise direction back into their home positions.

When the rate switch T900 is thus released the set of switch springs TS906 is actuated, thereby to interrupt, at the contacts 909 thereof, the previously traced circuit for energizing the magnet TM905, and to interrupt, at the contacts 907 thereof, the previously traced holding circuit for energizing the winding of the hold relay R620, thereby to cause the latter relay to restore. Upon restoring, the hold relay R620 interrupts, at the contacts 621, the previously mentioned path for applying ground potential to the start conductor C606, thereby to mark the printer controller 85 as idle to the finder switch A635 in the printer controller allotter 86 having access thereto. Also, the hold relay R620 interrupts, at the contacts 625, the previously traced holding circuit for energizing the winding of the test relay R640, thereby to cause the latter relay to restore. Upon restoring, the test relay R640 interrupts, at the contacts 642, the previously traced holding circuit for energizing the upper winding of the test relay R2640 in the printer allotter 95. At this time, the printer controller 85 is completely released.

Upon restoring, the test relay R2640 in the printer allotter 95 interrupts, at the contacts 2643, the previously mentioned circuit for energizing the winding of the connect relay R2610, thereby to cause the latter relay to restore. Upon restoring, the connect relay R2610 interrupts, at the contacts 2611, etc., the previously mentioned connections between the leads C716 to C719, inclusive, and the toll ticket printer 90, and interrupts, at the contacts 2612, etc., the previously mentioned connections between the leads in the group of marking leads 637 and the toll ticket printer 90. Also, the test relay R2640 interrupts, at the contacts 2642, the previously mentioned path for applying ground potential to the conductor C2634, thereby to mark the finder switch F2600 and the associated toll ticket printer 90 as idle to the allotter switch A2635 in the printer allotter 95 having access thereto. At this time, the finder switch F2600 and the toll ticket printer 90 are completely released and available for further use.

*Toll call from exchange 1 zone 38 to exchange 4 zone 62—Alternative routing*

In the foregoing explanation, it was assumed that the call extending from the calling subscriber substation T1 in exchange 1 zone 38 to the called subscriber substation in exchange 4 zone 62 was routed therebetween by the register translator 60 via exchange 1 zone 73, the exchange in zone 46 and exchange 1 zone 62, this route being selected by the register translator 60 in conformity with the trunking plan utilized. Further, it is recalled that the routing digits required in order to route the call via the route specified comprise the four digits 2462 and were determined by the operated position of the rate and route switch R2210, in accordance with the operated position of the composite code switch P2230. More particularly, the subscriber at the calling subscriber substation T1 dialed the digits 624, comprising the code portion of the directory number of the called subscriber substation in exchange 4 zone 62. The code digits 6, 2 and 4 were respectively registered in the first, second and third code registers A2300, B2320 and C2330 in the register translator 60. More particularly, the first code digit 6 registered in the first code register A2300 caused the first code register A2300 to select the fifth wiper 2235 of the composite code switch P2230; while the second code digit 2 and the third code digit 4 respectively registered in the second code register B2320 and the third code register C2330 caused the second code register B2320 and the third code register C2330 respectively to operate the wiper carriage of the Strowger mechanism in the composite code switch P2230 to its 2 up 4 in position; whereupon operation of the rate and route switch R2210 was initiated. More particularly, the wiper carriage of the Strowger mechanism in the rate and route switch R2210 was operated to its 9 up 4 in position corresponding to the 2 up 4 in position of the composite code switch P2230, the operation of the wiper carriage of the rate and route switch R2210 to its 9 up 4 in position being effective to select the route specified and to set the wipers 2215, 2214, 2213 and 2212 respectively carried by the wiper carriage of the Strowger mechanism in the rate and route switch R2210 in accordance with the route digits 2, 4, 6 and 2, respectively, as previously explained.

At this time, the calling subscriber substation T1 is operatively connected by way of the line switch 40, the primary selector 50 and the register translator selector B380 to the register translator 60; and the subscriber at the calling subscriber substation is engaged in dialing the four digits comprising the numerical portion of the directory number of the called subscriber substation in exchange 4 zone 62, as previously explained. The register translator 60 then operates to transmit the first routing digit 2 to the primary selector 50, thereby to cause operation thereof to select an idle toll line in the group of toll lines extending from exchange 1 zone 38 to exchange 1 zone 73, in the manner previously explained. More particularly, the wiper carriage of the Strowger mechanism S400 in the primary selector 50 is operated two steps in the vertical direction and is then operated step by step in the rotary direction in order successively to test the toll lines in the group of toll lines mentioned. In the event there is an idle toll line in this group of toll lines, the primary selector 50 operates to select the idle toll line, in the manner previously explained. However, in the event there is no idle toll line in this group of toll lines, the wiper carriage of the Strowger mechanism S400 in the primary selector 50 is driven step by step in the rotary direction eleven steps away from its normal position.

In the event the wiper carriage of the Strowger mechanism S400 in the primary selector 50 is driven eleven steps in the rotary direction away from its normal position, the line wiper 402 carried thereby engages, in the present example, the contact terminating the busy conductor C475 connected to the grounded secondary winding 417 of the busy transformer 415, the primary winding 416 of the busy transformer 415 being connected to a suitable source of busy tone current. This application of ground potential to the line wiper 402 carried by the wiper carriage of the Strowger mechanism S400 completes an obvious path for applying ground potential to the control conductor C374 of the trunk 370 and, accordingly, to the control conductor C394 of the trunk 390, the switching relay R310 and the switch-through relay R430 occupying their operated positions at this time, as previously explained. The application of ground potential to the control conductor C394 completes a circuit for energizing the lower winding of the route busy relay R2130, this circuit extending from the grounded control conductor C394 of the trunk 390, the wiper 2301 of the first code register A2300 and engaged sixth contact in the associated contact bank, C1970, the contacts 1922, C1845, the contacts 1827, C1844, the contacts 2043, C1842, the wiper 2203 of the digit sequence switch N2200 and engaged first contact in the associated contact bank, C1835, the contacts 2013, C2062 and the lower winding of R2130 to battery. When thus energized, the route busy relay R2130 operates to complete, at the contacts 2132, a holding circuit for energizing the upper winding thereof, this circuit extending from ground by way of the contacts 2208 of the set of switch springs NS2207, C1832, the contacts 2132 and the upper winding of R2130 to battery.

When the switch-through relay R430 in the primary selector 50 operates it completes, at the contacts 432, an alternative circuit for energizing the winding of the line relay R420, this circuit extending from the grounded control conductor C392 of the trunk 390 by way of the wiper 382 of the register translator selector B380, the control conductor C372 of the trunk 370, the contacts 312, 432 and 401, the line wiper 401 carried by the wiper carriage of the Strowger mechanism S400, C474 and the winding of R420 to battery. When this series circuit is completed the line relay R420 reoperates. Also, upon operating, the switch-through relay R430 interrupts, at the contacts 437, the previously mentioned circuit for energizing the winding of the hold relay R330, thereby to cause the latter relay to restore shortly thereafter. Also, upon operating, the route busy relay R2130 in the register translator 60 interrupts, at the contacts 2133, the previously traced path for applying ground potential to the control conductor C392 of the trunk 390, thereby to interrupt the previously traced circuit for energizing the winding of the line relay R420 in the primary selector 50, whereupon the latter relay restores. When the hold relay R330 in the primary selector 50 restores it completes, at the contacts 335, the previously traced circuit for energizing the release magnet SM408, thereby to cause the release magnet SM408 to operate and release the wiper carriage of the Strowger mechanism S400; whereupon the wiper carriage of the Strowger mechanism S400 is returned to its normal vertical and rotary positions. At this time, the primary selector 50 is completely released.

Returning now to the register translator 60, when the route busy relay R2130 operates it also completes, at the contacts 2131, an obvious circuit for energizing the lower winding of the busy relay R2010, thereby to cause the busy relay R2010 to operate partially. When the busy relay R2010 operates partially it completes, at the contacts 2011, an obvious path for short-circuiting the upper winding thereof. Further, the route busy relay R2130 completes, at the contacts 2134, a circuit for energizing the magnet NM2205, this circuit extending from the grounded wiper 2521 of the impulse sender switch K2520 and the engaged home contact in the associated contact bank by way of C2146, the contacts 2134, C1841, the contacts 2208 of the set of switch springs NS2207, the contacts 2206 and the magnet NM2205 to battery. When thus energized, the magnet NM2205 operates intermittently, thereby to drive the wipers noted of the digit sequence switch N2200 step by step in the counterclockwise direction back into their home positions. When the digit sequence switch N2200 is thus released the set of switch springs NS2207 is actuated, thereby to interrupt, at the contacts 2208 thereof, the previously traced circuit for energizing the magnet NM2205. Further, upon operating, the route busy relay R2130 completes, at the contacts 2136, an obvious circuit for energizing the rotary magnet RM2221, thereby to cause the rotary magnet RM2221 to operate in order to drive the wiper carriage of the Strowger mechanism in the rate and route switch R2210 an additional step in the rotary direction. Accordingly, at this time, the wiper carriage of the Strowger mechanism in the rate and route switch R2210 occupies its 9 up 5 in position. Also, when the set of switch springs NS2207 is actuated, the contacts 2209 thereof are disengaged, thereby to interrupt the previously traced holding circuit for energizing the upper winding of the route busy relay R2130, thereby to cause the latter relay to restore. Upon restoring, the route busy relay R2130 interrupts, at the contacts 2136, the previously mentioned circuit for energizing the rotary magnet RM2221, thereby to cause the rotary magnet RM2221 to restore. Further, the route busy relay R2130 interrupts, at the contacts 2131, the previously mentioned path for short-circuiting the upper winding of the busy relay R2010; whereupon an obvious circuit for energizing the upper and lower windings of the relay R2010 in series is completed, thereby to cause the latter relay to operate fully. Upon operating, the busy relay R2010 interrupts, at the contacts 2013, a point in the previously traced circuit for energizing the lower winding of the route busy relay R2130.

At this time, the wiper carriage of the Strowger mechanism in the rate and route switch R2210 occupies its 9 up 5 in position, thereby to cause the rate and route switch R2210 to select another route from exchange I zone 38 to exchange 4 zone 62 in conformity with the trunking plan utilized. For example, the alternative route selected may be via exchange I zone 62 and direct between exchange I zone 38 and exchange I zone 62, as indicated in Fig. 1. The digit sequence switch N2200 in the register translator 60 then reoperates, thereby to cause the register translator 60 to transmit the routing digits corresponding to the alternative route selected between exchange I zone 38 and exchange 4 zone 62, the particular routing digits transmitted from the register translator 60 being governed in accordance with the 9 up 5 in positions of the wipers 2111 to 2115, inclusive, carried by the wiper carriage of the Strowger mechanism in the rate and route switch R2210, in the manner previously explained. The operation of the primary selector 50 in response to the first routing digit transmitted from the register translator 60, and the operation of the other switching apparatus in response to the subsequent routing digits transmitted from the register translator 60, are the same, as previously described. In the foregoing explanation of the alternative routing arrangement, it was assumed that the primary selector 50 encountered an all-busy condition of the group of toll lines extending between exchange I zone 38 and exchange I zone 73. However, the all-busy condition may be encountered at the tandem switching point by the automatic switching apparatus in exchange I zone 73, that is, all of the toll lines in the group of toll lines extending between exchange I zone 73 and the exchange in zone 46 may be busy. In this case, the primary selector 50 operates in response to the first routing digit 2, in the manner previously explained, to select the idle trunk 470, thereby to cause the toll ticket repeater 80 to repeat the second routing digit 4 over the toll line 1500 extending between exchange I zone 38 and exchange I zone 73. The second routing digit 4 transmitted over the toll line 1500 causes the automatic switching apparatus in exchange I zone 73 to operate and search for an idle toll line in the group of toll lines extending between exchange I zone 73 and the exchange in zone 46, in the manner previously explained. In the event all of the toll lines extending between exchange I zone 73 and the exchange in zone 46 are busy at this time, the automatic switching apparatus in exchange I zone 73 operates at the conclusion of the second routing digit 4, thereby to cause ground and battery potential to be applied respectively to the line conductors C1502 and C1501 of the toll line 1500, thereby to complete the previously traced circuit for energizing the left-hand winding of the answer relay R1560 in series with the impedance 1505, whereupon the answer relay R1560 operates. Upon operating, the answer relay R1560 completes, at the contacts 1562, an obvious path for applying ground potential to the line conductor C472 of the trunk 470, thereby to cause ground potential to be applied to the line wiper 402 carried by the wiper carriage of the Strowger mechanism S400 in the primary selector 50. This application of ground potential to the line wiper 402 carried by the wiper carriage of the Strowger mechanism S400 in the primary selector 50 causes the primary selector 50 to be released, and the wiper carriage of the Strowger mechanism in the rate and route switch R2210 to be driven an additional step in the rotary direction to its 9 up 5 in position; whereupon an alternative route is selected between exchange I zone 38 and exchange 4 zone 62, in the manner previously explained.

In the foregoing explanation of the alternative routing arrangement, it was first assumed that the primary selector 50 encountered an all-busy condition of the group of toll lines extending between exchange I zone 38 and exchange I zone 73; and then it was assumed that the all-busy condition was encountered at the tandem switching point by the automatic switching apparatus in exchange I zone 73. However, the all-busy condition may be encountered at a switching point beyond the tandem switching point by the automatic switching apparatus in the exchange in zone 46 or by the automatic switching apparatus in exchange I zone 62. In this event, the automatic switching apparatus encountering the all-busy condition causes operation of the answer relay R1560 in the toll ticket repeater 80, in the manner previously explained; whereupon ground potential is applied to the control conductor C394 of the trunk 390 due to the operation of the toll ticket repeater 80 and the register translator 60, in the manner previously explained. However, in this case, the application of ground potential to the control conductor C394 of the trunk 390 is effective to cause the register translator 60 to be released in view of the fact that more than two routing digits have been transmitted from the register translator 60. More particularly, the application of ground potential to the control conductor C394 of the trunk 390 completes a circuit for energizing the upper winding of the release relay R2120, this circuit extending from the grounded control conductor C394 of the trunk 390 by way of the wiper 2301 of the first code register A2300 and engaged sixth contact in the associated contact bank, C1970, the contacts 1922, C1845, the contacts 1827, C1844, the contacts 2043, C1842, the wiper 2203 of the digit sequence switch N2200 and the engaged third or fourth contact in the associated contact bank, C2556, and the upper winding of R2120 to battery. When thus energized, the release relay R2120 operates, thereby to effect the release of the register translator 60, in the manner previously explained.

When the register translator 60 is thus released, the switching relay R310 and the test relay R320 in the primary selector 50 restore, whereupon the previously traced operative connection is completed between the calling subscriber substation T1 and the toll ticket repeater 80. At this time, busy tone current returned from the automatic switching apparatus in the exchange in zone 46 or the automatic switching apparatus in exchange I zone 62 to the toll ticket repeater 80 causes busy tone current to be transmitted from the toll ticket repeater 80 over the previously traced connection to the receiver of the telephone instrument at the calling subscriber substation T1, thereby to indicate to the subscriber thereat that the desired toll connection cannot be immediately completed due to an all-busy condition. The subscriber at the calling subscriber substation T1 then releases the line switch 40, the primary selector 50, the toll ticket repeater 80 and the automatic switching apparatus in the various exchanges over which the connection has been forwarded by replacing the receiver of the telephone instrument thereat upon its associated switchhook, in the manner previously explained.

Further, it is pointed out that after an alternative route has been selected by the register translator 60, due to the existence of an all-busy condition of the toll lines extending between exchange I zone 38 and exchange I zone 73 or an all-busy condition of the toll lines extending between exchange I zone 73 and the exchange in zone 46, an all-busy condition may be encountered in the alternative route selected. In this event, the primary selector 50 or the switching apparatus in an exchange in the alternative route causes ground potential to be applied to the line wiper 402 carried by the wiper carriage of the Strowger mechanism S400 in the primary selector 50, thereby to prepare the previously traced circuit for energizing the lower winding of the route busy relay R2130. However, the previously traced circuit for energizing the lower winding of the route busy relay R2130 is not completed at this time due to the operated condition of the busy relay R2010, the busy relay R2010 being operated incident to the selection of the alternative route, as previously explained.

Thus, in this case, when the alternative route selected by the register translator 60 proves also to be busy, the register translator 60 continues to operate in order to transmit all of the digits registered therein to the primary selector 50, which digits are without effect due to the all-busy condition in the alternative route. After all of the digits registered in the register translator 60 have been transmitted therefrom the register translator 60 is released, in the manner previously explained. At this time, either the wiper carriage of the Strowger mechanism S400 in the primary selector 50 occupies its eleventh position, indicating that all of the toll lines in the group of toll lines extending from exchange I zone 38 in the alternative route selected are busy; or the automatic switching apparatus in the exchange at the tandem switching point occupies its eleventh position, indicating that all of the toll lines extending therefrom in the alternative route selected are busy, whereupon busy tone current is returned to the calling subscriber station T1.

By way of example, it is assumed that the wiper carriage of the Strowger mechanism S400 in the primary selector 50 occupies its eleventh position when the register translator 60 is released at this time. In this case, when the switching relay R310 in the primary selector 50 restores, an alternative circuit is completed for energizing the winding of the switch-through relay R430 in series with the rotary step relay R450. The circuit for returning busy tone current to the calling subscriber substation T1 extends from the ungrounded terminal of the grounded secondary winding 417 of the busy tone transformer 415 by way of the busy conductor C475, the line wiper 402 carried by the wiper carriage of the Strowger mechanism S400 and the contacts 463, 434 and 315 to the line conductor C362 of the trunk 360; and from battery by way of the winding of R420, C474, the line wiper 401 carried by the wiper carriage of the Strowger mechanism S400 and the contacts 461, 432 and 313 to the line conductor C361 of the trunk 360, the line conductors C361 and C362 of the trunk 360 being included in the previously traced loop circuit including the calling subscriber substation T1. When the above traced circuit for returning busy tone current to the calling subscriber substation T1 is completed the winding of the line relay R420 is energized, thereby to cause the line relay R420 to operate. Upon operating the line relay R420 completes, at the contacts 423, the previously mentioned alternative circuit for energizing the winding of the switch-through relay 430 in series with the winding of the rotary step relay R450 and an obvious path for applying ground potential to the control conductor C363 of the trunk 360, thereby to retain the line switch 40 in its operated position. Shortly after the switch-through relay R430 operates, the hold relay R330 restores, as previously explained.

When the subscriber at the calling subscriber substation T1 receives busy tone he replaces the receiver of the telephone instrument thereat upon its associated switchhook, thereby to interrupt the previously traced circuit for energizing the winding of the line relay R420, thereby to cause the latter relay to restore. Upon restoring, the line relay R420 interrupts, at the contacts 423, the previously mentioned holding circuit for energizing the winding of the switch-through relay R430 in series with the winding of the rotary step relay R450, thereby to cause the switch-through relay R430 to restore. Also, the line relay R420 interrupts, at the contacts 423, the previously mentioned path for applying ground potential to the control conductor C363 of the trunk 360, thereby to cause the line switch 40 to be released. When the switch-through relay R430 restores it completes, at the contacts 437, the previously traced circuit for energizing the release magnet SM408, thereby to effect the release of the primary selector 50, in the manner previously explained. At this time, the line switch 40, the primary selector 50 and the register translator 60 are completely released and are available for further use.

*Toll call from exchange 1 zone 38 to the exchange in zone 46*

Assuming that the call extending from the calling subscriber substation T1 to the primary selector 50 and the register translator 60 is to be extended to a called subscriber substation in the exchange in zone 46, the subscriber at the calling subscriber substation T1 proceeds to dial the directory number of the called subscriber substation. The directory number of the called subscriber substation comprises a code portion, including the digits 46, identifying the called zone and exchange, and a numerical portion, including four digits, such, for example, as the digits 1234, identifying the line terminal.

Accordingly, the subscriber at the calling subscriber substation T1 proceeds to dial the first digit 4, thereby to cause the first digit 4 to be registered in the first code register A2300, in the manner previously explained. The wiper carriage of the Strowger mechanism S400 in the primary selector 50 is operated to its fourth vertical position, in accordance with the first digit 4, and is then released at the conclusion of the first digit 4, in the manner previously explained.

The subscriber at the calling subscriber substation T1 then proceeds to dial the second digit 6, thereby to cause the second digit 6 to be registered in the second code register B2320, in the manner previously explained. The wiper carriage of the Strowger mechanism S400 in the primary selector 50 is not operated in accordance with the second digit 6, as previously explained.

The subscriber at the calling subscriber substation T1 then proceeds to dial the third digit 1, thereby to cause the third digit 1 to be registered in the third code register C2330, in the manner previously explained. The wiper carriage of the Strowger mechanism S400 in the primary selector 50 is not operated in accordance with the third digit 1 due to the completed holding circuit for energizing the winding of the line relay R420, as previously explained.

Accordingly, at this time, the first digit 4 is registered in the first code register A2300; the second digit 6, is registered in the second code register B2320; and the third digit 1 is registered in the third code register C2330; the wiper 2304 of the first code register A2300 engages the fourth contact in the associated contact bank, thereby to select the third wiper 2233 carried by the wiper carriage of the Strowger mechanism in the composite code switch P2230; and the wiper carriage of the Strowger mechanism in the composite code switch P2230 occupies its sixth vertical position and its first rotary position. Also, at the conclusion of the third digit 1, the wipers noted of the sequence switch S2440 engage the third contacts in the associated contact banks, thereby to initiate intermittent operation of the pulse relay R2040, in the manner previously explained.

At this point, it is noted that the first digit 4 and the second digit 6 respectively registered in the first code register A2300 and the second code register B2320 comprise the code portion of the directory number of the called subscriber substation in the exchange in zone 46; while the third digit 1 registered in the third code register C2330 comprises the first digit of the numerical portion of the directory number of the called subscriber substation in the exchange in zone 46, rather than the third digit of the code portion of the directory number of the called subscriber substation in the exchange in zone 46. This situation is presented due to the fact that the code portion of the directory number of the called subscriber substation in the exchange in zone 46 comprises two digits instead of three digits. Thus, it will be understood that the routing of the call by the composite code switch P2230 from exchange 1 zone 38 to the exchange in zone 46 must, in fact, be determined by the first digit 4 and the second digit 6, and irrespective of the actual value of the third digit 1. In order to accomplish this end, a special multiple is provided in the contact bank associated with the third wiper 2233 carried by the wiper carriage of the Strowger mechanism in the composite code switch P2230. More particularly, each contact in the sixth vertical row of contacts in the contact bank associated with the third wiper 2233 carried by the wiper carriage of the Strowger mechanism in the composite code switch P2230 are connected together; and are connected by way of the jumper 2272 to the corresponding 4 up 6 in contact in the contact bank associated with the control wiper 2218 carried by the wiper carriage of the Strowger mechanism in the rate and route switch R2210. Thus, it will be understood that the operation of the pulse relay R2040 is effective to cause the wiper carriage of the Strowger mechanism in the rate and route switch R2210 to be operated to its 4 up 6 in position when the wiper carriage of the Strowger mechanism in the composite code switch P2230 occupies its 6 up 1, 2, 3, etc., in positions; and the third wiper 2233 carried by the wiper carriage of the Strowger mechanism in the composite code switch P2230 is selected due to the registration of the first digit 4 in the first code register A2300.

Accordingly, at this time, the operating pulse relay R2040 causes the wiper carriage of the Strowger mechanism in the rate and route switch R2210 to be operated to its 4 up 6 in position, thereby to select a routing for the present call from exchange 1 zone 38 to the exchange in zone 46 via exchange 1 zone 73, which routing requires two routing digits.

Considering now the jumper arrangement among the contacts in the contact bank of the Strowger mechanism in the rate and route switch R2210, it is noted that the respective 4 up 6 in contacts in the contact banks respectively associated with the wipers 2215 and 2214 carried by the wiper carriage of the Strowger mechanism in the rate and route switch R2210 are respectively connected, by the jumper 2275, to two of the marking conductors in the marking cable 2281 corresponding to the two routing digits required; the 4 up 6 in contact in the contact bank associated with the wiper 2213 carried by the wiper carriage of the Strowger mechanism in the rate and route switch R2210 is connected by way of the jumper 2273 to the slip conductor C1838; while the 4 up 6 in contacts in the contact banks respectively associated with the wipers 2212 and 2211 carried by the wiper carriage of the Strowger mechanism in the rate and route switch R2210 are connected by way of the jumper 2274 to the control conductor C1852.

The operation of the rate and route switch R2210 described above, in response to the composite code switch P2230, takes place in an extremely short interval of time at the conclusion of the third digit 1, whereupon the stop relay R1810 is operated. Upon operating, the stop relay R1810 initiates intermittent operation of the pulse relay R2020, in the manner previously explained, thereby to cause the digit sequence switch N2200 and the impulse sender switch K2520 to operate, in the manner previously explained, in order to transmit the digits registered in the register translator 60 to the primary selector 50. More particularly, the wipers noted of the digit sequence switch N2200 first engage the home contacts and then the first contacts in the associated contact banks, thereby to cause the impulse sender switch K2520 first to transmit the first routing digit and then the second routing digit to the primary selector 50, in order to cause operation of the primary selector 50 and the automatic switching apparatus in exchange 1 zone 73, in the manner previously explained.

At the conclusion of the second routing digit transmitted from the register translator 60 to the primary selector 50, the wipers noted of the digit sequence switch N2200 are moved into engagement with the second contacts in the associated contact banks, thereby to complete a path for applying ground potential to the slip conductor C1838, this path extending from ground by way of the contacts 1803, C1854, the wiper 2204 of the digit sequence switch N2200 and engaged second contact in the associated contact bank, C2263 and the wiper 2213 carried by the wiper carriage of the Strowger mechanism in the rate and route switch R2210 and engaged 4 up 6 in contact in the associated contact bank to the slip conductor C1838. This application of ground potential to the slip conductor C1838 completes an obvious circuit for energizing the winding of the slip relay R1910, thereby to cause the latter relay to operate. Upon operating, the slip relay R1910 completes, at the contacts 1911, an obvious holding circuit for energizing the winding thereof, and completes, at the contacts 1912, a circuit for energizing the magnet NM2205, this circuit extending from the grounded slip conductor C1838 by way of the contacts 1912, C1852, the contacts 2206 and the winding of NM2205 to battery. When thus energized, the magnet NM2205 operates and restores, thereby to drive the wipers noted of the digit sequence switch N2200 one step in the counterclockwise direction into engagement with the third contacts in the associated contact banks. When the wiper 2204 of the digit sequence switch N2200 engages the third contact in the associated contact bank, the previously traced circuit for energizing the magnet NM2205 by way of the control conductor C1852 is completed, thereby to cause the magnet NM2205 to operate and restore in order to drive the wipers noted of the digit sequence switch N2200 into engagement with the fourth contacts in the associated contact banks. When the wiper 2204 of the digit sequence switch N2200 engages the fourth contact in the associated contact bank, the previously traced circuit for energizing the magnet NM2205 by way of the control conductor C1852 is again completed, thereby to cause the magnet NM2205 to operate and restore in order to drive the wipers noted of the digit sequence switch N2200 into engagement with the fifth contacts in the associated contact banks, the conductor C2266 being terminated by the fifth contact in the contact bank associated with the wiper 2204 of the digit sequence switch N2200.

The operated slip relay R1910 completes, at the contacts 1914, 1916, 1918, 1911' and 1913', obvious connections between the conductors C2266, C2267, C2268, C2269 and C2270, respectively, and the conductors C1981, C1982, C1983, C1984 and C1985 respectively extending to the third code register C2330, to the first numerical register D2350, to the second numerical register E2360, to the third numerical register F2400, and to the fourth numerical register G2410. At this time, the third digit 1, the fourth digit 2, the fifth digit 3 and the sixth digit 4 are respectively registered in the third code register C2330, the first numerical register D2350, the second numerical register E2360 and the third numerical register F2400, no digit being registered in the fourth numerical register G2410, it being assumed that the called subscriber substation in the exchange in zone 46 is of the private type as contrasted to the party type.

Accordingly, the digit sequence switch N2200 then successively engages the fifth, sixth, seventh and eighth contacts in the associated contact bank, thereby to cause the third digit 1 registered in the third code register C2330, the fourth digit 2 registered in the first numerical register D2350, the fifth digit 3 registered in the second numerical register E2360 and the sixth digit 4 registered in the third numerical register F2400 to be transmitted successively to the primary selector 50, thereby to cause the automatic switching apparatus in the exchange in zone 46 to seize the line terminal of the subscriber line extending to the called subscriber substation therein, in the manner previously explained.

Subsequently, the wiper 2204 of the digit sequence switch N2200 engages the ninth contact in the associated contact bank, thereby to complete an alternative circuit for energizing the magnet NM2205, this circuit extending from ground by way of the contacts 1803, C1854, the wiper 2204 of the digit sequence switch N2200 and engaged ninth contact in the associated contact bank, C2270, the contacts 1913', C1985, the wiper 2411 of the fourth numerical register G2410 and engaged home contact in the associated contact bank, C1906, the contacts 1915', C1852, the contacts 2206 and the magnet NM2205 to battery. When thus energized, the magnet NM2205 operates and restores, thereby to drive the wipers noted of the digit sequence switch N2200 an additional step in the counter-clockwise direction.

At this time, the register translator 60 is released, in the manner previously explained, thereby to cause the primary selector 50 to operate and complete an established connection between the calling subscriber substation T1 in exchange 1 zone 38 and the called subscriber substation in the exchange in zone 46. The operation of the toll ticketing apparatus, in order to cause a toll ticket individual to the toll call between the calling subscriber substation T1 in exchange 1 zone 38 and the called subscriber substation in the exchange in zone 46, and the subsequent release of the apparatus involved in the established connection, are the same as those previously explained.

*Toll call from a party subscriber substation*

Any one of the subscriber lines in exchange 1 zone 38 may be of the party type, as previously noted. It is now assumed that the subscriber line 350 is of the party type and that the call initiated at the calling party subscriber substation T1 thereon is extended to the primary selector 50 and to the register translator 60, and is to be extended toll, such, for example, as to a called subscriber substation in exchange 4 zone 62. When the register translator selector B380 seizes the trunk 390 extending to the register translator 60, the previously traced circuit for energizing the upper winding of the test relay R320 in the primary selector 50 is completed, thereby to cause the latter relay to operate and complete, at the contacts 321 and 322, the previously traced loop circuit for energizing the winding of the impulse relay R1960 in the register translator 60, thereby to cause the latter relay to operate. As previously noted, the lower winding of the line relay R2000 is short-circuited at this time due to the application of ground potential to the line conductor C393 of the trunk 390 at the contacts 310 of the set of switch springs AS2306. Accordingly, the line relay R2000 does not operate at this time. Also, the previously traced path for applying holding ground potential by way of the winding of the party relay R1930 to the control conductor C363 of the trunk 360 is completed in order to retain the line switch 40 in its operated position. As previously noted, the party relay R1930 is of the marginal type and is adequately energized at this time due to the application of booster battery potential in the line switch 40 to the control conductor C353 of the subscriber line 350, thereby to cause the party relay R1930 to operate. Upon operating, the party relay R1930 completes, at the contacts 1931, an obvious path for applying ground potential by way of the contacts 2436 of the set of switch springs JS2435 to the interceptor conductor C22, 78, for a purpose more fully described hereinafter. The remainder of the operation of the apparatus in the register translator 60 incident to the operation of the impulse relay R1960 is the same as that previously described.

In order to initiate a toll call, the subscriber at the calling party subscriber substation T1 must first dial the prefix digit 11 followed by the directory number of the called subscriber substation, such, for example, as the directory number 6241234, as previously explained, the dialing mechanism at the calling party subscriber substation T1 being of the specially constructed 11-point type, as previously noted. When the prefix digit 11 is dialed at the calling party subscriber substation T1 it is registered in the first code register A2300, in the manner previously explained. When the rotary dial of the dialing mechanism at the calling party subscriber substation T1 is operated to its eleventh position, both the pair of eleventh position springs and the pair of cam control springs therein are operated, thereby to complete a path in the dialing mechanism at the calling party subscriber substation T1 for applying ground potential to the positive line conductor C352 of the subscriber line 350 and, consequently, to the line conductor C393 of the trunk 390 extending to the register translator 60. This application of ground potential to the line conductor C393 of the trunk 390 completes an obvious multiple path for short circuiting the lower winding of the line relay R2000. Accordingly, following the registration of the first impulse of the digit 11 in the first code register A2300, when the set of switch springs AS2306 is actuated, the line relay R2000 does not immediately operate. As previously noted, when the first impulse of a digit is registered in the first code register A2300 the set of switch springs AS2306 is actuated, thereby to interrupt, at the contacts 2310 thereof, the previously traced original path for applying ground potential to the line conductor C393 of the trunk 390. Also, at the contacts 2309 of the set of switch springs AS2306, a circuit is completed for energizing the magnet JM2433, this circuit extending from ground by way of the contacts 2309 of the set of switch springs AS2306, C1979, the contacts 1963 and 2003, C2007 and the magnet JM2433. When thus energized, the magnet JM2433 operates, thereby to condition the wipers noted of the calling party register J2430 to be driven one step in the counterclockwise direction. Successive impulses, following the first impulse, of the digit 11 are registered in the calling party register J2430 prior to operation of the line relay R2000. More particularly, at this time, each time the impulse relay R1960 operates it interrupts, at the contacts 1963, the previously traced circuit for energizing the magnet JM2433, thereby to cause the magnet JM2433 to restore and drive the wipers noted of the calling party register J2430 one step in the counterclockwise direction.

After a predetermined operation of the rotary dial of the dialing mechanism at the calling party subscriber substation T1, the pair of cam control springs in this dialing mechanism is actuated into disengagement, thereby to interrupt the previously mentioned path for applying ground potential to the positive line conductor C352 of the subscriber line 350 and, consequently, to the line conductor C393 of the trunk 390, whereupon the previously mentioned path for short-circuiting the lower winding of the line relay R2000 is interrupted. Hence, at this time, the lower winding of the line relay R2000 is energized in series with the winding of the impulse relay R1960. When the line relay R2000 is thus energized it operates to complete, at the contacts 2002, the previously mentioned holding circuit for energizing the upper winding thereof. Also, the line relay R2000 interrupts, at the contacts 2001, the previously traced path for returning dial tone current over the calling subscriber line 350 to the calling party subscriber substation T1, and interrupts, at the contacts 2003, a point in the previously traced circuit for energizing the magnet JM2433, thereby to arrest further operation thereof and, consequently, further operation of the calling party register J2430. As previously noted, the number of impulses of the digit 11 transmitted by the dialing mechanism at the calling party subscriber substation T1 prior to the operation of the pair of cam control springs in this dialing mechanism determines the time duration of the application of ground potential to the line conductor C393 of the trunk 390 and, consequently, the time duration of retaining restored the line relay R2000 and, consequently, the number of impulses of the digit 11 registered in the calling party register J2430. More specifically, the number of impulses of the prefix digit 11, during which ground potential is applied in the dialing mechanism at the calling party subscriber substation T1 to the positive line conductor C352 of the subscriber line 350, corresponds to the position of the calling party subscriber substation T1 upon the associated party subscriber line 350, thereby to cause a digit to be registered in the calling party register J2430 corresponding to the suffix digit of the directory number of the calling party subscriber substation T1.

Hence, at the conclusion of the prefix digit 11, there is registered in the calling party register J2430 the suffix digit of the directory number of the calling party subscriber substation T1; and there is registered in the first code register A2300 the prefix digit 11. It is noted that, when the prefix digit 11 is registered in the first code register A2300, the first code register A2300 is in fact released as there are only eleven contacts in the contact banks associated with the wipers thereof, previously noted. Accordingly, at this time, the wipers noted of the first code register A2300 reengage the home contacts in the associated contact banks. Also, it is noted that, when the calling party register J2430 is operated, the set of switch springs JS2435 is actuated, thereby to interrupt, at the contacts 2436 thereof, the previously mentioned path for applying ground potential to the interceptor conductor C2278.

The subscriber at the calling party subscriber substation T1 then proceeds to dial the directory number 6241234 of the called subscriber substation in exchange 4 zone 62, thereby to cause the digits 624 to be registered respectively in the first code register A2300, the second code register B2320 and the third code register C2330, and to cause the digits 1234 to be registered respectively in the first numerical register D2350, the second numerical register E2360, the third numerical register F2400 and the fourth numerical register G2410. It is pointed out that the digit 6 will be registered in the first code register A2300 like the prefix digit 11, due to the fact that the wipers noted of the sequence switch S2440 are not operated away from their home positions following the conclusion of the prefix digit 11. This result is accomplished by virtue of the fact that the previously traced circuit for energizing the magnet SM2444, following the conclusion of the first digit dialed, includes the contacts 2311 of the set of switch springs AS2306, which set of switch springs AS2306 are reactuated when the wipers noted of the first code register A2300 are actuated back into their home positions, thereby to interrupt, at the contacts 2311 thereof, a point in the previously traced circuit for energizing the magnet SM2444. Hence, the magnet SM2444 is not energized and subsequently deenergized incident to the restoration of the transfer relay R2030 at the conclusion of the prefix digit 11, in the present example.

The subsequent operation of the register translator 60, the primary selector 50, the toll ticketing repeater 80 and the automatic switching apparatus in the various exchanges, in order to establish a connection between the calling party subscriber substation T1 in exchange 1 zone 38 and the called party subscriber substation in exchange 4 zone 62, is the same as that previously explained. Also, incident to the release of this connection at the calling party subscriber substation T1 in exchange 1 zone 38, the toll ticketing apparatus operates in order to produce a toll ticket individual to the toll call between exchange 1 zone 38 and exchange 4 zone 62, in the manner previously explained. At this point, it is noted that, on the ticket produced by the toll ticketing apparatus, at this time, there will be printed in the space entitled Calling zone Ex. No. the numerals 381—29214; assuming that the suffix digit of the directory number of the calling party subscriber substation T1 is 4 due to the fact that the suffix digit 4 is registered in the calling party register J2430 at the conclusion of the toll call, in the present example.

In the event the subscriber at the calling party subscriber substation T1 should attempt to initiate a toll call, such as that previously described, without first dialing the prefix digit 11, the connection is automatically routed from the calling party subscriber substation T1 to the toll operator position 110. More particularly, when the rotary dial of the dialing mechanism at the calling party subscriber substation T1 is operated, the pair of eleventh position springs in this dialing mechanism is actuated into engagement, thereby to cause ground potential to be applied to the positive line conductor C352 of the subscriber line 350, only in the event the prefix digit 11 is dialed. Thus, in the event the subscriber at the calling party subscriber substation T1 attempts to set up a toll connection by dialing the directory number of the called subscriber substation directly without first dialing the prefix digit 11, ground potential is not connected to the positive line conductor C352 of the subscriber line 350 and, consequently, to the line conductor C393 of the trunk 390. Thus, when the first impulse of the first digit dialed at the calling party subscriber substation T1 is registered in the first code register A2300, the set of switch springs AS2306 is actuated, thereby to interrupt, at the contacts 2310 thereof, the previously traced path for short-circuiting the lower winding of the line relay R2000, whereupon the line relay R2000 operates immediately. Upon operating, the line relay R2000 interrupts, at the contacts 2003, a point in the previously traced circuit for energizing the magnet JM2433, thereby to prevent energization and deenergization of the magnet JM2433 and the consequent operation of the calling party register J2430. Hence, in this event, no digit is registered in the calling party register J2430 and the various digits dialed at the calling party subscriber substation T1 are registered directly in the various code registers and the various numerical registers, in the manner previously explained.

In the present example, at the conclusion of the third digit dialed at the calling subscriber substation T1, the wiper 2442 of the digit sequence switch S2440 is actuated into engagement with the third contact in the associated contact bank, thereby to initiate operation of the pulse relay R2040, in the manner previously explained. Also, at this time, the first three digits dialed at the calling party subscriber substation T1 are respectively registered in the first code register A2300, the second code register B2320 and the third code register C2330, thereby to cause the first code register A2300 to select, in accordance with the digit registered therein, a predetermined one of the wipers carried by the wiper carriage of the Strowger mechanism in the composite code switch P2230, and cause the wiper carriage of the Strowger mechanism in the composite code switch P2230 to be operated to a predetermined vertical and rotary position respectively corresponding to the digits registered in the second code register B2320 and the third code register C2330, in the manner previously explained. Also, at this time, the previously mentioned path for applying ground potential to the interceptor conductor C2278 is completed, due to the non-actuated position of the set of switch springs JS2435 associated with the calling party register J2430, no digit being registered in the calling party register J2430 at this time. The path for applying ground potential to the interceptor conductor C2278 extends from ground by way of the contacts 2436 of the set of switch springs JS2435 by way of C1978, and the contacts 1931 to the interceptor conductor C2278.

This application of ground potential to the interceptor conductor C2278 marks the I up I in position in the contact bank associated with the control wiper 2218 carried by the wiper carriage of the Strowger mechanism in the rate and route switch R2210, thereby to cause the pulse relay R2040 to operate the vertical and rotary magnets RM2220 and RM2221, respectively, in order to cause the wiper carriage of the Strowger mechanism in the rate and route switch R2210 to be driven one step in the vertical direction and one step in the rotary direction, regardless of the setting of the wiper carriage of the Strowger mechanism in the composite code switch P2230. Thus, it will be understood that, in the event the subscriber at the calling party subscriber substation T1 attempts to initiate a toll call without first dialing the prefix digit 11, the operation of the register translator 60 is effective to cause the wiper carriage of the Strowger mechanism in the rate and route switch R2210 to be operated to its I up I position, regardless of the digits dialed at the calling party subscriber substation T1.

When the wiper carriage of the Strowger mechanism in the rate and route switch R2210 occupies its I up I in position, the wipers 2215, 2214 and 2213 carried thereby respectively engage, in the associated contact banks, contacts respectively connected by way of the jumper 2275 to the marking conductors 1, I and 0 in the marking cable 2281, thereby to cause the register translator 60 to transmit the routing digits 110 to the primary selector 50. The primary selector 50 responds to the first routing digit 1 in order to select an idle trunk in the associated group extending to an idle special service selector, such, for example, as the trunk 481 extending to the special service selector 54. This special service selector 54 is of the dropback type and is operated and dropped back to its normal position in response to the second routing digit 1. Subsequently, the special service selector 54 is operated in accordance with the digit 0 to select an idle trunk, such, for example, as the trunk illustrated, extending to the toll operator position 110; whereby an operative connection is completed between the calling party subscriber substation T1 and the toll operator position 110 by way of the line switch 40, the primary selector 50, the trunk 481, the special service selector 54 and the trunk illustrated extending to the toll operator position 110. The operator at the toll operator position 110 then answers the call and advises the subscriber at the calling party subscriber substation T1 that he failed to dial the prefix digit 11 prior to attempting to set up a toll connection. At this point, the operator at the toll operator position 110 may extend the connection for the subscriber at the calling party subscriber substation T1 in the usual manner; or the subscriber at the calling party subscriber substation T1 may release the connection and dial the desired toll connection in the proper manner, as previously explained, the release of the connection between the calling party subscriber substation T1 and the toll operator position 110 being identical to that previously described.

*Local call from a party subscriber substation*

Assuming that the call extending from the calling party subscriber substation T1 to the primary selector 50 and the register translator 60 is to be extended locally to the called subscriber substation T3 in exchange I zone 38, the subscriber at the calling party subscriber substation T1 merely proceeds to dial the directory number of the called subscriber substation T3, in the manner previously explained, the directory number of the called subscriber substation T3 being 3811254 as previously noted.

In the present example, when the first digit 3 is registered in the first code register A2300 and the second digit 8 is registered in the second code register B2320, the register translator 60 is released in view of the fact that the first and second digits 3 and 8 respectively indicate that the call is to be extended locally, in the manner previously explained. The subsequent routing of the connection from the calling party subscriber substation T1 to the called subscriber substation T3 is controlled directly from the dialing mechanism at the calling party subscriber substation T1, in the manner previously explained. In view of the fact that the register translator 60 is released at the conclusion of the second digit 8, the call is not routed from the calling party subscriber substation T1 to the toll operator position 110, in the manner previously explained, as is the case when the subscriber at the calling party subscriber substation T1 attempts to initiate a toll call without first dialing the prefix digit 11. The subsequent operation of the apparatus, in order to complete the connection between the calling party subscriber substation T1 and the called subscriber substation T3, and the ultimate release thereof are the same, as previously explained.

*Conclusions*

From the foregoing, it is apparent that an automatic telephone system is provided, which comprises automatic recording apparatus operative to record, without the aid of an operator, given particulars of certain calls in the system for which special charges are made, regardless of whether the calls are originated at private or party subscriber substations, and improved apparatus selectively controllable to govern the assessment of the charges against either the calling subscriber substation or the called subscriber substation, regardless of whether the calls are originated at or completed to private or party subscriber substations.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a calling station, a called station, means for setting up a connection between said stations, automatic means for establishing a charge for said connection, means normally operative to assess said established charge against said calling station, and means responsive to the transmission over said connection of a predetermined digit dialed at said called station for rendering said last-mentioned means operative to assess said established charge against said called station.

2. In a telephone system provided with subscriber lines of both the private type and the party type, a calling subscriber line, a called subscriber line, means for setting up a connection between said subscriber lines, and subscriber controllable means for assessing the charge for said connection against said called subscriber line in the event it is of the private type or against the particular called subscriber substation on said called subscriber line in the event it is of the party type.

3. In a telephone system provided with subscriber lines of both the private type and the party type, a calling subscriber line, a called subscriber line, means for setting up a connection between said subscriber lines, and subscriber controllable means for selectively assessing the charge for said connection against said calling subscriber line in the event it is of the private type or against the particular calling subscriber substation on said calling subscriber line in the event it is of the party type or against said called subscriber line in the event it is of the private type or against the particular called subscriber substation on said called subscriber line in the event it is of the party type.

4. In a telephone system provided with subscriber lines of both the private type and the party type, a calling subscriber line, a called subscriber line, means for setting up a connection between said subscriber lines, automatic means for establishing a charge for said connection, and subscriber controllable means for selectively assessing said established charge for said connection against said calling subscriber line in the event it is of the private type or against the particular calling subscriber substation on said calling subscriber line in the event it is of the party type or against said called subscriber line in the event it is of the private type or against the particular called subscriber substation on said called subscriber line in the event it is of the party type.

5. In a telephone system, a calling station, a called station, automatic switching apparatus including a link for setting up a connection between said stations, automatic means for establishing a charge for said connection, means normally operative to assess said charge against said calling station, said link including a register, control means for registering in said register a predetermined digit transmitted over said connection and dialed at said called station, and means governed only in the event said predetermined digit is registered in said register for rendering said calling station charge assessing means operative to assess said charge against said called station.

6. In a telephone system, a calling station, a called station, switching apparatus for setting up a connection between said stations, automatic means for registering certain items of record information pertaining to said connection, means controllable from said called station for registering an item indicating that said called station desires a special service in conjunction with said connection, and means including a recorder for producing a record of said registered items.

7. In a telephone system, a calling station, a called station, switching apparatus for setting up a connection between said stations, automatic means for registering certain items of record information pertaining to said connection including a first item indicating the established charge for said connection, means selectively operative to register a second item indicating whether the charge for said connection is to be assessed against said calling station or said called station, and means including a recorder for producing a record of said registered items.

8. In a telephone system, a calling station, a called station, switching apparatus for setting up a connection between said stations, automatic means controlled incident to the setting up of said connection for registering certain items of record information pertaining to said connection, means selectively operative over said connection prior to the release thereof for registering another item indicating whether the charge for said connection is to be assessed against said calling station or said called station, a recorder operative to produce a record of said registered items, and means controlled incident to the release of said connection for establishing a charge item for said connection dependent upon both the location of said stations with respect to each other and the time duration of said connection and for registering said charge item and for operating said recorder.

9. In a telephone system, a calling station, a called station, switching apparatus for setting up a connection between said stations, automatic means controlled incident to the setting up of said connection for registering certain items of record information pertaining to said connection and including an item identifying said calling station and an item identifying said called station, means selectively operative over said connection prior to the release thereof for registering another item indicating whether the charge for said connection is to be assessed against said calling station or said called station, a printer operative to print on a ticket individual to said connection said registered items, and means controlled incident to the release of said connection for establishing a charge item for said connection dependent upon both the location of said stations with respect to each other and the time duration of said connection and for registering said charge item and for operating said printer.

10. In a telephone system, a calling station, a called station, means for setting up a connection between said stations, means controlled incident to the setting up of said connection for collecting certain items of record information pertaining to said connection including an item identifying said calling station and an item identifying said called station, additional means controlled incident to the setting up of said connection for establishing a rate factor applicable thereto, means controllable over said connection for selectively determining whether the charge for said connection is to be assessed against said calling station or said called station, means operable progressively during said connection for establishing a time factor applicable thereto, means controlled incident to the termination of said connection and governed jointly in accordance with said established rate factor and said established time factor for producing a charge item, a recorder, and additional means controlled incident to the termination of said connection for operating said recorder to record said items and another item indicating that said established charge item is to be assessed against said determined station.

11. In a telephone system, a calling station, a called station, switching apparatus for setting up a connection between said stations, means controlled over said connection for registering a reversal of charge indication, means operated responsive to the termination of said connection for establishing a charge for said connection, and means for printing a record of said established charge in such a manner as to assess it against said calling station in the event that said reversal of charge indication has not been registered, or for printing a record of said established charge in such a manner as to assess it against said called station in the event said reversal of charge indication has been registered.

12. In a telephone system, a calling station, a called station, switching apparatus for setting up a connection between said stations, means controlled over said connection for registering a reversal of charge indication, means operated responsive to the termination of said connection for establishing a charge for said connection, and means for printing a record of said registered charge so as to assess the same against said calling station or said called station, depending upon whether or not registration has been made of said reversal of charge indication.

13. In a telephone system, a calling station, a called station, means for setting up a connection between said stations, automatic means for establishing a charge for said connection, a printer, means operated responsive to the termination of said connection for normally operating said printer to assess said established charge against said calling station, and means at times operated under control of said called station prior to the termination of said connection for operating said printer upon the termination of said connection to assess said established charge against said called station.

14. In a telephone system, a calling station, a called station, switching apparatus for establishing a connection between said stations, means operated during the establishment of said connection for registering identifications of said calling station and said called station, means operable over said established connection for registering a reversal of charge indication, means operated responsive to the termination of said connection for establishing a charge for said connection, means thereafter operated depending upon the non-operated or operated condition of said reversal of charge register for either printing a record of said identification and said established charge whereby the charge for said connection is assessed against said calling station, or for printing a record of said identifications, said established charge, and said reversal of charge indication whereby the charge for said connection is assessed against said called station.

15. In a telephone system, a calling station, a called station, switching apparatus for setting up a connection between said stations, means for registering the identification of both said calling and called stations, means controlled over said connection for registering a reversal of charge indication, means operated responsive to the termination of said connections for establishing a total charge for said connection, and means for producing a record of said registered identifications, said established charge, and said reversal of charge indication, whereby the charge for said connection is assessed against said called station.

JOHN E. OSTLINE.

REFERENCES CITED

The following references are of record in the file of this patent:

UNITED STATES PATENTS

| Number | Name | Date |
|---|---|---|
| 1,673,420 | Ostline | June 12, 1928 |
| 2,007,736 | Wilson | July 9, 1935 |
| 2,089,768 | Stevenson | Aug. 10, 1937 |
| 2,272,475 | Ostline | Feb. 10, 1942 |
| 2,297,365 | Ostline | Sept. 29, 1942 |
| 2,300,829 | Gooderhorn | Nov. 3, 1942 |
| 2,352,492 | Ostline | June 27, 1944 |